(12) United States Patent
Rich et al.

(10) Patent No.: US 11,221,448 B2
(45) Date of Patent: Jan. 11, 2022

(54) ANIMATED OPTICAL SECURITY FEATURE

(71) Applicant: WAVEFRONT TECHNOLOGY, INC., Paramount, CA (US)

(72) Inventors: Christopher Chapman Rich, Rancho Palos Verdes, CA (US); Joel Mikael Petersen, Valley Village, CA (US); Roger Winston Phillips, Santa Rosa, CA (US); John Michael Tamkin, Pasadena, CA (US)

(73) Assignee: WAVEFRONT TECHNOLOGY, INC., Paramount, CA (US)

( * ) Notice: Subject to any disclaimer, the term of this patent is extended or adjusted under 35 U.S.C. 154(b) by 0 days.

(21) Appl. No.: 16/795,501

(22) Filed: Feb. 19, 2020

(65) Prior Publication Data
US 2020/0400892 A1 Dec. 24, 2020

Related U.S. Application Data

(60) Provisional application No. 62/838,242, filed on Apr. 24, 2019, provisional application No. 62/836,579, filed on Apr. 19, 2019.

(51) Int. Cl.
*G02B 6/35* (2006.01)
*F21V 8/00* (2006.01)

(52) U.S. Cl.
CPC ........... *G02B 6/3504* (2013.01); *G02B 6/003* (2013.01); *G02B 6/3512* (2013.01); *G02B 6/3532* (2013.01); *G02B 6/3556* (2013.01)

(58) Field of Classification Search
CPC .... G02B 6/3504; G02B 6/003; G02B 6/3556; G02B 6/3532
See application file for complete search history.

(56) References Cited

U.S. PATENT DOCUMENTS

| 4,124,947 A | 11/1978 | Kuhl et al. |
| 4,186,943 A | 2/1980 | Lee |
| 4,417,784 A | 11/1983 | Knop et al. |
| 4,534,398 A | 8/1985 | Crane |

(Continued)

FOREIGN PATENT DOCUMENTS

| AU | 2014250638 | 11/2014 |
| AU | 2014250641 | 11/2014 |

(Continued)

OTHER PUBLICATIONS

Hecht, Eugene, "Optics", Third Edition, Addison-Wesley Publishing Company, Ch. 9.3.1, 1998, pp. 385-392.
International Search Report and Written Opinion received in PCT Application No. PCT/US2015/057235, dated Feb. 23, 2016 in 12 pages.
International Search Report and Written Opinion received in PCT Application No. PCT/US2016/041935, dated Nov. 4, 2016 in 12 pages.

(Continued)

*Primary Examiner* — Joseph L Williams
(74) *Attorney, Agent, or Firm* — Knobbe, Martens, Olson & Bear, LLP

(57) ABSTRACT

An optical device includes an array of lenses and a plurality of segments disposed under the array of lenses. The plurality of segments corresponds to a plurality of images. Upon tilting the device at different viewing angle, the array of lenses presents images sequentially. In some examples, individual ones of the segments can comprise specular reflecting, transparent, diffusely reflecting, and/or diffusely transmissive features. In some examples, individual ones of the segments can comprise transparent and non-transparent regions. Some examples can incorporate more than one region producing an optical effect.

31 Claims, 37 Drawing Sheets

(56) References Cited

U.S. PATENT DOCUMENTS

| | | |
|---|---|---|
| 4,681,451 A | 7/1987 | Guerra et al. |
| 4,892,336 A | 1/1990 | Kaule et al. |
| 5,105,306 A | 4/1992 | Ohala |
| 5,276,478 A | 1/1994 | Morton |
| 5,291,317 A | 3/1994 | Newswanger |
| 5,600,486 A | 2/1997 | Gal et al. |
| 5,689,340 A | 11/1997 | Young |
| 5,699,190 A | 12/1997 | Young et al. |
| 5,924,870 A | 7/1999 | Brosh et al. |
| 6,351,334 B1 | 2/2002 | Hsieh et al. |
| 6,410,213 B1 | 6/2002 | Raguin et al. |
| 6,424,467 B1 | 7/2002 | Goggins |
| 6,817,530 B2 | 11/2004 | Labrec et al. |
| 7,047,883 B2 | 5/2006 | Raksha et al. |
| 7,298,533 B2 | 11/2007 | Petersen et al. |
| 7,333,268 B2 | 2/2008 | Steenblik et al. |
| 7,551,335 B2 | 6/2009 | Schilling et al. |
| 7,729,026 B2 | 6/2010 | Argoitia et al. |
| 8,009,360 B2 | 8/2011 | Steenblik et al. |
| 8,025,239 B2 | 9/2011 | Labrec et al. |
| 8,077,393 B2 | 12/2011 | Steenblik et al. |
| 8,111,462 B2 | 2/2012 | Steenblik et al. |
| 8,120,855 B2 | 2/2012 | Steenblik et al. |
| 8,144,399 B2 | 3/2012 | Steenblik et al. |
| 8,254,030 B2 | 8/2012 | Steenblik et al. |
| 8,284,492 B2 | 10/2012 | Crane et al. |
| 8,310,760 B2 | 11/2012 | Steenblik et al. |
| 8,739,711 B2 | 6/2014 | Cote |
| 8,755,121 B2 | 6/2014 | Cape et al. |
| 8,773,763 B2 | 7/2014 | Steenblik et al. |
| 8,861,055 B2 | 10/2014 | Holmes et al. |
| 8,867,134 B2 | 10/2014 | Steenblik et al. |
| 8,964,296 B2 | 2/2015 | Hoffmuller et al. |
| 8,982,231 B2 | 3/2015 | Vincent |
| 9,016,726 B2 | 4/2015 | Rauch et al. |
| 9,132,690 B2 | 9/2015 | Raymond et al. |
| 9,234,992 B2 | 1/2016 | Hill et al. |
| 9,827,802 B2 | 11/2017 | Fuhse et al. |
| 10,252,563 B2 | 4/2019 | Rich et al. |
| 10,850,550 B2 | 12/2020 | Rich et al. |
| 10,859,851 B2 | 12/2020 | Rich et al. |
| 2003/0179364 A1 | 9/2003 | Steenblik et al. |
| 2003/0183695 A1 | 10/2003 | Labrec et al. |
| 2004/0240777 A1 | 12/2004 | Woodgate et al. |
| 2005/0180020 A1 | 8/2005 | Steenblik et al. |
| 2006/0056065 A1 | 3/2006 | Schilling et al. |
| 2007/0273143 A1 | 11/2007 | Crane et al. |
| 2008/0036196 A1 | 2/2008 | Steenblik et al. |
| 2008/0037131 A1 | 2/2008 | Steenblik et al. |
| 2008/0165423 A1 | 7/2008 | Steenblik et al. |
| 2008/0166505 A1 | 7/2008 | Huang et al. |
| 2008/0212192 A1 | 9/2008 | Steenblik et al. |
| 2008/0212193 A1 | 9/2008 | Steenblik et al. |
| 2008/0258456 A1 | 10/2008 | Rahm et al. |
| 2008/0309063 A1 | 12/2008 | Zintzmeyer |
| 2009/0021840 A1 | 1/2009 | Steenblik et al. |
| 2009/0034082 A1 | 2/2009 | Commander et al. |
| 2009/0102179 A1 | 4/2009 | Lo |
| 2009/0122412 A1 | 5/2009 | Steenblik et al. |
| 2010/0172000 A1 | 7/2010 | Holmes |
| 2010/0246019 A1 | 9/2010 | Booyens et al. |
| 2010/0308571 A1 | 12/2010 | Steenblik et al. |
| 2011/0019283 A1 | 1/2011 | Steenblik et al. |
| 2011/0209328 A1 | 9/2011 | Steenblik et al. |
| 2012/0099199 A1 | 4/2012 | Vasylyev |
| 2012/0170124 A1 | 7/2012 | Fuhse et al. |
| 2012/0237675 A1 | 9/2012 | Sharp et al. |
| 2012/0319395 A1 | 12/2012 | Fuhse et al. |
| 2013/0052373 A1 | 2/2013 | Noizet |
| 2013/0093172 A1 | 4/2013 | Fuhse et al. |
| 2013/0099474 A1 | 4/2013 | Fuhse et al. |
| 2013/0106092 A1 | 5/2013 | Holmes |
| 2013/0182300 A1 | 7/2013 | Müller et al. |
| 2013/0193679 A1 | 8/2013 | Fuhse et al. |
| 2013/0270813 A1 | 10/2013 | Hoffmuller et al. |
| 2014/0151996 A1 | 6/2014 | Camus |
| 2014/0160568 A1 | 6/2014 | Fuhse |
| 2014/0177008 A1 | 6/2014 | Raymond et al. |
| 2014/0184599 A1 | 7/2014 | Quilot et al. |
| 2014/0191500 A1 | 7/2014 | Holmes |
| 2014/0268332 A1 | 9/2014 | Guo et al. |
| 2014/0346766 A1 | 11/2014 | Walter et al. |
| 2015/0084324 A1 | 3/2015 | Spehar |
| 2015/0198924 A1 | 7/2015 | Woida-O'Brien |
| 2015/0213666 A1 | 7/2015 | Schiffmann et al. |
| 2015/0258838 A1 | 9/2015 | Fuhse |
| 2015/0352884 A1 | 12/2015 | Fuhse et al. |
| 2016/0023495 A1 | 1/2016 | Fuhse et al. |
| 2016/0075166 A1 | 3/2016 | Ritter et al. |
| 2016/0147076 A1 | 5/2016 | Rich et al. |
| 2016/0167421 A1 | 6/2016 | Holmes |
| 2016/0176221 A1 | 6/2016 | Holmes |
| 2016/0178221 A1 | 6/2016 | Thornton |
| 2017/0129272 A1 | 5/2017 | Rich et al. |
| 2018/0001692 A1 | 1/2018 | Rich et al. |
| 2019/0236887 A1 | 8/2019 | Rich et al. |
| 2020/0039279 A1 | 2/2020 | Rich et al. |

FOREIGN PATENT DOCUMENTS

| | | |
|---|---|---|
| CN | 1906547 | 1/2007 |
| CN | 101563640 | 10/2009 |
| CN | 102712206 | 10/2012 |
| CN | 103748284 | 4/2014 |
| CN | 104769490 | 7/2015 |
| CN | 104838304 | 8/2015 |
| CN | 105636798 | 6/2016 |
| DE | 10 2015 015 991 | 6/2017 |
| EP | 0 323 108 | 7/1989 |
| EP | 2 270 557 | 1/2011 |
| EP | 2 338 692 | 6/2011 |
| EP | 2 365 374 | 9/2011 |
| EP | 2 365 375 | 9/2011 |
| EP | 2 365 378 | 9/2011 |
| EP | 1 776 242 | 10/2011 |
| EP | 2 384 902 | 11/2011 |
| EP | 2 450 735 | 5/2012 |
| EP | 2 461 203 | 6/2012 |
| EP | 2 608 161 | 6/2013 |
| EP | 2 660 070 | 11/2013 |
| EP | 2 708 371 | 3/2014 |
| EP | 2 727 742 | 5/2014 |
| EP | 2 853 411 | 4/2015 |
| EP | 2 860 042 | 4/2015 |
| EP | 2 886 356 | 6/2015 |
| EP | 2 365 376 | 10/2015 |
| EP | 2 400 338 | 12/2015 |
| JP | 2013-509312 | 3/2013 |
| JP | 2013-509314 | 3/2013 |
| WO | WO 95/026916 | 10/1995 |
| WO | WO 98/015418 | 4/1998 |
| WO | WO 00/013916 | 3/2000 |
| WO | WO 01/070516 | 9/2001 |
| WO | WO 2005/106601 | 11/2005 |
| WO | WO 2006/013215 | 2/2006 |
| WO | WO 2006/125224 | 11/2006 |
| WO | WO 2007/020048 | 2/2007 |
| WO | WO 2007/056782 | 5/2007 |
| WO | WO 2007/131375 | 11/2007 |
| WO | WO 2008/008635 | 1/2008 |
| WO | WO 2009/126030 | 10/2009 |
| WO | WO 2011/051668 | 5/2011 |
| WO | WO 2011/051670 | 5/2011 |
| WO | WO 2011/066990 | 6/2011 |
| WO | WO 2011/116425 | 9/2011 |
| WO | WO 2012/027779 | 3/2012 |
| WO | WO 2012/048847 | 4/2012 |
| WO | WO 2012/055505 | 5/2012 |
| WO | WO 2012/055506 | 5/2012 |
| WO | WO 2012/055537 | 5/2012 |
| WO | WO 2012/055538 | 5/2012 |
| WO | WO 2012/084169 | 6/2012 |
| WO | WO 2012/084182 | 6/2012 |
| WO | WO 2013/007374 | 1/2013 |

(56) References Cited

FOREIGN PATENT DOCUMENTS

| WO | WO 2013/055318 | 4/2013 |
|----|----|----|
| WO | WO 2013/079542 | 6/2013 |
| WO | WO 2013/091819 | 6/2013 |
| WO | WO 2014/024145 | 2/2014 |
| WO | WO 2014/044402 | 3/2014 |
| WO | WO 2014/060089 | 4/2014 |
| WO | WO 2014/060115 | 4/2014 |
| WO | WO 2014/065799 | 5/2014 |
| WO | WO 2014/095057 | 6/2014 |
| WO | WO 2014/174402 | 10/2014 |
| WO | WO 2015/011494 | 1/2015 |
| WO | WO 2015/078572 | 6/2015 |
| WO | WO 2015/078573 | 6/2015 |
| WO | WO 2016/065331 | 4/2016 |
| WO | WO 2017/011476 | 1/2017 |
| WO | WO 2017/184581 | 10/2017 |
| WO | WO 2019/077419 | 4/2019 |
| WO | WO 2020/214239 | 10/2020 |

OTHER PUBLICATIONS

International Search Report and Written Opinion received in PCT Application No. PCT/US2017/028094, dated Aug. 14, 2017 in 14 pages.
International Search Report and Written Opinion received in PCT Application No. PCT/US2018/056296, dated Dec. 11, 2018 in 27 pages.
International Search Report and Written Opinion received in PCT Application No. PCT/US2020/018913, dated Jun. 16, 2020 in 10 pages.
"Positive and Negative Photoresist", https://web.archive.org/web/20151017081844/http://www.ece.gatech.edu:80/research/labs/vc/theory/PosNegRes.html, as archived Oct. 17, 2015 in 1 page.
"Insights into New OVDs", Presented by Dr. Mark Deakes at The Holography Conference, Nov. 2017, Barcelona, 38 pages.
Yen, Eugene K. et al., "The Ineffectiveness of the Correlation Coefficient for Image Comparisons", http://lib-www.lanl.gov/la-pubs/00418797.pdf, LA-UR-96-2474, 13 pages.

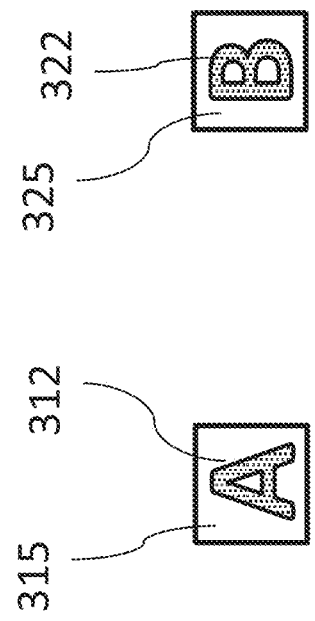
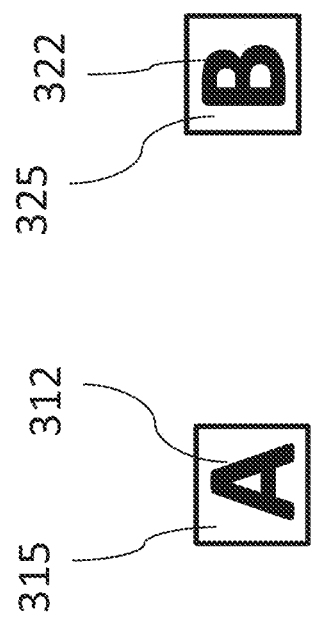

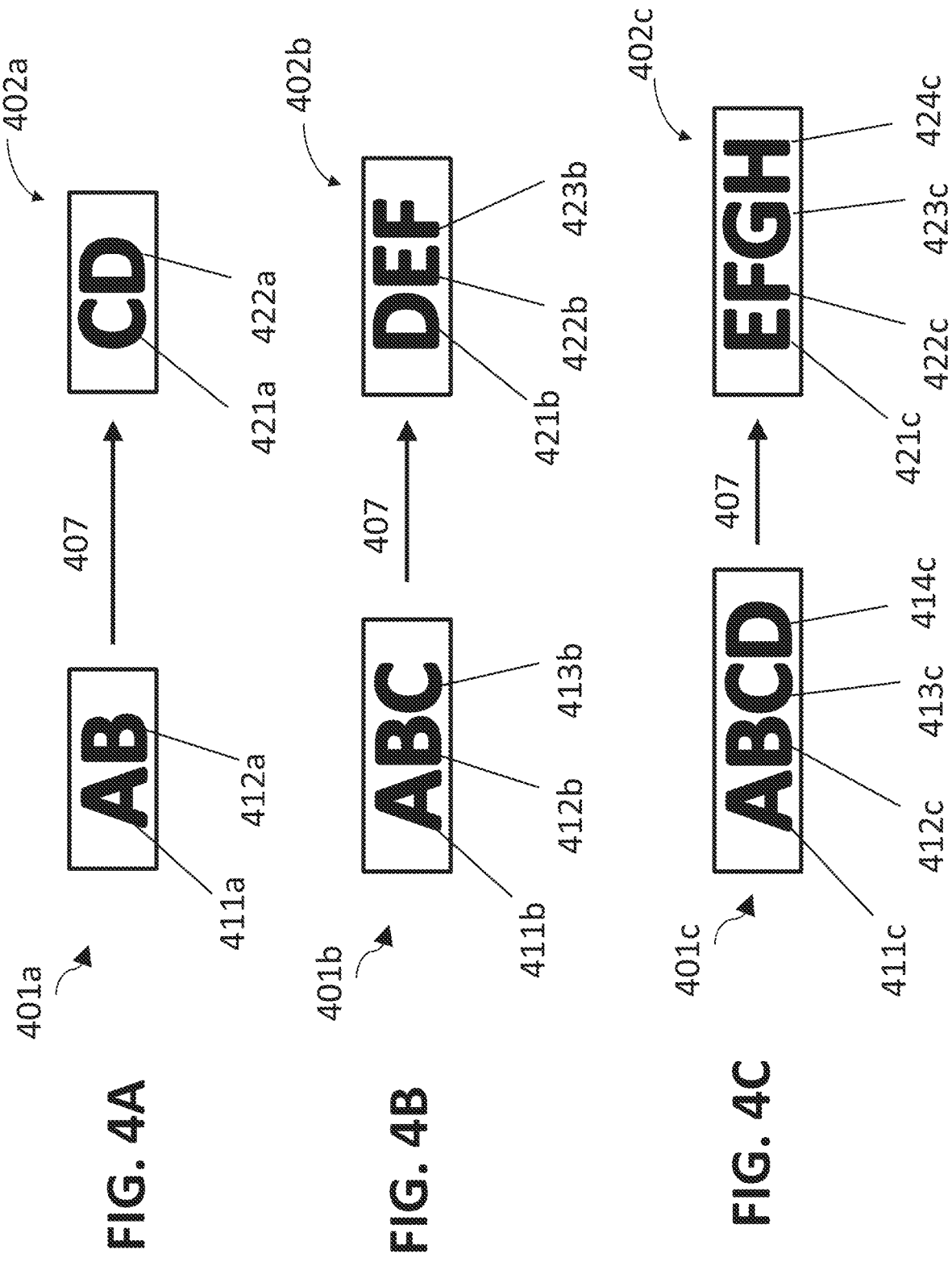

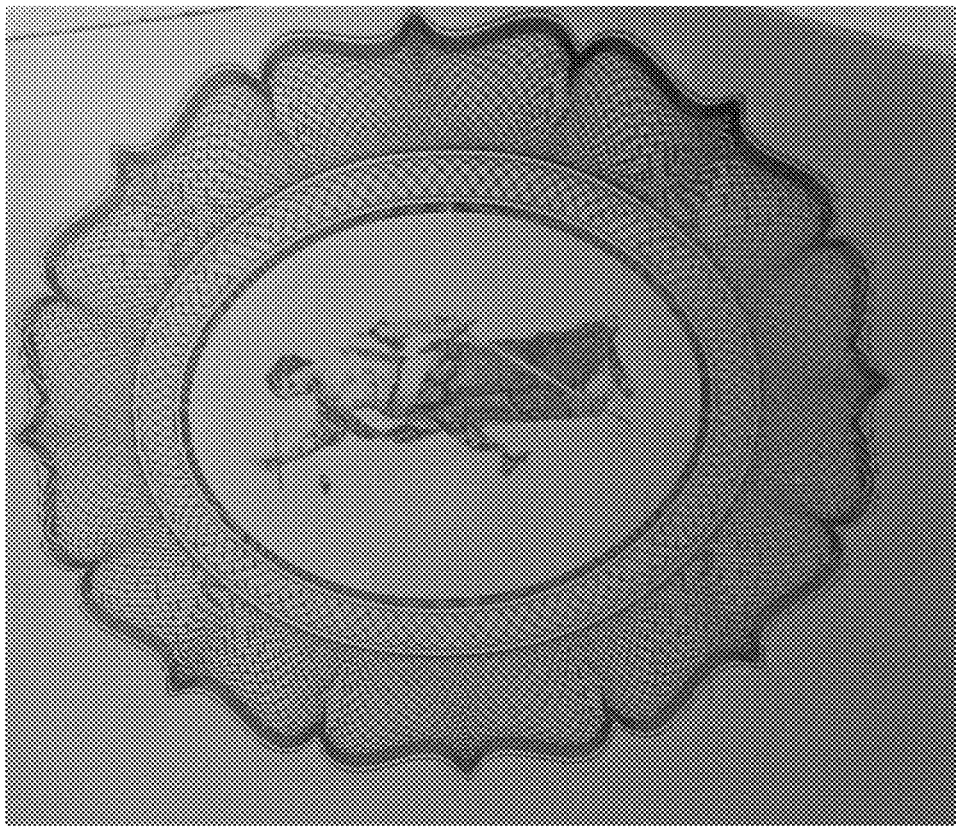
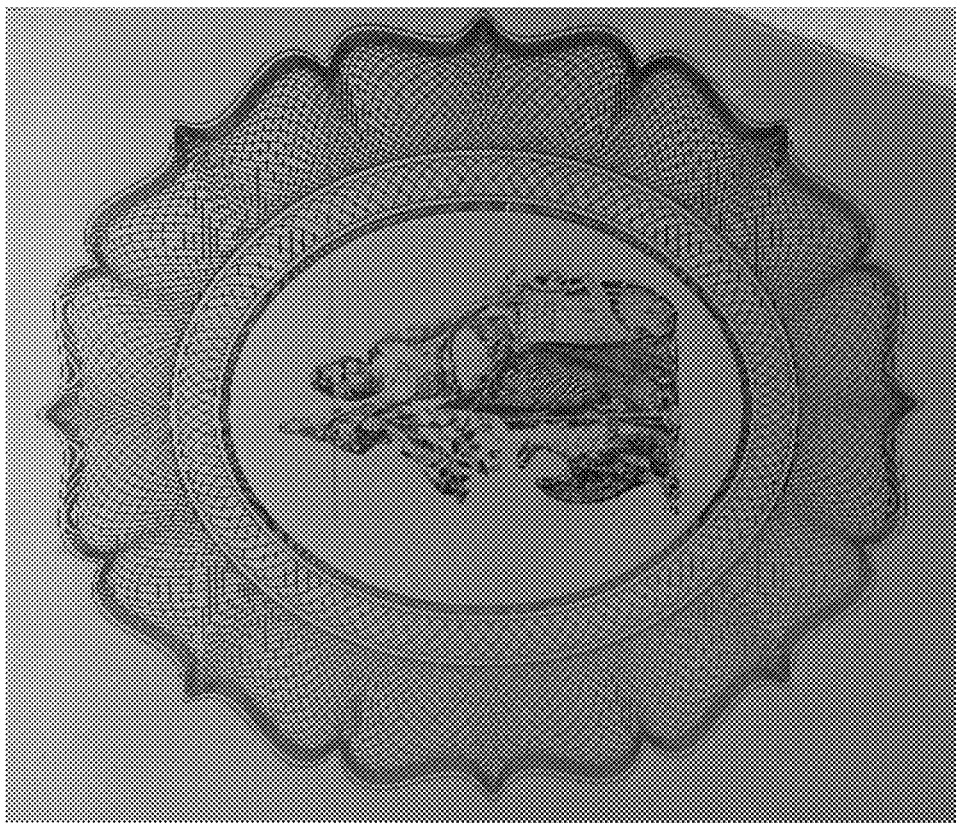
FIG. 8A

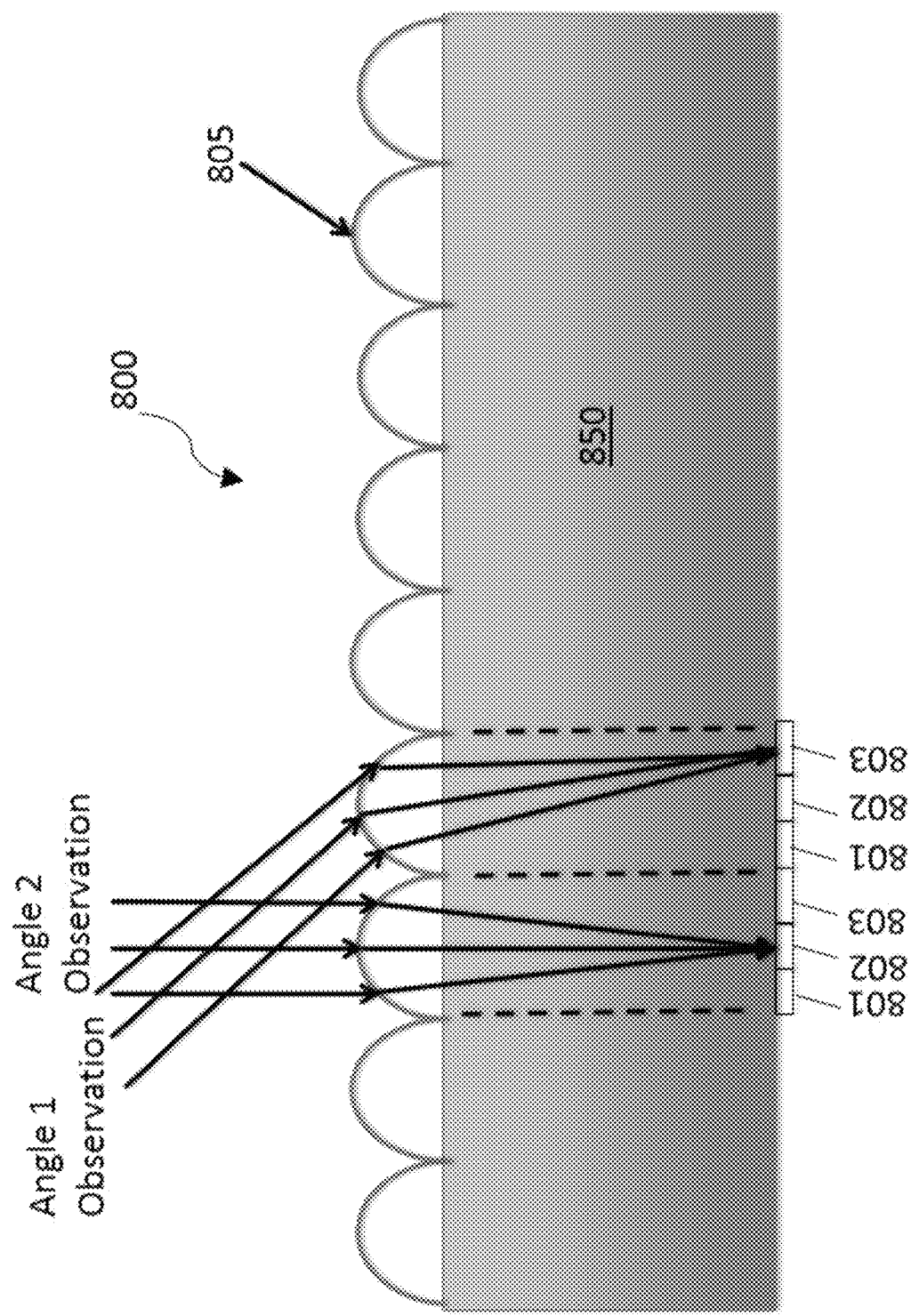

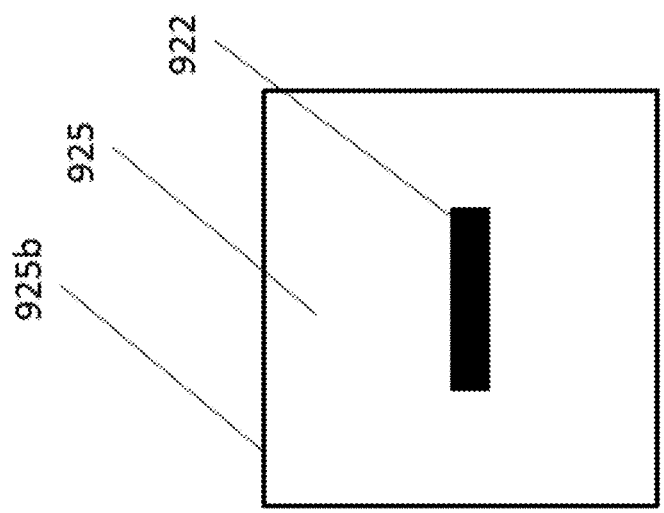
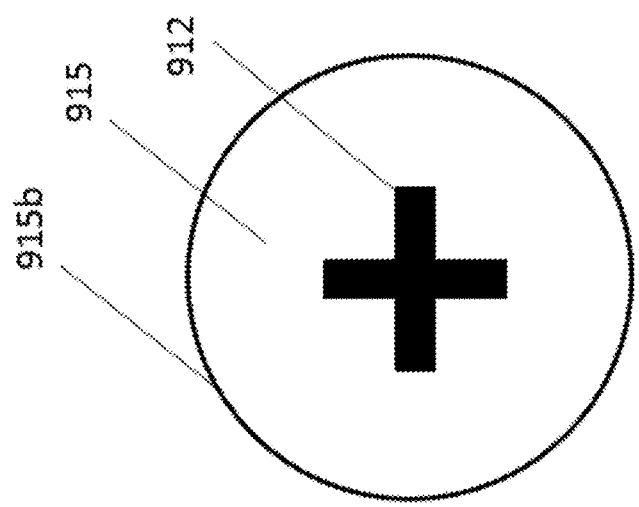
FIG. 9B

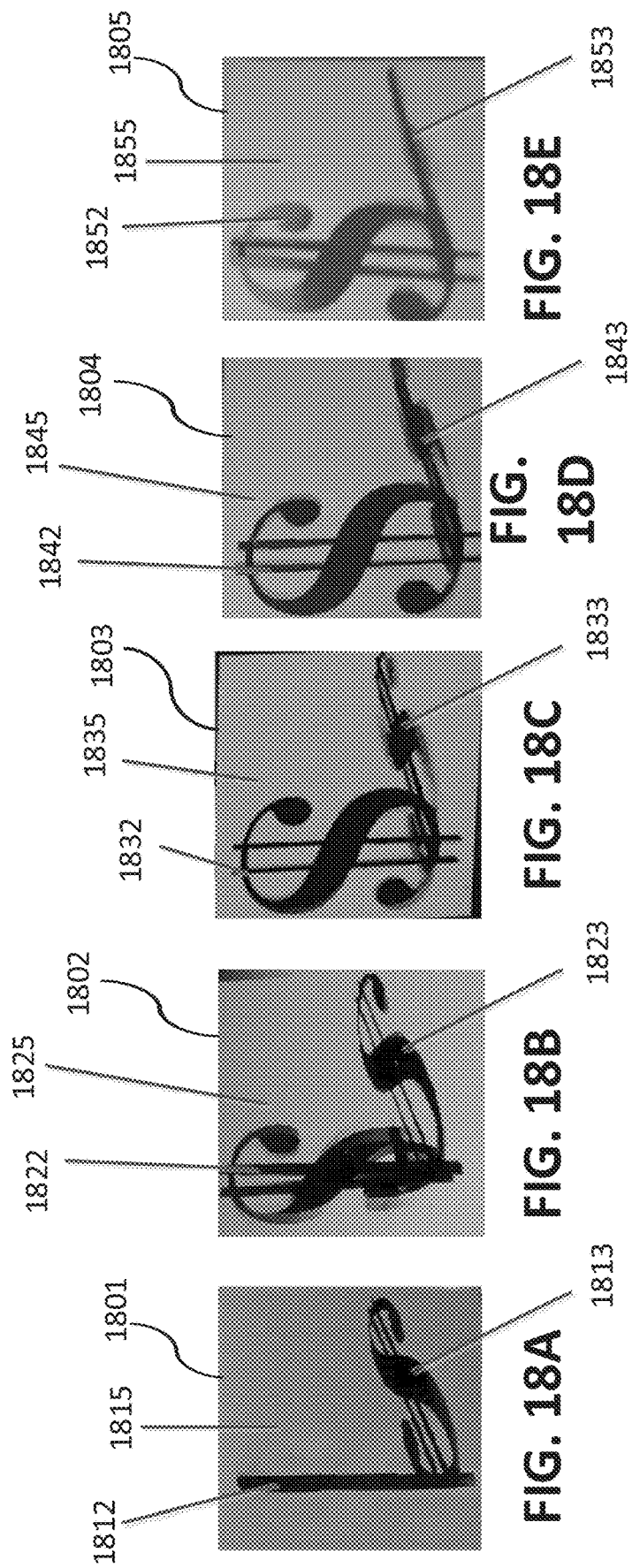

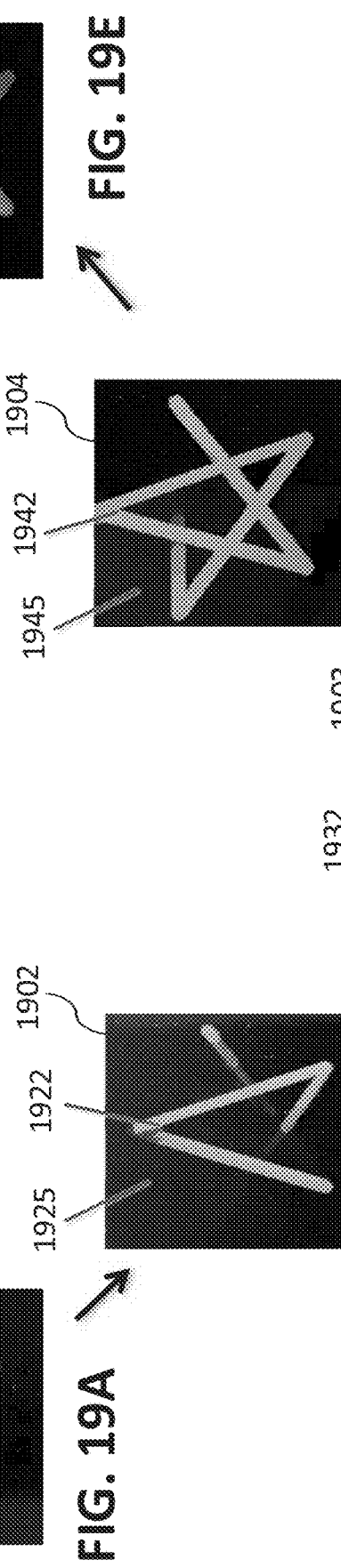
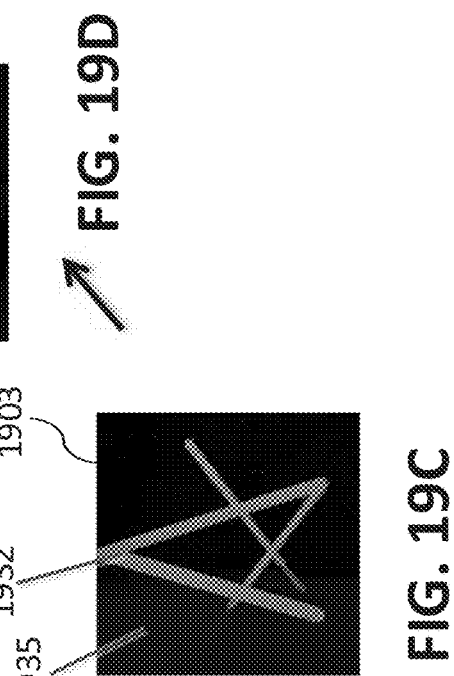
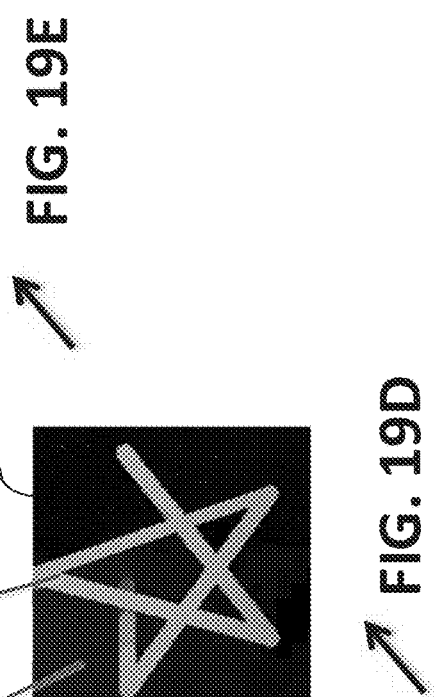
FIG. 19A
FIG. 19B
FIG. 19C
FIG. 19D
FIG. 19E

ANIMATED OPTICAL SECURITY FEATURE

CROSS-REFERENCE TO RELATED APPLICATIONS

This application claims the benefit of priority to U.S. Provisional Application No. 62/836,579, entitled "OPTICAL SWITCH DEVICES," filed Apr. 19, 2019 and to U.S. Provisional Application No. 62/838,242, entitled "OPTICAL SWITCH DEVICES," filed Apr. 24, 2019. This application is related to U.S. patent application Ser. No. 16/105,759, entitled "OPTICAL SWITCH DEVICES," filed Aug. 20, 2018, which claims the benefit of priority to U.S. Provisional Application No. 62/575,340, entitled "OPTICAL SWITCH DEVICES," filed Oct. 20, 2017 and to U.S. Provisional Application No. 62/577,138, entitled "OPTICAL SWITCH DEVICES," filed Oct. 25, 2017. The entirety of each application referenced in this paragraph is incorporated herein by reference.

STATEMENT REGARDING FEDERALLY SPONSORED R&D

This invention was made with government support under Contract No. TEPS 14-02302 awarded by the Bureau of Engraving and Printing. The government has certain rights in the invention.

TECHNICAL FIELD

The present application generally relates to optical switch devices. In particular, the optical switch devices include optical features and/or color generating structures (e.g., microstructures and/or nanostructures configured to provide one or more colors) under an array of lenses to present one or more icons for viewing when illuminated.

DESCRIPTION OF THE RELATED TECHNOLOGY

Optical switch devices can be used as a security device, such as an anti-counterfeit feature (for example, on a banknote). Holograms have been used as a counterfeit deterrent. However, this technology has become so widespread with hundreds if not thousands of holographic shops around the world that holograms are now viewed by some as having poor security. Optically variable inks and optically variable magnetic inks have also been used on banknotes. However, these products have now been simulated or have been even made from similar materials as the originals that these security elements are now questionable as a high security feature. Motion type security elements have been adopted into banknotes, but even here, this feature has also been used widely on commercial products. Thus, with respect to security devices, a new security feature that is difficult to counterfeit and can be readily incorporated into an item such as a banknote is desirable.

SUMMARY

In accordance with certain embodiments described herein, optical switch devices, such as security devices are disclosed. Advantageously, the security devices disclosed herein can present sharp, high contrast images with or without color that switch rapidly, which are difficult to counterfeit.

This disclosure provides a security device including an array of lenses. The device can also include a plurality of first and second segments disposed under the array of lenses. The first segments can correspond to portions of an icon and a background. At a first viewing angle, the array of lenses presents the icon for viewing. At a second viewing angle different from the first viewing angle, the array of lenses does not present the icon for viewing. Individual ones of the first segments can comprise specular reflecting features and diffusing features. The specular reflecting features can define one of the icon and the background. The diffusing features can define the background when the specular reflecting features define the icon. The diffusing features can define the icon when the specular reflecting features define the background. Individual ones of the second segments can comprise diffusing features when the diffusing features of the first segments define the background, and can comprise specular reflecting features when the specular reflecting features of the first segments define the background.

Upon viewing at an angle in the specular direction, the icon can appear specularly bright and the background can appear matte white or grey when the specular reflecting features define the icon and the diffusing features define the background. Alternatively, upon viewing at an angle in the specular direction, the icon can appear matte white or grey and the background appears specularly bright when the specular reflecting features define the background and the diffusing features define the icon. The specular reflecting features can define the icon and the diffusing features define the background.

At the first viewing angle, the array of lenses can present for viewing the icon and the background. The background can comprise a shaped background. At the second viewing angle, the array of lenses can present for viewing the shaped background without the icon.

This disclosure provides a security device comprising an array of lenses. The device can include a plurality of first and second segments disposed under the array of lenses. The first segments can correspond to portions of a first image, and the second segments can correspond to portions of a second image. The first and second images can comprise an icon and a background. At a first viewing angle, the array of lenses can present the first image for viewing without presenting the second image for viewing. At a second viewing angle different from the first viewing angle, the array of lenses can present for viewing the second image without presenting the first image for viewing. Individual ones of the first and second segments can comprise specular reflecting features and diffusing features. For the first and second segments, the specular reflecting features can define one of the icon and the background. The diffusing features can define the background when the specular reflecting features define the icon. The diffusing features can define the icon when the specular reflecting features define the background.

Upon viewing at an angle in the specular direction, the icon can appear specularly bright and the background can appear matte white or grey when the specular reflecting features define the icon and the diffusing features define the background. Alternatively, upon viewing at an angle in the specular direction, the icon can appear matte white or grey and the background can appear specularly bright when the specular reflecting features define the background and the diffusing features define the icon. For the first and second segments, the specular reflecting features can define the icon and the diffusing features can define the background. The icon of the first image can have a different overall shape than the icon of the second image.

This disclosure provides a security device comprising an array of lenses. The device can include a plurality of first and second segments disposed under the array of lenses. The first segments can correspond to portions of a first icon and a first background. The second segments can correspond to portions of a second icon and a second background. At a first viewing angle, the array of lenses can present for viewing the first icon and the first background without presenting the second icon for viewing. At a second viewing angle different from the first viewing angle, the array of lenses can present for viewing the second icon and the second background without presenting the first icon for viewing. The second background at the second viewing angle can appear the same in outer shape, size, and brightness as the first background at the first viewing angle. Individual ones of the first and second segments can comprise specular reflecting features and diffusing features. For the first and second segments, the specular reflecting features can define the first and second icons, and the diffusing features can define the first and second backgrounds. Alternatively, for the first and second segments, the diffusing features can define the first and second icons, and the specular reflecting features can define the first and second backgrounds.

Upon viewing at an angle in the specular direction, the first and second icons can appear specularly bright and the first and second backgrounds can appear matte white or grey when the specular reflecting features define the first and second icons and the diffusing features define the first and second backgrounds. Alternatively, upon viewing at an angle in the specular direction, the first and second icons can appear matte white or grey and the first and second backgrounds can appear specularly bright when the specular reflecting features define the first and second backgrounds and the diffusing features define the first and second icons.

For the first and second segments, the specular reflecting features can define the first and second icons and the diffusing features can define the first and second backgrounds. The first and second backgrounds can be in the form of at least one alphanumeric character, a symbol, an art image, graphic, or an object. The first and second backgrounds can further comprise a covert feature. For example, the covert feature can comprise a fluorescent material or an up-converting pigment. The first and second backgrounds can further comprise a tint, a dye, ink, or a pigment.

This disclosure provides a security device comprising a plurality of lenses forming an array of lenses along a longitudinal axis. A plurality of first and second segments can be disposed under the array of lenses. The first segments can correspond to portions of a first set of at least two icons, and the second segments can correspond to portions of a second set of at least two icons. At a first viewing angle, the array of lenses can present for viewing the first set of the at least two icons. At a second viewing angle different from the first viewing angle, the array of lenses can present for viewing the second set of the at least two icons.

The icons in the first and second sets can be separated by background. Also, one or more of the at least two icons of the first set can be different from a corresponding one of the at least two icons of the second set. The first set and the second set can be presented for viewing in a row along the axis perpendicular to the longitudinal axis of the array of lenses.

This disclosure provides a security device comprising a plurality of lenses forming an array of lenses along a longitudinal axis. A plurality of first and second segments can be disposed under the array of lenses. The first segments can correspond to portions of a first set of at least four icons, and the second segments can correspond to portions of a second set of at least four icons. At a first viewing angle, the array of lenses can present for viewing the first set of the at least four icons in a row along an axis perpendicular to the longitudinal axis of the array of lenses. At a second viewing angle different from the first viewing angle, the array of lenses can present for viewing the second set of the at least four icons in a row along the axis perpendicular to the longitudinal axis of the array of lenses.

The icons in the first and second sets can be separated by background. One or more of the at least four icons of the first set can be different from a corresponding one of the at least four icons of the second set.

This disclosure provides a security device comprising an array of lenses. A plurality of first and second segments can be disposed under the array of lenses. The first segments can correspond to portions of a first icon and a first background, and the second segments can correspond to portions of a second icon and a second background. At a first viewing angle, the array of lenses can present for viewing the first icon and the first background without presenting the second icon for viewing. At a second viewing angle different from the first viewing angle, the array of lenses can present for viewing the second icon and the second background without presenting the first icon for viewing. Individual ones of the first segments can comprise a first surface texture defining the first icon. Individual ones of the second segments can comprise a second surface texture defining the second icon. The second surface texture can be different from the first surface texture. Individual ones of the first and second segments can further comprise a third surface texture defining the first and second backgrounds respectively. The third surface texture can be different from the first and second surface textures.

The first surface texture can comprise a moth eye texture. The second surface texture can comprise an interference grating. The third surface texture can comprise a diffusing texture.

The first surface texture can comprise a moth eye texture. The second surface texture can comprise specular reflecting features. The third surface texture comprises a diffusing texture.

The first surface texture can comprise specular reflecting features. The second surface texture can comprise an interference grating. The third surface texture can comprise a diffusing texture.

This disclosure provides a security device comprising a plurality of lenses forming an array of lenses. The lenses can have a longitudinal axis disposed in a vertical direction. A plurality of first and second segments can be disposed under the array of lenses. The first segments can correspond to portions of a right side view of an image, and the second segments can correspond to portions of a left side view of the image. The image can comprise an icon and a background. When tilting the first and second segments about the longitudinal axis of the lenses, the array of lenses can present the right and left side views of the image for a stereoscopic view of the image. Individual ones of the first and second segments can comprise specular reflecting features and diffusing features. For the first and second segments, the specular reflecting features can define one of the icon and the background. The diffusing features can define the background when the specular reflecting features define the icon. The diffusing features can define the icon when the specular reflecting features define the background.

The specular reflecting features can define the icon and the diffusing features can define the background. The first and second segments can correspond to portions of at least three images.

This disclosure provides the following features in a security device.

The array of lenses can comprise a 1D lenticular lens array. The array of lenses can comprise a 2D array of lenses. For example, the array of lenses can comprise a first lenticular lens array having a first longitudinal axis and a second lenticular lens array having a second longitudinal axis. The first and second arrays can be arranged such that the first longitudinal axis of the first array is angled from 5 to 90 degrees with respect to the second longitudinal axis of the second array. A difference in the first and second viewing angles can be less than or equal to 15 degrees under a point light source. A difference in the first and second viewing angles can be less than or equal to 20 degrees under an extended light source.

A first image or icon or set of icons can flip to the second image or icon or set of icons with no observable transition upon a change from the first viewing angle to the second viewing angle.

The first and second segments can each comprise a length, a width, and a thickness. The width of each of the first and second segments can be less than or equal to 80 microns.

The first image or second image, the icon, first or second icon, or the first or second set can comprise a half tone image.

The contrast percentage between the icon and the background, between the first icon and the first background, or between the second icon and the second background can be from 25% to 90% when viewing at an angle in the specular direction, or from 25% to 90% when viewing at an angle not in the specular direction.

For the first or second segments, the diffusing features can provide Lambertian reflectance.

For the first or second segments, the diffusing features can have an elliptical output.

The device can comprise a kinoform diffuser providing the diffusing features.

For the first or second segments, the diffusing features can comprise a brightness greater than 85 and a whiteness index greater than 85.

For the first or second segments, the diffusing features can comprise $TiO_2$ particles.

For the first or second segments, the specular reflecting features and the diffusing features can provide no diffractive or interference color.

For the first or second segments, the diffusing features can comprise a tint, an ink, a fluorescent chemical, a transparent dye, an opaque dye, or an opaque pigment.

The icon, first or second image, first or second icon, or first or second set can comprise at least one alphanumeric character, a symbol, an art image, graphic, or an object. The background of the icon, the background of the first or second image, or the background of the first or second icon can comprise a circle, a square, a rectangle, a hexagon, an oval, a star, or a knurled edge. The background of the icon, the background of the first or second image, or the background of the first or second icon can comprise a pattern of alphanumeric characters, symbols, images, graphics, or objects.

The security device can further comprise a substrate having a first side and a second side opposite the first side. The array of lenses can be disposed on the first side of the substrate. The specular reflecting features and diffusing features can be disposed on the second side of the substrate. The substrate can have a thickness in a range from 10 microns to 300 microns. The thickness can be in the range from 10 microns to 90 microns, from 10 microns to 85 microns, from 10 microns to 70 microns, from 10 microns to 60 microns, from 10 microns to 50 microns, from 10 microns to 45 microns, from 10 microns to 40 microns, in any ranges within these ranges, any values within these ranges, or in any ranges formed by such values.

The security device can be configured to provide authenticity verification on an item for security. The item can be a credit card, a debit card, currency, a passport, a driver's license, an identification card, a document, a temper evident container or packaging, or a bottle of pharmaceuticals. The security device can be a security thread, a hot stamp feature, an embedded feature, a windowed feature, or a laminated feature.

The security device can further comprise another optical element outside of the first and second segments. The security device can further comprise another optical element within of the first segment or the second segment. The another optical element can comprise a holographic element, a diffractive element, or a non-holographic non-diffractive element.

The security device can further comprise one or more micro-structural lenses. The one or more micro-structural lenses can comprise a Fresnel lens or a diamond turned element. The one or more micro-structural lenses can be overprinted.

The security device can further comprise a metallized coating. The security device can further comprise a metallized coating with portions without metallization to form at least one alphanumeric character, a symbol, an image, or an object. The metallized coating can comprise aluminum, silver, gold, copper, titanium, zinc, tin, or any alloy thereof.

The background for the first or second image, the background for the icon, or the first or second background can be transparent.

For the first or second segments, the diffusing features can be coated with a transparent high index material. For the first or second segments, the diffusing features can be coated with ZnS.

The first segment can comprise half tone. The second segment can comprise half tone. The specular reflecting features and the diffusing features can each have sizes and be distributed within the first or second segment to provide half tone imagery for producing the icon, the first or second image, the first or second icon, or the first or second set.

The specular reflecting features and the diffusing features can be included in the first or second segment in an amount and distribution to provide half tone imagery for producing the icon, the first or second image, the first or second icon, or the first or second set.

The first or second segment can include specular reflecting features that provide half tone, where individual specular reflecting features cannot be resolved in images of the specular reflecting features produced by a corresponding lens in the array of lenses by the unaided eye.

The shape of the icon, the shape of the first or second image, the shape of the first or second icon, or the shape of the first or second set can be invariant as the light source changes position.

The first or second segment can comprise a micro-image having a height smaller than a width of the first or second segment. The micro-image can be at least one alphanumeric character, symbol, an art image, graphic, or an object.

This disclosure provides a method of fabricating a security device. The method can comprise preparing a master using an electron beam, lithographic techniques, or etching. The method can further comprise using the master to form the specular reflecting features or the diffusing features.

Various embodiments disclosed herein can be used for security documents, in particular, as security threads in bank notes or as a laminated strip, or as a patch or as a window. Other security items such as passports, ID cards, chip cards, credit cards, stock certificates and other investment securities, vouchers, admission tickets and commercial packages that protect items of value such as CD's, medicinal drugs, car and aircraft parts, etc. may also be protected against counterfeiting using the concepts and embodiments described herein. Furthermore, various embodiments disclosed herein can also be used for non-security applications.

Additional examples are provided below.

1. An optical device comprising:
an array of lenses; and
a plurality of first and second segments disposed under the array of lenses, the first segments corresponding to portions of an icon and a background,
wherein at a first viewing angle, the array of lenses presents the icon for viewing, and at a second viewing angle different from the first viewing angle, the array of lenses does not present the icon for viewing,
wherein individual ones of the first segments comprise specular reflecting features and diffusing features, the specular reflecting features defining one of the icon and the background, the diffusing features defining the background when the specular reflecting features define the icon, and the diffusing features defining the icon when the specular reflecting features define the background, and
wherein individual ones of the second segments comprise diffusing features when the diffusing features of the first segments define the background, and comprise specular reflecting features when the specular reflecting features of the first segments define the background.

2. The device of Example 1, wherein upon viewing at an angle in the specular direction,
the icon appears specularly bright and the background appears matte white or grey when the specular reflecting features define the icon and the diffusing features define the background, or
the icon appears matte white or grey and the background appears specularly bright when the specular reflecting features define the background and the diffusing features define the icon.

3. The device of Example 1 or 2, wherein for the first segments, the specular reflecting features define the icon and the diffusing features define the background.

4. The device of any of Examples 1-3, wherein at the first viewing angle, the array of lenses presents for viewing the icon and the background, the background comprising a shaped background, and wherein at the second viewing angle, the array of lenses presents for viewing the shaped background without the icon.

5. An optical device comprising:
an array of lenses; and
a plurality of first and second segments disposed under the array of lenses, the first segments corresponding to portions of a first image, and the second segments corresponding to portions of a second image, the first and second images comprising an icon and a background,
wherein at a first viewing angle, the array of lenses presents the first image for viewing without presenting the second image for viewing, and at a second viewing angle different from the first viewing angle, the array of lenses presents for viewing the second image without presenting the first image for viewing,
wherein individual ones of the first and second segments comprise specular reflecting features and diffusing features, and
wherein for the first and second segments, the specular reflecting features define one of the icon and the background, the diffusing features define the background when the specular reflecting features define the icon, and the diffusing features define the icon when the specular reflecting features define the background.

6. The device of Example 5, wherein upon viewing at an angle in the specular direction,
the icon appears specularly bright and the background appears matte white or grey when the specular reflecting features define the icon and the diffusing features define the background, or
the icon appears matte white or grey and the background appears specularly bright when the specular reflecting features define the background and the diffusing features define the icon.

7. The device of Example 5 or 6, wherein for the first and second segments, the specular reflecting features define the icon and the diffusing features define the background.

8. The device of any of Examples 5-8, wherein the icon of the first image has a different overall shape than the icon of the second image.

9. An optical device comprising:
an array of lenses; and
a plurality of first and second segments disposed under the array of lenses, the first segments corresponding to portions of a first icon and a first background, and the second segments corresponding to portions of a second icon and a second background,
wherein at a first viewing angle, the array of lenses presents for viewing the first icon and the first background without presenting the second icon for viewing, and at a second viewing angle different from the first viewing angle, the array of lenses presents for viewing the second icon and the second background without presenting the first icon for viewing,
wherein the second background at the second viewing angle appears the same in outer shape, size, and brightness as the first background at the first viewing angle,
wherein individual ones of the first and second segments comprise specular reflecting features and diffusing features,
wherein for the first and second segments,
the specular reflecting features define the first and second icons, and the diffusing features define the first and second backgrounds, or
the diffusing features define the first and second icons, and the specular reflecting features define the first and second backgrounds.

10. The device of Example 9, wherein upon viewing at an angle in the specular direction,
the first and second icons appear specularly bright and the first and second backgrounds appear matte white or grey when the specular reflecting features define the first and second icons and the diffusing features define the first and second backgrounds, or
the first and second icons appear matte white or grey and the first and second backgrounds appear specularly bright when the specular reflecting features define the first and second backgrounds and the diffusing features define the first and second icons.

11. The device of Example 9 or 10, wherein for the first and second segments, the specular reflecting features define the first and second icons and the diffusing features define the first and second backgrounds.

12. The device of any of Examples 9-11, wherein the first and second backgrounds are in the form of at least one alphanumeric character, a symbol, an art image, graphic, or an object.

13. The device of any of Examples 9-12, wherein the first and second backgrounds further comprise a covert feature.

14. The device of Example 13, wherein the covert feature comprises a fluorescent material or an up-converting pigment.

15. The device of any of Examples 9-14, wherein the first and second backgrounds further comprise a tint, a dye, ink, or a pigment.

16. An optical device comprising:
a plurality of lenses forming an array of lenses along a longitudinal axis; and
a plurality of first and second segments disposed under the array of lenses, the first segments corresponding to portions of a first set of at least two icons, and the second segments corresponding to portions of a second set of at least two icons,
wherein at a first viewing angle, the array of lenses presents for viewing the first set of the at least two icons, and at a second viewing angle different from the first viewing angle, the array of lenses presents for viewing the second set of the at least two icons,
wherein one or more of the at least two icons of the first set are different from a corresponding one of the at least two icons of the second set.

17. The device of Example 16, the first set and the second set are presented for viewing in a row along the axis perpendicular to the longitudinal axis of the array of lenses.

18. An optical device comprising:
a plurality of lenses forming an array of lenses along a longitudinal axis; and
a plurality of first and second segments disposed under the array of lenses, the first segments corresponding to portions of a first set of at least four icons, and the second segments corresponding to portions of a second set of at least four icons,
wherein at a first viewing angle, the array of lenses presents for viewing the first set of the at least four icons in a row along an axis perpendicular to the longitudinal axis of the array of lenses, and at a second viewing angle different from the first viewing angle, the array of lenses presents for viewing the second set of the at least four icons in a row along the axis perpendicular to the longitudinal axis of the array of lenses.

19. The device of Example 18, wherein one or more of the at least four icons of the first set are different from a corresponding one of the at least four icons of the second set.

20. An optical device comprising:
an array of lenses; and
a plurality of first and second segments disposed under the array of lenses, the first segments corresponding to portions of a first icon and a first background, and the second segments corresponding to portions of a second icon and a second background,
wherein at a first viewing angle, the array of lenses presents for viewing the first icon and the first background without presenting the second icon for viewing, and at a second viewing angle different from the first viewing angle, the array of lenses presents for viewing the second icon and the second background without presenting the first icon for viewing,
wherein individual ones of the first segments comprise a first surface texture defining the first icon,
wherein individual ones of the second segments comprise a second surface texture defining the second icon, the second surface texture different from the first surface texture,
wherein individual ones of the first and second segments further comprise a third surface texture defining the first and second backgrounds respectively, the third surface texture different from the first and second surface textures.

21. The device of Example 20, wherein the first surface texture comprises a moth eye texture, the second surface texture comprises an interference grating, and the third surface texture comprises a diffusing texture.

22. The device of Example 20, wherein the first surface texture comprises a moth eye texture, the second surface texture comprises specular reflecting features, and the third surface texture comprises a diffusing texture.

23. The device of Example 20, wherein the first surface texture comprises specular reflecting features, the second surface texture comprises an interference grating, and the third surface texture comprises a diffusing texture.

24. An optical device comprising:
a plurality of lenses forming an array of lenses, the lenses having a longitudinal axis disposed in a vertical direction; and
a plurality of first and second segments disposed under the array of lenses, the first segments corresponding to portions of a right side view of an image, and the second segments corresponding to portions of a left side view of the image, the image comprising an icon and a background,
wherein when tilting the first and second segments about the longitudinal axis of the lenses, the array of lenses presents the right and left side views of the image for a stereoscopic view of the image,
wherein individual ones of the first and second segments comprise specular reflecting features and diffusing features, and
wherein for the first and second segments, the specular reflecting features define one of the icon and the background, the diffusing features define the background when the specular reflecting features define the icon, and the diffusing features define the icon when the specular reflecting features define the background.

25. The device of Example 24, wherein the specular reflecting features define the icon and the diffusing features define the background.

26. The device of Example 24 or 25, wherein the first and second segments correspond to portions of at least three images.

27. The device of any of the preceding examples, wherein the array of lenses comprises a 1D lenticular lens array.

28. The device of any of the preceding examples, wherein the array of lenses comprises a 2D array of lenses.

29. The device of Example 28, wherein the array of lenses comprises a first lenticular lens array having a first longitudinal axis and a second lenticular lens array having a second longitudinal axis, wherein the first and second arrays are arranged such that the first longitudinal axis of the first array is angled from 5 to 90 degrees with respect to the second longitudinal axis of the second array.

30. The device of any of the preceding examples, wherein a difference in the first and second viewing angles is less than or equal to 15 degrees under a point light source.

31. The device of any of the preceding examples, wherein a difference in the first and second viewing angles is less than or equal to 20 degrees under an extended light source.

32. The device of any of Examples 5-8, wherein the first image flips to the second image with no observable transition upon a change from the first viewing angle to the second viewing angle.

33. The device of any of Examples 9-15 or any of Examples 20-23, wherein the first icon flips to the second icon with no observable transition upon a change from the first viewing angle to the second viewing angle.

34. The device of any of Examples 16-19, wherein the first set flips to the second set with no observable transition upon a change from the first viewing angle to the second viewing angle.

35. The device of any of the preceding examples, wherein the first and second segments each comprises a length, a width, and a thickness, and wherein the width of each of the first and second segments is less than or equal to 80 microns.

36. The device of any of Examples 1-4 or any of Examples 24-26, wherein the icon comprises a half tone image.

37. The device of any of Examples 5-8, wherein the first or second image comprises a half tone image.

38. The device of any of Examples 9-15 or any of Examples 20-23, wherein the first or second icon comprises a half tone image.

39. The device of any of Examples 16-19, wherein the first or second set comprises a half tone image.

40. The device of any of Examples 1-4 or any of Examples 24-26, wherein the contrast percentage between the icon and the background is from 25% to 90% when viewing at an angle in the specular direction, or from 25% to 90% when viewing at an angle not in the specular direction.

41. The device of any of Examples 5-8, wherein for the first image or the second image, the contrast percentage between the icon and the background is from 25% to 90% when viewing at an angle in the specular direction, or from 25% to 90% when viewing at an angle not in the specular direction.

42. The device of any of Examples 9-15 or any of Examples 20-23, wherein the contrast percentage between the first icon and the first background or between the second icon and the second background is from 25% to 90% when viewing at an angle in the specular direction, or from 25% to 90% when viewing at an angle not in the specular direction.

43. The device of any of Examples 1-15 or any of Examples 24-26, wherein for the first or second segments, the diffusing features provide Lambertian reflectance.

44. The device of any of Examples 1-15 or any of Examples 24-26, wherein for the first or second segments, the diffusing features have an elliptical output.

45. The device of any of Examples 1-15 or any of Examples 24-26, wherein the device comprises a kinoform diffuser providing the diffusing features.

46. The device of any of Examples 1-15 or any of Examples 24-26, wherein for the first or second segments, the diffusing features comprise a brightness greater than 85 and a whiteness index greater than 85.

47. The device of any of Examples 1-15 or any of Examples 24-26, wherein for the first or second segments, the diffusing features comprise $TiO_2$ particles.

48. The device of any of Examples 1-15 or any of Examples 24-26, wherein for the first or second segments, the specular reflecting features and the diffusing features provide no diffractive or interference color.

49. The device of any of Examples 1-15 or any of Examples 24-26, wherein for the first or second segments, the diffusing features comprise a tint, an ink, a fluorescent chemical, a transparent dye, an opaque dye, or an opaque pigment.

50. The device of any of Examples 1-4 or any of Examples 24-26, wherein the icon comprises at least one alphanumeric character, a symbol, an art image, graphic, or an object.

51. The device of any of Examples 5-8, wherein the first or second image comprises at least one alphanumeric character, a symbol, an art image, graphic, or an object.

52. The device of any of Examples 9-15 or any of Examples 20-23, wherein the first or second icon comprises at least one alphanumeric character, a symbol, an art image, graphic, or an object.

53. The device of any of Examples 16-19, wherein the first or second set comprises at least one alphanumeric character, a symbol, an art image, graphic, or an object.

54. The device of any of Examples 1-4 or any of Examples 24-26, wherein the background of the icon comprises a circle, a square, a rectangle, a hexagon, an oval, a star, or a knurled edge.

55. The device of any of Examples 5-8, wherein the background of the first or second image comprises a circle, a square, a rectangle, a hexagon, an oval, a star, or a knurled edge.

56. The device of any of Examples 9-15 or any of Examples 20-23, wherein the background of the first or second icon comprises a circle, a square, a rectangle, a hexagon, an oval, a star, or a knurled edge.

57. The device of any of Examples 1-4 or any of Examples 24-26, wherein the background of the icon comprises a pattern of alphanumeric characters, symbols, images, graphics, or objects.

58. The device of any of Examples 5-8, wherein the background of the first or second image comprises a pattern of alphanumeric characters, symbols, images, graphics, or objects.

59. The device of any of Examples 9-15 or any of Examples 20-23, wherein the background of the first or second icon comprises a pattern of alphanumeric characters, symbols, images, graphics, or objects.

60. The device of any of Examples 1-15 or any of Examples 24-26, further comprising a substrate having a first side and a second side opposite the first side,
   wherein the array of lenses is disposed on the first side of the substrate, and
   wherein the specular reflecting features and diffusing features are disposed on the second side of the substrate.

61. The device of Example 60, wherein the substrate has a thickness in a range from 10 microns to 300 microns.

62. The device of Example 61, wherein the thickness is in the range from 10 microns to 40 microns.

63. The device of any of the preceding examples, wherein the device is configured to provide authenticity verification on an item for security.

64. The device of Example 63, wherein the item is a credit card, a debit card, currency, a passport, a driver's license, an identification card, a document, a temper evident container or packaging, or a bottle of pharmaceuticals.

65. The device of any of the preceding examples, wherein the device is a security thread, a hot stamp feature, an embedded feature, a windowed feature, or a laminated feature.

66. The device of any of the preceding examples, further comprising another optical element outside of the first and second segments.

67. The device of any of the preceding examples, further comprising another optical element within of the first segment or the second segment.

68. The device of Example 67, wherein the another optical element comprises a holographic element, a diffractive element, or a non-holographic non-diffractive element.

69. The device of any of the preceding examples, further comprising one or more micro-structural lenses.

70. The device of Example 69, wherein the one or more micro-structural lenses comprise a Fresnel lens or a diamond turned element.

71. The device of Example 69 or 70, wherein the one or more micro-structural lenses are overprinted.

72. The device of any of the preceding examples, further comprising a metallized coating.

73. The device of any of the preceding examples, further comprising a metallized coating with portions without metallization to form at least one alphanumeric character, a symbol, an image, or an object.

74. The device of Example 72 or 73, wherein the metallized coating comprises aluminum, silver, gold, copper, titanium, zinc, tin, or any alloy thereof.

75. The device of any of Examples 5-8, wherein for the first or second image, the background is transparent.

76. The device of any of Examples 1-4 or any of Examples 24-26, wherein the background is transparent.

77. The device of any of Examples 9-15 or any of Examples 20-23, wherein the first or second background is transparent.

78. The device of any of Examples 1-15 or any of Examples 24-26, wherein for the first or second segments, the diffusing features are coated with a transparent high index material.

79. The device of any of Examples 1-15 or any of Examples 24-26, wherein for the first or second segments, the diffusing features are coated with ZnS.

80. The device of any of the preceding examples, wherein the first segment comprises half tone.

81. The device of any of the preceding examples, wherein the second segment comprises half tone.

82. The device of any of Examples 1-4 or any of Examples 24-26, wherein the specular reflecting features and the diffusing features each have sizes and are distributed within said first or second segment to provide half tone imagery for producing said icon.

83. The device of any of Examples 5-8, wherein the specular reflecting features and the diffusing features each have sizes and are distributed within said first or second segment to provide half tone imagery for producing said first or second image.

84. The device of any of Examples 9-15 or any of Examples 20-23, wherein the specular reflecting features and the diffusing features each have sizes and are distributed within said first or second segment to provide half tone imagery for producing said first or second icon.

85. The device of any of Examples 16-19, wherein the specular reflecting features and the diffusing features each have sizes and are distributed within said first or second segment to provide half tone imagery for producing said first or second set.

86. The device of any of Examples 1-4 or any of Examples 24-26, wherein the specular reflecting features and the diffusing features are included in said first or second segment in an amount and distribution to provide half tone imagery for producing said icon.

87. The device of any of Examples 5-8, wherein the specular reflecting features and the diffusing features are included in said first or second segment in an amount and distribution to provide half tone imagery for producing said first or second image.

88. The device of any of Examples 9-15 or any of Examples 20-23, wherein the specular reflecting features and the diffusing features are included in said first or second segment in an amount and distribution to provide half tone imagery for producing said first or second icon.

89. The device of any of Examples 16-19, wherein the specular reflecting features and the diffusing features are included in said first or second segment in an amount and distribution to provide half tone imagery for producing said first or second set.

90. The device of any of the preceding examples, wherein the first or second segment includes specular reflecting features that provide half tone, wherein individual specular reflecting features cannot be resolved in images of the specular reflecting features produced by a corresponding lens in the array of lenses by the unaided eye.

91. The device of any of Examples 1-4 or any of Examples 24-26, wherein the shape of the icon is invariant as the light source changes position.

92. The device of any of Examples 5-8, wherein the shape of the first or second image is invariant as the light source changes position.

93. The device of any of Examples 9-15 or any of Examples 20-23, wherein the shape of the first or second icon is invariant as the light source changes position.

94. The device of any of Examples 16-19, wherein the shape of the first or second set is invariant as the light source changes position.

95. The device of any of the preceding examples, wherein the first or second segment comprises a micro-image having a height smaller than a width of the first or second segment.

96. The device of Example 95, wherein the micro-image is at least one alphanumeric character, symbol, an art image, graphic, or an object.

97. The device of any of Examples 16-19, wherein the icons in the first and second sets are separated by background.

98. A method of fabricating a device of any of the preceding examples, the method comprising:
preparing a master using an electron beam, lithographic techniques, or etching; and
using the master to form the specular reflecting features or the diffusing features.

99. The device of any of Examples 1-97, wherein at least one first segment or at least one second segment comprises one or more microstructures or one or more nanostructures configured to provide one or more colors.

100. An optical device comprising:
an array of lenses; and
a plurality of first and second segments disposed under the array of lenses, the first segments corresponding to portions of an icon and a background,
wherein at a first viewing angle, the array of lenses presents a view of the icon, and at a second viewing angle different from the first viewing angle, the array of lenses presents a view without the icon, and wherein at least one first segment or at least one second segment comprises one or more microstructures or one or more nanostructures configured to provide one or more colors for the view of the icon or the view without the icon.

101. The device of Example 100, wherein the at least one first segment comprises the one or more microstructures or the one or more nanostructures configured to provide one or more colors for the icon or for the background.

102. The device of Example 100 or 101, wherein the at least one second segment comprises the one or more microstructures or the one or more nanostructures configured to provide one or more colors for the view without the icon.

103. An optical device comprising:
an array of lenses; and
a plurality of first and second segments disposed under the array of lenses, the first segments corresponding to portions of a first image, and the second segments corresponding to portions of a second image,
wherein at a first viewing angle, the array of lenses presents the first image for viewing without presenting the second image for viewing, and at a second viewing angle different from the first viewing angle, the array of lenses presents for viewing the second image without presenting the first image for viewing, and
wherein at least one first segment or at least one second segment of the plurality of first and second segments comprises one or more microstructures or one or more nanostructures configured to provide one or more colors for the first or second image.

104. The device of Example 103, wherein the first and second images comprise an icon and a background.

105. The device of Example 104, wherein the icon of the first image has a different overall shape than the icon of the second image.

106. The device of any of Example 103-105, wherein the at least one first segment and the at least one second segment comprise the one or more microstructures or the one or more nanostructures.

107. The device of Example 106, wherein the one or more microstructures or the one or more nanostructures are configured to provide a first color for the first image and a second color for the second image.

108. The device of Example 107, wherein the first and second colors are different.

109. The device of any of Examples 99-108, wherein the one or more microstructures or the one or more nanostructures comprise at least one opal structure.

110. The device of Example 109, wherein the at least one opal structure comprises a plurality of microsurface or nanosurface relief portions.

111. The device of Example 110, wherein the microsurface or nanosurface relief portions comprise a reflective metal coating.

112. The device of Example 110, wherein the microsurface or nanosurface relief portions comprise a transparent coating having an index of refraction between 1.8 and 3.

113. The device of Example 112, wherein the transparent coating comprises zinc sulfide, titanium oxide, or indium tin oxide.

114. The device of any of Examples 99-113, wherein the one or more microstructures or the one or more nanostructures comprise at least one plasmonic structure.

115. The device of Example 114, wherein the at least one plasmonic structure comprises:
a first metal microfeature or nanofeature;
a second metal microfeature or nanofeature; and
a dielectric microfeature or nanofeature.

116. The device of Example 115, wherein the first or second metal microfeature or nanofeature comprises silver, aluminum, gold, copper, tin, or combinations thereof.

117. The device of Example 115 or Example 116, wherein the dielectric microfeature or nanofeature comprises a dielectric material between the first and second metal microfeature or nanofeature.

118. The device of Example 117, wherein the dielectric material comprises a UV curable resin.

119. The device of any of Examples 115-118, wherein the dielectric microfeature or nanofeature comprises a reflective microfeature or nanofeature disposed over the dielectric microfeature or nanofeature.

120. The device of Example 119, wherein the reflective microfeature or nanofeature comprises aluminum.

121. The device of Example 119 or Example 120, further comprising a protective coating over the reflective microfeature or nanofeature.

122. The device of any of Examples 115-121, wherein the at least one plasmonic structure does not comprise a reflective microfeature or nanofeature disposed on the dielectric microfeature or nanofeature.

123. The device of any of Examples 99-122, wherein the one or more colors produced by a corresponding lens in the array of lenses can be resolved by an unaided eye.

124. The device of any of Examples 99-123, wherein at least one of the one or more colors produced by a corresponding lens in the array of lens cannot be resolved by an unaided eye.

125. The device of any of Examples 99-124, wherein the one or more microstructures or the one or more nanostructures comprise a plurality of microstructures, nanostructures, or combinations thereof.

126. The device of any of Examples 99-125, wherein the one or more microstructures or the one or more nanostructures are configured to provide a same color.

127. The device of any of Examples 99-125, wherein the one or more microstructures or the one or more nanostructures are configured to provide different colors.

128. The device of Example 127, wherein the one or more microstructures or the one or more nanostructures are configured to provide different colors that combine to produce a single color as perceived by the naked eye.

129. The device of Example 127, wherein the one or more microstructures or the one or more nanostructures are configured to provide different colors that combine to produce an achromatic white appearance.

130. The device of any of Examples 100-129, wherein the array of lenses comprises a 1D lenticular lens array.

131. The device of any of Examples 100-129, wherein the array of lenses comprises a 2D array of lenses.

132. The device of any of Examples 100-131, wherein one of the first segments of the plurality of first segments comprises diffusing features.

133. The device of any of Examples 100-132, wherein one of the second segments of the plurality of second segments comprises diffusing features.

134. The device of Example 132 or 133, wherein the diffusing features provide Lambertian reflectance.

135. The device of any of Examples 132-134, wherein the diffusing features have an elliptical output.

136. The device of any of Examples 132-135, wherein the device comprises a kinoform diffuser providing the diffusing features.

137. The device of any of Examples 132-136, wherein the diffusing features comprise a brightness greater than 85 and a whiteness index greater than 85.

138. The device of any of Examples 100-137, wherein one of the first segments of the plurality of first segments comprises specular reflecting features.

139. The device of any of Examples 100-138, wherein one of the second segments of the plurality of second segments comprises specular reflecting features.

140. The device of any of Examples 100-102, wherein the icon comprises a half tone image.

141. The device of any of Examples 103-108, wherein the first or second image comprises a half tone image.

142. The device of any of Examples 100-102 or Example 140, wherein the icon comprises at least one alphanumeric character, a symbol, an art image, graphic, or an object.

143. The device of any of Examples 103-108 or Example 141, wherein the first or second image comprises at least one alphanumeric character, a symbol, an art image, graphic, or an object.

144. The device of any of Examples 100-102 or Example 140 or Example 142, wherein the background of the icon comprises a circle, a square, a rectangle, a hexagon, an oval, a star, or a knurled edge.

145. The device of any of Examples 103-108 or Example 141 or Example 143, wherein the background of the first or second image comprises a circle, a square, a rectangle, a hexagon, an oval, a star, or a knurled edge.

146. The device of any of Examples 100-102 or Example 140 or Example 142, wherein the background of the icon comprises a pattern of alphanumeric characters, symbols, images, graphics, or objects.

147. The device of any of Examples 103-108 or Example 141 or Example 143, wherein the background of the first or second image comprises a pattern of alphanumeric characters, symbols, images, graphics, or objects.

148. The device of any of Examples 130-147, further comprising a substrate having a first side and a second side opposite the first side,
wherein the array of lenses is disposed on the first side of the substrate, and
wherein the one or more microstructures or the one or more nanostructures are disposed on the second side of the substrate.

149. The device of any of Examples 100-148, wherein the device is configured to provide authenticity verification on an item for security.

150. The device of Example 149, wherein the item is a credit card, a debit card, currency, a passport, a driver's license, an identification card, a document, a temper evident container or packaging, or a bottle of pharmaceuticals.

151. The device of any of Examples 100-150, wherein the device is a security thread, a hot stamp feature, an embedded feature, a windowed feature, or a laminated feature.

152. The device of any of Examples 100-151, further comprising another optical element outside of the first and second segments.

153. The device of any of Examples 100-152, further comprising another optical element within of the first segment or the second segment.

154. The device of Example 152 or Example 153, wherein the another optical element comprises a holographic element, a diffractive element, or a non-holographic non-diffractive element.

155. The device of any of Examples 100-154, wherein a first or second segment comprises half tone.

156. The method of Example 98, further comprising using the master to form one or more microstructure or one or more nanostructures configured to provide one or more colors.

157. A method of fabricating a device of any of Examples 99-155, the method comprising:
preparing a master using an electron beam, lithographic techniques, or etching; and
using the master to form the one or more microstructures or the one or more nanostructures.

158. The method of Example 157, further comprising using the master to form one or more specular reflecting features or diffusing features.

159. The device of any of Examples 109-155, wherein the at least one opal structure comprises at least one reverse opal structure.

160. The device of any of Examples 109-155 or Example 159, wherein the at least one opal structure comprises at least one positive opal structure.

161. The device of any of Examples 109-155 or any of Examples 159-160, wherein the at least one opal structure comprises at least one reflective opal structure.

162. The device of any of Examples 109-155 or any of Examples 159-161, wherein the at least one opal structure comprises at least one transmissive opal structure.

163. The device of any of Examples 114-155 or any of Examples 159-162, wherein the at least one plasmonic structure comprises at least one reflective plasmonic structure.

164. The device of any of Examples 114-155 or any of Examples 159-163, wherein the at least one plasmonic structure comprises at least one transmissive plasmonic structure.

165. The device of any of Examples 99-155 or any of Examples 159-164, wherein the device is configured to provide a rendition of an object's natural color through an icon or image.

166. The device of any of Examples 1-97 or any of Examples 99-155 or any of Examples 159-165, further comprising one or more microstructures or one or more nanostructures configured to provide one or more colors in a region other than said plurality of first and second segments disposed under the array of lenses.

167. The device of Example 28, wherein the plurality of first and second segments form a 2D image array, wherein each of the plurality of first and second segments is disposed with respect to a corresponding lens of the 2D array of lenses.

168. The device of Example 167, wherein the 2D array of lenses is registered with the 2D image array such that a distance between adjacent lenses of the 2D array of lenses is equal to a distance between the corresponding segments that are disposed under the 2D array of lenses.

169. The device of Example 167, wherein a distance between adjacent lenses of the 2D array of lenses is less than or greater than a distance between the corresponding segments that are disposed under the 2D array of lenses such that pitch of the 2D array of lenses is not equal to pitch of the 2D image array.

170. The device of Example 167, wherein the icon appear to move laterally when the device is tilted such that the viewing angle changes from the first viewing angle to the second viewing angle.

171. The device of Example 167, wherein the icon appear at the surface of the device or appear to float above or below the surface of the device in the first or the second viewing angle.

172. An optical device comprising:
a plurality of lenses forming an array of lenses along a longitudinal axis; and
a plurality of portions disposed under the array of lenses, the plurality of portions comprising two icons,
wherein at a first viewing angle, the array of lenses presents for viewing the first icon at a first position and the second icon at a second position and at a second viewing angle different from the first viewing angle, the array of lenses presents for viewing the second icon at a third position different from the second position.

173. The device of Example 172, wherein at the second viewing angle, the array of lenses presents for viewing the first icon at a fourth position different from the first position.

174. The device of Example 173, wherein at the second viewing angle, the first icon appears to move from the first position to the fourth position along a first direction and the second icon appears to move from the second position to the third position along a second direction different from the first direction.

175. The device of Example 173, wherein at the second viewing angle, the first icon appears to move from the first position to the fourth position along a first direction and the second icon appears to move from the second position to the third position along the first direction.

176. The device of Example 172, wherein at the second viewing angle, the second icon appears to move closer to the first icon.

177. The device of Example 172, wherein at the second viewing angle, the second icon appears to move farther from the first icon.

178. The device of any of Examples 172-177, wherein at least one of the plurality of portions comprises one or more microstructures or one or more nanostructures configured to provide one or more colors.

179. The device of Example 178, wherein the one or more microstructures or the one or more nanostructures comprise at least one opal structure.

180. The device of Example 179, wherein the at least one opal structure comprises at least one reverse opal structure.

181. The device of Example 179 or Example 180, wherein the at least one opal structure comprises at least one positive opal structure.

182. The device of any of Examples 178-181, wherein the one or more microstructures or the one or more nanostructures comprise at least one plasmonic structure.

183. The device of any of Examples 172-177, wherein the plurality of portions comprise a first set of specular reflecting features or diffusing features defining the first icon and second set of specular reflecting features or diffusing features defining the second icon.

184. The device of any of Examples 172-177, wherein the plurality of lenses are arranged to form a two-dimensional lens grid and the plurality of portions are arranged to form a two-dimensional image grid such that each lens of the lens grid is disposed over a corresponding portion of the image grid, and wherein distance between consecutive portions of the image grid is not equal to distance between the corresponding lenses of the lens grid disposed over the consecutive portions.

185. The device of any of Examples 172-177, wherein the plurality of lenses are arranged to form a two-dimensional lens grid and the plurality of portions are arranged to form a two-dimensional image grid such that each lens of the lens grid is disposed over a corresponding portion of the image grid, and wherein the lens grid is rotated with respect to the image grid 186. The device of any of Examples 1-185, wherein the diffusing features and the specular reflecting features are coated with a transparent high index material.

Additional Examples

1. An optical device comprising:
an array of lenses; and
a plurality of first and second segments disposed under the array of lenses, the first segments corresponding to portions of an icon and a background,
wherein at a first viewing angle, the array of lenses presents the icon for viewing, and at a second viewing angle different from the first viewing angle, the array of lenses does not present the icon for viewing,
wherein for the first segments,
specular reflecting features define the icon, and diffusely reflective features define the background, or
specular reflecting features define the background, and diffusely reflective features define the icon, or
specular reflecting features define the icon, and diffusely transmissive features define the background, or
specular reflecting features define the background, and diffusely transmissive features define the icon, or
transparent features define the icon, and diffusely reflective features define the background, or
transparent features define the background, and diffusely reflective features define the icon, or
transparent features define icon, and diffusely transmissive features define the background, or
transparent features define background, and diffusely transmissive features define the icon, or
specular reflecting features define the icon, and transparent features define the background, or
specular reflecting features define the background, and transparent features define the icon, or
diffusely reflective features define the icon, and diffusely transmissive features define the background, or
diffusely reflective features define the background, and diffusely transmissive features define the icon, and
wherein for the second segments, the second segments comprise features similar to the features defining the background of the first segments.

2. The device of Example 1, wherein for the first segments, the specular reflecting features define the icon, and the diffusely reflective features define the background.

3. The device of Example 1, wherein for the first segments, the specular reflecting features define the background, and the diffusely reflective features define the icon.

4. The device of Example 1, wherein for the first segments, the specular reflecting features define the icon, and the diffusely transmissive features define the background.

5. The device of Example 1, wherein for the first segments, the specular reflecting features define the background, and the diffusely transmissive features define the icon.

6. The device of Example 1, wherein for the first segments, the transparent features define the icon, and the diffusely reflective features define the background.

7. The device of Example 1, wherein for the first segments, the transparent features define the background, and the diffusely reflective features define the icon.

8. The device of Example 1, wherein for the first segments, the transparent features define the icon, and the diffusely transmissive features define the background.

9. The device of Example 1, wherein for the first segments, the transparent features define the background, and the diffusely transmissive features define the icon.

10. The device of Example 1, wherein for the first segments, the specular reflecting features define the icon, and the transparent features define the background.

11. The device of Example 1, wherein for the first segments, the specular reflecting features define the background, and the transparent features define the icon.

12. The device of Example 1, wherein for the first segments, the diffusely reflective features define the icon, and the diffusely transmissive features define the background.

13. The device of Example 1, wherein for the first segments, the diffusely reflective features define the background, and the diffusely transmissive features define the icon.

14. An optical device comprising:
an array of lenses; and
a plurality of first and second segments disposed under the array of lenses, the first segments corresponding to portions of a first icon and a first background, and the second segments corresponding to portions of a second icon and a second background,
wherein at a first viewing angle, the array of lenses presents for viewing the first icon and the first background without presenting the second icon for viewing, and at a second viewing angle different from the first viewing angle, the array of lenses presents for viewing the second icon and the second background without presenting the first icon for viewing,
wherein for the first segments,
specular reflecting features define the first icon, and diffusely reflective features define the first background, or
specular reflecting features define the first background, and diffusely reflective features define the first icon, or
specular reflecting features define the first icon, and diffusely transmissive features define the first background, or
specular reflecting features define the first background, and diffusely transmissive features define the first icon, or
transparent features define the first icon, and diffusely reflective features define the first background, or
transparent features define the first background, and diffusely reflective features define the first icon, or
transparent features define first icon, and diffusely transmissive features define the first background, or
transparent features define first background, and diffusely transmissive features define the first icon, or
specular reflecting features define the first icon, and transparent features define the first background, or
specular reflecting features define the first background, and transparent features define the first icon, or
diffusely reflective features define the first icon, and diffusely transmissive features define the first background, or
diffusely reflective features define the first background, and diffusely transmissive features define the first icon, and
wherein for the second segments,
specular reflecting features define the second icon, and diffusely reflective features define the second background, or
specular reflecting features define the second background, and diffusely reflective features define the second icon, or
specular reflecting features define the second icon, and diffusely transmissive features define the second background, or
specular reflecting features define the second background, and diffusely transmissive features define the second icon, or
transparent features define the second icon, and diffusely reflective features define the second background, or
transparent features define the second background, and diffusely reflective features define the second icon, or
transparent features define second icon, and diffusely transmissive features define the second background, or
transparent features define second background, and diffusely transmissive features define the second icon, or
specular reflecting features define the second icon, and transparent features define the second background, or
specular reflecting features define the second background, and transparent features define the second icon, or
diffusely reflective features define the second icon, and diffusely transmissive features define the second background, or
diffusely reflective features define the second background, and diffusely transmissive features define the second icon.

15. The device of Example 14, wherein for the first segments, the specular reflecting features define the first icon, and the diffusely reflective features define the first background.

16. The device of Example 14, wherein for the first segments, the specular reflecting features define the first background, and the diffusely reflective features define the first icon.

17. The device of Example 14, wherein for the first segments, the specular reflecting features define the first icon, and the diffusely transmissive features define the first background.

18. The device of Example 14, wherein for the first segments, the specular reflecting features define the first background, and the diffusely transmissive features define the first icon.

19. The device of Example 14, wherein for the first segments, the transparent features define the first icon, and the diffusely reflective features define the first background.

20. The device of Example 14, wherein for the first segments, the transparent features define the first background, and the diffusely reflective features define the first icon.

21. The device of Example 14, wherein for the first segments, the transparent features define the first icon, and the diffusely transmissive features define the first background.

22. The device of Example 14, wherein for the first segments, the transparent features define the first background, and the diffusely transmissive features define the first icon.

23. The device of Example 14, wherein for the first segments, the specular reflecting features define the first icon, and the transparent features define the first background.

24. The device of Example 14, wherein for the first segments, the specular reflecting features define the first background, and the transparent features define the first icon.

25. The device of Example 14, wherein for the first segments, the diffusely reflective features define the first icon, and the diffusely transmissive features define the first background.

26. The device of Example 14, wherein for the first segments, the diffusely reflective features define the first background, and the diffusely transmissive features define the first icon.

27. The device of any of Examples 14-26, wherein for the second segments, the specular reflecting features define the second icon, and the diffusely reflective features define the second background.

28. The device of any of Examples 14-26, wherein for the second segments, the specular reflecting features define the second background, and the diffusely reflective features define the second icon.

29. The device of any of Examples 14-26, wherein for the second segments, the specular reflecting features define the second icon, and the diffusely transmissive features define the second background.

30. The device of any of Examples 14-26, wherein for the second segments, the specular reflecting features define the second background, and the diffusely transmissive features define the second icon.

31. The device of any of Examples 14-26, wherein for the second segments, the transparent features define the second icon, and the diffusely reflective features define the second background.

32. The device of any of Examples 14-26, wherein for the second segments, the transparent features define the second background, and the diffusely reflective features define the second icon.

33. The device of any of Examples 14-26, wherein for the second segments, the transparent features define the second icon, and the diffusely transmissive features define the second background.

34. The device of any of Examples 14-26, wherein for the second segments, the transparent features define the second background, and the diffusely transmissive features define the second icon.

35. The device of any of Examples 14-26, wherein for the second segments, the specular reflecting features define the second icon, and the transparent features define the second background.

36. The device of any of Examples 14-26, wherein for the second segments, the specular reflecting features define the second background, and the transparent features define the second icon.

37. The device of any of Examples 14-26, wherein for the second segments, the diffusely reflective features define the second icon, and the diffusely transmissive features define the second background.

38. The device of any of Examples 14-26, wherein for the second segments, the diffusely reflective features define the second background, and the diffusely transmissive features define the second icon.

39. The device of any of Examples 1-38, further comprising a substrate having a first side and a second side opposite the first side,
wherein the array of lenses is disposed on the first side of the substrate, and
wherein the first and second segments are disposed on the second side of the substrate.

40. The device of Example 39, further comprising a layer of material, wherein the first and second segments comprise transparent or diffusely transmissive features, and wherein the transparent or diffusely transmissive features are disposed over the layer of material.

41. The device of Example 40, wherein the layer of material comprises a transparent coating configured to provide an index mismatch with the diffusely transmissive features.

42. The device of Example 41, wherein the coating comprises zinc sulfide, titanium dioxide, tantalum pentoxide, zirconium dioxide, or a combination thereof.

43. The device of Example 40, wherein the layer of material comprises a window, and wherein the transparent or diffusely transmissive features are disposed over the window.

44. The device of Example 43, wherein the window comprises a coating.

45. The device of any of Examples 1-44, wherein the device is configured to provide authenticity verification on an item for security.

46. The device of Example 45, wherein the item is a credit card, a debit card, currency, a passport, a driver's license, an identification card, a document, a ticket, a tamper evident container or packaging, or a bottle of pharmaceuticals.

47. The device of Example 45 or 46, further comprising at least one transparent region disposed over information on the item.

48. The device of Example 47, wherein the at least one transparent region is adjacent a metallized region.

49. The device of Example 47 or 48, wherein the information comprises printed information, graphics, or a photograph.

50. An optical device comprising:
an array of lenses; and
a plurality of first and second segments disposed under the array of lenses, the first segments corresponding to portions of an icon and a background,
wherein at a first viewing angle, the array of lenses presents the icon for viewing, and at a second viewing angle different from the first viewing angle, the array of lenses does not present the icon for viewing,
wherein for the first segments,
transparent features define the icon, and non-transparent features define the background, or
transparent features define the background, and non-transparent features define the icon, and
wherein for the second segments, the second segments comprise features similar to the features defining the background of the first segments.

51. The device of Example 50, wherein for the first segments, the transparent features define the icon, and the non-transparent features define the background.

52. The device of Example 50, wherein for the first segments, the transparent features define the background, and the non-transparent features define the icon.

53. An optical device comprising:
an array of lenses; and
a plurality of first and second segments disposed under the array of lenses, the first segments corresponding to portions of a first icon and a first background, and the second segments corresponding to portions of a second icon and a second background,
wherein at a first viewing angle, the array of lenses presents for viewing the first icon and the first background without presenting the second icon for viewing, and at a second viewing angle different from the first viewing angle, the array of lenses presents for viewing the second icon and the second background without presenting the first icon for viewing,
wherein individual ones of the first and second segments comprise transparent and non-transparent regions,
wherein for the first and second segments,
the transparent regions define the first and second icons, and the non-transparent regions define the first and second backgrounds, or
the non-transparent regions define the first and second icons, and the transparent regions define the first and second backgrounds.

54. The device of Example 53, wherein the transparent regions define the first and second icon, and the non-transparent regions define the first and second background.

55. The device of Example 53, wherein the non-transparent regions define the first and second icon, and the transparent regions define the first and second background.

56. The device of any of Examples 50-55, wherein the transparent regions are laser ablated regions.

57. The device of any of Examples 50-56, wherein the non-transparent regions are absorbing regions.

58. The device of any of Examples 50-56, wherein the non-transparent regions are specular reflecting regions.

59. The device of any of Examples 50-58, further comprising a substrate having a first side and a second side opposite the first side,
wherein the array of lenses is disposed on the first side of the substrate, and
wherein the first and second segments are disposed on the second side of the substrate.

60. The device of Example 59, further comprising a layer of material, wherein the transparent regions are disposed over the layer of material.

61. The device of Example 60, wherein the layer of material comprises a window, and wherein the transparent regions are disposed over the window.

62. The device of Example 60, wherein the window comprises a coating

63. The device of Example 60, wherein the layer of material comprises a colored coating.

64. The device of Example 60, wherein the layer of material comprises a flat or diffuse white coating.

65. The device of any of Examples 50-64, wherein the device is configured to provide authenticity verification on an item for security.

66. The device of Example 65, wherein the item is a credit card, a debit card, currency, a passport, a driver's license, an identification card, a document, a ticket, a tamper evident container or packaging, or a bottle of pharmaceuticals.

67. The device of Example 65 or 66, further comprising an additional transparent region disposed over information on the item.

68. The device of Example 67, wherein the information comprises printed information, graphics, or a photograph.

69. The device of any of Examples 1-49, wherein the device comprises a kinoform diffuser providing the diffusely reflective features or the diffusely transmissive features.

70. The device of any of Examples 1-49 or Example 69, wherein the specular reflecting features are more reflective than transmissive.

71. The device of any of Examples 1-49 or Examples 69-70, wherein the transparent features are more transmissive than reflective.

72. The device of any of Examples 1-49 or any of Examples 69-71, wherein the diffusely reflective features are more diffusely reflective than diffusely transmissive.

73. The device of any of Examples 1-49 or any of Examples 69-72, wherein the diffusely transmissive features are more diffusely transmissive than diffusely reflective.

74. The device of any of the preceding Examples, wherein the array of lenses comprises a 1D lenticular lens array.

75. The device of any of Examples 1-73, wherein the array of lenses comprises a 2D array of lenses.

76. The device of any of Examples 1-75, wherein the device is configured to provide authenticity verification on an item of security comprising a paper base.

77. The device of any of Examples 1-75, wherein the device is configured to provide authenticity verification on an item of security comprising a polymer base.

78. The device of any of Examples 47-49 or any of Examples 67-68, wherein the transparent region comprises a material having a refractive index of about 1.8 to about 2.75.

79. The device of Example 78, wherein the material comprises zinc sulfide, titanium dioxide, tantalum pentoxide, zirconium dioxide, or a combination thereof.

80. An optical device comprising:
at least one array of lenses;
a plurality of first and second segments having a length extending along a first axis, the plurality of first and second segments disposed under the at least one array of lenses, the first segments corresponding to portions of a first icon and a first background, wherein upon tilting the first and second segments about the first axis at a first viewing angle, the at least one array of lenses presents the first icon for viewing, wherein upon tilting the first and second segments about the first axis at a second viewing angle different from the first viewing angle, the at least one array of lenses does not present the first icon for viewing; and
a plurality of third and fourth segments having a length extending along a second axis different from the first axis, the plurality of third and fourth segments disposed under the at least one array of lenses, the third segments corresponding to portions of a second icon and a second background, wherein upon tilting the third and fourth segments about the second axis at third viewing angle, the at least one array of lenses presents the second icon for viewing, wherein upon tilting the third and fourth segments about the second axis at a fourth viewing angle different from the third viewing angle, the at least one array of lenses does not present the second icon for viewing.

81. The device of Example 80, wherein the first axis and the second axis are orthogonal to each other.

82. The device of Example 80 or 81, wherein the first axis is a horizontal axis and the second axis is a vertical axis, or wherein the first axis is a vertical axis and the second axis is a horizontal axis.

83. The device of any of Examples 80-82, wherein the plurality of first and second segments is laterally displaced from the plurality of third and fourth segments.

84. The device of any of Examples 80-83, wherein the plurality of first and second segments forms a 1D segment array such that individual ones of the first and second segments are disposed under a plurality of corresponding lenses of the at least one array of lenses.

85. The device of any of Examples 80-84, wherein the plurality of third and fourth segments forms a 1D segment array such that individual ones of the third and fourth segments are disposed under a plurality of corresponding lenses of the at least one array of lenses.

86. The device of any of Examples 80-85,
 wherein for the first segments,
  specular reflecting features define the first icon, and diffusely reflective features define the first background, or
  specular reflecting features define the first background, and diffusely reflective features define the first icon, or
  specular reflecting features define the first icon, and diffusely transmissive features define the first background, or
  specular reflecting features define the first background, and diffusely transmissive features define the first icon, or
  transparent features define the first icon, and diffusely reflective features define the first background, or
  transparent features define the first background, and diffusely reflective features define the first icon, or
  transparent features define first icon, and diffusely transmissive features define the first background, or
  transparent features define first background, and diffusely transmissive features define the first icon, or
  specular reflecting features define the first icon, and transparent features define the first background, or
  specular reflecting features define the first background, and transparent features define the first icon, or
  diffusely reflective features define the first icon, and diffusely transmissive features define the first background, or
  diffusely reflective features define the first background, and diffusely transmissive features define the first icon, and
 wherein for the second segments, the second segments comprise features similar to the features defining the first background of the first segments.

87. The device of Example 86,
 wherein for the third segments,
  specular reflecting features define the second icon, and diffusely reflective features define the second background, or
  specular reflecting features define the second background, and diffusely reflective features define the second icon, or
  specular reflecting features define the second icon, and diffusely transmissive features define the second background, or
  specular reflecting features define the second background, and diffusely transmissive features define the second icon, or
  transparent features define the second icon, and diffusely reflective features define the second background, or
  transparent features define the second background, and diffusely reflective features define the second icon, or
  transparent features define second icon, and diffusely transmissive features define the second background, or
  transparent features define second background, and diffusely transmissive features define the second icon, or
  specular reflecting features define the second icon, and transparent features define the second background, or
  specular reflecting features define the second background, and transparent features define the second icon, or
  diffusely reflective features define the second icon, and diffusely transmissive features define the second background, or
  diffusely reflective features define the second background, and diffusely transmissive features define the second icon, and
 wherein for the fourth segments, the fourth segments comprise features similar to the features defining the second background of the third segments.

88. The device of any of Examples 80-85, wherein the second segments correspond to portions of a third icon and a third background, wherein upon tilting the first and second segments about the first axis at the first viewing angle, the at least one array of lenses does not present the third icon for viewing, and wherein upon tilting the first and second segments about the first axis at the second viewing angle, the at least one array of lenses presents the third icon for viewing.

89. The device of Example 88,
 wherein for the first segments,
  specular reflecting features define the first icon, and diffusely reflective features define the first background, or
  specular reflecting features define the first background, and diffusely reflective features define the first icon, or
  specular reflecting features define the first icon, and diffusely transmissive features define the first background, or
  specular reflecting features define the first background, and diffusely transmissive features define the first icon, or
  transparent features define the first icon, and diffusely reflective features define the first background, or
  transparent features define the first background, and diffusely reflective features define the first icon, or
  transparent features define first icon, and diffusely transmissive features define the first background, or
  transparent features define first background, and diffusely transmissive features define the first icon, or
  specular reflecting features define the first icon, and transparent features define the first background, or
  specular reflecting features define the first background, and transparent features define the first icon, or
  diffusely reflective features define the first icon, and diffusely transmissive features define the first background, or
  diffusely reflective features define the first background, and diffusely transmissive features define the first icon, and wherein for the second segments,
specular reflecting features define the third icon, and diffusely reflective features define the third background, or
specular reflecting features define the third background, and diffusely reflective features define the third icon, or
specular reflecting features define the third icon, and diffusely transmissive features define the third background, or
specular reflecting features define the third background, and diffusely transmissive features define the third icon, or
transparent features define the third icon, and diffusely reflective features define the third background, or
transparent features define the third background, and diffusely reflective features define the third icon, or
transparent features define third icon, and diffusely transmissive features define the third background, or
transparent features define third background, and diffusely transmissive features define the third icon, or
specular reflecting features define the third icon, and transparent features define the third background, or
specular reflecting features define the third background, and transparent features define the third icon, or
diffusely reflective features define the third icon, and diffusely transmissive features define the third background, or
diffusely reflective features define the third background, and diffusely transmissive features define the third icon.

90. The device of Example 86, wherein the fourth segments correspond to portions of a third icon and a third background, wherein upon tilting the third and fourth segments about the second axis at the third viewing angle, the at least one array of lenses does not present the third icon for viewing, and wherein upon tilting the third and fourth segments about the second axis at the fourth viewing angle, the at least one array of lenses presents the third icon for viewing.

91. The device of Example 90,
wherein for the third segments,
specular reflecting features define the second icon, and diffusely reflective features define the second background, or
specular reflecting features define the second background, and diffusely reflective features define the second icon, or
specular reflecting features define the second icon, and diffusely transmissive features define the second background, or
specular reflecting features define the second background, and diffusely transmissive features define the second icon, or
transparent features define the second icon, and diffusely reflective features define the second background, or
transparent features define the second background, and diffusely reflective features define the second icon, or
transparent features define second icon, and diffusely transmissive features define the second background, or
transparent features define second background, and diffusely transmissive features define the second icon, or
specular reflecting features define the second icon, and transparent features define the second background, or
specular reflecting features define the second background, and transparent features define the second icon, or
diffusely reflective features define the second icon, and diffusely transmissive features define the second background, or
diffusely reflective features define the second background, and diffusely transmissive features define the second icon, and
wherein for the fourth segments,
specular reflecting features define the third icon, and diffusely reflective features define the third background, or
specular reflecting features define the third background, and diffusely reflective features define the third icon, or
specular reflecting features define the third icon, and diffusely transmissive features define the third background, or
specular reflecting features define the third background, and diffusely transmissive features define the third icon, or
transparent features define the third icon, and diffusely reflective features define the third background, or
transparent features define the third background, and diffusely reflective features define the third icon, or
transparent features define third icon, and diffusely transmissive features define the third background, or
transparent features define third background, and diffusely transmissive features define the third icon, or
specular reflecting features define the third icon, and transparent features define the third background, or
specular reflecting features define the third background, and transparent features define the third icon, or
diffusely reflective features define the third icon, and diffusely transmissive features define the third background, or
diffusely reflective features define the third background, and diffusely transmissive features define the third icon.

92. The device of Example 88 or 89, wherein the fourth segments correspond to portions of a fourth icon and a fourth background, wherein upon tilting the third and fourth segments about the second axis at the third viewing angle, the at least one array of lenses does not present the fourth icon for viewing, and wherein upon tilting the third and fourth segments about the second axis at the fourth viewing angle, the at least one array of lenses presents the fourth icon for viewing.

93. The device of Example 92,
wherein for the third segments,
specular reflecting features define the second icon, and diffusely reflective features define the second background, or
specular reflecting features define the second background, and diffusely reflective features define the second icon, or
specular reflecting features define the second icon, and diffusely transmissive features define the second background, or
specular reflecting features define the second background, and diffusely transmissive features define the second icon, or transparent features define the second icon, and diffusely reflective features define the second background, or transparent features define the second background, and diffusely reflective features define the second icon, or transparent features define second icon, and diffusely transmissive features define the second background, or transparent features define second background, and diffusely transmissive features define the second icon, or specular reflecting features define the second icon, and transparent features define the second background, or specular reflecting features define the second background, and transparent features define the second icon, or diffusely reflective features define the second icon, and diffusely transmissive features define the second background, or diffusely reflective features define the second background, and diffusely transmissive features define the second icon, and wherein for the fourth segments, specular reflecting features define the fourth icon, and diffusely reflective features define the fourth background, or specular reflecting features define the fourth background, and diffusely reflective features define the fourth icon, or specular reflecting features define the fourth icon, and diffusely transmissive features define the fourth background, or specular reflecting features define the fourth background, and diffusely transmissive features define the fourth icon, or transparent features define the fourth icon, and diffusely reflective features define the fourth background, or transparent features define the fourth background, and diffusely reflective features define the fourth icon, or transparent features define fourth icon, and diffusely transmissive features define the fourth background, or transparent features define fourth background, and diffusely transmissive features define the fourth icon, or specular reflecting features define the fourth icon, and transparent features define the fourth background, or specular reflecting features define the fourth background, and transparent features define the fourth icon, or diffusely reflective features define the fourth icon, and diffusely transmissive features define the fourth background, or diffusely reflective features define the fourth background, and diffusely transmissive features define the fourth icon.

94. The device of any of Examples 80-93, further comprising:
a plurality of additional segments forming a 2D image array of a plurality of additional icons, the plurality of additional segments disposed under the at least one array of lenses, individual ones of the plurality of additional segments disposed with respect to a corresponding lens of the at least one array of lenses, wherein the at least one array of lenses presents the plurality of additional icons for viewing.

95. The device of Example 94, wherein the plurality of additional segments is laterally displaced from the plurality of first and second segments or from the plurality of third and fourth segments.

96. The device of Example 94 or 95, wherein a distance between adjacent lenses of the at least one array of lenses is equal to a distance between the corresponding additional segments that are disposed under the at least one array of lenses.

97. The device of Example 94 or 95, wherein a distance between adjacent lenses of the at least one array of lenses is less than or greater than a distance between the corresponding additional segments that are disposed under the at least one array of lenses such that pitch of the at least one array of lenses is not equal to pitch of the 2D image array.

98. The device of Example 97, wherein the pitch of the at least one array of lenses is greater than the pitch of the 2D image array such that the plurality of additional icons appears below or behind the surface of the device.

99. The device of Example 97, wherein the pitch of the at least one array of lenses is less than the pitch of the 2D image array such that the plurality of additional icons appears above or in front of the surface of the device.

100. An optical device comprising:
at least one array of lenses;
a plurality of first and second segments having a length extending along a first axis, the plurality of first and second segments disposed under the at least one array of lenses, the first segments corresponding to portions of a first icon and a first background, wherein upon tilting the first and second segments about the first axis at a first viewing angle, the at least one array of lenses presents the first icon for viewing, wherein upon tilting the first and second segments about the first axis at a second viewing angle different from the first viewing angle, the at least one array of lenses does not present the first icon for viewing; and
a plurality of additional segments forming a 2D image array of a plurality of additional icons, the plurality of additional segments disposed under the at least one array of lenses, individual ones of the plurality of additional segments disposed with respect to a corresponding lens of the at least one array of lenses, wherein the at least one array of lenses presents the plurality of additional icons for viewing.

101. The device of Example 100, wherein the plurality of additional segments is laterally displaced from the plurality of first and second segments.

102. The device of Example 100 or 101, wherein the plurality of first and second segments forms a 1D segment array such that individual ones of the first and second segments are disposed under a plurality of corresponding lenses of the at least one array of lenses.

103. The device of any of Examples 100-102, wherein a distance between adjacent lenses of the at least one array of lenses is equal to a distance between the corresponding additional segments that are disposed under the at least one array of lenses.

104. The device of any of Examples 100-102, wherein a distance between adjacent lenses of the at least one array of lenses is less than or greater than a distance between the corresponding additional segments that are disposed under the at least one array of lenses such that pitch of the at least one array of lenses is not equal to pitch of the 2D image array.

105. The device of Example 104, wherein the pitch of the at least one array of lenses is greater than the pitch of the 2D image array such that the plurality of additional icons appears below or behind the surface of the device.

106. The device of Example 104, wherein the pitch of the at least one array of lenses is less than the pitch of the 2D image array such that the plurality of additional icons appears above or in front of the surface of the device.

107. The device of any of Examples 100-106, wherein for the first segments,
  specular reflecting features define the first icon, and diffusely reflective features define the first background, or
  specular reflecting features define the first background, and diffusely reflective features define the first icon, or
  specular reflecting features define the first icon, and diffusely transmissive features define the first background, or
  specular reflecting features define the first background, and diffusely transmissive features define the first icon, or
  transparent features define the first icon, and diffusely reflective features define the first background, or
  transparent features define the first background, and diffusely reflective features define the first icon, or
  transparent features define first icon, and diffusely transmissive features define the first background, or
  transparent features define first background, and diffusely transmissive features define the first icon, or
  specular reflecting features define the first icon, and transparent features define the first background, or
  specular reflecting features define the first background, and transparent features define the first icon, or
  diffusely reflective features define the first icon, and diffusely transmissive features define the first background, or
  diffusely reflective features define the first background, and diffusely transmissive features define the first icon, and
  wherein for the second segments, the second segments comprise features similar to the features defining the first background of the first segments.

108. The device of any of Examples 100-106, wherein the second segments correspond to portions of a second icon and a second background, wherein upon tilting the first and second segments about the first axis at the first viewing angle, the at least one array of lenses does not present the second icon for viewing, and wherein upon tilting the first and second segments about the first axis at the second viewing angle, the at least one array of lenses presents the second icon for viewing.

109. The device of Example 108,
  wherein for the first segments,
    specular reflecting features define the first icon, and diffusely reflective features define the first background, or
    specular reflecting features define the first background, and diffusely reflective features define the first icon, or
    specular reflecting features define the first icon, and diffusely transmissive features define the first background, or
    specular reflecting features define the first background, and diffusely transmissive features define the first icon, or
    transparent features define the first icon, and diffusely reflective features define the first background, or
    transparent features define the first background, and diffusely reflective features define the first icon, or
    transparent features define first icon, and diffusely transmissive features define the first background, or
    transparent features define first background, and diffusely transmissive features define the first icon, or
    specular reflecting features define the first icon, and transparent features define the first background, or
    specular reflecting features define the first background, and transparent features define the first icon, or
    diffusely reflective features define the first icon, and diffusely transmissive features define the first background, or
    diffusely reflective features define the first background, and diffusely transmissive features define the first icon, and
  wherein for the second segments,
    specular reflecting features define the second icon, and diffusely reflective features define the second background, or
    specular reflecting features define the second background, and diffusely reflective features define the second icon, or
    specular reflecting features define the second icon, and diffusely transmissive features define the second background, or
    specular reflecting features define the second background, and diffusely transmissive features define the second icon, or
    transparent features define the second icon, and diffusely reflective features define the second background, or
    transparent features define the second background, and diffusely reflective features define the second icon, or
    transparent features define second icon, and diffusely transmissive features define the second background, or
    transparent features define second background, and diffusely transmissive features define the second icon, or
    specular reflecting features define the second icon, and transparent features define the second background, or
    specular reflecting features define the second background, and transparent features define the second icon, or
    diffusely reflective features define the second icon, and diffusely transmissive features define the second background, or
    diffusely reflective features define the second background, and diffusely transmissive features define the second icon.

110. An optical device comprising:
at least one array of lenses;
a plurality of first segments forming a first 2D image array of a plurality of first icons, the plurality of first segments disposed under the at least one array of lenses, individual ones of the plurality of first segments disposed with respect to a corresponding lens of the at least one array of lenses, wherein the at least one array of lenses presents the plurality of first icons for viewing; and
a plurality of second segments forming a second 2D image array of a plurality of second icons, the plurality of second segments disposed under the at least one array of lenses, individual ones of the plurality of second segments disposed with respect to a corresponding lens of the at least one array of lenses, wherein the at least one array of lenses presents the plurality of second icons for viewing,
wherein the plurality of first segments produces a different optical effect than the plurality of second segments or
wherein the plurality of first segments is spaced apart from the plurality of second segments by a region that produces a different optical effect than the plurality of first or second segments.

111. The device of Example 110, wherein the different optical effect comprises a difference in size, shape, color, or texture.

112. The device of Example 110 or 111, wherein the plurality of second segments is laterally displaced from the plurality of first segments.

113. The device of any of Examples 110-112, wherein a distance between adjacent lenses of the at least one array of lenses is equal to a distance between the corresponding first segments that are disposed under the at least one array of lenses.

114. The device of any of Examples 110-112, wherein a distance between adjacent lenses of the at least one array of lenses is less than or greater than a distance between the corresponding first segments that are disposed under the at least one array of lenses such that pitch of the at least one array of lenses is not equal to pitch of the first 2D image array.

115. The device of Example 114, wherein the pitch of the at least one array of lenses is greater than the pitch of the first 2D image array such that the plurality of first icons appears below or behind the surface of the device.

116. The device of Example 114, wherein the pitch of the at least one array of lenses is less than the pitch of the first 2D image array such that the plurality of first icons appears above or in front of the surface of the device.

117. The device of any of Examples 110-116, wherein a distance between adjacent lenses of the at least one array of lenses is equal to a distance between the corresponding second segments that are disposed under the at least one array of lenses.

118. The device of any of Examples 110-116, wherein a distance between adjacent lenses of the at least one array of lenses is less than or greater than a distance between the corresponding second segments that are disposed under the at least one array of lenses such that pitch of the at least one array of lenses is not equal to pitch of the second 2D image array.

119. The device of Example 118, wherein the pitch of the at least one array of lenses is greater than the pitch of the second 2D image array such that the plurality of second icons appears below or behind the surface of the device.

120. The device of Example 118, wherein the pitch of the at least one array of lenses is less than the pitch of the second 2D image array such that the plurality of second icons appears above or in front of the surface of the device.

121. The device of any of Examples 80-120, wherein at least one array of lenses comprises multiple arrays of lenses.

122. The device of any of Examples 80-120, wherein the at least one array of lenses comprises a single 2D array of lenses.

123. The device of any of Examples 80-122, wherein the device is configured to provide authenticity verification on an item for security.

124. The device of Example 123, wherein the item is a credit card, a debit card, currency, a passport, a driver's license, an identification card, a document, a ticket, a tamper evident container or packaging, or a bottle of pharmaceuticals.

125. The device of Example 123 or 124, further comprising at least one transparent region disposed over information on the item.

126. The device of Example 125, wherein the at least one transparent region is adjacent a metallized region.

127. The device of Example 125 or 126, wherein the information comprises printed information, graphics, or a photograph.

128. The device of any of Examples 125-127, wherein the transparent region comprises a material having a refractive index of about 1.8 to about 2.75.

129. The device of Example 128, wherein the material comprises zinc sulfide, titanium dioxide, tantalum pentoxide, zirconium dioxide, or a combination thereof.

130. The device of any of Examples 80-129, wherein the device is configured to provide authenticity verification on an item of security comprising a paper base.

131. The device of any of Examples 80-129, wherein the device is configured to provide authenticity verification on an item of security comprising a polymer base.

132. The device of any of Examples 94-95 or any of Examples 100-102, wherein the plurality of additional icons appears above or in front of the surface of the device.

133. The device of Example 132, wherein the plurality of additional icons appears to move to the right of the device when an observer moves to the left of the device.

134. The device of any of Examples 94-95 or any of Examples 100-102, wherein the plurality of additional icons appears below or behind the surface of the device.

135. The device of Example 134, wherein the plurality of additional icons appears to move to the left of the device when an observer moves to the left of the device.

136. The device of any of Examples 110-112, wherein the plurality of first icons appears above or in front of the surface of the device.

137. The device of Example 136, wherein the plurality of first icons appears to move to the right of the device when an observer moves to the left of the device.

138. The device of any of Examples 110-112, wherein the plurality of first icons appears below or behind the surface of the device.

139. The device of Example 138, wherein the plurality of first icons appears to move to the left of the device when an observer moves to the left of the device.

140. The device of any of Examples 136-139, wherein the plurality of second icons appears above or in front of the surface of the device.

141. The device of Example 140, wherein the plurality of second icons appears to move to the right of the device when an observer moves to the left of the device.

142. The device of any of Examples 136-139, wherein the plurality of second icons appears below or behind the surface of the device.

143. The device of Example 142, wherein the plurality of second icons appears to move to the left of the device when an observer moves to the left of the device.

144. An optical array thin film device, comprising:
a first image; and
a second image,
wherein upon tilting the device away or toward an observer, the first image flips to a third image, and
wherein upon tilting the device from side to side, the second image flips to a fourth image.

145. The device of Example 144, wherein the second image is adjacent to the first image.

146. The device of any of Examples 144-145, wherein the first, second, third, and fourth images are different from one another.

147. The device of any of Examples 144-145, wherein the first image matches the third or fourth image at a tilting angle.

148. The device of any of Examples 144-145 or 147, wherein the second image matches the first or second image at a tilting angle.

149. The device of any of Examples 144-148, wherein at least one of the first, second, third, or fourth images comprises an icon, wherein the icon appears bright against a darker diffuse background at an angle of specular observation.

150. The device of any of Examples 144-149, wherein at least one of the first, second, third, or fourth images comprises an icon, wherein the icon appears dark against a brighter diffuse background at an angle of off-specular observation.

151. The device of any of Examples 144-150, wherein the device comprises one or more of specular reflecting, diffusely reflecting, transmissive, or diffusely transmissive features configured to define the first, second, third, or fourth images.

152. The device of any of Examples 144-151, further comprising at least one array of lenses 153. The device of Example 152, wherein the at least one array of lenses comprises multiple arrays of lenses.

154. The device of Example 152, wherein the at least one array of lenses comprises a 2D array of lenses.

155. The device of any of Examples 1-13, further comprising:
a plurality of third and fourth segments disposed under the array of lenses, the third segments corresponding to portions of a second icon and a second background,
wherein at a third viewing angle, the array of lenses presents the second icon for viewing, and at a fourth viewing angle different from the third viewing angle, the array of lenses does not present the second icon for viewing, and
wherein the difference in the first and second viewing angles is different than the difference in the third and fourth viewing angles.

156. The device of Example 155, wherein the difference in the first and second viewing angles is larger than the difference in the third and fourth viewing angles.

157. The device of Example 155, wherein the difference in the first and second viewing angles is smaller than the difference in the third and fourth viewing angles.

158. The device of any of Examples 155-157,
wherein for the third segments,
specular reflecting features define the second icon, and diffusely reflective features define the second background, or
specular reflecting features define the second background, and diffusely reflective features define the second icon, or
specular reflecting features define the second icon, and diffusely transmissive features define the second background, or
specular reflecting features define the second background, and diffusely transmissive features define the second icon, or
transparent features define the second icon, and diffusely reflective features define the second background, or
transparent features define the second background, and diffusely reflective features define the second icon, or
transparent features define second icon, and diffusely transmissive features define the second background, or
transparent features define second background, and diffusely transmissive features define the second icon, or
specular reflecting features define the second icon, and transparent features define the second background, or
specular reflecting features define the second background, and transparent features define the second icon, or
diffusely reflective features define the second icon, and diffusely transmissive features define the second background, or
diffusely reflective features define the second background, and diffusely transmissive features define the second icon, and
wherein for the fourth segments, the fourth segments comprise features similar to the features defining the background of the thirds segments.

159. The device of any of Examples 155-158, wherein for the third segments, the specular reflecting features define the second icon, and the diffusely reflective features define the second background.

160. The device of any of Examples 155-158, wherein for the third segments, the specular reflecting features define the second background, and the diffusely reflective features define the second icon.

161. The device of any of Examples 155-158, wherein for the third segments, the specular reflecting features define the second icon, and the diffusely transmissive features define the second background.

162. The device of any of Examples 155-158, wherein for the third segments, the specular reflecting features define the second background, and the diffusely transmissive features define the second icon.

163. The device of any of Examples 155-158, wherein for the third segments, the transparent features define the second icon, and the diffusely reflective features define the second background.

164. The device of any of Examples 155-158, wherein for the third segments, the transparent features define the second background, and the diffusely reflective features define the second icon.

165. The device of any of Examples 155-158, wherein for the third segments, the transparent features define the second icon, and the diffusely transmissive features define the second background.

166. The device of any of Examples 155-158, wherein for the third segments, the transparent features define the second background, and the diffusely transmissive features define the second icon.

167. The device of any of Examples 155-158, wherein for the third segments, the specular reflecting features define the second icon, and the transparent features define the second background.

168. The device of any of Examples 155-158, wherein for the third segments, the specular reflecting features define the second background, and the transparent features define the second icon.

169. The device of any of Examples 155-158, wherein for the third segments, the diffusely reflective features define the second icon, and the diffusely transmissive features define the second background.

170. The device of any of Examples 155-158, wherein for the third segments, the diffusely reflective features define the second background, and the diffusely transmissive features define the second icon.

171. The device of any of Examples 1-13, further comprising:
a plurality of third and fourth segments disposed under the array of lenses, the third segments corresponding to portions of a second icon and a second background, and the fourth segments corresponding to portions of a third icon and a third background,
wherein at a third viewing angle, the array of lenses presents for viewing the second icon and the second background without presenting the third icon for viewing, and at a fourth viewing angle different from the third viewing angle, the array of lenses presents for viewing the third icon and the third background without presenting the second icon for viewing,
wherein the difference in the first and second viewing angles is different than the difference in the third and fourth viewing angles.

172. The device of Example 171, wherein the difference in the first and second viewing angles is larger than the difference in the third and fourth viewing angles.

173. The device of Example 171, wherein the difference in the first and second viewing angles is smaller than the difference in the third and fourth viewing angles.

174. The device of any of Examples 171-173, wherein the third background at the fourth viewing angle appears the same in outer shape, size, and brightness as the second background at the third viewing angle.

175. The device of any of Examples 171-174,
wherein for the third segments,
specular reflecting features define the second icon, and diffusely reflective features define the second background, or
specular reflecting features define the second background, and diffusely reflective features define the second icon, or
specular reflecting features define the second icon, and diffusely transmissive features define the second background, or
specular reflecting features define the second background, and diffusely transmissive features define the second icon, or
transparent features define the second icon, and diffusely reflective features define the second background, or
transparent features define the second background, and diffusely reflective features define the second icon, or
transparent features define second icon, and diffusely transmissive features define the second background, or
transparent features define second background, and diffusely transmissive features define the second icon, or
specular reflecting features define the second icon, and transparent features define the second background, or
specular reflecting features define the second background, and transparent features define the second icon, or
diffusely reflective features define the second icon, and diffusely transmissive features define the second background, or
diffusely reflective features define the second background, and diffusely transmissive features define the second icon, and
wherein for the fourth segments,
specular reflecting features define the third icon, and diffusely reflective features define the third background, or
specular reflecting features define the third background, and diffusely reflective features define the third icon, or
specular reflecting features define the third icon, and diffusely transmissive features define the third background, or
specular reflecting features define the third background, and diffusely transmissive features define the third icon, or
transparent features define the third icon, and diffusely reflective features define the third background, or
transparent features define the third background, and diffusely reflective features define the third icon, or
transparent features define third icon, and diffusely transmissive features define the third background, or
transparent features define third background, and diffusely transmissive features define the third icon, or
specular reflecting features define the third icon, and transparent features define the third background, or
specular reflecting features define the third background, and transparent features define the third icon, or
diffusely reflective features define the third icon, and diffusely transmissive features define the third background, or
diffusely reflective features define the third background, and diffusely transmissive features define the third icon.

176. The device of Example 175, wherein for the third segments, the specular reflecting features define the second icon, and the diffusely reflective features define the second background.

177. The device of Example 175, wherein for the third segments, the specular reflecting features define the second background, and the diffusely reflective features define the second icon.

178. The device of Example 175, wherein for the third segments, the specular reflecting features define the second icon, and the diffusely transmissive features define the second background.

179. The device of Example 175, wherein for the third segments, the specular reflecting features define the second background, and the diffusely transmissive features define the second icon.

180. The device of Example 175, wherein for the third segments, the transparent features define the second icon, and the diffusely reflective features define the second background.

181. The device of Example 175, wherein for the third segments, the transparent features define the second background, and the diffusely reflective features define the second icon.

182. The device of Example 175, wherein for the third segments, the transparent features define the second icon, and the diffusely transmissive features define the second background.

183. The device of Example 175, wherein for the third segments, the transparent features define the second background, and the diffusely transmissive features define the second icon.

184. The device of Example 175, wherein for the third segments, the specular reflecting features define the second icon, and the transparent features define the second background.

185. The device of Example 175, wherein for the third segments, the specular reflecting features define the second background, and the transparent features define the second icon.

186. The device of Example 175, wherein for the third segments, the diffusely reflective features define the second icon, and the diffusely transmissive features define the second background.

187. The device of Example 175, wherein for the third segments, the diffusely reflective features define the second background, and the diffusely transmissive features define the second icon.

188. The device of any of Examples 175-187, wherein for the fourth segments, the specular reflecting features define the third icon, and the diffusely reflective features define the third background.

189. The device of any of Examples 175-187, wherein for the fourth segments, the specular reflecting features define the third background, and the diffusely reflective features define the third icon.

190. The device of any of Examples 175-187, wherein for the fourth segments, the specular reflecting features define the third icon, and the diffusely transmissive features define the third background.

191. The device of any of Examples 175-187, wherein for the fourth segments, the specular reflecting features define the third background, and the diffusely transmissive features define the third icon.

192. The device of any of Examples 175-187, wherein for the fourth segments, the transparent features define the third icon, and the diffusely reflective features define the third background.

193. The device of any of Examples 175-187, wherein for the fourth segments, the transparent features define the third background, and the diffusely reflective features define the third icon.

194. The device of any of Examples 175-187, wherein for the fourth segments, the transparent features define the third icon, and the diffusely transmissive features define the third background.

195. The device of any of Examples 175-187, wherein for the fourth segments, the transparent features define the third background, and the diffusely transmissive features define the third icon.

196. The device of any of Examples 175-187, wherein for the fourth segments, the specular reflecting features define the third icon, and the transparent features define the third background.

197. The device of any of Examples 175-187, wherein for the fourth segments, the specular reflecting features define the third background, and the transparent features define the third icon.

198. The device of any of Examples 175-187, wherein for the fourth segments, the diffusely reflective features define the third icon, and the diffusely transmissive features define the third background.

199. The device of any of Examples 175-187, wherein for the fourth segments, the diffusely reflective features define the third background, and the diffusely transmissive features define the third icon.

200. The device of any of Examples 14-49, further comprising:
a plurality of third and fourth segments disposed under the array of lenses, the third segments corresponding to portions of a third icon and a third background, and the fourth segments corresponding to portions of a fourth icon and a fourth background,
wherein at a third viewing angle, the array of lenses presents for viewing the third icon and the third background without presenting the fourth icon for viewing, and at a fourth viewing angle different from the third viewing angle, the array of lenses presents for viewing the fourth icon and the fourth background without presenting the third icon for viewing,
wherein the difference in the first and second viewing angles is different than the difference in the third and fourth viewing angles.

201. The device of Example 200, wherein the difference in the first and second viewing angles is larger than the difference in the third and fourth viewing angles.

202. The device of Example 200, wherein the difference in the first and second viewing angles is smaller than the difference in the third and fourth viewing angles.

203. The device of any of Examples 200-202, wherein the second background at the second viewing angle appears the same in outer shape, size, and brightness as the first background at the first viewing angle.

204. The device of any of Examples 200-203, wherein the fourth background at the fourth viewing angle appears the same in outer shape, size, and brightness as the third background at the third viewing angle.

205. The device of any of Examples 200-204,
wherein for the third segments,
specular reflecting features define the third icon, and diffusely reflective features define the third background, or
specular reflecting features define the third background, and diffusely reflective features define the third icon, or
specular reflecting features define the third icon, and diffusely transmissive features define the third background, or
specular reflecting features define the third background, and diffusely transmissive features define the third icon, or
transparent features define the third icon, and diffusely reflective features define the third background, or
transparent features define the third background, and diffusely reflective features define the third icon, or
transparent features define third icon, and diffusely transmissive features define the third background, or
transparent features define third background, and diffusely transmissive features define the third icon, or
specular reflecting features define the third icon, and transparent features define the third background, or
specular reflecting features define the third background, and transparent features define the third icon, or
diffusely reflective features define the third icon, and diffusely transmissive features define the third background, or
diffusely reflective features define the third background, and diffusely transmissive features define the third icon, and wherein for the fourth segments,
  specular reflecting features define the fourth icon, and diffusely reflective features define the fourth background, or
  specular reflecting features define the fourth background, and diffusely reflective features define the fourth icon, or
  specular reflecting features define the fourth icon, and diffusely transmissive features define the fourth background, or
  specular reflecting features define the fourth background, and diffusely transmissive features define the fourth icon, or
  transparent features define the fourth icon, and diffusely reflective features define the fourth background, or
  transparent features define the fourth background, and diffusely reflective features define the fourth icon, or
  transparent features define fourth icon, and diffusely transmissive features define the fourth background, or
  transparent features define fourth background, and diffusely transmissive features define the fourth icon, or
  specular reflecting features define the fourth icon, and transparent features define the fourth background, or
  specular reflecting features define the fourth background, and transparent features define the fourth icon, or
  diffusely reflective features define the fourth icon, and diffusely transmissive features define the fourth background, or
  diffusely reflective features define the fourth background, and diffusely transmissive features define the fourth icon.

206. The device of Example 205, wherein for the third segments, the specular reflecting features define the third icon, and the diffusely reflective features define the third background.

207. The device of Example 205, wherein for the third segments, the specular reflecting features define the third background, and the diffusely reflective features define the third icon.

208. The device of Example 205, wherein for the third segments, the specular reflecting features define the third icon, and the diffusely transmissive features define the third background.

209. The device of Example 205, wherein for the third segments, the specular reflecting features define the third background, and the diffusely transmissive features define the third icon.

210. The device of Example 205, wherein for the third segments, the transparent features define the third icon, and the diffusely reflective features define the third background.

211. The device of Example 205, wherein for the third segments, the transparent features define the third background, and the diffusely reflective features define the third icon.

212. The device of Example 205, wherein for the third segments, the transparent features define the third icon, and the diffusely transmissive features define the third background.

213. The device of Example 205, wherein for the third segments, the transparent features define the third background, and the diffusely transmissive features define the third icon.

214. The device of Example 205, wherein for the third segments, the specular reflecting features define the third icon, and the transparent features define the third background.

215. The device of Example 205, wherein for the third segments, the specular reflecting features define the third background, and the transparent features define the third icon.

216. The device of Example 205, wherein for the third segments, the diffusely reflective features define the third icon, and the diffusely transmissive features define the third background.

217. The device of Example 205, wherein for the third segments, the diffusely reflective features define the third background, and the diffusely transmissive features define the third icon.

218. The device of any of Examples 205-217, wherein for the fourth segments, the specular reflecting features define the fourth icon, and the diffusely reflective features define the fourth background.

219. The device of any of Examples 205-217, wherein for the fourth segments, the specular reflecting features define the fourth background, and the diffusely reflective features define the fourth icon.

220. The device of any of Examples 205-217, wherein for the fourth segments, the specular reflecting features define the fourth icon, and the diffusely transmissive features define the fourth background.

221. The device of any of Examples 205-217, wherein for the fourth segments, the specular reflecting features define the fourth background, and the diffusely transmissive features define the fourth icon.

222. The device of any of Examples 205-217, wherein for the fourth segments, the transparent features define the fourth icon, and the diffusely reflective features define the fourth background.

223. The device of any of Examples 205-217, wherein for the fourth segments, the transparent features define the fourth background, and the diffusely reflective features define the fourth icon.

224. The device of any of Examples 205-217, wherein for the fourth segments, the transparent features define the fourth icon, and the diffusely transmissive features define the fourth background.

225. The device of any of Examples 205-217, wherein for the fourth segments, the transparent features define the fourth background, and the diffusely transmissive features define the fourth icon.

226. The device of any of Examples 205-217, wherein for the fourth segments, the specular reflecting features define the fourth icon, and the transparent features define the fourth background.

227. The device of any of Examples 205-217, wherein for the fourth segments, the specular reflecting features define the fourth background, and the transparent features define the fourth icon.

228. The device of any of Examples 205-217, wherein for the fourth segments, the diffusely reflective features define the fourth icon, and the diffusely transmissive features define the fourth background.

229. The device of any of Examples 205-217, wherein for the fourth segments, the diffusely reflective features define the fourth background, and the diffusely transmissive features define the fourth icon.

230. The device of any of Examples 14-49,
  wherein at the first viewing angle, the first icon appears dark and the first background appears matte white or grey, and at the second viewing angle, the second icon appears dark and the second background appears matte white or grey, or wherein at the first viewing angle, the first icon appears bright and the first background appears matte white or grey, and at the second viewing angle, the second icon appears bright and the second background appears matte white or grey, or wherein at the first viewing angle, the first icon appears dark and the first background appears matte white or grey, and at the second viewing angle, the second icon appears bright and the second background appears matte white or grey.

231. The device of Example 230, wherein at the first viewing angle, the first icon appears dark and the first background appears matte white or grey, and at the second viewing angle, the second icon appears dark and the second background appears matte white or grey.

232. The device of Example 230, wherein at the first viewing angle, the first icon appears bright and the first background appears matte white or grey, and at the second viewing angle, the second icon appears bright and the second background appears matte white or grey.

233. The device of Example 230, wherein at the first viewing angle, the first icon appears dark and the first background appears matte white or grey, and at the second viewing angle, the second icon appears bright and the second background appears matte white or grey.

234. The device of any of Examples 230-233, wherein the device is viewed under a combination of a point light source and a diffuse light source.

235. The device of any of Examples 230-233, wherein the device is viewed under a point light source.

236. The device of any of Examples 230-233, wherein the device is viewed under a diffuse light source.

237. The device of any of Examples 155-229, wherein the array of lenses comprises at least two lens arrays.

238. The device of Example 237, wherein the at least two lens arrays comprise at least two 1D lens arrays.

239. The device of Example 237, wherein the at least two lens arrays comprise at least two 2D lens arrays.

240. The device of Example 237, wherein the at least two lens arrays comprise a 1D lens array and a 2D lens array.

241. The device of any of Examples 237-240, wherein the at least two lens arrays are displaced at an angle with respect to each other.

242. The device of any of the preceding Examples, further comprising one or more microstructures or one or more nanostructures configured to provide one or more colors.

243. The device of Example 242, wherein the one or more microstructures or the one or more nanostructures comprise at least one plasmonic structure.

244. The device of Example 242, wherein the one or more microstructures or the one or more nanostructures comprise at least one opal structure.

245. The device of Example 244, wherein the at least one opal structure comprises at least one reverse opal structure.

246. The device of Example 244, wherein the at least one opal structure comprises at least one positive opal structure.

247. An optical device comprising:
an array of lenses; and
a plurality of first and second segments disposed under the array of lenses, the first segments corresponding to portions of an icon and a background,
wherein at a first viewing angle, the array of lenses presents the icon for viewing, and at a second viewing angle different from the first viewing angle, the array of lenses does not present the icon for viewing,
wherein for the first segments,
specular reflecting features define the icon, and diffusely reflective features define the background, or
specular reflecting features define the background, and diffusely reflective features define the icon, or
specular reflecting features define the icon, and diffusely transmissive features define the background, or
specular reflecting features define the background, and diffusely transmissive features define the icon, or
transparent features define the icon, and diffusely reflective features define the background, or
transparent features define the background, and diffusely reflective features define the icon, or
transparent features define icon, and diffusely transmissive features define the background, or
transparent features define background, and diffusely transmissive features define the icon, or
specular reflecting features define the icon, and transparent features define the background, or
specular reflecting features define the background, and transparent features define the icon, or
diffusely reflective features define the icon, and diffusely transmissive features define the background, or
diffusely reflective features define the background, and diffusely transmissive features define the icon.

248. The device of Example 247, wherein at a second viewing angle different from the first viewing angle, the array of lenses presents for viewing a second icon and a second background.

249. The device of Example 248, wherein for the second segments,
specular reflecting features define the second icon, and diffusely reflective features define the second background, or
specular reflecting features define the second background, and diffusely reflective features define the second icon, or
specular reflecting features define the second icon, and diffusely transmissive features define the second background, or
specular reflecting features define the second background, and diffusely transmissive features define the second icon, or
transparent features define the second icon, and diffusely reflective features define the second background, or
transparent features define the second background, and diffusely reflective features define the second icon, or
transparent features define second icon, and diffusely transmissive features define the second background, or
transparent features define second background, and diffusely transmissive features define the second icon, or
specular reflecting features define the second icon, and transparent features define the second background, or
specular reflecting features define the second background, and transparent features define the second icon, or
diffusely reflective features define the second icon, and diffusely transmissive features define the second background, or
diffusely reflective features define the second background, and diffusely transmissive features define the second icon.

250. The device of any of Examples 1-249, wherein for the first segments, the specular reflecting features define the icon, and the diffusely reflective features define the background.

251. The device of any of Examples 1-249, wherein for the first segments, the specular reflecting features define the background, and the diffusely reflective features define the icon.

252. The device of any of Examples 1-249, wherein for the first segments, the specular reflecting features define the icon, and the diffusely transmissive features define the background.

253. The device of any of Examples 1-249, wherein for the first segments, the specular reflecting features define the background, and the diffusely transmissive features define the icon.

254. The device of any of Examples 1-249, wherein for the first segments, the transparent features define the icon, and the diffusely reflective features define the background.

255. The device of any of Examples 1-249, wherein for the first segments, the transparent features define the background, and the diffusely reflective features define the icon.

256. The device of any of Examples 1-249, wherein for the first segments, the transparent features define the icon, and the diffusely transmissive features define the background.

257. The device of any of Examples 1-249, wherein for the first segments, the transparent features define the background, and the diffusely transmissive features define the icon.

258. The device of any of Examples 1-249, wherein for the first segments, the specular reflecting features define the icon, and the transparent features define the background.

259. The device of any of Examples 1-249, wherein for the first segments, the specular reflecting features define the background, and the transparent features define the icon.

260. The device of any of Examples 1-249, wherein for the first segments, the diffusely reflective features define the icon, and the diffusely transmissive features define the background.

261. The device of any of Examples 1-249, wherein for the first segments, the diffusely reflective features define the background, and the diffusely transmissive features define the icon.

262. The device of any of Examples 1-261, wherein the icon or image comprises a half tone image.

Further Examples

1. An optical device comprising:
an array of lenses; and
a plurality of segments disposed under the array of lenses, the plurality of segments corresponding to a plurality of images, the images comprising at least one icon and at least one background,
wherein the plurality of segments comprises smooth features and diffusing features, the smooth features defining one of the at least one icon and the at least one background, the diffusing features defining the at least one background when the smooth features define the at least one icon, and the diffusing features defining the at least one icon when the smooth features define the at least one background, and
wherein the plurality of segments comprises at least two sets of segments corresponding to at least a first and second image of the plurality of images such that as the device is tilted, the array of lenses presents the first image at a first viewing angle and the second image at a second viewing angle different from the first viewing angle.

2. The optical device of Example 1, wherein the plurality of segments comprises 3 sets of segments corresponding to 3 images of the plurality of images such that the array of lenses presents the 3 images sequentially as the device is tilted through 3 different viewing angles.

3. The optical device of Example 2, wherein the plurality of segments comprises 4 sets of segments corresponding to 4 images of the plurality of images such that the array of lenses presents the 4 images sequentially as the device is tilted through 4 different viewing angles.

4. The optical device of Example 3, wherein the plurality of segments comprises 5 sets of segments corresponding to 5 images of the plurality of images such that the array of lenses presents the 5 images sequentially as the device is tilted through 5 different viewing angles.

5. The optical device of Example 4, wherein the plurality of segments comprises 9 sets of segments corresponding to 9 images of the plurality of images such that the array of lenses presents the 9 images sequentially as the device is tilted through 9 different viewing angles 6. The optical device of Example 5, wherein the plurality of segments comprises 10 sets of segments corresponding to 10 images of the plurality of images such that the array of lenses presents the 10 images sequentially as the device is tilted through 10 different viewing angles.

7. The optical device of Example 6, wherein the plurality of segments comprises 15 sets of segments corresponding to 15 images of the plurality of images such that the array of lenses presents the 15 images sequentially as the device is tilted through 15 different viewing angles.

8. The optical device of Example 7, wherein the plurality of segments comprises 20 sets of segments corresponding to 20 images of the plurality of images such that the array of lenses presents the 20 images sequentially as the device is tilted through 20 different viewing angles.

9. The optical device of Example 8, wherein the plurality of segments comprises 25 sets of segments corresponding to 25 images of the plurality of images such that the array of lenses presents the 25 images sequentially as the device is tilted through 25 different viewing angles.

10. The optical device of any of the preceding examples, wherein each set of the at least two sets of segments comprises non-adjacent segments.

11. The optical device of any of the preceding examples, wherein the presented images provide images of the at least one icon from a different perspective.

12. The optical device of any of the preceding examples, wherein the presented images provide images of the at least one icon in a different location.

13. The optical device of any of the preceding examples, wherein the at least one icon appears to move as the device is tilted.

14. The optical device of any of the preceding examples, wherein the at least one icon appears to rotate as the device is tilted.

15. The optical device of any of the preceding examples, wherein the at least one icon appears to change form as the device is tilted.

16. The optical device of any of the preceding examples, wherein at least one of the at least one icon and the at least one background appear to change in brightness as the device is tilted.

17. The optical device of any of the preceding examples, wherein the plurality of segments comprises a tint, dye, ink, or pigment such that the images comprise color.

18. The optical device of any of the preceding examples, wherein the images are monochromatic.

19. The optical device of any of Examples 1-16, wherein the images are achromatic.

20. The optical device of any of the preceding examples, wherein the device comprises a kinoform diffuser providing the diffusing features.

21. The optical device of any of the preceding examples, wherein the smooth features comprise specular reflecting features, and the diffusing features comprise diffusely reflective features.

22. The optical device of any of the preceding examples, wherein the smooth features comprise specular reflecting features, and the diffusing features comprise diffusely transmissive features.

23. The optical device of any of the preceding examples, wherein the smooth features comprise transparent features, and the diffusing features comprise diffusely reflective features.

24. The optical device of any of the preceding examples, wherein the smooth features comprise transparent features, and the diffusing features comprise diffusely transmissive features.

25. The optical device of any of the preceding examples, wherein the smooth features comprise specular reflecting features and transparent features, and the diffusing features comprise diffusely reflective features and diffusely transmissive features.

26. The optical device of any of the preceding examples, wherein the array of lenses comprises at least one 1D lens array.

27. The optical device of any of the preceding examples, wherein the array of lenses comprises at least one 2D array of lenses.

28. The optical device of the preceding examples, wherein the array of lenses comprises a first lens array having a first longitudinal axis and a second lens array having a second longitudinal axis, wherein the first and second arrays are arranged such that the first longitudinal axis of the first array is angled from 5 to 90 degrees with respect to the second longitudinal axis of the second array.

29. The optical device of any of the preceding examples, wherein the device is configured to provide authenticity verification on an item for security.

30. The optical device of Example 29, wherein the item is a credit card, a debit card, a banknote, currency, a passport, a driver's license, an identification card, a document, a ticket, a tamper evident container or packaging, or a bottle of pharmaceuticals.

31. The optical device of any of the preceding examples, wherein the device is a security thread, a hot stamp feature, an embedded feature, a windowed feature, or a laminated feature.

32. The optical device of any of the preceding examples, wherein adjacent segments have a correlation such that the at least one icon in the corresponding images appears to flip to another icon.

33. The optical device of Example 32, wherein the adjacent segments have a correlation differential in a range from 0.6 to 1.

34. The optical device of any of the preceding examples, wherein adjacent segments have a correlation such that the at least one icon in the corresponding images appears to move.

35. The optical device of any of the preceding examples, wherein adjacent segments have a correlation such that the at least one icon in the corresponding images appears to rotate.

36. The optical device of any of the preceding examples, wherein adjacent segments have a correlation such that the at least one icon in the corresponding images appears to change form.

37. The optical device of any of Examples 34-36, wherein the adjacent segments have a correlation differential in a range from 0 to 0.4.

38. The optical device of any of Examples 34-36, wherein the correlation is between all adjacent segments.

39. The optical device of Example 38, wherein all adjacent segments have a correlation differential in a range from 0 to 0.4.

40. The optical device of any of Examples 34-36, wherein the correlation is such that the at least one icon appears to flip to another icon and change form.

41. The optical device of Example 40, wherein two segments have a correlation differential in a range from 0.6 to 1 and other adjacent segments have a correlation differential in a range from 0 to 0.4.

42. The optical device of any of the preceding examples, wherein the at least one icon appears to rotate with a corresponding shadow from a fixed light source.

43. The optical device of any of the preceding examples, wherein the at least one icon appears to remain fixed with a shadow that changes corresponding to a moving light source.

44. The optical device of any of the preceding examples, wherein for a plurality of preceding and succeeding images, each succeeding image includes an element in the preceding image.

45. The optical device of any of the preceding examples, wherein the presented images include a first icon with a natural optical effect and a second icon with an unnatural optical effect.

Further Additional Examples

1. An optical device comprising:
an array of lenses; and
a plurality of segments disposed under the array of lenses, the plurality of segments corresponding to a plurality of images, the images comprising at least one icon and at least one background,
wherein the plurality of segments comprises smooth features and diffusing features, the smooth features defining one of the at least one icon and the at least one background, the diffusing features defining the at least one background when the smooth features define the at least one icon, and the diffusing features defining the at least one icon when the smooth features define the at least one background, and
wherein the plurality of segments comprises ten sets of segments corresponding to ten images of the plurality of images such that as the device is tilted, the array of lenses presents the ten images sequentially as the device is tilted through 10 different viewing angles.

2. The optical device of Example 1, wherein the plurality of segments comprises 15 sets of segments corresponding to 15 images of the plurality of images such that the array of lenses presents the 15 images sequentially as the device is tilted through 15 different viewing angles.

3. The optical device of Example 2, wherein the plurality of segments comprises 20 sets of segments corresponding to 20 images of the plurality of images such that the array of lenses presents the 20 images sequentially as the device is tilted through 20 different viewing angles.

4. The optical device of Example 3, wherein the plurality of segments comprises 25 sets of segments corresponding to 25 images of the plurality of images such that the array of lenses presents the 25 images sequentially as the device is tilted through 25 different viewing angles.

5. The optical device of any of the preceding examples, wherein each set of the ten sets of segments comprises non-adjacent segments.

6. The optical device of any of the preceding examples, wherein the presented images provide images of the at least one icon from a different perspective.

7. The optical device of any of the preceding examples, wherein the presented images provide images of the at least one icon in a different location.

8. The optical device of any of the preceding examples, wherein the at least one icon appears to move as the device is tilted.

9. The optical device of any of the preceding examples, wherein the at least one icon appears to rotate as the device is tilted.

10. The optical device of any of the preceding examples, wherein the at least one icon appears to change form as the device is tilted.

11. The optical device of any of the preceding examples, wherein at least one of the at least one icon and the at least one background appear to change in brightness as the device is tilted.

12. The optical device of any of the preceding examples, wherein the plurality of segments comprises a tint, dye, ink, or pigment such that the images comprise color.

13. The optical device of any of the preceding examples, wherein the images are monochromatic.

14. The optical device of any of Examples 1-11, wherein the images are achromatic.

15. The optical device of any of the preceding examples, wherein the device comprises a kinoform diffuser providing the diffusing features.

16. The optical device of any of the preceding examples, wherein the smooth features comprise specular reflecting features, and the diffusing features comprise diffusely reflective features.

17. The optical device of any of the preceding examples, wherein the smooth features comprise specular reflecting features, and the diffusing features comprise diffusely transmissive features.

18. The optical device of any of the preceding examples, wherein the smooth features comprise transparent features, and the diffusing features comprise diffusely reflective features.

19. The optical device of any of the preceding examples, wherein the smooth features comprise transparent features, and the diffusing features comprise diffusely transmissive features.

20. The optical device of any of the preceding examples, wherein the smooth features comprise specular reflecting features and transparent features, and the diffusing features comprise diffusely reflective features and diffusely transmissive features.

21. The optical device of any of the preceding examples, wherein the array of lenses comprises at least one 1D lens array.

22. The optical device of any of the preceding examples, wherein the array of lenses comprises at least one 2D array of lenses.

23. The optical device of the preceding examples, wherein the array of lenses comprises a first lens array having a first longitudinal axis and a second lens array having a second longitudinal axis, wherein the first and second arrays are arranged such that the first longitudinal axis of the first array is angled from 5 to 90 degrees with respect to the second longitudinal axis of the second array.

24. The optical device of any of the preceding examples, wherein the device is configured to provide authenticity verification on an item for security.

25. The optical device of Example 24, wherein the item is a credit card, a debit card, a banknote, currency, a passport, a driver's license, an identification card, a document, a ticket, a tamper evident container or packaging, or a bottle of pharmaceuticals.

26. The optical device of any of the preceding examples, wherein the device is a security thread, a hot stamp feature, an embedded feature, a windowed feature, or a laminated feature.

27. The optical device of any of the preceding examples, wherein adjacent segments have a correlation such that the at least one icon in the corresponding images appears to flip to another icon.

28. The optical device of Example 27, wherein the adjacent segments have a correlation differential in a range from 0.6 to 1.

29. The optical device of any of the preceding examples, wherein adjacent segments have a correlation such that the at least one icon in the corresponding images appears to move.

30. The optical device of any of the preceding examples, wherein adjacent segments have a correlation such that the at least one icon in the corresponding images appears to rotate.

31. The optical device of any of the preceding examples, wherein adjacent segments have a correlation such that the at least one icon in the corresponding images appears to change form.

32. The optical device of any of Examples 29-31, wherein the adjacent segments have a correlation differential in a range from 0 to 0.4.

33. The optical device of any of Examples 29-31, wherein the correlation is between all adjacent segments.

34. The optical device of Example 33, wherein all adjacent segments have a correlation differential in a range from 0 to 0.4.

35. The optical device of any of Examples 29-31, wherein the correlation is such that the at least one icon appears to flip to another icon and change form.

36. The optical device of Example 35, wherein two segments have a correlation differential in a range from 0.6 to 1 and other adjacent segments have a correlation differential in a range from 0 to 0.4.

37. The optical device of any of the preceding examples, wherein the at least one icon appears to rotate with a corresponding shadow from a fixed light source.

38. The optical device of any of the preceding examples, wherein the at least one icon appears to remain fixed with a shadow that changes corresponding to a moving light source.

39. The optical device of any of the preceding examples, wherein for a plurality of preceding and succeeding images, each succeeding image includes an element in the preceding image.

40. The optical device of any of the preceding examples, wherein the presented images include the at least one icon with a natural optical effect.

41. The optical device of any of the preceding examples, wherein the presented images include the at least one icon with an unnatural optical effect.

42. The optical device of any of the preceding examples, wherein the presented images include a first icon with a natural optical effect and a second icon with an unnatural optical effect.

43. The optical device of any of the preceding examples, wherein the presented images provide a smooth, continuous animation.

44. The optical device of Example 1, wherein the array of lenses is a 1D array of lenses configured to present 3D images of the at least one icon with a shadow.

45. The optical device of any of the preceding examples, wherein the smooth features are abutted next to the diffusing features.

46. The optical device of any of the preceding examples, wherein adjacent segments have a correlation such that the at least one icon in the corresponding images appears to move seamlessly.

47. The optical device of any of the preceding examples, wherein adjacent segments have a correlation such that the at least one icon in the corresponding images appears to rotate seamlessly.

48. The optical device of any of the preceding examples, wherein adjacent segments have a correlation such that the at least one icon in the corresponding images appears to change form seamlessly.

49. The optical device of any of the examples above, wherein the adjacent segments have a correlation differential in a range from 0 to 0.4.

50. The optical device of any of Examples 46-49, wherein the correlation is between all adjacent segments.

51. The optical device of Example 50, wherein all adjacent segments have a correlation differential in a range from 0 to 0.4.

52. The optical device of any of Examples 46-51, wherein at least two adjacent segments have a correlation such that the at least one icon appears to flip to another icon or change form.

53. The optical device of any of the preceding examples, wherein at least 70% of adjacent segments have a correlation coefficient in the range from 0.7 to 1.

54. The optical device of any of the preceding examples, wherein at least 70% of adjacent segments have a correlation differential in the range from 0 to 0.3.

55. The optical device of any of the preceding examples, wherein at least 80% of adjacent segments have a correlation coefficient in the range from 0.7 to 1.

56. The optical device of any of the preceding examples, wherein at least 80% of adjacent segments have a correlation differential in the range from 0 to 0.3.

57. The optical device of any of the preceding examples, wherein at least 90% of adjacent segments have a correlation coefficient in the range from 0.7 to 1.

58. The optical device of any of the preceding examples, wherein at least 90% of adjacent segments have a correlation differential in the range from 0 to 0.3.

59. The optical device of any of the preceding examples, wherein at least 70% of adjacent segments have a correlation coefficient in the range from 0.8 to 1.

60. The optical device of any of the preceding examples, wherein at least 70% of adjacent segments have a correlation differential in the range from 0 to 0.2.

61. The optical device of any of the preceding examples, wherein at least 80% of adjacent segments have a correlation coefficient in the range from 0.8 to 1.

62. The optical device of any of the preceding examples, wherein at least 80% of adjacent segments have a correlation differential in the range from 0 to 0.2.

63. The optical device of any of the preceding examples, wherein at least 90% of adjacent segments have a correlation coefficient in the range from 0.8 to 1.

64. The optical device of any of the preceding examples, wherein at least 90% of adjacent segments have a correlation differential in the range from 0 to 0.2.

65. The optical device of any of the preceding examples, wherein at least 70% of adjacent segments have a correlation coefficient in the range from 0.9 to 1.

66. The optical device of any of the preceding examples, wherein at least 70% of adjacent segments have a correlation differential in the range from 0 to 0.1.

67. The optical device of any of the preceding examples, wherein at least 80% of adjacent segments have a correlation coefficient in the range from 0.9 to 1.

68. The optical device of any of the preceding examples, wherein at least 80% of adjacent segments have a correlation differential in the range from 0 to 0.1.

69. The optical device of any of the preceding examples, wherein at least 90% of adjacent segments have a correlation coefficient in the range from 0.9 to 1.

70. The optical device of any of the preceding examples, wherein at least 90% of adjacent segments have a correlation differential in the range from 0 to 0.1.

71. The optical device of any of the preceding examples, wherein at least 70% of adjacent segments have a correlation coefficient in the range from 0.95 to 1.

72. The optical device of any of the preceding examples, wherein at least 70% of adjacent segments have a correlation differential in the range from 0 to 0.05.

73. The optical device of any of the preceding examples, wherein at least 80% of adjacent segments have a correlation coefficient in the range from 0.95 to 1.

74. The optical device of any of the preceding examples, wherein at least 80% of adjacent segments have a correlation differential in the range from 0 to 0.05.

75. The optical device of any of the preceding examples, wherein at least 90% of adjacent segments have a correlation coefficient in the range from 0.95 to 1.

76. The optical device of any of the preceding examples, wherein at least 90% of adjacent segments have a correlation differential in the range from 0 to 0.05.

77. The optical device of any of the preceding examples, wherein the at least one icon includes a corresponding shadow from a fixed light source.

78. The optical device of Example 77, wherein the at least one icon includes a shadow that does not correspond to the fixed light source.

79. The optical device of any of the preceding examples, wherein the at least one icon includes a shadow that does not correspond to a fixed light source.

80. The optical device of any of the preceding examples, wherein the at least one icon includes a corresponding shadow from a moving light source.

81. The optical device of Example 80, wherein the at least one icon includes a shadow that does not correspond to said moving light source.

82. The optical device of any of the preceding examples, wherein the at least one icon includes a shadow that does not correspond to a moving light source.

83. The optical device of any of the preceding examples, wherein the at least one icon includes a shadow that does not correspond to a fixed light source or a moving light source.

84. The optical device of any of the preceding examples, wherein the at least one icon includes an object with a shadow and an object without a shadow.

BRIEF DESCRIPTION OF THE DRAWINGS

FIG. 1C-2 schematically illustrates a 2D lens array compatible with certain embodiments described herein.

FIG. 3C schematically illustrates certain images and effects that can be presented during viewing at an angle in the specular direction by a security device in accordance with certain embodiments described herein.

FIG. 3D schematically illustrates certain images and effects that can be presented during viewing at an angle not in the specular direction by a security device in accordance with certain embodiments described herein.

FIGS. 4A, 4B, and 4C schematically illustrate certain images and effects that can be presented for viewing by a security device in accordance with certain embodiments described herein.

FIG. 5B-1 schematically illustrates a top view of a security thread.

FIG. 5B-2 schematically illustrates a side view of the security thread shown in FIG. 5B-1 with a protective coating in accordance with certain embodiments described herein.

FIGS. 6B-1, 6B-2, 6B-3, and 6B-4 show the relatively high contrast and sharpness of the edges of the icons presented in certain embodiments of devices described herein.

FIG. 8A shows certain images (e.g., art objects) and effects that can be presented for viewing by a security device in accordance with certain embodiments described herein.

FIGS. 9A-1 and 9A-2 schematically illustrate an example device created using laser ablation.

FIG. 9A-3 schematically illustrates an example of a second layer coupled to an ablated area of an example device.

FIG. 9A-4 schematically illustrates an example device showing two possible angles of observation.

FIG. 9B shows an icon within an icon that switches to a different icon within an icon.

FIGS. 18A, 18B, 18C, 18D, and 18E show another example set of images that can be presented for viewing by an optical device described herein.

FIGS. 19A, 19B, 19C, 19D, and 19E show another example set of images that can be presented for viewing by an optical device.

DETAILED DESCRIPTION

Figure 1A:
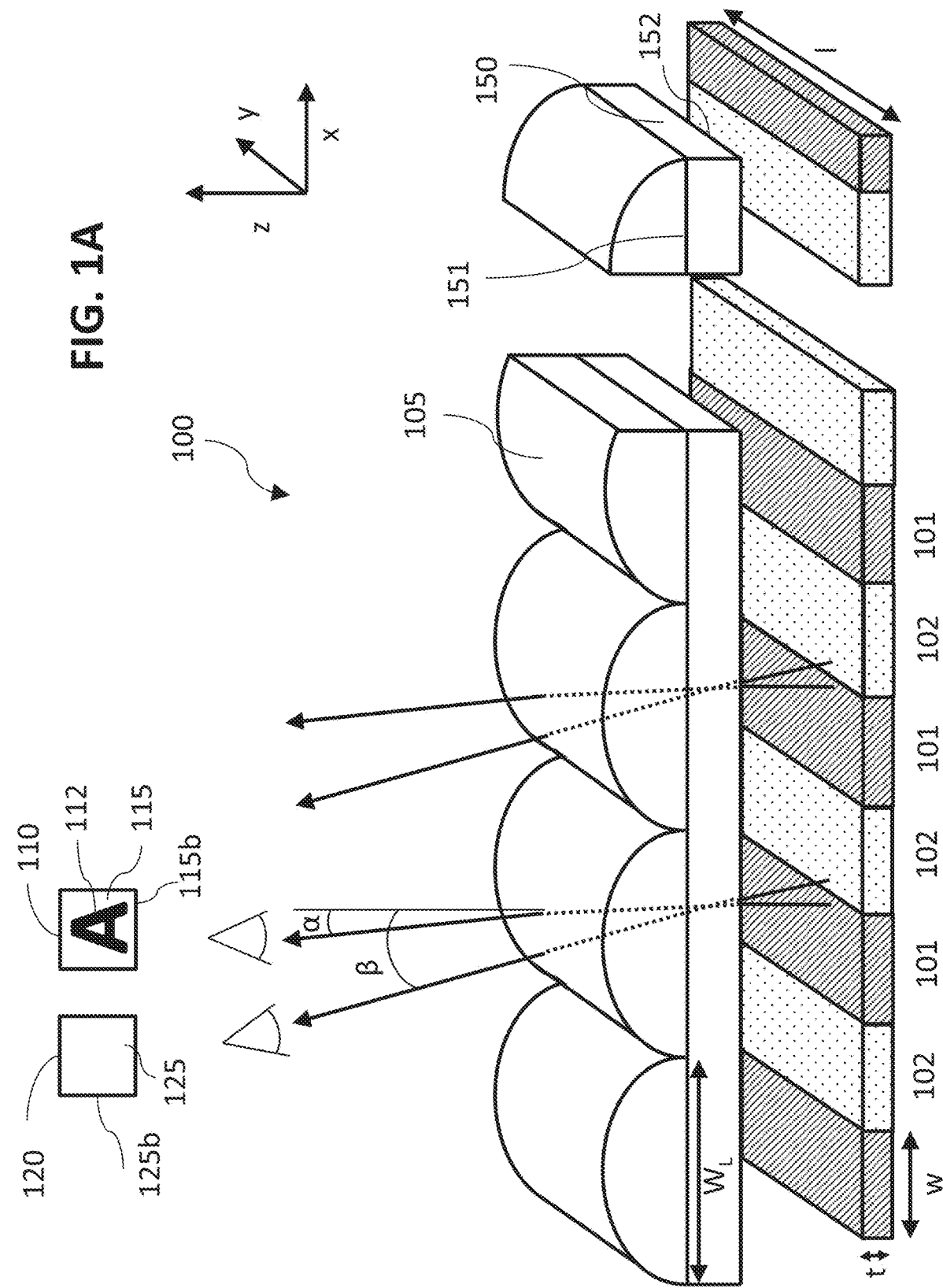
FIG. 1A schematically illustrates an example security device in accordance with certain embodiments described herein.

A first line of defense to prevent counterfeiting and the effectiveness of a security system are often by first line inspection, for example, by the general public. Banknote security features preferably are easily seen under a variety of light conditions within a 5-10 second time frame and remembered, by the public, including people who are color blind. In addition, the security feature in general, should not be able to be copied by electronic or photographic means.

The trend in security features has been toward more complicated structures and color changing effects. This trend, however, has been self-defeating as regards the general public. Such complicated security devices have confused the average person looking for a distinctive security feature. On the other hand, there is a high general awareness by the general public of the banknote watermark (around 70% know of it). The watermark is an image defined by light and dark regions as seen by holding up a banknote to see the watermark in light transmission. Also, color shifting features are low in the public's recognition and awareness. For example, colors in color shifting inks are not bright. Colors in kinegrams are bright, but are too complicated for the average person to remember it or to hone in the feature for authenticity. Recent security devices (e.g., color shifting ink and motion type features) are not readily seen under low light conditions (e.g., at low lit bars, restaurants, etc.), are poor in image definition, or have slow optical movement relative to the movement of the banknote.

What is needed in many security devices, therefore, is a sharp image with high contrast to the background that switches on and off, or switches to a different image, at a high rate of change, with little, if no, transition state, while operating under a variety of light conditions, including low light. In essence, a high contrast reflective "watermark" that changes its image when one changes its viewing angle by a small angle is desired.

Certain embodiments described herein utilize the dramatic effect of black icons that transform themselves to a shiny silver color or to a different image against a white diffuse background as the device is tilted relative to the observer. Certain embodiments use the gamut of black, white, and grey to create intense high definition images.

In accordance with certain embodiments described herein, optical switch devices, such as security devices are disclosed. Although embodiments may be described with respect to security devices, the devices disclosed herein can also be used for non-security devices (e.g., for aesthetics such as on packaging). In various embodiments, the security device, when illuminated, can present an icon for viewing. The icon can appear bright or dark and can appear sharp (e.g., have high definition) against its background. In certain embodiments, upon tilting the device, a user can switch the icon on and off (and/or switch the icon off and on), and in various instances, at relatively small tilt angles (e.g., from 2 degrees to 15 degrees in some cases). In various other embodiments, instead of switching an icon on and off upon tilting the device, a user can switch between at least two icons. Advantageously, the security devices disclosed herein can present sharp, high contrast icons that switch rapidly, which are difficult to counterfeit. For additional security, various embodiments of features described herein can be combined together and/or with other features known in the art or yet to be developed.

Certain embodiments of security devices described herein can present one or more sharp icons with high contrast to the background by incorporating two different types of optical features having high contrast with respect to each other. In some embodiments, the optical features can include specular reflecting features (e.g., optically variable) and diffusing features (e.g., optically invariable).

In some embodiments, the specular reflecting features and the diffuse features can be incorporated into a security device including an array of lenses that is configured to switch an icon on and off upon tilting the device (e.g., tilting the devices such that the viewer moves his or her observation angle, while the light source remains fixed in position).

Figure 1B:
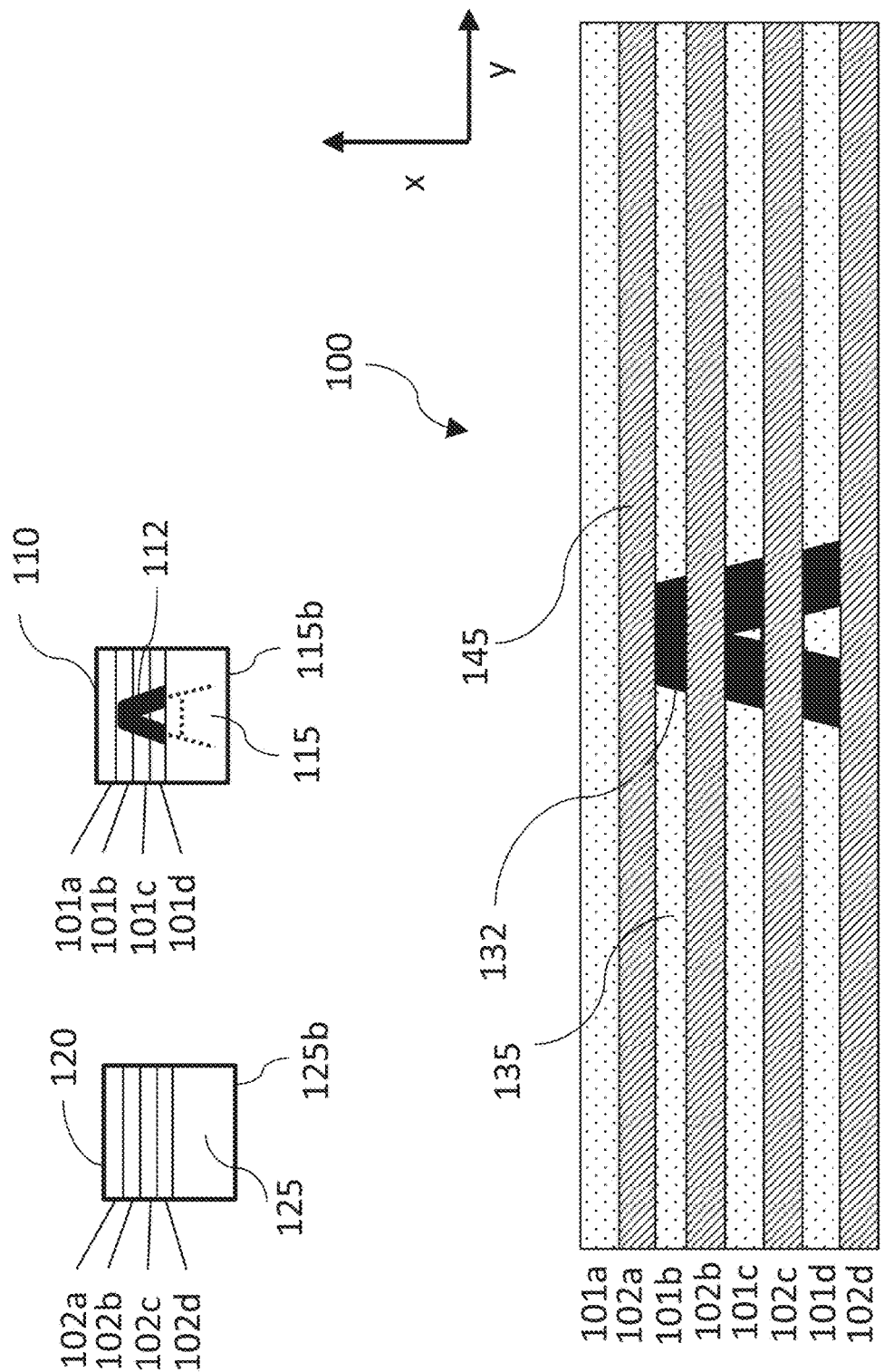
FIG. 1B schematically illustrates certain features of the example security device shown in FIG. 1A.

In some embodiments, the position of the light source can be moved while keeping the observer's angle fixed with no change in the shape of the image (e.g., the shape of the image can remain invariant). FIGS. 1A and 1B schematically illustrate an example of such a security device. As shown in FIG. 1A, the security device 100 can include an array 105 of lenses and a plurality of first segments 101 and second segments 102 disposed under the array 105 of lenses. Referring to FIG. 1B, a first segment 101a, 101b, 101c, 101d can correspond to a portion of the icon 112 and/or background 115. Referring to FIG. 1A, at a first viewing angle α (e.g., an angle relative to a normal plane of the device 100), the array 105 of lenses can be configured to allow the icon 112 to be viewable. At a second viewing angle β (e.g., an angle relative to a normal plane of the device 100) different from the first viewing angle α, the array 105 of lenses can be configured to not allow the icon 112 to be viewable. For example, the first segments 101 can include specular reflecting features and diffusing features, whereas the second segments 102 can include either specular reflecting features or diffusing features as will be disclosed herein. (Or the second segments 102 can include specular reflecting features and diffusing features, whereas the first segments 101 can include either specular reflecting features or diffusing features.)

In FIG. 1A, the array 105 of lenses can switch the icon 112 on and off upon tilting the device 100 from the first viewing angle α to the second viewing angle β. For example, the security device 100 can include a set of first segments 101 and a set of second segments 102 disposed under the array 105 of lenses. The first segments 101 can correspond to portions of the icon 112 and a first background 115, such that at the first viewing angle α, the array 105 of lenses can allow the icon 112 and first background 115 to be viewed. The second segments 102 can correspond to portions of a second background 125 without an icon 112 (e.g., as represented by the absence of the icon 112 within second background 125), such that at the second viewing angle β, the array 105 of lenses does not allow the icon 112 to be viewed. Thus, by tilting the device 100 from the first viewing angle α to the second viewing angle β, the array 105 of lenses can switch the icon 112 on and off. As such, the viewer can see the icon 112 appear and disappear upon tilting the device 100.

Figures 1, 1C:
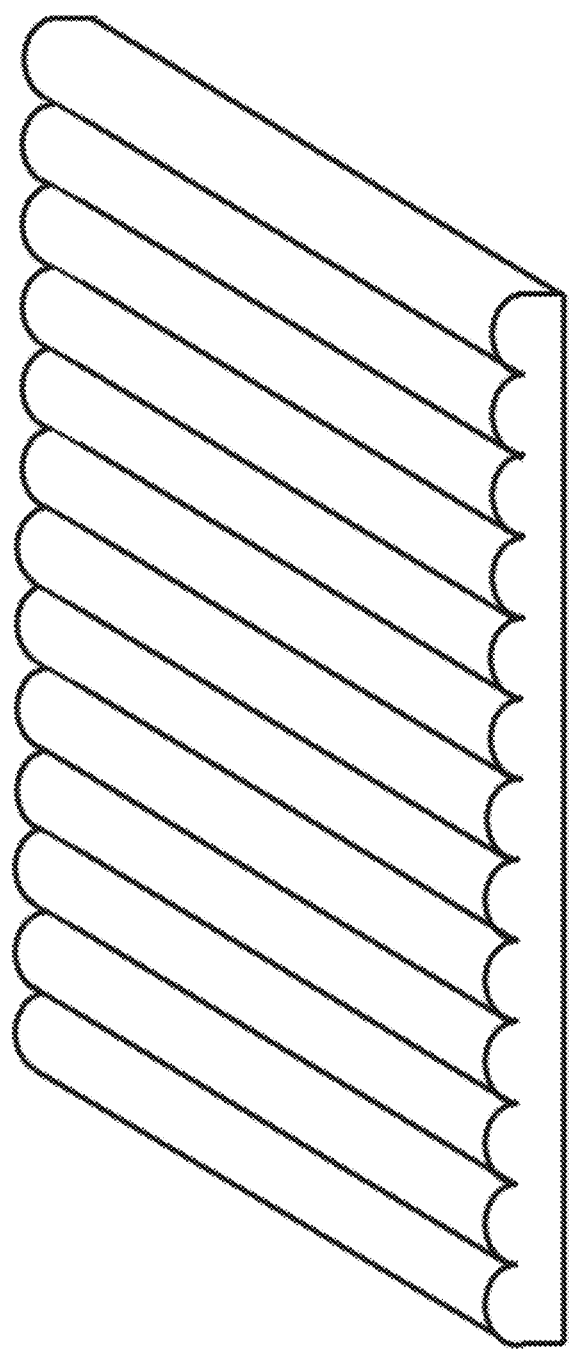
FIG. 1C-1 schematically illustrates a 1D lens array compatible with certain embodiments described herein.

In various embodiments, the array 105 of lenses can include a 1-D array of lenses. As shown in FIG. 1C-1, the lenses can extend in length much longer than shown in FIG. 1A. However, the drawings and schematics are merely illustrative. A wide variation in sizes and dimensions are possible. In some embodiments, referring to FIG. 1A, the array 105 of lenses can include a number of cylindrical, hemi-cylindrical lenses, truncated hemi-cylindrical lenses, or plano convex cylindrical lenses with one convex surface and one plano surface. In some embodiments, the lenses can have one convex surface and one concave surface. In some instances, the lenses can have surfaces that are symmetrical. In some instances, the lenses can have surfaces that are asymmetrical. In some instances, the lenses can have surfaces that are freeform surfaces.

The array of lenses can include a micro lens array having a pitch (e.g., lateral distance between the centers of two lenses) that can be in a range from 5 microns to 200 microns (such as 6.6 microns, 8.4 microns, 12.5 microns, 16 microns, 20 microns, 22 microns, 80 microns, 84 microns, 90 microns, 100 microns, 120 microns, 150 microns, etc.), in any ranges within this range (such as 5 microns to 150 microns, 5 microns to 100 microns, 5 microns to 90 microns, 5 microns to 85 microns, 5 microns to 80 microns, 5 microns to 50 microns, 5 microns to 25 microns, 5 microns to 20 microns, 6.6 microns to 150 microns, 6.6 microns to 100 microns, 6.6 microns to 80 microns, 6.6 microns to 22 microns, 8.4 microns to 150 microns, 8.4 microns to 100 microns, 8.4 microns to 80 microns, 8.4 microns to 22 microns, 12.5 microns to 150 microns, 12.5 microns to 100 microns, 12.5 microns to 80 microns, 16 microns to 150 microns, 16 microns to 100 microns, 16 microns to 80 microns, 20 microns to 150 microns, 20 microns to 100 microns, 20 microns to 80 microns, 22 microns to 150 microns, 22 microns to 100 microns, 22 microns to 80 microns, 80 microns to 150 microns, 84 microns to 150 microns, etc.), any values within these ranges, or in any ranges formed by such values. In certain embodiments, the pitch can be constant across the array 105 of lenses. However, in some embodiments, the pitch can vary across the array 105.

A lens within the array 105 of lenses can have a width $W_L$ (e.g., along the x-axis) that can be in a range from 5 microns to 200 microns (such as 6.6 microns, 8.4 microns, 12.5 microns, 16 microns, 20 microns, 22 microns, 80 microns, 84 microns, 90 microns, 100 microns, 120 microns, 150 microns, etc.), in any ranges within this range (such as 5 microns to 150 microns, 5 microns to 100 microns, 5 microns to 90 microns, 5 microns to 85 microns, 5 microns to 80 microns, 5 microns to 50 microns, 5 microns to 25 microns, 5 microns to 20 microns, 6.6 microns to 150 microns, 6.6 microns to 100 microns, 6.6 microns to 80 microns, 6.6 microns to 22 microns, 8.4 microns to 150 microns, 8.4 microns to 100 microns, 8.4 microns to 80 microns, 8.4 microns to 22 microns, 12.5 microns to 150 microns, 12.5 microns to 100 microns, 12.5 microns to 80 microns, 16 microns to 150 microns, 16 microns to 100 microns, 16 microns to 80 microns, 20 microns to 150 microns, 20 microns to 100 microns, 20 microns to 80 microns, 22 microns to 150 microns, 22 microns to 100 microns, 22 microns to 80 microns, 80 microns to 150 microns, 84 microns to 150 microns, etc.), any values within these ranges, or in any ranges formed by such values. In certain embodiments, the width $W_L$ of a lens can be the same as the width $W_L$ of another lens in the array 105 of lenses. However, in other embodiments, the width $W_L$ of a lens can be different than the width $W_L$ of another lens in the array 105 of lenses.

The radius of curvature of a lens can be in a range from 5 microns to 100 microns (such as 5 microns, 12.5 microns, 25 microns, 37.5 microns, 50 microns, 62.5 microns, 75 microns, 87.5 microns, 100 microns, 200 micron, 300 microns, etc.), in any ranges within this range (such as 5 microns to 87.5 microns, 5 microns to 75 microns, 12.5 microns to 87.5 microns, 12.5 microns to 75 microns, etc.), any values within these ranges, or in any ranges formed by such values. In some embodiments, the radius of curvature of a lens can be different from the radius of curvature of another lens in the array 105 of lenses. The curvature can be rotationally symmetrical or can be rotationally asymmetrical.

The lenses can be made of various materials such as a polymer. For example, the array 105 of lenses can be UV casted into a resin layer coated on a polymer substrate. Some example substrate materials can include, but are not limited to, polyethylene terephthalate (PET), oriented polypropylene (OPP), low density polyethylene (LDPE), linear low density polyethylene (LLDPE), polypropylene (PP), polyvinyl chloride (PVC), or polycarbonate (PC). As another example, the array 105 of lenses can be molded or embossed in a polymer substrate. Moldable and/or embossable substrates can include acrylonitrile butadiene styrene (ABS), polymethyl methacrylate (PMMA), polyethylene (PE), polycarbonate/acrylonitrile butadiene styrene (PC/ABS), and polyethylene terephthalate glycol-modified (PETG). Other methods and materials known in the art or yet to be developed can be used.

In some embodiments, a lens can have a focal length (and corresponding f-number) and be disposed at a distance with respect to the back side of the substrate in comparison to the lens's focal length to focus light on the back side of the substrate. In other embodiments, a lens can have a focal length (and corresponding f-number) and be disposed at a distance with respect to the back side of the substrate in comparison to the lens's focal length to focus light on the front side of the substrate. In yet other embodiments, a lens can have a focal length (and corresponding f-number) and be disposed at a distance with respect to the back side of the substrate in comparison to the lens's focal length to focus light in between the front and back sides of the substrate. In some examples, the lens's focal length can equal the thickness of the substrate. Example focal lengths include a number that can be in a range from 5 microns to 200 microns, from 5 microns to 250 microns, or from 5 microns to 300 microns (such as 5 microns, 10 microns, 12 microns, 12.5 microns, 25 microns, 37.5 microns, 50 microns, 62.5 microns, 75 microns, 87.5 microns, 100 microns, 112.5 microns, 125 microns, 137.5 microns, 150 microns, 162.5 microns, 175 microns, 187.5 microns, 200 microns, 250 microns, 300 microns, etc.), in any ranges within this range (such as 5 microns to 300 microns, 5 microns to 250 microns, 5 microns to 200 microns, 5 microns to 187.5 microns, 5 microns to 175 microns, 10 microns to 300 microns, 10 microns to 250 microns, 10 microns to 200 microns, 12 microns to 300 microns, 12 microns to 250 microns, 12 microns to 200 microns, 12.5 microns to 187.5 microns, 12.5 microns to 175 microns, etc.), any values within these ranges, or in any ranges formed by such values. In some embodiments, the focal length (and f-number) of a lens can be different from the focal length (and f-number) of another lens in the array 105 of lenses.

Figures 1, 1C, 2:
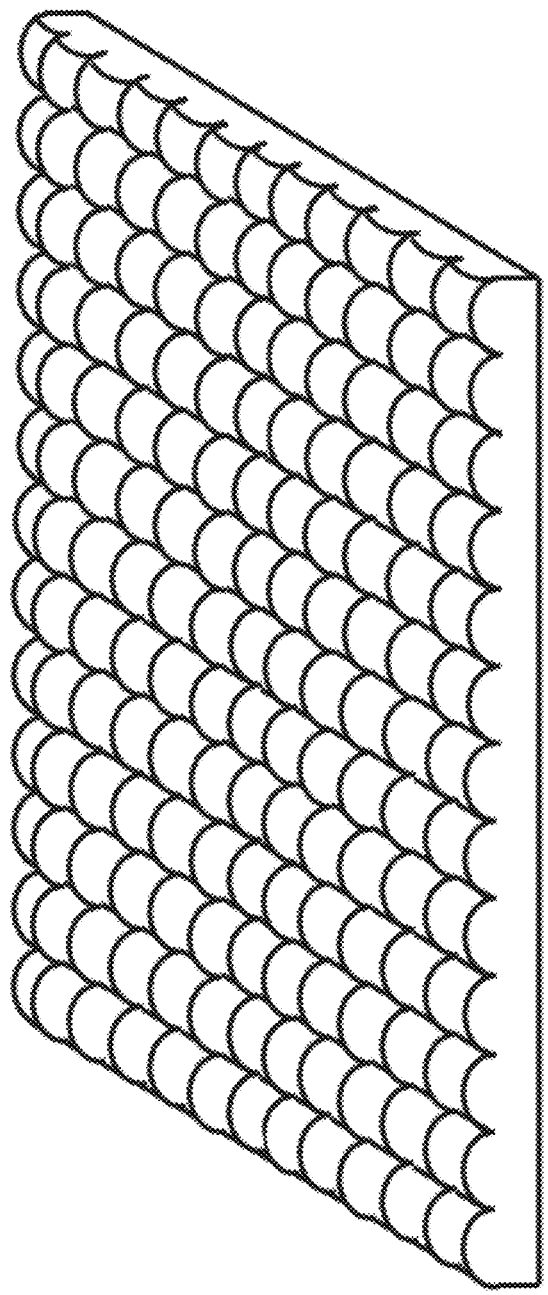

Although the array 105 of lenses is illustrated in FIG. 1A as a 1D array of lenses (e.g., an array of lenses periodic in one dimension such as a 1D array of cylindrical lenses), in some embodiments, the array 105 of lenses can include a 2D array of lenses. FIG. 1C-2 shows an example 2D array of lenses. For example, the plurality of first 101 and second 102 segments can form a 1D segment array (e.g., an array of segments periodic in one dimension) and can be disposed under the 2D array of lenses such that individual ones of the first 101 and second 102 segments can be disposed under a plurality of corresponding lenses. A 1D array of lenses (e.g., FIG. 1A) can include a series of cylindrical, hemi-cylindrical lenses, truncated hemi-cylindrical lenses, or plano convex cylindrical lenses in a row with power (e.g., curvature) in one direction only, whereas a 2D array of lenses (e.g., FIG. 1C-2) can have power (e.g., curvature) in two directions. In various embodiments, the 2D array comprises lenses having surfaces that are rotationally symmetric surfaces. In some embodiments, the 2D array can comprise lenses having surfaces that are freeform or asymmetrical. For example, the lenses can be elliptical in that the lenses are longer in one orthogonal direction compared to the other. In some embodiments, the 2D array can comprise spherical lenses. In some embodiments, the 2D array can comprise lenses with aspheric surfaces. In various embodiments, the 2D array can comprise elliptical, hexagonal, Fresnel and/or achromatic lenses. The lenses in the 2D lens array can be arranged in close packed arrangement or in a square arrangement. The shape and or arrangement of the lenses, however, should not be considered to be limited. As additional examples, the surfaces of the lenses can be convex, aspherical, toroidal, and/or de-centered. The lenses may have circular, square, rectangular, hexagonal aperture shape or footprint, or may have other shapes, and the aperture may be truncated. Similarly, the lenses may be arranged in a square array, triangular array, hexagonal closed packed, or arranged otherwise. In some embodiments, the array 105 of lenses can include a first lenticular lens array having a first longitudinal axis and a second lenticular lens array having a second longitudinal axis. In some instances, the first and second arrays can be arranged such that the first longitudinal axis of the first array can be angled from 5 to 90 degrees (or any range within this range, such as from 5 to 80 degrees, 10 to 90 degrees, 20 to 90 degrees, etc.) with respect to the second longitudinal axis of the second array.

In various embodiments, the array 105 of lenses can include a series of lenses (e.g., lenticular lenses, microlenses, spherical lenses, etc.) configured to allow the features disposed under the lenses corresponding to different images to be viewable at different viewing angles. For example, in some cases, the lenses are magnifying lenses to enlarge different features disposed under the lenses corresponding to different images at different viewing angles. As another example, the lenses can provide an avenue to switch between different images through different channels. Thus, the security device 100 can include a set of first segments 101 and a set of second segments 102 disposed under the array 105 of lenses.

In FIG. 1B, the first segments 101 and the second segments 102 are interlaced with each other. A first segment 101a, 101b, 101c, 101d can correspond to a portion of a first image 110 (only top portion illustrated), such that at the first viewing angle α, the array 105 of lenses can be configured to allow the plurality of portions of the first image 110 to be viewable. Although the array 105 of lenses allows a plurality of separate portions to be viewable, the viewer can see the sum total of all the portions of the first image 110 (e.g., the whole first image 110). A second segment 102a, 102b, 102c, 102d can correspond to a portion of a second image 120, such that at the second viewing angle β, the array 105 of lenses can be configured to allow the plurality of portions of the second image 120 to be viewable. Although the array 105 of lenses allows a plurality of separate portions to be viewable, the viewer can see the sum total of all the portions of the second image 120 (e.g., the whole second image 120).

In the example shown in FIGS. 1A and 1B, the first image 110 includes an icon 112 and a first background 115, whereas the second image 120 includes a second background 125 without an icon 112. In various embodiments, the first image 110 (or icon 112) can include at least one alphanumeric character, a symbol, an image (e.g., an art image), a half tone image, graphic, or an object. Other items are possible. In this example, the first image 110 shown is an icon 112 of the letter A.

Since the first image 110 includes icon 112, the array 105 of lenses allows the icon 112 to be viewable at the first viewing angle α. However, since the second image 120 does not include the icon 112, the array 105 of lenses does not allow the icon 112 to be viewable at the second viewing angle β. Thus, by tilting the device 100 from the first viewing angle α to the second viewing angle β, the array 105 of lenses can switch the icon 112 on and off.

Referring to FIG. 1A, the first segments 101 and the second segments 102 can be disposed under the array 105 of lenses. In various embodiments, the first segments 101 and the second segments 102 can have a width w smaller than the width $W_L$ of a lens in the array 105 of lenses. In some embodiments, a pair of a first segment 101 and a second segment 102 can be aligned under each lens in the array 105 of lenses. However, a pair of a first segment 101 and a second segment 102 need not be exactly aligned under a single lens in the array 105, but might be offset from such an alignment. For example, a first segment 101 can be disposed under a single lens in the array, while a portion of a second segment 102 can be disposed under parts of two different lenses in the array 105. Thus, in various embodiments, the pairs of a first segment 101 and a second segment 102 under the array 105 of lenses are not alignment sensitive (e.g., exact alignment of pairs of a first segment 101 and a second segment 102 under a single lens in the array 105 is not necessary).

Although exact alignment of the pairs of a first segment 101 and a second segment 102 under a single lens in the array 105 is not necessary, a lens within the array 105 of lenses can be registered on average to a pair of a first segment 101 and a second segment 102. For example, a lens can correspond to a pair of a first segment 101 and a second segment 102. Light from a first segment 101 can pass through a first part of a lens and light from a second segment 102 can pass through a separate part of the lens, and corresponding portions of the lens can form the distinct images at two different angles as described herein. On average, most of the lens may be registered with respect to the segments 101, 102 in this manner.

A first segment 101 and/or a second segment 102 can have a length l (along the y-axis), width w (along the x-axis), and thickness t (along the z-axis). The length l, width w, and thickness t are not particularly limited, and can be based on the application. In some embodiments, the width w of a first segment 101 and/or a second segment 102 can be based on the size of the lenses in the array 105 (e.g., approximately half of the pitch of the lens). In various embodiments, for example, for a security thread on a banknote, the width w of a first 101 and/or a second 102 segment can be less than or equal to 80 microns, less than or equal to 70 microns, or less than or equal to 60 microns, and/or in a range from 10 microns to 80 microns, in any range within this range (e.g., 10 microns to 75 microns, 15 microns to 75 microns, 15 microns to 70 microns, etc.), any values within these ranges, or in any ranges formed by such values. A first segment 101 and/or the second segments 102 can include multiple features per segment. For example, the features can include less than 10 micron sized features (as will be described herein) which correspond to portions of an image. In various embodiments, the array 105 of lenses can magnify the less than 10 micron sized features disposed under the lenses to be viewable with the un-aided eye. For example, in some embodiments, the first segment 101 and/or the second segment 102 may have a width w that is about half the width $W_L$ of a lens. When viewing the first 101 and/or second 102 segment under a lens in the array 105, however, the features may fill the width of the lens and thus the features within the segment may appear the size of the full width of the lens or at least larger than the segment itself. In certain embodiments, the first segment 101 and/or the second segment 102 can include a micro-image (e.g., at least one alphanumeric character, symbol, an art image, graphic, an object, etc.) not viewable by the un-aided eye where the height of the micro-image is smaller than the width w of the segment 101, 102. In some such embodiments, the array 105 of lenses can magnify the micro-image such that it is viewable by the un-aided eye. In other such embodiments, for an additional security feature, the micro-image can remain un-viewable by the un-aided eye but viewable with an additional aid such as a magnifying glass or microscope.

In various embodiments, the array 105 of lenses can be disposed on a first side 151 of a substrate or carrier 150. The first segments 101 and the second segments 102 can be disposed on the second side 152 opposite the first side 151 of the substrate 150. Referring to FIG. 1B, some embodiments can be manufactured by applying the specular reflecting features 132 and/or applying the diffusing features 135, 145 onto the substrate or carrier 150, e.g., on the second side 152 of the substrate 150. In some embodiments, the specular reflecting features 132 and the diffusing features 135 can be embossed into a coating or the substrate or carrier 150. After UV curing the embossed coating or substrate, the specular reflecting features 132 and the diffusing features 135 can be metallized (e.g., at the same time in some cases). The substrate or carrier 150 can comprise various polymeric substrates, such as, for example, polyethylene terephthalate (PET), oriented polypropylene (OPP), low density polyethylene (LDPE), linear low density polyethylene (LLDPE), polypropylene (PP), polyvinyl chloride (PVC), polycarbonate (PC) or any other type of plastic film or carrier. In various embodiments, the polymeric substrate can be transparent. The polymeric substrates can have a thickness that can be in a range from 10 microns to 300 microns (e.g., 12.5 microns, 25 microns, 37.5 microns, 50 microns, etc.), in any range within this range (e.g., 10 microns to 200 microns, 12.5 microns to 100 microns, 12.5 microns to 50 microns, etc.), any values within these ranges, or in any ranges formed by such values.

After the device 100 is formed, some such devices 100 can be incorporated into a banknote having a paper, plastic, or polymeric thickness that can be in a range from 10 microns to 110 microns (e.g., 12.5 microns, 25 microns, 40 microns, 50 microns, 90 microns, 95 microns, 98 microns, 100 microns, 105 microns, 107 microns, etc.), in any range within this range (e.g., 10 microns to 105 microns, 10 microns to 90 microns, 10 microns to 50 microns, 10 microns to 40 microns, etc.), any values within these ranges, or in any ranges formed by such values. In some embodiments, various devices 100 can be incorporated into a banknote (e.g., embedded into or laminated onto the paper, plastic, or polymer of the banknote) such that the total banknote thickness can be in a range from 10 microns to 130 microns, from 10 microns to 120 microns, from 10 microns to 110 microns, from 10 microns to 100 microns, from 10 microns to 90 microns, in any range within these ranges, any values within these ranges, or in any ranges formed by such values. The security device 100 can be formed into security threads in banknotes. A security thread can be a polymeric film interwoven into the banknote paper (or plastic or polymer) as it is being made such that portions of it are visible at the surface and some portions are not. The security device 100 can be a hot stamp feature, an embedded feature, a windowed feature, or a laminated feature. A hot stamp feature can be transferred to a banknote surface using a release substrate upon which may be located a security feature, e.g., a hologram, using heated die and pressure. A patch is generally hot stamped to a banknote surface. An embedded feature can be affixed within a depression, e.g., formed during the paper (or plastic or polymer) making process, in the banknote. In some embodiments, this feature can keep the banknote surface flat. A windowed feature can allow one to view the security device in transmission. A windowed feature can include an opening in the banknote paper (or plastic or polymer) and can be laminated with a polymeric film. A windowed feature can include a security thread interwoven into the banknote paper (or plastic or polymer). A laminated feature can be affixed to the surface of the banknote by means of an adhesive. A laminated strip can include a flat polymer film with built in optical security devices. This flat polymer film can be attached to a banknote across its width (e.g., narrow dimension) using adhesive on the banknote surface. In some embodiments, the security device 100 can be configured to provide authenticity verification on an item of security (e.g., currency, a credit card, a debit card, a passport, a driver's license, an identification card, a document, a tamper evident container or packaging, or a bottle of pharmaceuticals).

Although FIGS. 1A and 1B show two sets of segments (e.g., first segments 101 and second segments 102), additional sets of segments (e.g., third segments, fourth segments, etc.) can be included. For the same sized array 105 of lenses, to incorporate additional segments, the width w of the segments may be reduced. Alternatively, to incorporate additional (e.g., same sized) segments, the size of the lenses (e.g., $W_L$) may be increased.

With further reference to FIG. 1B, the first segments 101 can include specular reflecting features 132 and diffusing features 135. The specular reflecting features 132 can define the icon 112 and the diffusing features 135 can define the first background 115. In various embodiments, a master used to form the specular reflecting features 132 and/or the diffusing features 135 can be prepared by using an electron beam, lithographic techniques, and/or etching.

The specular reflecting features 132 can be provided by a mirror such as a metallized relatively flat and/or smooth surface. In some instances, the metallized surface can include metals such as aluminum, silver, gold, copper, titanium, zinc, tin, and alloys thereof (e.g., bronze).

The diffusing features 135 can be provided by a diffuser such as a kinoform diffuser (and may be replicated from a master that was formed using a holographic process that involved interfering light on a photosensitive material), a tailored micro diffuser, or a resin containing scattering particles such as $TiO_2$ or other type of diffuser. In certain embodiments, the diffusing features 135 can provide a matte white or a paper white finish or a grey finish. The surface texture of the diffusing features 135 can provide "color consistency" (e.g., a consistent white or grey look) and/or consistent brightness. In various embodiments, the surface texture of the specular reflecting features 132 can provide "color contrast" with the diffusing features 135 (e.g., providing a dark or shiny look adjacent the white or grey look). In some embodiments, the diffusing features 135 can include a tint, dye, ink, or pigment (or other material where absorption provides color) to change the color from white or grey, but maintain a matte finish appearance (e.g. a matte color such as matte green, matte red, etc.). In various embodiments, the high contrast and consistency can allow the presented image to be relatively invariant as the light source changes its position. An image having high contrast and consistency is effective in public recognition and awareness, which can be advantageous for a security device.

In various embodiments, the diffusing features 135 can include relatively fine and shallow features allowing the features to be used on a product (e.g., a bank note) without substantially increasing the thickness of the product. Further, a smaller sized feature in general, allows more features to be incorporated for a line of an image, which can allow for better diffusion and increase the resolution of the image.

The surface measurements of the diffusing features 135 can be measured by various instruments, such as by an apparatus marketed by Keyence. For example, the surface texture can be analyzed based on International Standard ISO 25178 to measure, for example, arithmetic mean height, maximum height, texture aspect ratio, arithmetic mean peak curvature, developed interfacial area ratio, root mean square height, skewness, kurtosis, maximum peak height. An example diffuser was measured within the following parameters. The diffusing features 135 can have an arithmetic mean height Sa (e.g., arithmetic mean of the absolute value of the height from the mean plane of the surface) less than or equal to 5 microns (e.g., less than or equal to 1 micron, less than or equal to 0.5 micron, less than or equal to 0.3 micron, less than or equal to 0.2 micron, etc.), and/or have an arithmetic mean height from 0.01 micron to 5 microns, in any range within this range (e.g., 0.01 micron to 3 microns, 0.01 micron to 1 micron, 0.01 micron to 0.5 micron, 0.05 micron to 3 microns, 0.05 micron to 1 micron, 0.05 micron to 0.5 micron, 0.05 micron to 0.3 micron, 0.05 micron to 0.2 micron, 0.1 micron to 1 micron, 0.1 micron to 0.5 micron, 0.1 micron to 0.3 micron, 0.1 micron to 0.2 micron, etc.), of any values within these ranges, or in any ranges formed by such values. In certain embodiments, the maximum height Sz (e.g., distance between the highest point and the lowest point on the surface) of the diffusing features 135 can be less than or equal to 10 microns (e.g., less than or equal to 8 microns, less than or equal to 5 microns, less than or equal to 3 microns, less than or equal to 2 microns, etc.) and/or be from 0.01 micron to 10 microns, in any range within this range (e.g., 0.1 micron to 5 microns, 0.15 micron to 5 microns, 0.2 microns to 5 micron, 0.5 micron to 5 microns, 0.5 micron to 3 microns, 1 micron to 3 microns, etc.), any values within these ranges, or in any ranges formed by such values. The diffusing features 135 can have a texture aspect ratio Str (e.g., a measure of uniformity of the surface texture) of less than 5 (e.g., less than 3, less than 1, etc.), and/or have a texture aspect ratio from 0.01 to 5, in any range within this range (e.g., from 0.2 to 1, from 0.5 to 1, etc.), of any values within these ranges, or in any ranges formed by such values. In some embodiments the diffusing features 135 can have an arithmetic mean peak curvature Spc (e.g., the arithmetic mean of principal curvature of peaks) greater than or equal to 1,000 1/mm (e.g., greater than or equal to 10,000 1/mm, greater than or equal to 30,000 1/mm, etc.), and/or have an arithmetic mean peak curvature from 1,000 1/mm to 100,000 1/mm, in any range within this range (e.g., 10,000 1/mm to 80,000 1/mm, 15,000 1/mm to 80,000 1/mm, 25,000 1/mm to 65,000 1/mm, 30,000 1/mm to 50,000 1/mm, etc.), of any values within these ranges, or in any ranges formed by such values.

In various examples, the developed interfacial area ratio Sdr (e.g., percentage of the definition area's additional surface area contributed by the texture as compared to the planar footprint or definition area) of the diffusing features 135 can be less than or equal to 10 (e.g., less than or equal to 5, less than or equal to 4, less than or equal to 3, less than or equal to 2, etc.), and/or have a developed interfacial area ratio from 0.5 to 10, in any range within this range (e.g., from 0.8 to 7, from 1 to 2, from 1.2 to 1.8, etc.), of any values within these ranges, or in any ranges formed by such values. In some embodiments, the root mean square height Sq (e.g., standard deviation σ of heights) can be less than or equal to 5 microns (e.g., less than or equal to 0.5 micron, less than or equal to 0.3 micron, less than or equal to 0.2 micron, etc.), and/or have a root mean square height from 0.05 micron to 5 microns, in any range within this range (e.g., 0.05 micron to 1 micron, 0.05 micron to 0.5 micron, 0.1 micron to 0.5 micron, etc.), of any values within these ranges, or in any ranges formed by such values. The diffusing features 135 can have skewness Ssk (e.g., degree of bias of the roughness shape) of less than or equal to 5 (e.g., less than or equal to 3, less than or equal to 1, etc.), and/or have a skewness from 0.01 to 5, in any range within this range (e.g., from 0.5 to 5, from 0.6 to 2, from 0.7 to 1, etc.), of any values within these ranges, or in any ranges formed by such values. The surface can have a kurtosis Sku (e.g., measure of the sharpness of the roughness profile) of less than or equal to 10 (e.g., less than or equal to 8, less than or equal to 5, etc.), and/or have a kurtosis from 0.5 to 10, in any range within this range (e.g., from 0.8 to 9, from 1.2 to 7, from 2 to 5, etc.), of any values within these ranges, or in any ranges formed by such values. The maximum peak height Sp (e.g., height of the highest peak) of the diffusing features 135 can be less than or equal to 10 microns (e.g., less than or equal to 8 microns, less than or equal to 5 microns, less than or equal to 3 microns, less than or equal to 2 microns, etc.) and/or be from 0.05 micron to 10 microns, in any range within this range (e.g., 0.1 micron to 5 microns, 0.15 micron to 3 microns, 0.18 micron to 2 microns, etc.), any values within these ranges, or in any ranges formed by such values.

The diffusing features 135 can be configured to provide Lambertian reflectance, such as reflectance with the brightness appearing the same regardless of one's angle of view. In some instances, the diffusing features 135 can have an elliptical or linear output. In various embodiments, the diffusing features 135 can be characterized by a Bi-Directional Reflectance Distribution Function (BRDF), and can have a zero-order peak. In some embodiments, the diffusing features 135 can have a brightness greater than or equal to 85, such as 85, 86, 88, 90, 95, 99 and/or in a range from 85 to 100, in any range within this range (e.g., from 88 to 100, from 90 to 100, etc.), of any values within these ranges, or in any ranges formed by such values and/or can have a whiteness index greater than or equal to 85, such as 85, 86, 88, 90, 95, 99 and/or in a range from 85 to 100, in any range within this range (e.g., from 88 to 100, from 90 to 100, etc.), of any values within these ranges, or in any ranges formed by such values. In various embodiments, the device can be dependent on the color of the light source. For example, if one views the device under a sodium light source, the overall color can be yellowish, whereas under a white light source, the device can be achromatic (without color).

In certain embodiments, because of a relatively high contrast between the specular reflecting features 132 and the diffusing features 135 as will be disclosed herein, the security device 100 can operate under a variety of light sources, including low light (e.g., subdued lighting as found in bars and restaurants or at dusk or at dawn). In certain embodiments, the specular reflecting features 132 and the diffusing features 135 can provide no diffractive or interference color (e.g., no wavelength dispersion or rainbows or rainbow effects). In various embodiments, the range of brightness from white to black can be used, without color (e.g., achromatic). However, some embodiments can be colored (e.g., green, red, brown, yellow, etc.) so that a monochromatic effect can be seen. For example, in some embodiments, the diffusing features can comprise a tint, an ink, a transparent dye, an opaque dye, or an opaque pigment where absorption can provide color. However, in some implementations, the brightness or luminance can change. Thus, in some implementations, a change in brightness can be used with a monochromatic effect. For example, the brightness or luminance many change, however, the chromaticity or the location on the chromaticity diagram remains the same.

By incorporating specular reflecting features 132 to define the icon 112 and diffusing features 135 to define the first background 115 of the first image 110, certain embodiments of security devices 100 can present relatively high contrast between icon 112 and first background 115 and a sharp border between the icon 112 and first background 115. For example, the specular reflecting features 132 can be adjacent or abutting next to the diffusing features 135. In some instances, the specular reflecting features 132 can be embedded within the diffusing features 135, or vice versa. One way to characterize the border or a high definition line can be by the differential (e.g., derivative or slope) across the boundary. Relatively sharp lines with little or no gradual change or having a ragged edge can typically have a rapidly changing profile. Those that have a gradual transition from one brightness to another brightness can have a slow rising and receding differential trace. Relatively high contrast can have a narrow differential trace with large height while relatively low contrast can have a wide differential trace with small height. In various embodiments, a 3D profile of the surface can be mapped, e.g., with a ZYGO interferometer, between a region including specular reflecting features 132 and a region including diffusing features. In some embodiments, the width of the physical transition of the boundary can be from 0.1 micron to 2 microns (e.g., 0.8 micron, 1 micron, 1.2 microns, etc.), in any range within this range (e.g., 0.2 micron to 2 microns, 0.5 micron to 2 microns, etc.), any values within these ranges, or in any ranges formed by such values.

Various discussions provided herein refer to viewing in the specular direction (e.g., on-axis viewing) as well as viewing in a direction other than the specular direction (e.g., off-axis viewing). As is well known, according to Snell's law, light incident on a flat smooth surface at an angle of incidence, $\theta_i$, (e.g., measured with respect to the surface normal of the flat smooth surface) will be reflected at an angle of reflection, $\theta_r$, (e.g., measured with respect to the surface normal of the flat smooth surface) such that the angle of incidence, $\theta_i$, is equal to the angle of reflection, $\theta_r$, (e.g., $\theta_i=\theta_r$). The specular direction refers to the direction of this reflected light, e.g., the reflected light directed at the angle, $\theta_r$, with respect to the normal. The direction other than the specular direction refers to the direction not corresponding to the direction of this reflected light, e.g., the reflected light directed at the angle, $\theta_r$, with respect to the normal off the surface. The specular direction is also used herein in connection with diffuse surfaces to correspond to the angle of reflection, $\theta_r$, that is equal to the angle of incidence, $\theta_i$, even though a diffuse surface will not necessarily limit the light scattered therefrom to the specular direction and will scatter light in many directions other than in a direction having an angle of reflection, $\theta_r$, equal to the angle of incidence, $\theta_i$. The terms "on-axis" and "off-axis" may also be used interchangeably with the direction of specular reflection and a direction not corresponding to the specular direction, respectively.

Although the description above refers to the angles of reflection as is applicable for reflective surfaces, the structures described herein should not be limited to reflective structures and may, for example, comprise transmissive structures and/or a combination of reflective and transmissive structures. For example, as described herein, the specular reflecting features 132 can include metallized relatively flat and/or smooth surfaces, and the diffusing features 135 can include metallized scattering or diffusing microstructure (e.g., having surface relief such as provided by a kinoform diffuser) on a side 152 of the substrate 150 opposite the array 105 of lenses (e.g., a 1D or 2D array of lenses) such that the smooth features 132 and the diffusing features 135 reflect light from the same side of the array 105 of lenses. For instance, the smooth features 132 can be configured to specularly reflect light (e.g., when viewing in the specular direction), and the diffusing features 135 can be configured to diffusely reflect light.

Instead of metallized smooth features 132 and metallized diffusing features 135 reflecting light from the same side of the array 105 of lenses, the smooth features 132 and/or the diffusing features 135 may allow light to transmit through from the opposite side of the array 105 of lenses. In various embodiments, the smooth features 132 can be metallized while the diffusing features are not metallized such that the smooth features 132 can be configured to specularly reflect light (e.g., when viewing in the specular direction) from the same side of the array 105 of lenses, and the diffusing features 135 can be configured to diffusely transmit light from the opposite side of the array 105 of lenses. For example, a coating of partially transmissive and partially reflective zinc sulfide (ZnS) or other high refractive index material (e.g., a transparent material with an index of about 1.6 to about 3, about 1.6 to about 2.75, about 1.6 to about 2.5, about 1.6 to about 2, about 1.65 to about 3, about 1.65 to about 2.75, about 1.65 to about 2.5, about 1.65 to about 2, about 1.7 to about 3, about 1.7 to about 2.75, about 1.7 to about 2.5, about 1.7 to about 2, about 1.8 to about 3, about 1.8 to about 2.75, about 1.8 to about 2.5, possibly about 2.0 or greater, with substantially little absorption such as cerium oxide, aluminum oxide, titanium dioxide, tantalum pentoxide, zirconium dioxide, etc.) can be deposited over the smooth features 132 and the microstructure of the diffusing features 135 (e.g., on a side opposite the array 105 of lenses) followed by an opaque coating of vacuum deposited aluminum (or other reflective metal such as silver, gold, chromium, copper, titanium, zinc, tin, nickel, bronze, etc.). The aluminum can be selectively metallized (e.g., using a partial metallization method such as forming a patterned metal layer) or selectively demetallized (e.g., using a demetallization method such as alkali etching or oil based lift off or ablation to remove exposed, unprotected metal) or laser ablated (e.g., using a laser to remove regions of metal) from the diffusing features 135 such that the regions having smooth features 132 are reflective and diffusing features 135 are transmissive. Alternatively, the high index layer can be deposited after incorporating the aluminum (e.g., after selective metallization, selective demetallization, or laser ablation) such that the smooth features 132 are reflective and diffusing features 135 are transmissive.

Being transmissive, the diffusing features 135 in some embodiments may be configured to be nondetectable in transmission. In some such embodiments, a high index layer (e.g., ZnS or other high refractive index material such as titanium dioxide, tantalum pentoxide, zirconium dioxide, etc. or a combination of such materials) can increase optical effect (e.g., visibility) of the features 135. For example, a high index layer can provide an index mismatch with the features 135 such that the boundaries of the relatively fine and shallow features of the diffusing features 135 can be viewable (e.g., by reflection at the interfaces) or can cause an index mismatch so optical interfaces do not vanish. Index mismatch can enable Snell's law of refraction to occur and light to be deviated to provide a diffusing effect. Although various embodiments are described as using a high index material, some embodiments might not use a high index material, but just a material with a different refractive index as the diffusing features 135.

In various embodiments, the diffusing features 135 can be viewed in transmission, for example, by light from the opposite side of the array 105, even though the diffusing features 135 may also reflect light incident on the diffusing surfaces. In some embodiments, the diffusing features 135 can be more diffusely transmissive than diffusely reflective.

For example, the diffusing features 135 can be in a range from about 51% to about 100% diffusely transmissive, in any range within this range (e.g., from about 60% to about 100% diffusely transmissive, from about 65% to about 99% diffusely transmissive, from about 70% to about 99% diffusely transmissive, from about 80% to about 99% diffusely transmissive, from about 90% to about 99% diffusely transmissive, from about 95% to about 99% diffusely transmissive, from about 60% to about 95% diffusely transmissive, from about 65% to about 95% diffusely transmissive, from about 70% to about 95% diffusely transmissive, from about 80% to about 95% diffusely transmissive, from about 90% to about 95% diffusely transmissive), any values within these ranges, and/or in any ranges formed by such values.

Alternatively, in some embodiments, selective metallization, selective demetallization, or laser ablation can be used such that the smooth features 132 are not metallized while the diffusing features are metallized. The smooth features 132 can be transparent (e.g., substantially clear and/or without substantial image distortion and/or without substantial degradation, for example, such that objects behind can be distinctly seen) and configured to transmit light from the opposite side of the array 105 of lenses, and the diffusing features 135 can be configured to diffusely reflect light from the same side of the array 105 of lenses. In some embodiments, a layer may be disposed against the unmetallized smooth features 132 to provide contrast against the adjacent white appearance or color provided by the metallized diffusing features. For example, the unmetallized smooth features 132 may be provided with a color coating.

Alternatively, in some embodiments, only a high index coating (e.g., substantially no metallization) covers both the smooth features 132 and diffusing features 135 such that both features are viewed in transmission. For example, the smooth features 132 can be transparent and configured to transmit light from the opposite side of the array 105 of lenses. In some instances, the high index coating may cause an index mismatch such that the smooth features 132 may also reflect light at the interface. The smooth features 132 can be more transmissive than reflective. Also, the diffusing features 135 can be configured to diffusely transmit light from the opposite side of the array 105 of lenses. The diffusing features 135 may also reflect light at the interface with the index mismatched material. As described herein, in some embodiments, the diffusing features 135 can be more diffusely transmissive than diffusely reflective.

In some examples, after the smooth features 132 and diffusing features 135 are applied/coupled (e.g., facets, microroughness, microstructure, and/or kinoform diffusers embossed, patterned, laminated, etc.) to the backside 152 of the substrate or carrier 150, a high index layer (e.g., a ZnS layer) can provide an index mismatch with the smooth features 132 and/or diffusing features 135 (e.g., a polymer such as acrylic polymer). Also, in place of the high index layer, other transparent or optically transmissive index mismatched material can be used. For example, the index mismatch can provide reflection of the smooth features 132 and/or diffusing features 135 (e.g., Fresnel reflection) and/or provide for Snell's law of refraction. In some embodiments, without an index mismatched layer, use of an adhesive which has a similar index as the layer where the diffusing features are formed, the features may optically disappear (e.g., reflection and refraction not being significant to be noticeable).

In addition, the index mismatched layer (and/or another transmissive coating layer over the index mismatched layer) can provide a layer over the smooth 132 and/or diffusing features 135 for protection and/or to decrease the chances of counterfeiting (e.g., copying). Alternatively, in some embodiments, the index mismatched layer can be deposited after incorporating an aluminum (or other metal) region and removing some of the aluminum (e.g., after selective metallization, selective demetallization, or laser ablation).

In further examples, additional layers of the index mismatched layer can be provided to increase reflectivity of diffusing features 135. For example, additional layers of a high refractive index material can be provided over unmetallized diffusing features 135 such that the diffusing features are more diffusely reflective than diffusely transmissive. In addition, multiple layers such as multiple layers of different refractive index can be provided. In some embodiments, for example, a plurality of layers can be provided to produce an interference effect such as reflection by interference. An interference coating can be configured to operate as a reflector. Such an interference-based reflective feature may, for example, comprise a plurality of alternating high and low index layers. For example, the plurality of layers can include a high index layer and a low index layer or a high index layer, a low index layer, and a high index layer (e.g., each having a thickness of a quarter wavelength) to create an interference effect (e.g., a quarter wave stack that is a reflector or a quarter wave reflector). Optical interference can thus be employed by creating optical interference coatings that may produce reflective features or regions.

For example, the diffusing features 135 can be in a range from about 51% to about 100% diffusely reflective, in any range within this range (e.g., from about 60% to about 100% diffusely reflective, from about 65% to about 99% diffusely reflective, from about 70% to about 99% diffusely reflective, from about 80% to about 99% diffusely reflective, from about 90% to about 99% diffusely reflective, from about 95% to about 99% diffusely reflective, from about 60% to about 95% diffusely reflective, from about 65% to about 95% diffusely reflective, from about 70% to about 95% diffusely reflective, from about 80% to about 95% diffusely reflective, from about 90% to about 95% diffusely reflective), any values within these ranges, and/or in any ranges formed by such values.

When incorporating transmissive structures (e.g., transparent features 132 or diffusing optically transmissive features 135 configured to diffusely transmit light) into a product such as a banknote or other document, some embodiments can include a windowed feature. For example, the device 100 can be coupled on the backside (e.g., laminated on a side opposite the array 105 of lenses) to a window in an underlying product (e.g., an opening in an underlying paper/plastic/cloth/fabric base material or a clear region in an underlying plastic or polymer base material) such that light can transmit through the window and the transmissive structure. In some embodiments, the windowed feature can include a transmissive layer (e.g., a high index layer or other coating) for protection and/or to decrease chances of duplication. In some embodiments, when incorporating transmissive structures (e.g., transparent features 132 or diffusing optically transmissive features 135) to an underlying product, the device 100 can be coupled (e.g., with a transmissive adhesive and an index mismatched material such as a high refractive index material) to the underlying product (e.g., with or without a window) such that the transmissive structures can allow information (e.g., color, printing, graphics, a photograph, etc.) from the underlying product to be viewed. For example, in some implementations, transmissive structures (e.g., transparent features 132 or diffusing features 135) can be provided on a substrate (e.g., on the side opposite of the array of lenses), coated with an index mismatched material, and attached to an underlying product with a transmissive adhesive such that information (e.g., color, printing, graphics, photograph, etc.) on the underlying product can be viewed when looking through the lenses. As described herein, the transmissive structures (e.g., transparent features 132 or diffusing features 135) can also reflect light at the index mismatched interface. The transmissive features can be more transmissive (e.g., from about 51% to about 100% transmissive) than reflective (e.g., 0% to about 49% reflective). In some instances, these transmissive features can be about 5%, 10%, 15%, 20%, 25%, 30%, 35%, 40%, 45%, or 49% reflective, or any ranges formed by any such values (e.g., 0% to 40% reflective, 0% to 45% reflective, 5% to 40% reflective, 5% to 45% reflective, 10% to 40% reflective, 10% to 45% reflective, 15% to 40%, 15% to 45%, 20% to 40%, 20% to 45%, etc.). Reflective features, such as decorative features, may be formed however by the index mismatched material such as high refractive index material or reflective interference coating(s) that provide some level of reflectivity in addition to some level of optical transmission.

Although the smooth features 132 (specular reflecting or transparent) are illustrated as defining the icon 112 and the diffusing features 135 (diffusely reflective or diffusely transmissive) are illustrated as defining the background 115 of an image 110, in some embodiments, the diffusing features 135 (diffusely reflective or diffusely transmissive) can be configured to define the icon 112 and the smooth features 132 (specular reflecting or transparent) can be configured to define the background 115 of an image 110. By incorporating smooth features 132 (specular reflecting or transparent) in combination with diffusing features 135 (diffusely reflective or diffusely transmissive) to define either the icon or the background of an image, relatively high contrast and/or a sharp border between the icon and background can be presented to the viewer.

Other combinations of specular reflecting, transparent, and diffusing (diffusely reflective or diffusely transmissive) features for the icons and backgrounds are possible. For example, in certain embodiments, specular reflecting features and transparent features can define the icon and the background respectively (or vice versa). As another example, in various embodiments, diffusely reflective features and diffusely transmissive features can define the icon and the background respectively (or vice versa). In some embodiments, specular reflecting features and transparent features can define the icon, and diffusely reflective features and diffusely transmissive features can define the background. In some embodiments, specular reflecting features, transparent features, diffusely reflective features, or diffusely transmissive features can define both the icon and the background (e.g., by incorporating different specular reflectances, pigments, etc. to provide contrast). Combinations of these different types can be included on different portions of a product or packaging.

Although various examples herein are described with respect to reflective structures (e.g., specular reflecting features and/or diffusely reflective features), one or more of the reflective structures can be substituted or combined with one or more transmissive structures (e.g., transparent features or diffusely transmissive features) described herein. In some embodiments, the reflective structures can be more reflective than transmissive, and the transmissive structures can be more transmissive than reflective. For example, the reflective structures can be in a range from about 51% to about 100% reflective, in any range within this range (e.g., from about 60% to about 100% reflective, from about 65% to about 100% reflective, from about 70% to about 100% reflective, from about 80% to about 100% reflective, from about 90% to about 100% reflective, from about 95% to about 100% reflective, from about 60% to about 99% reflective, from about 65% to about 99% reflective, from about 70% to about 99% reflective, from about 80% to about 99% reflective, from about 90% to about 99% reflective, from about 60% to about 95% reflective, from about 65% to about 95% reflective, from about 70% to about 95% reflective, from about 80% to about 95% reflective, from about 90% to about 95% reflective), any values within these ranges, and/or in any ranges formed by such values. These reflective structures can be in a range from about 0% to about 49% transmissive, in a range within this range (e.g., from about 0% to about 40% transmissive, from about 0% to about 35% transmissive, from about 0% to about 30% transmissive, from about 0% to about 20% transmissive, from about 0% to about 10% transmissive, from about 0% to about 5% transmissve, from about 1% to about 40% transmissive, from about 1% to about 35% transmissive, from about 1% to about 30% transmissive, from about 1% to about 20% transmissive, from about 1% to about 10% transmissive, from about 5% to about 40% transmissive, from about 5% to about 35% transmissive, from about 5% to about 30% transmissive, from about 5% to about 20% transmissive, from about 5% to about 10% transmissive), any values within these ranges, and/or any ranges formed by such values. As another example, the transmissive structures can be in a range from about 51% to about 100% transmissive, in any range within this range (e.g., from about 60% to about 100% transmissive, from about 65% to about 100% transmissive, from about 70% to about 100% transmissive, from about 80% to about 100% transmissive, from about 90% to about 100% transmissive, from about 95% to about 100% transmissive, from about 60% to about 99% transmissive, from about 65% to about 99% transmissive, from about 70% to about 99% transmissive, from about 80% to about 99% transmissive, from about 90% to about 99% transmissive, from about 60% to about 95% transmissive, from about 65% to about 95% transmissive, from about 70% to about 95% transmissive, from about 80% to about 95% transmissive, from about 90% to about 95% transmissive), any values within these ranges, and/or in any ranges formed by such values. These transmissive structures can be in a range from about 0% to about 49% reflective, in a range within this range (e.g., from about 0% to about 40% reflective, from about 0% to about 35% reflective, from about 0% to about 30% reflective, from about 0% to about 20% reflective, from about 0% to about 10% reflective, from about 0% to about 5% reflective, from about 1% to about 40% reflective, from about 1% to about 35% reflective, from about 1% to about 30% reflective, from about 1% to about 20% reflective, from about 1% to about 10% reflective, from about 5% to about 40% reflective, from about 5% to about 35% reflective, from about 5% to about 30% reflective, from about 5% to about 20% reflective, from about 5% to about 10% reflective, from about 10% to about 40% reflective, from about 10% to about 35% reflective, from about 10% to about 30% reflective, from about 10% to about 20% reflective), any values within these ranges, and/or in any ranges formed by such values. In some instances, the reflective and/or transmissive structures can be 50% reflective and 50% transmissive.

Figure 2C:
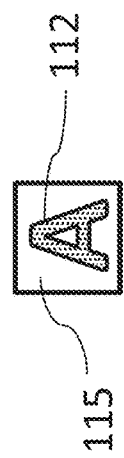
FIG. 2C schematically illustrates certain images and effects that can be presented during viewing at an angle in the specular direction by a security device in accordance with certain embodiments described herein.
Figure 2D:
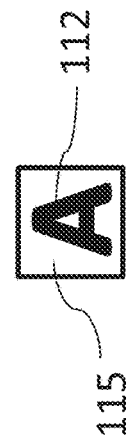
FIG. 2D schematically illustrates certain images and effects that can be presented during viewing at an angle not in the specular direction by a security device in accordance with certain embodiments described herein.
Figure 2A:
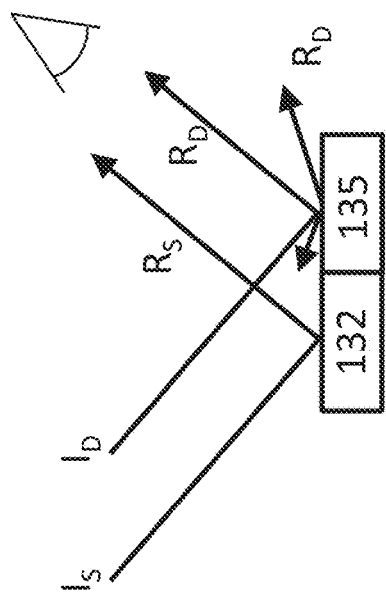
FIG. 2A schematically illustrates viewing at an angle in the specular direction of specular reflecting features and at the same angle of diffusing features in accordance with certain embodiments described herein.

FIG. 2A schematically illustrates viewing at an angle in the specular direction of specular reflecting features 132 (e.g., on-axis viewing) and at the same angle (e.g., off-axis viewing) of diffusing features 135 in accordance with certain embodiments described herein. For simplicity, the array 105 of lenses is not shown. As shown in FIG. 2A, light from an incoming direction Is can be reflected from the specular reflecting features 132 primarily in a single direction $R_S$. The reflectance from the specular reflecting features 132 can appear the brightest when viewing in the single direction $R_S$ of specular reflectance (e.g., viewing at an angle in the specular direction).

In contrast, light from an incoming direction $I_D$ can be reflected from the diffusing features 135 in multiple directions $R_D$. The reflectance from the diffusing features 135 is generally the same in the multiple directions including in the direction of specular reflectance of the specular reflecting features 132. In general, the reflectance from the diffusing features 135 is not as bright as the reflectance from the specular reflecting features 132 when viewing at the angle in the specular direction. However, the reflectance from the diffusing features 135 can be more reflective than the specular reflecting features 132 when viewing at an angle not in the specular direction.

Figure 2B:
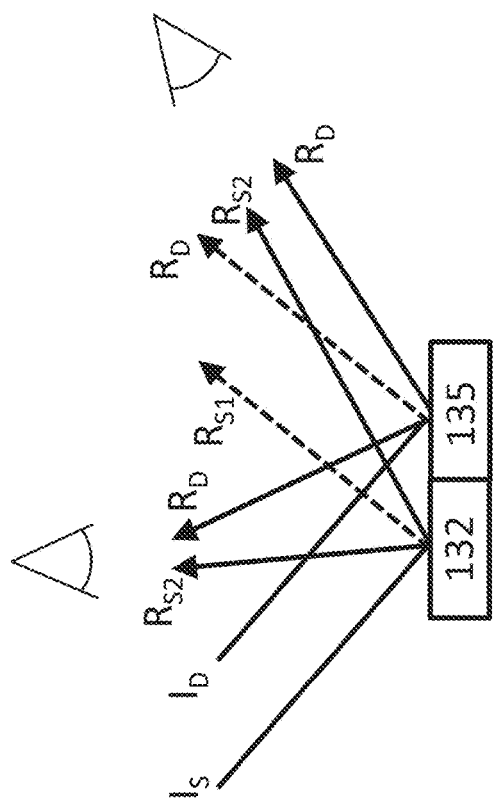
FIG. 2B schematically illustrates viewing at angles not in the specular direction of specular reflecting features and at the same angles of diffusing features in accordance with certain embodiments described herein.

For example, as shown in FIG. 2B, because light from an incoming direction Is can be reflected from the specular reflecting features 132 primarily in a single direction $R_{S1}$, the reflectance from the specular reflecting features 132 can appear dark when viewing at an angle not in the specular direction (e.g., directions $R_{S2}$ other than the single direction $R_{S1}$). With further reference to FIG. 2B, light from an incoming direction $I_D$ can be reflected from the diffusing features 135 in multiple directions $R_D$. The reflectance from the diffusing features 135 can appear the same (e.g., and not as bright as from the specular reflecting features 135 at the specular reflective angle) in the multiple directions, e.g., directions of specular reflectance of the specular reflecting features 132 as well as other directions.

In certain embodiments, high contrast between two regions (a first region defined by the specular reflecting features 132 and a second region defined by the diffusing features 135) can be achieved under multiple, if not all, angles of viewing. For example, FIG. 2C schematically illustrates certain images and effects that can be presented during viewing at an angle in the specular direction by a security device in accordance with certain embodiments described herein. FIG. 2D schematically illustrates certain images and effects that can be presented during viewing at an angle not in the specular direction by the security device in accordance with certain embodiments described herein. In this example, the specular reflecting features 132 define the icon 112, and the diffusing features 135 define the background 115. Referring to FIG. 2C, the icon 112 appears very bright (e.g., high reflectance) against a matte white or grey background 115. Referring to FIG. 2D, the icon 112 appears dark (e.g., low reflectance) against a matte white or grey background 115. In both viewing situations, there is high contrast between the icon 112 and the background 115. The contrast can be measured as the percentage of the difference between the maximum brightness and the minimum brightness divided by the sum of the maximum brightness and minimum brightness. In various embodiments, when viewing at an angle in the specular direction of the specular reflecting features 132 (e.g., FIG. 2C), the contrast of an image presented by certain devices described herein can be from 25% to 50% (e.g., 30%, 32%, 35%, 40%, 42%, 45%, etc.), and/or in any range within this range (e.g., from 30% to 50%, from 30% to 48%, from 30% to 45%, etc.), any values within these ranges, or in any ranges formed by such values. When viewing at an angle not in the specular direction (e.g., FIG. 2D), the contrast of an image presented by certain devices described herein can be from 50% to 90% (e.g., 60%, 62%, 65%, 70%, 72%, 75%, 78%, etc.), and/or in any range within this range (e.g., from 55% to 85%, from 60% to 85%, from 60% to 80%, etc.), any values within these ranges, or in any ranges formed by such values. In other embodiments, when viewing at an angle in the specular direction of the specular reflecting features 132, the contrast of an image presented by certain devices described herein can be from 50% to 90% (e.g., 60%, 62%, 65%, 70%, 72%, 75%, 78%, etc.), and/or in any range within this range (e.g., from 55% to 85%, from 60% to 85%, from 60% to 80%, etc.), any values within these ranges, or in any ranges formed by such values. When viewing at an angle not in the specular direction, the contrast of an image presented by certain devices described herein can be from 25% to 50% (e.g., 30%, 32%, 35%, 40%, 42%, 45%, etc.), and/or in any range within this range (e.g., from 30% to 50%, from 30% to 48%, from 30% to 45%, etc.), any values within these ranges, or in any ranges formed by such values. In these examples, the contrast percentage is higher for either viewing at an angle in the specular direction or not in the specular direction. However, in some embodiments, the contrast percentage can be similar for viewing at an angle in the specular direction and not in the specular direction. For example, the contrast percentage can be from 25% to 90% (e.g., 30%, 32%, 35%, 40%, 42%, 45%, 50%, 60%, 62%, 65%, 70%, 72%, 75%, 78%, etc.), and/or in any range within this range (e.g., from 30% to 50%, from 30% to 48%, from 30% to 45%, from 55% to 85%, from 60% to 85%, from 60% to 80%, etc.), any values within these ranges, or in any ranges formed by such values for both viewing situations.

In various embodiments, the device 100 can have viewing angles from negative angles (e.g., device 100 tilted towards the viewer) through the normal and to positive angles (e.g., device 100 tilted away from the viewer). Because light from an incoming direction $I_D$ can be reflected from the specular reflecting features 132 primarily in a single direction $R_{S1}$, the device 100 may be viewed at an angle not in the specular direction for the majority of the time. For example, as the device 100 is tilted from negative through the normal and to positive angles, a dark icon 112 against a matte white or grey background 115 (e.g., FIG. 2D) can switch between appearing and disappearing. The icon 112 and the backgrounds 115, 125 are achromatic. As the device 100 is tilted to the angle of specular reflectance, a very bright icon 112 against a matte white or grey background 115 (e.g., FIG. 2C) can appear. In some cases, depending on the metallization and processing of the specular reflecting features 132, a color (e.g., a shiny aluminum color or a shiny copper color) may appear momentarily against a matte white or grey background 115. As the device 100 is tilted out of the angle of specular reflectance and beyond, a dark icon 112 against a matte white or grey background 115 (e.g., FIG. 2D) can once again switch between appearing and disappearing.

Various embodiments can utilize a relatively high contrast and a sharp border between the two regions, e.g., between the icon 112 and the first background 115, and/or between a region at the first viewing angle α and a region at the second viewing angle β, e.g., between the icon 112 and the second background 125. The contrast and sharpness of images in an example device is shown in FIGS. 6A, 6B-1, 6B-2, 6B-3, and 6B-4.

With reference back to FIG. 1B, the specular reflecting features 132 can define the icon 112 and the diffusing features 135 can define the first background 115. In other embodiments still utilizing a relatively high contrast, the specular reflecting features 132 can define the first background 115 and the diffusing features 135 can define the icon 112. As shown in FIG. 1B, the first background 115 can have an outer shape 115b and size. The second background 125 can also have an outer shape 125b and a size. The outer shapes 115b, 125b can be shaped as described herein, but are shown in FIG. 1B as a rectangle for simplicity.

With further reference to FIG. 1B, the second segments 102 can include diffusing features 145. The diffusing features 145 can define the second background 125. Because there is no icon 112 within the second background 125, by tilting the device 100 from the first viewing angle α to the second viewing angle β, the array 105 of lenses can switch the icon 112 off. In certain embodiments, the diffusing features 145 of the second segments 102 can be different than the diffusing features 135 of the first segments 101. However, in various embodiments, the diffusing features 145 of the second segments 102 can be the same as the diffusing features 135 of the first segments 101. In some such embodiments (e.g., with the first and second backgrounds 115, 125 also having the same outer shape 115b, 125b and size), the second background 125 at the second viewing angle β looks the same (e.g., in shape, size, and brightness) as the first background 115 viewable at the first viewing angle α. For example, the viewer can see the icon 112 appear and disappear against similar backgrounds 115, 125 upon tilting the device 100 from the first viewing angle α to the second viewing angle β. Although the array 105 of lenses switches from first background 115 to second background 125, the viewer sees a background 125 that appears unchanged (e.g., constant shape, size, and/or brightness).

In various embodiments, the icon 112 and/or the backgrounds 115, 125 are achromatic. In some instances, the icon 112 and/or the backgrounds 115, 125 may be provided with monochromatic color (e.g., green, red, brown, yellow, etc.) by incorporating color to the specular reflecting features 132, the diffusing features 135, 145, and/or the lenses in the array 105 of lenses, and/or the substrate 150. This may be a matte (or diffuse) color or a mixture of matte colors as well as patterns or images formed by different colors. In some instances, the specular reflecting features 132, the diffusing features 135, 145, and/or the array 105 of lenses can include a tint, a dye, ink, or a pigment. For an additional security feature, the specular reflecting features 132, the diffusing features 135, 145, and/or the array 105 of lenses can include a covert feature, such as a fluorescent material (e.g., to emit a color when exposed to UV light) or an up-converting pigment (e.g., to convert near infrared light to visible light).

In FIGS. 1A and 1B, the outer shape 115b of the first background 115 is illustrated as a rectangle. The outer shape 125b of the second background 125 is also illustrated as a rectangle. As described herein, in some embodiments, the second background 125 can have the same shape, size, and diffusing features 145 as the first background 115 such that the background appears unchanged (e.g., in shape, size, and brightness) when tilting the device from a first viewing angle α to a second viewing angle β. In various embodiments, at the first viewing angle α, the array 105 of lenses can allow the icon 112 and a shaped background 115 to be observed. At the second viewing angle β, the array 105 of lenses can allow the same shaped background 125 to be observed. The shape of the backgrounds 115, 125 is not particularly limited. In some embodiments, the shape can include a pattern of alphanumeric characters, symbols, images (e.g., art images), graphics, or objects. For example, the background 115, 125 can include a circle, a square, a rectangle, a hexagon, an oval, a star, or a knurled edge. Other example backgrounds 115, 125 can be in the form of a bell, an inkwell, or a number. However, a wide range of other backgrounds are possible. In other embodiments, the shape and/or size of first background 115 and second background 125 can be different such that the background may appear to change when tilting the device from a first viewing angle α to a second viewing angle β.

In FIG. 1B, the first segments 101 include specular reflecting features 132 defining the icon 112 and diffusing features 135 defining the first background 115, and the second segments 102 include diffusing features 145 to match the diffusing features 135 defining the first background 115 of the first segments 101. However, in other embodiments, the first segments 101 can include diffusing features 135 defining the icon 112 and specular reflecting features 132 defining the first background 115, and the second segments 102 can include specular reflecting features 145 to match the specular reflecting features 132 of the first segments 101.

As shown in FIGS. 2A and 2B, there is a relatively narrow range of specular reflection for the specular reflecting features 132 and a relatively wide range of low reflection. Certain embodiments can incorporate specular reflecting features 132 (e.g., in a first segment 101) adjacent to diffusing features 145 (e.g., in a second segment 102) such that the security device 100 can switch an icon 112 on and off with relatively small tilt angles. For example, under a point light source (e.g., an LED), a user can switch the icon on (or off) upon tilting the device, forward or backward, by less than or equal to 15 degrees (e.g., 4 degrees, 5 degrees, 5.5 degrees, 6 degrees, 7 degrees, etc.), and/or a range from 2 degrees to 15 degrees, any range within this range (e.g., 3 degrees to 15 degrees, 3 degrees to 14 degrees, 4 degrees to 15 degrees, 4 degrees to 14 degrees, 4 degrees to 13 degrees, 5 degrees to 15 degrees, 5 degrees to 13 degrees, etc.), any values within these ranges, or any ranges formed by such values. As another example, under an extended light source (e.g., incandescent light), a user can switch the icon on (or off) upon tilting the device, forward or backward, by less than or equal to 20 degrees (e.g., 8 degrees, 9 degrees, 10 degrees, 11 degrees, etc.), and/or a range from 2 degrees to 20 degrees, any range within this range (e.g., 2 degrees to 18 degrees, 2 degrees to 15 degrees, 3 degrees to 15 degrees, 4 degrees to 15 degrees, 5 degrees to 15 degrees, 5 degrees to 12 degrees, etc.), any values within these ranges, or any ranges formed by such values.

In some embodiments, the user can switch the icon back off (or back on) upon tilting of the device in the opposite direction by at least the same tilt angles described herein, or upon further tilting of the device in the same direction by at least the same tilt angles described herein. Further, incorporating specular reflecting features 132 in a first segment 101 adjacent to diffusing features 145 in a second segment 102 can provide the relatively high contrast between these regions as described herein. Such incorporation can allow the security device 100 to switch an icon 112 on and off with sharp boundaries upon tilting from viewing angle α to viewing angle β. Advantageously, security devices in accordance with certain embodiments can present sharp icons that switch on and off rapidly with little, if no, transitional state, which are difficult to reproduce.

Figure 3A:
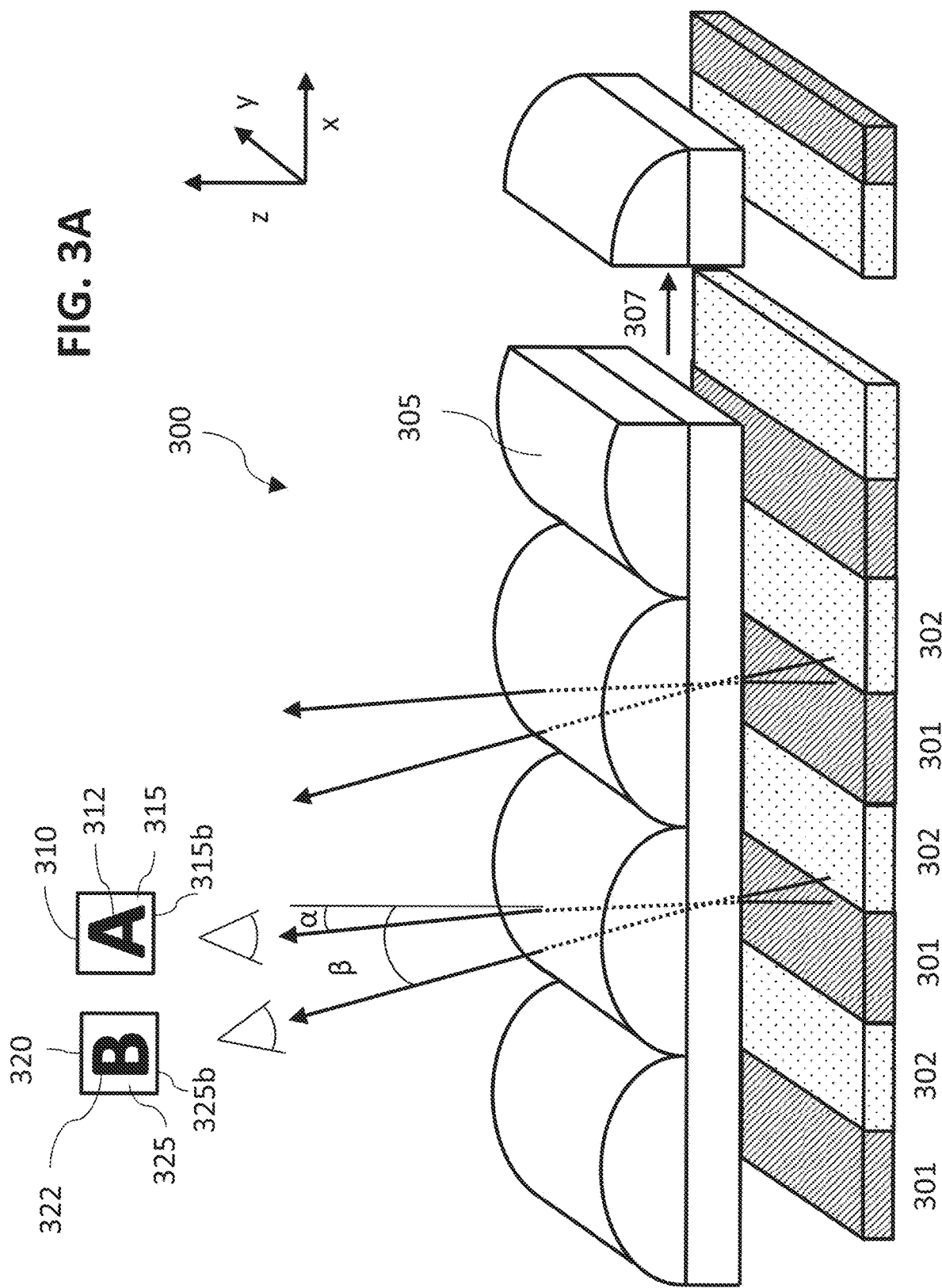
FIG. 3A schematically illustrates another example security device in accordance with certain embodiments described herein.
Figure 3B:
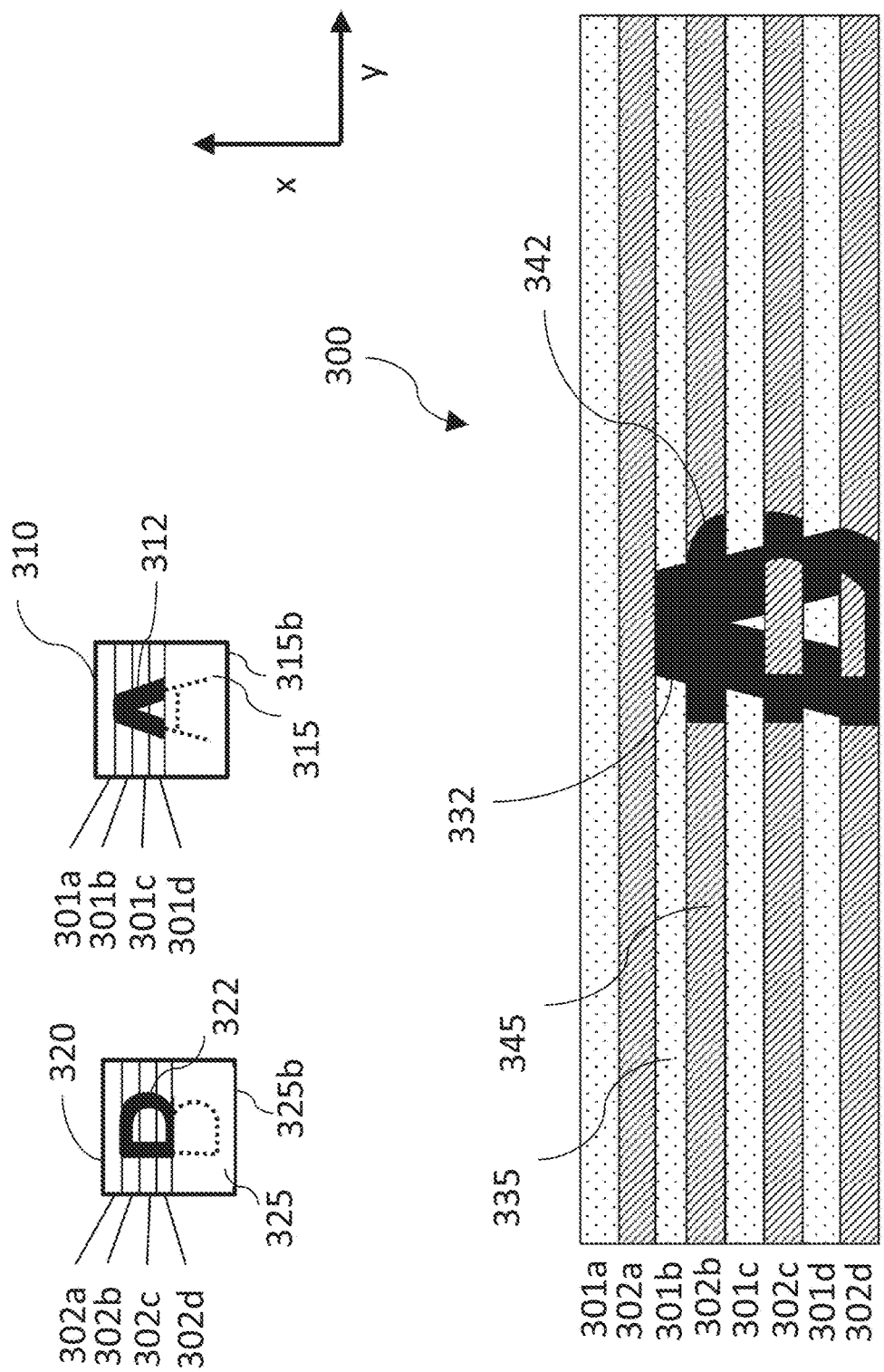
FIG. 3B schematically illustrates certain features of the example security device shown in FIG. 3A.

In accordance with certain embodiments described herein, instead of switching an icon on and off, a security device can be configured to switch between at least two icons upon tilting the device. FIGS. 3A and 3B schematically illustrate an example of such a security device. The embodiment shown in FIGS. 3A and 3B is similar to the embodiment shown in FIGS. 1A and 1B except that instead of the second image 120 including only the second background 125 (and no second icon), the second image 320 in FIGS. 3A and 3B includes a second icon 322 in addition to the second background 325. Accordingly, the features disclosed herein relating to the embodiment shown in FIGS. 1A and 1B extend to the embodiment shown in FIGS. 3A and 3B.

For example, as shown in FIG. 3A, the security device 300 can include an array 305 of lenses and a plurality of first segments 301 and second segments 302 disposed under the array 305 of lenses. Referring to FIG. 3B, the first segments 301a, 301b, 301c, 301d can correspond to portions of a first image 310 (only top portion illustrated). The second segments 302a, 302b, 302c, 302d can correspond to portions of a second image 320 (only top portion illustrated). The first image 310 can include a first icon 312 and a first background 315. The second image 320 can include a second icon 322 and a second background 325. Thus, instead of switching an icon 112 on and off, the example embodiment shown in FIGS. 3A and 3B can switch between two icons 312, 322, or more particularly, between two images 310, 320 with each image 310, 320 having an icon 312, 322 and a background 315, 325.

For example, at a first viewing angle α, the array 305 of lenses can be configured to allow the first image 310 for viewing without allowing the second image 320 for viewing. At a second viewing angle β different from the first viewing angle α, the array 305 of lenses can be configured to allow the second image 320 for viewing without allowing the first image 310 for viewing. Although various embodiments are described as allowing one image to be viewed without allowing the other image to be viewed, this does not preclude having two images with similar icons and backgrounds but perceived differently. For example, the images can include different perceptions of an object seen from different orientations, perspectives, locations and/or an object that may appear to move, rotate, change form, color, brightness, etc. For instance, an object may appear to flip vertically, or an object may appear to flip horizontally. In some such embodiments, the images can be considered as different images.

Referring to FIG. 3B, the first segments 301 can include specular reflecting features 332 and diffusing features 335. Instead of the second segments 102 only including either specular reflecting features or diffusing features 145, the second segments 302 can include both specular reflecting features 342 and diffusing features 345.

For the first 301 and second 302 segments, the specular reflecting features 332, 342 can define either the icon 312, 322 or the background 315, 325. If the specular reflecting features 332, 342 define the icon 312, 322, then the diffusing features 335, 345 can define the background 315, 325. On the other hand, if the diffusing features 335, 345 define the icon 312, 322, then the specular reflecting features 332, 342 can define the background 315, 325. In further embodiments, the specular reflecting features (e.g., the specular reflecting features 332, 342) can define the icon (e.g., the first icon 312) in one set of segments (e.g., the first segments 301) yet define the background (e.g., the second background 325) in the other set of segments (e.g., the second segments 302). The specular reflecting features 332, 342 can be adjacent or abutting next to the diffusing features 335, 345 (e.g., for high contrast). In some instances, the specular reflecting features 332, 342 can be embedded within the diffusing features 335, 345, or vice versa. Further, any of the reflective structures (e.g., specular reflecting features or diffusely reflective features) can be substituted or combined in any combination with any of the transmissive structures described herein (e.g., transparent features or diffusely transmissive features).

In FIG. 3A, the specular reflecting features 332 in the first segments 301 define the first icon 312, and the diffusing features 335 define the first background 315. The specular reflecting features 342 in the second segments 302 define the second icon 322, and the diffusing features 345 define the second background 325. In various implementations, the diffusing features 335, 345 can provide a constant brightness.

As described herein, incorporating specular reflecting features 332, 342 adjacent or abutted next to diffusing features 335, 345 can provide the relatively high contrast between icon 312, 322 and background 315, 325 upon tilting from viewing angle α to viewing angle β. Advantageously, security devices in accordance with certain embodiments can present for viewing a sharp icon that switches rapidly to another sharp icon with little, if no, transitional state, which are difficult to reproduce. The rapid switching from one icon to another can occur even when the icons 312, 322 have different overall shapes from each other. In some embodiments, it may be desired to have a transitional state (e.g., showing slow movement). In some such embodiments, switching can occur among multiple icons to show the effect of movement.

Similar to the disclosure herein with respect to the embodiment shown in FIGS. 1A and 1B, in certain embodiments, the outer shape 325b of the second background 325, the size of the second background 325, and the diffusing features 345 of the second segments 302 can be the same or different than the outer shape 315b of the first background 315, the size of the first background 315, and the diffusing features 335 of the first segments 301. In embodiments where they are the same, the viewer can see the icons 312, 322 switch from one to another against a similar background 315, 325 (e.g., in shape, size, and brightness) upon tilting the device 300 from the first viewing angle α to the second viewing angle β. Thus, in various embodiments, at the first viewing angle α, the array 305 of lenses can present for viewing the first icon 312 and a shaped background 315. At the second viewing angle β, the array 305 of lenses can present for viewing the second icon 322 in the same shaped background 325. Although the array 305 of lenses switch from the first background 315 to the second background 325, the viewer sees an icon 312 switch to another icon 322 while the background 315 appears unchanged (e.g., constant shape, size, and/or brightness). In various instances, there can be high contrast with the backgrounds being constant in brightness.

Similar to FIG. 2C, FIG. 3C schematically illustrates certain images and effects that can be presented during viewing at an angle in the specular direction by a security device in accordance with certain embodiments described herein. Similar to FIG. 2D, FIG. 3D schematically illustrates certain images and effects that can be presented during viewing at an angle not in the specular direction by the security device in accordance with certain embodiments described herein. In this example, the specular reflecting features 332 define the first icon 312, and the diffusing features 335 define the first background 315. The specular reflecting features 342 define the second icon 322, and the diffusing features 345 define the second background 325. Referring to FIG. 3C, the icons 312, 322 appear very bright (e.g., high reflectance) against a matte white or grey background 315, 325. Referring to FIG. 3D, the icons 312, 322 appear dark (e.g., low reflectance) against a matte white or grey background 315, 325. In both viewing situations, there is high contrast between the icons 312, 322 and the backgrounds 315, 325.

In various embodiments, as the device 300 is tilted from negative through the normal and to positive angles, a viewer can see an image flip between a first dark icon 312 against a first matte white or grey background 315 and a second dark icon 322 against a second matte white or grey background 325 (e.g., FIG. 3D). The icons 312, 322 and the backgrounds 315, 325 are achromatic. As the device 300 is tilted to the angle of specular reflectance, a first shiny icon 312 against a first matte white or grey background 315 (e.g., FIG. 3C) can appear. Upon a further slight tilt, the first shiny icon 312 against the first matte white or grey background 315 can flip to a second shiny icon 322 against a second matte white or grey background 325 (e.g., FIG. 3C). As the device 300 is tilted out of the angle of specular reflectance and beyond, the viewer can once again see an image flip between the first dark icon 312 against the first matte white or grey background 315 and the second dark icon 322 against the second matte white or grey background 325 (e.g., FIG. 3D).

Although the example embodiment shown in FIGS. 3A and 3B illustrates a single icon 312 switching to another single icon 322, in some embodiments, multiple icons can switch to other icons. In FIGS. 3A and 3B, the security device 300 can include a plurality of lenses forming an array 305 of lenses along a longitudinal axis 307.

Referring to FIG. 4A, the first segments (e.g., first segments 301 in FIGS. 3A and 3B) can correspond to portions of a first set 401*a* of at least two icons 411*a*, 412*a*. The second segments 302 can correspond to portions of a second set 402*a* of at least two icons 421*a*, 422*a*. The icons in each set 401*a*, 402*a* can be separated by background. At a first viewing angle α, the array 305 can be configured to allow the first set 401*a* of two or more icons 411*a*, 412*a* to be viewable, e.g., in a row along an axis 407 perpendicular to the longitudinal axis 307 of the array 305 of lenses. At a second viewing angle β, different from the first viewing angle α, the array 305 of lenses can be configured to allow the second set 402*a* of two or more icons 421*a*, 422*a* to be viewable, e.g., in a row along the axis 407 perpendicular to the longitudinal axis 307 of the array 305 of lenses. In various embodiments, one or more of the multiple icons 411*a*, 412*a* of the first set 401*a* can be different from a corresponding one of the multiple icons 421*a*, 422*a* in the second set 402*a*. For example, for two icons 411*a*, 412*a*, each icon can switch to the same or to a different icon, resulting in 4 (e.g., 2×2) different possible icon combinations. As another example, for two icons 411*a*, 412*a*, each icon has the possibility to be in one of three states, e.g., same icon, different icon, or no icon. In such an example, there are 9 (e.g, 3×3) different possible icon combinations. In the example shown in FIG. 4A, the icons 411*a*, 412*a* at the first viewing angle α and the icons 421*a*, 422*a* at the second viewing angle β are arranged in a row along the axis 407. However, other arrangements are possible.

As another example, referring to FIG. 4B, the first segments (e.g., first segments 301 in FIGS. 3A and 3B) can correspond to portions of a first set 401*b* of at least three icons 411*b*, 412*b*, 413*b*. The second segments 302 can correspond to portions of a second set 402*b* of at least three icons 421*b*, 422*b*, 423*b*. The icons in each set 401*b*, 402*b* can be separated by background. At a first viewing angle α, the array 305 can be configured to allow the first set 401*b* of three or more icons 411*b*, 412*b*, 413*b* to be viewable, e.g., in a row along an axis 407 perpendicular to the longitudinal axis 307 of the array 305 of lenses. At a second viewing angle β, different from the first viewing angle α, the array 305 of lenses can be configured to allow the second set 402*b* of three or more icons 421*b*, 422*b*, 423*b* to be viewable, e.g., in a row along the axis 407 perpendicular to the longitudinal axis 307 of the array 305 of lenses. In various embodiments, one or more of the multiple icons 411*b*, 412*b*, 413*b* of the first set 401*b* can be different from a corresponding one of the multiple icons 421*b*, 422*b*, 423*b* in the second set 402*b*. For example, for three icons 411*b*, 412*b*, 413*b* each icon can switch to the same or to a different icon, resulting in 8 (e.g., 2×2×2) different possible icon combinations. As another example, for three icons 411*b*, 412*b*, 413*b* each icon has the possibility to be in one of three states, e.g., same icon, different icon, or no icon. In such an example, there are 27 (e.g, 3×3×3) different possible icon combinations. In the example shown in FIG. 4B, the icons 411*b*, 412*b*, 413*b* at the first viewing angle α and the icons 421*b*, 422*b*, 423*b* at the second viewing angle β are arranged in a row along the axis 407. However, other arrangements are possible.

As another example, certain implementations can include one or more additional icons appearing and disappearing or one or more additional icons flipping to another icon(s). For instance, some embodiments can further comprise a plurality of additional segments (e.g., third segments, fourth segments, etc.) disposed under the array of lenses. The array of lenses can include the same array of lenses as for the first icon (e.g., the same 1D or 2D lens array as for the first icon) or a separate array of lenses (e.g., a different 1D or 2D lens array as for the first icon). In the case of separate lens arrays, the device can include two 1D lens arrays, a 1D lens array and a 2D lens array, or two 2D lens arrays. The lens arrays can be laterally or angularly displaced with respect to one another. The lens arrays can be similar or different in width, pitch, curvature, etc. The number of icons and/or lens arrays is not limited.

Similar to the first segments 101 in FIG. 1A, the third segments can correspond to portions of the additional icon and background. At a third viewing angle, the array of lenses can present the additional icon for viewing. At a fourth viewing angle different from the third viewing angle, the array of lenses does not present the additional icon for viewing. When incorporated with the example shown in FIG. 1A, the additional icon may appear and disappear at the same rate as the first icon 112 appears and disappears. Alternatively, the additional icon may appear and disappear at a faster or slower rate than the first icon 112 appears and disappears. For example, the difference in the first and second viewing angles α, β may be different than the difference in the third and fourth viewing angles. As the angle of view changes, one of the icons may switch between appearing and disappearing (and/or disappearing and appearing) in more cycles than the other icon. When incorporated with the example shown in FIG. 3A, the additional icon may appear and disappear at the same rate as icon 312 flips to icon 322. Alternatively, the additional icon may appear and disappear at a faster or slower rate than icon 312 flips to icon 322. For example, the difference in the first and second viewing angles α, β may be different than the difference in the third and fourth viewing angles. In some examples, as the angle of view changes, the additional icon may switch between appearing and disappearing (and/or disappearing and appearing) in more cycles than icon 312 switches to icon 322 (and/or icon 322 switches to icon 312). In some examples, as the angle of view changes, icon 312 may switch to icon 322 (and/or icon 322 switches to icon 312) in more cycles than the additional icon appears and disappears (and/or disappears and appears).

As another example, similar to the first and second segments 301, 302 in FIG. 3A (which allow a first icon 312 to flip to a second icon 322), the third segments can correspond to portions of a third icon and a third background, and the fourth segments can correspond to portions of a fourth icon and a fourth background. At a third viewing angle, the array of lenses can present for viewing the third icon and the third background without presenting the fourth icon for viewing. At a fourth viewing angle different from the third viewing angle, the array of lenses can present for viewing the fourth icon and the fourth background without presenting the third icon for viewing.

When incorporated with the example shown in FIG. 3A, the third icon may flip to the fourth icon at the same rate as icon 312 flips to icon 322. Alternatively, the third icon may flip to the fourth icon at a faster or slower rate than icon 312 flips to icon 322. For example, the difference in the first and second viewing angles α, β may be different than the difference in the third and fourth viewing angles. In some examples, as the angle of view changes, one pair of icons (e.g., the icon 312/icon 322 pair or the third icon/fourth icon pair) may switch in more cycles than the other pair of icons. In any of these examples, the one or more additional icons/backgrounds can include any of the features described herein (e.g., specular reflecting features, diffusely reflective features, diffusely transmissive features, transparent features, plasmonic structures, opal structures, etc.)

Furthermore, as another example, referring to FIG. 4C, the first segments (e.g., first segments 301 in FIGS. 3A and 3B) can correspond to portions of a first set 401c of at least four icons 411c, 412c, 413c, 414c. The second segments 302c can correspond to portions of a second set 402c of at least four icons 421c, 422c, 423c, 424c. The icons in each set 401c, 402c can be separated by background. At a first viewing angle α, the array 305 can be configured to allow the first set 401c of four or more icons 411c, 412c, 413c, 414c to be viewable, e.g., in a row along an axis 407 perpendicular to the longitudinal axis 307 of the array 305 of lenses. At a second viewing angle β, different from the first viewing angle α, the array 305 of lenses can be configured to allow the second set 402c of four or more icons 421c, 422c, 423c, 424c to be viewable, e.g., in a row along the axis 407 perpendicular to the longitudinal axis 307 of the array 305 of lenses. In various embodiments, one or more of the multiple icons 411c, 412c, 413c, 414c of the first set 401c can be different from a corresponding one of the multiple icons 421c, 422c, 423c, 424c in the second set 402c. For example, for four icons 411c, 412c, 413c, 414c, each icon can switch to the same or to a different icon, resulting in 16 (e.g., 2×2×2×2) different possible icon combinations. As another example, for four icons 411c, 412c, 413c, 414c, each icon has the possibility to be in one of three states, e.g., same icon, different icon, or no icon. In such an example, there are 81 (e.g., 3×3×3×3) different possible icon combinations. In some examples, icons can be spaced by other icons that turn on or off at different angles. For example, at a first viewing angle, the first and third icons 411c, 413c can be turned on, while the second and fourth icons 412c, 414c are turned off. At a second viewing angle, the first and third icons 411c, 413c can be turned off, while the second and fourth icons 412c, 414c are turned on. As another example, at a first viewing angle, the first and fourth icons 411c, 414c can be turned on, while the second and third icons 412c, 413c are turned off. At a second viewing angle, the first and fourth icons 411c, 414c can be turned off, while the second and third icons 412c, 413c are turned on. As another example, only the first icon 411c can be turned on, followed by only the second icon 412c turned on, followed by only the third icon 413c turned on, followed by only the fourth icon 414c turned on. In the example shown in FIG. 4C, the icons 411c, 412c, 413c, 414c at the first viewing angle α and the icons 421c, 422c, 423c, 424c at the second viewing angle β are arranged in a row along the axis 407. However, other arrangements are possible.

In certain embodiments, the device can provide a stereoscopic view or a 3D effect. For example, the first and second segments can correspond to portions of a right side and left side view of an object or an icon or an icon and a background. In some such embodiments, the lenses in the array of lenses (and the first and second segments) can have a longitudinal axis disposed in the vertical direction (e.g., cylindrical lenses with curvature in the horizontal direction). When tilting the device about the longitudinal axis of the lenses, the array of lenses can be configured to present the right and left side views of the image for a stereoscopic view of the image. As disclosed herein, the first and second segments can include specular reflecting features and diffusing features. In some embodiments, the specular reflecting features define the icon and the diffusing features define the background. In some other embodiments, the diffusing features define the icon and the specular reflecting features define the background. In various embodiments, the first and second segments can correspond to portions of at least three images (e.g., 3, 4, 5, 6, 7, 8, 9, etc.). An image of an icon or object from a different perspective and angle can provide these multiple views. In some such embodiments, when the device is tilted about the longitudinal axis of the lenses, the viewer can observe around the icon in the image.

For additional security, various embodiments of features described herein can be combined together and/or with other features known in the art or yet to be developed. For example, certain embodiments can further comprise another optical element (e.g., a holographic element, a diffractive element, or a non-holographic and non-diffractive element). The additional optical element can be disposed under the array 105, 305 of lenses (within or outside of the first 101, 301 and/or second 102, 302 segments) or outside of the array 105, 305 of lenses. As another example, various embodiments can include one or more micro-structural lenses (e.g., Fresnel lens or a diamond turned element). The micro-structural lenses can be overprinted in some cases. Furthermore, as yet another example, some embodiments can include optically variable ink and/or interference features in thin films.

Figure 5A:
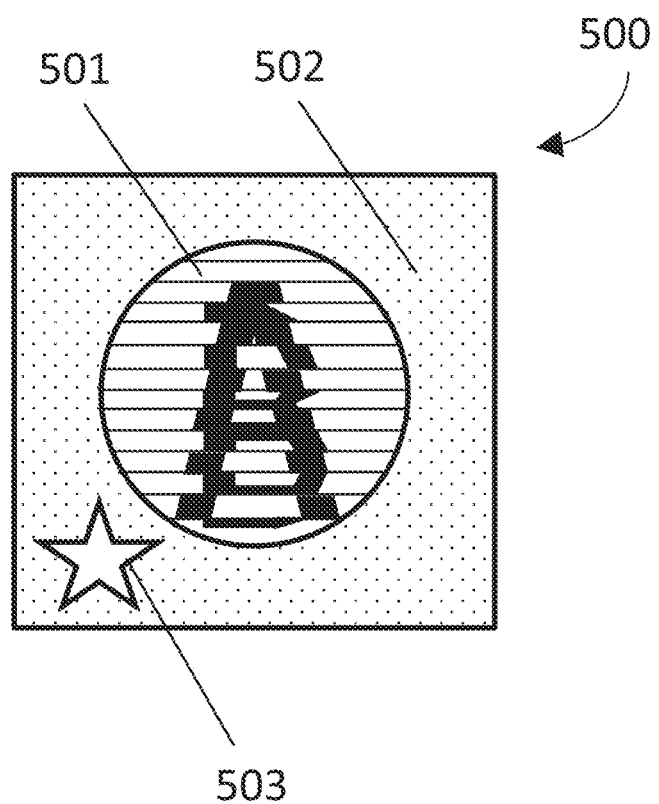
FIG. 5A schematically illustrates certain features of an example security device in accordance with certain embodiments described herein.

FIG. 5A schematically illustrates certain features of an example security device 500 in accordance with certain embodiments described herein. Like the other embodiments described herein, the security device 500 can include specular reflecting features 132, 332, 342 and diffusing (e.g., diffusely reflective) features 135, 335, 345 (or transparent features or diffusely transmissive features as described herein) under an array 105, 305 of lenses (shown collectively as 501). As shown in FIG. 5A, some embodiments can include a metallized coating 502 with a portion 503 without metallization (e.g., either demetallized or selectively metallized or ablated) to form at least one border, an alphanumeric character, a symbol, an image, or an object. As described herein, the device 500 can be coupled (e.g., with a transmissive adhesive and an index mismatched material such as a high refractive index material) on the backside to an underlying product (e.g., a banknote). In some embodiments, the portion 503 without metallization may allow printing, graphics, a photograph, etc. from the underlying product to be viewed. In some embodiments, the portion 503 without metallization may be coupled to a window in the underlying product such that the outline of the portion 503 can be viewed in transmission. In some embodiments, the window can include a transmissive layer (e.g., a transmissive coating) for protection. Light can also pass through, e.g., a diffusely transmissive region to make the region visible. In some instances, the metallized coating 502 can include aluminum, silver, gold, copper, titanium, zinc, tin, or alloys thereof (e.g., bronze). The portion 503 without metallization can be outside or within the array of lenses 501. In various embodiments, the array of lenses can also extend over the metallized region 502 and the region 503 without metallization. Reflective features, such as decorative features, may be formed however by the index mismatched material such as high refractive index material or reflective interference coating(s) that provide some level of reflectivity in addition to some level of optical transmission.

Figures 1, 5B:
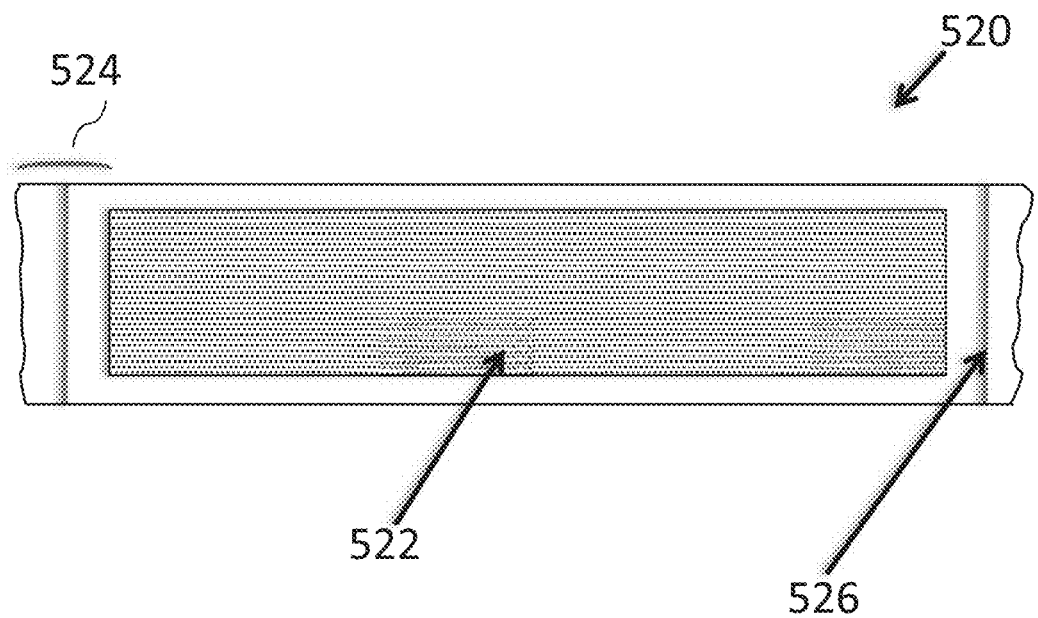
Figures 2, 5B:
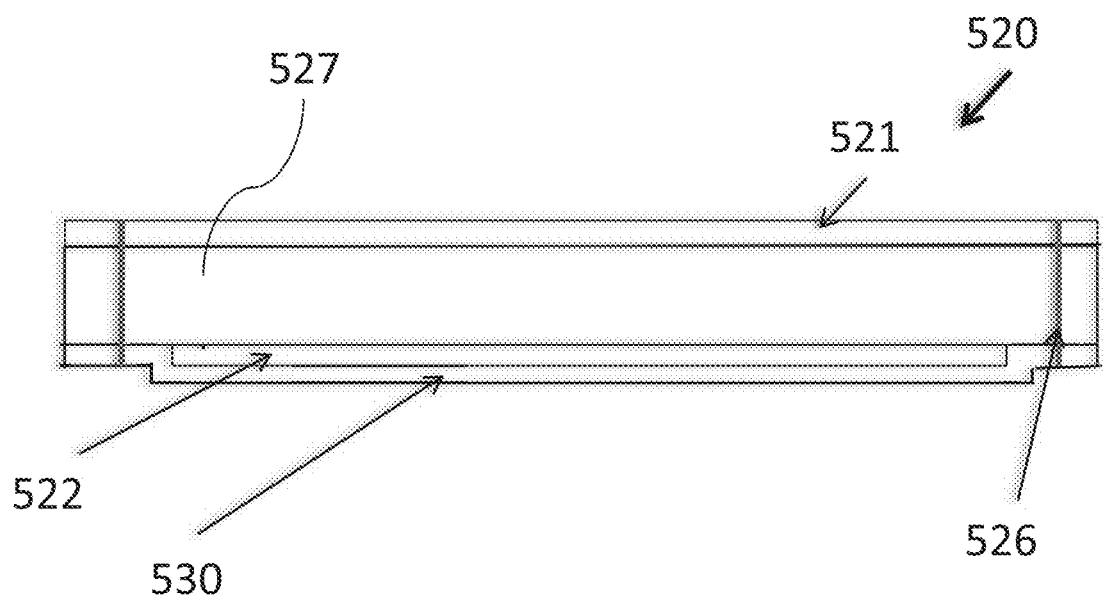

In some embodiments including a metallized region 502, the device can be incorporated into a security thread laid across a whole sheet of banknotes. When cutting the sheets into individual banknotes, the metallized region 502 of the security thread may be at a location that will be cut. Cutting the banknotes along a metallized region can thus cause the banknote to be susceptible to corrosion attack. For example, oxidation can occur or a ragged edge can be created near the cut in the metallized region. To help prevent these susceptible regions, regions without metallization in areas of the thread to be cut and/or a protective coating can be applied in some embodiments to help protect the edge of the metallization (e.g., to protect the edge from delamination/demetallization, solvent attack, and/or chemical attack). For example, FIG. 5B-1 schematically illustrates a top view of a security thread. The security thread 520 includes a metallized area 522 (e.g., from a metallized layer on the bottom surface, but viewable from the top surface). A region without metallization 524 (e.g., by demetallization or selectively metallization or laser ablation) can be created at the area of the security thread 520 where the banknote is to be cut 526. FIG. 5B-2 schematically illustrates a side view of this security thread 520 shown in FIG. 5B-1. FIG. 5B-2 shows an array 521 of lenses disposed on a substrate 527. As shown in FIGS. 5B-1 and 5B-2, the metallized area 522 (e.g., an aluminum layer) on the bottom side of the substrate 527 does not extend to the edge of the banknote (e.g., either by demetallization or selective metallization or laser ablation) where the thread is to be cut. A protective layer 530 (e.g., a protective organic coating) can also be applied on the bottom surface covering the metallized area 522 and the unmetallized regions 524 to strengthen the edge of the banknote where the metallized area 522 would otherwise have been cut.

Figure 5C:
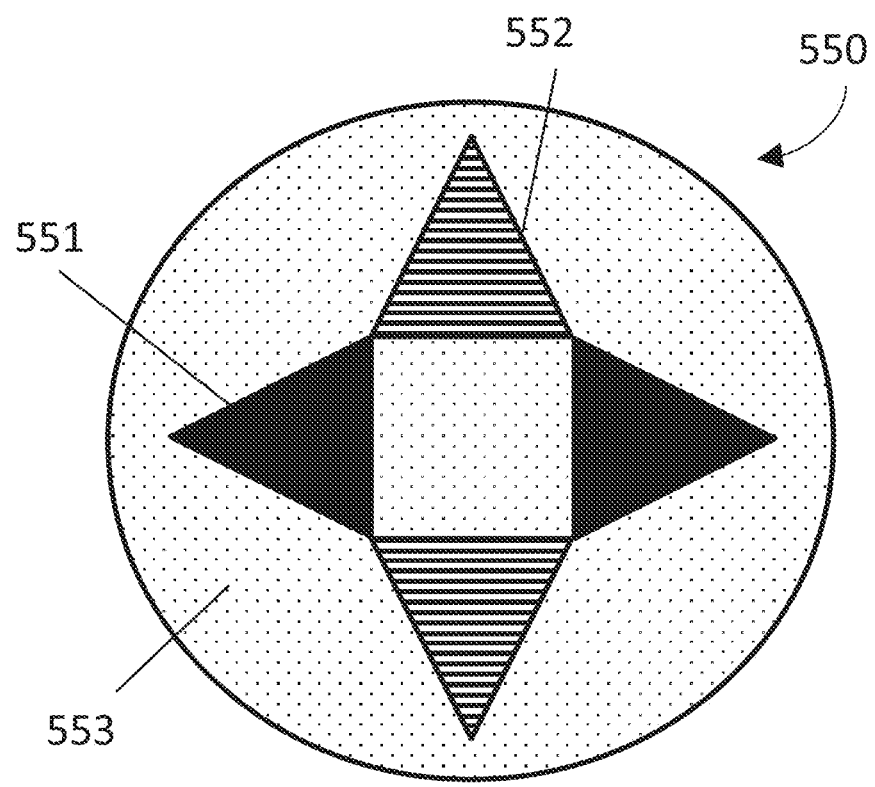
FIG. 5C schematically illustrates certain features of another example security device in accordance with certain embodiments described herein.

FIG. 5C schematically illustrates certain features of an example security device 550 in accordance with certain embodiments described herein. Like the other embodiments described herein, the security device can include an array of lenses, and a plurality of first and second segments disposed under the array of lenses. The first segments can correspond to portions of a first icon and a first background. The second segments can correspond to portions of a second icon and a second background. At a first viewing angle α, the array of lenses can be configured to allow the first icon and the first background to be viewable without allowing the second icon to be viewable. At a second viewing angle β different from the first viewing angle, the array of lenses can be configured to allow the second icon and the second background to be viewable without allowing the first icon to be viewable. In the embodiment shown in FIG. 5C, the first segments can include a first surface texture 551 defining the first icon. The second segments can include a second surface texture 552 defining the second icon. The second surface texture 552 can have a surface texture different from the first surface texture 551. The first and second segments can further include a third surface texture 553 defining the first and second backgrounds respectfully. The third surface texture 553 can be different from the first 551 and second 552 surface textures. For example, the first surface texture 551 can include a moth eye texture (e.g., texture producing dark reflectance). The second surface texture 552 can include an interference grating. The third surface texture 553 can include a diffusing texture as described herein. In some such embodiments, the relatively high contrast between diffusing texture and a moth eye texture or an interference grating can present for viewing a sharp image.

As another example, the first surface texture 551 can include a moth eye texture, while the second surface texture 552 can include specular reflecting features 132, 332, 342 as described herein. The third surface texture 553 can include a diffusing texture as described herein. As yet another example, the first surface texture 551 can include the specular reflecting features 132, 332, 342 as disclosed herein, while the second surface texture 552 can include an interference grating. The third surface texture 553 can include a diffusing texture as described herein. In some embodiments, the first 551 and second 552 surface textures can be in contact with each other. In additional embodiments, the first 551 and second 552 surface textures might not be in contact with each other.

Figure 6A:
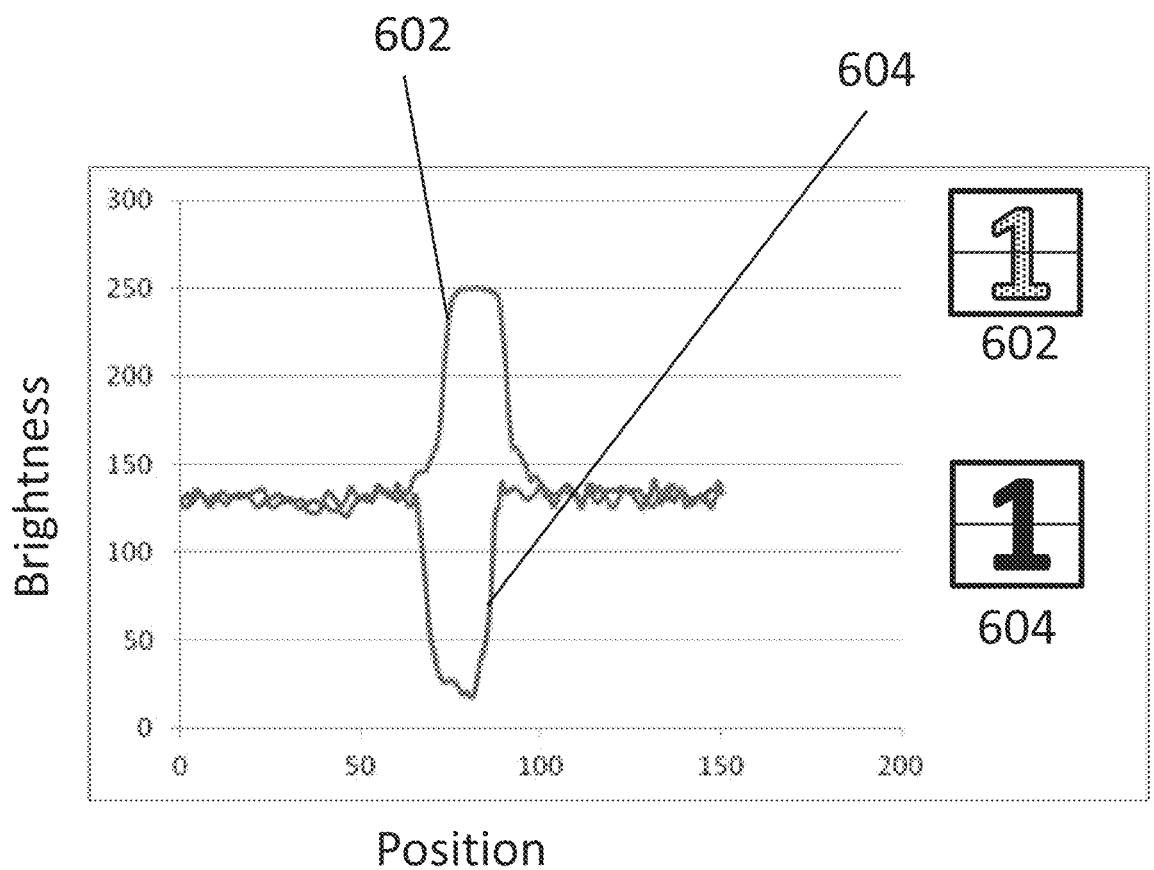
FIG. 6A shows the relative brightness as a function of distance of a line scan across an icon (e.g., represented by a number "1") in an example security device in accordance with certain embodiments described herein.

FIG. 6A shows the relative brightness (relative intensity units) as a function of distance (e.g., 150 data points over 5 mm) of a line scan across an icon in an example security device in accordance with certain embodiments described herein. The icon is represented by the number "1". When viewing the example device at an angle in the specular direction, a shiny icon such as one having a bright aluminum color against a matte white or grey background (or potentially colored by tint, dye, ink, pigment, or other absorptive material) can be viewed. As shown in trace 602, the relative brightness increases and decreases as the scan passes through the shiny icon. When viewing the example device at an angle not in the specular direction, a dark or black icon against a matte white or grey background can be viewed. As shown in trace 604, the relative brightness decreases and increases as the scan passes through the dark icon. The contrast between the icon and the background can be characterized as the height of the deviation from the background. In this example, the contrast is similar (e.g., the brightness is almost equal to the darkness such as between 120 and 125 relative intensity units) for both viewing conditions. In various embodiments, the contrast can be similar for both viewing conditions by ±5%, ±7%, or ±10%.

Figures 2, 6B:
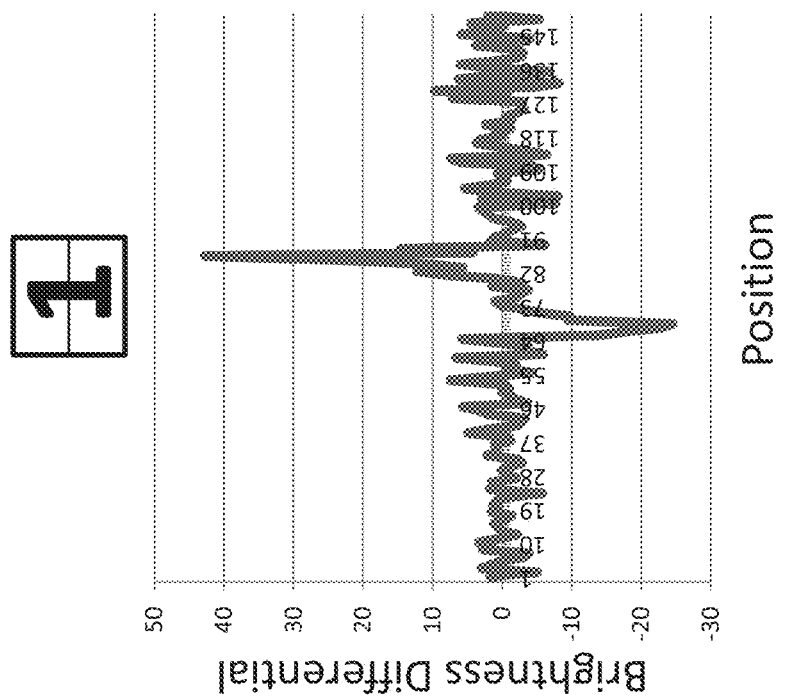
Figures 1, 6B:
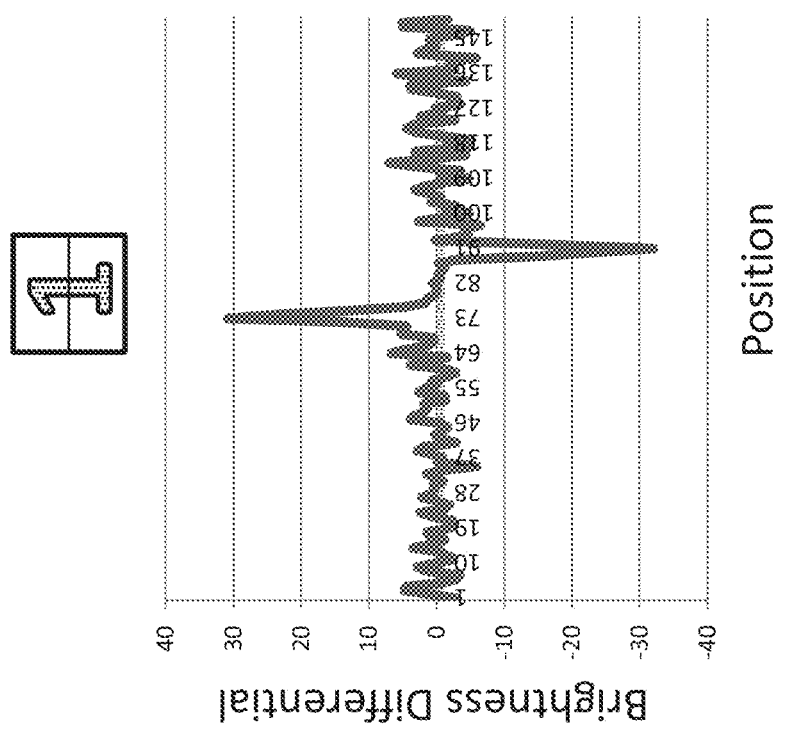
Figures 4, 6B:
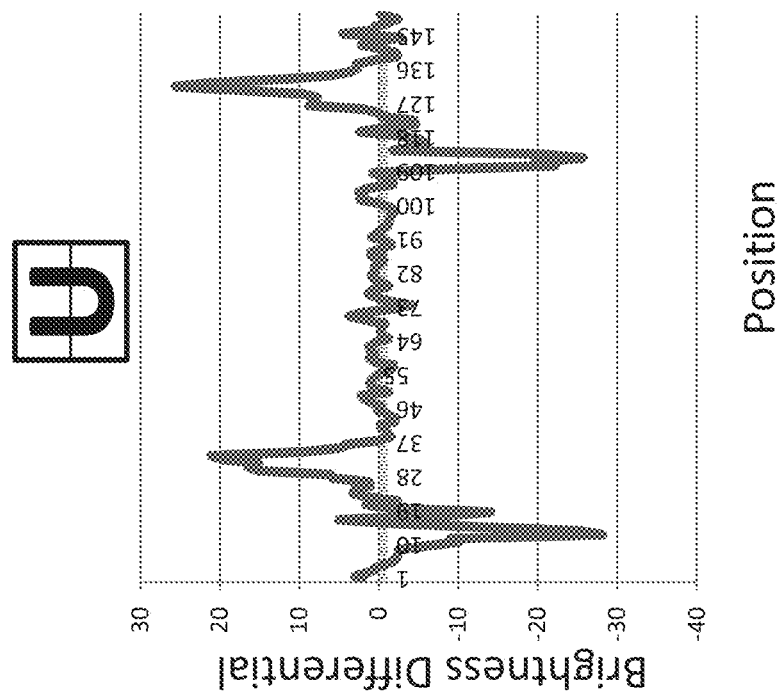
Figures 3, 6B:
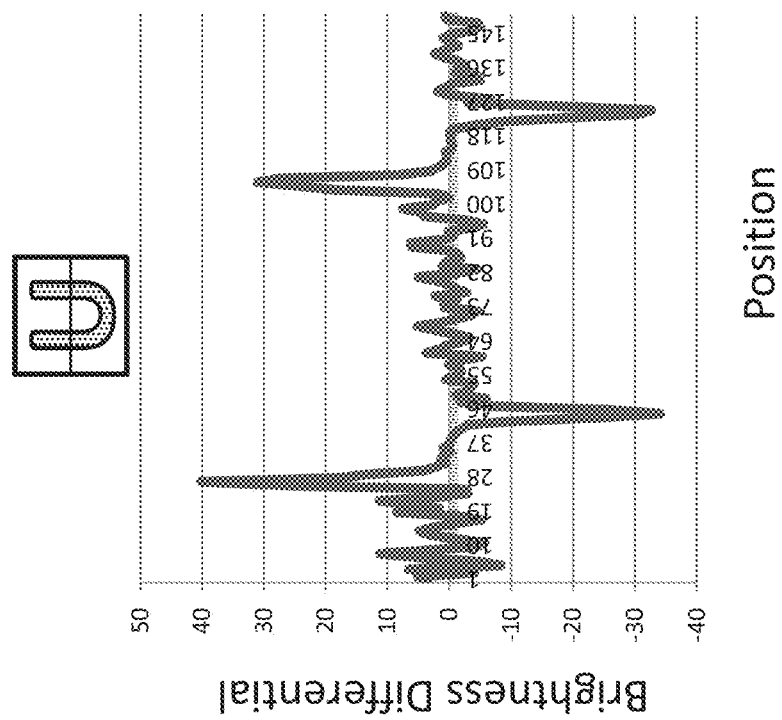

As described herein, one way to characterize the line definition (e.g., border) can be by the differential (e.g., derivative or slope) across the boundary. For example, relatively high contrast and a sharp border can have a high and/or narrow differential trace, while relatively low contrast and not so sharp border can have a low and/or wide differential trace. FIGS. 6B-1, 6B-2, 6B-3, and 6B-4 show the relatively high contrast and sharpness of the edges of the icons presented in certain embodiments of devices described herein. For example, FIGS. 6B-1 and 6B-2 show relatively narrow differential traces for the line definition of the shiny "1" icon and dark '1' icon respectively. FIGS. 6B-3 and 6B-4 show relatively narrow differential traces for the line definition of the shiny "U" icon and dark "U' icon respectively.

Figure 7:
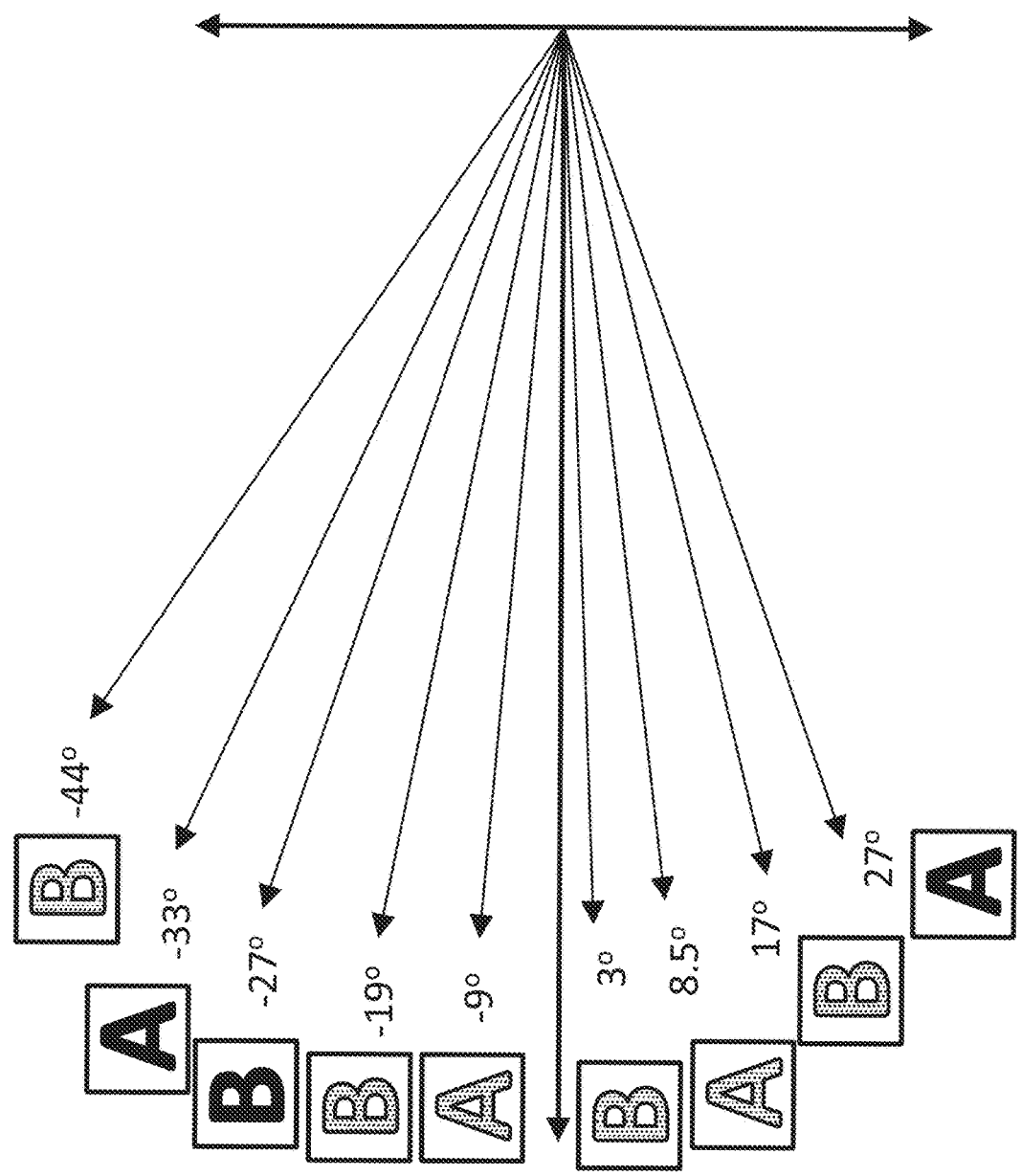
FIG. 7 schematically illustrates the change in brightness of two icons switching for various angles of tilt in a security device in accordance with certain embodiments described herein.

Table 1 shows the security effect from the human eye perspective of an example security device in accordance with certain embodiments described herein. As the example security device was tilted under an LED (with a diffuser), the presented icon was noted at each angle as well as the contrast of it relative to the diffuse background. The icon either appeared shiny (aluminum color) or appeared black against a matte white background. The angle of the device was determined by viewing a magnetically attached protractor having a needle pointed to the angle of the tilt. The results are shown schematically in Figure. 7. For example, FIG. 7 schematically illustrates the change in brightness of the two icons switching for various angles of tilt in the example device used in Table 1. In this example, the icons switched at tilt angles less than 15 degrees. The minimum tilt angle was 5 to 6 degrees with an average of 9 degrees. The icon appeared shiny against a black background for most of the angles measured due to the diffuser at the exit of the LED.

TABLE 1

| Angle | Delta angle | Icon | Contrast |
|---|---|---|---|
| −44 |  | B | Silver |
| −33 | 11 | A | Black |
| −27 | 6 | B | Black |
| −19 | 8 | B | Silver |
| −9 | 10 | A | Silver |
| 3 | 12 | B | Silver |
| 8.5 | 5.5 | A | Silver |
| 17 | 8.5 | B | Silver |
| 27 | 10 | A | Black |

FIG. 7 also schematically illustrates certain effects that can be presented by an optical device. In some examples, as the angle of tilt (or angle of view) such as along a horizontal or vertical axis changes, the icons can switch from an icon appearing dark (e.g., black A) against a matte white or grey background to another icon appearing bright (e.g., shiny B) against a matte white or grey background, or vice versa. In some examples, as the angle of tilt changes, the icons can switch from an icon appearing bright (e.g., shiny B) against a matte white or grey background to another icon appearing bright (e.g., shiny A) against a matte white or grey background. In some examples, as the angle of tilt changes, the icons can switch from an icon appearing dark (e.g., black B) against a matte white or grey background to another icon appearing dark (e.g., black A) against a matte white or grey background. The combinations of appearances may be independent on the type of lighting conditions, e.g., depending on the angle the light shines into the viewer's eye. The angles in which the icons can be viewed can be determined at the time of manufacturing (e.g., based on the geometry of the lens array(s), features defining the icons, etc.). In some instances, any or all of the combinations can be viewed under a combination of a point light source and a diffuse light source (e.g., a combination of office light and light coming through a window). In some instances, any or all of the combinations can be viewed under a point light source.

In some instances, any or all of the combinations can be viewed under diffuse light conditions (e.g., a cloudy day). As illustrated in the example shown in FIG. 7, the switching between icons is not necessarily symmetrical (e.g., the angles with respect to the tilt axis are not necessarily the same). In some implementations, the switching between icons may be symmetrical.

FIG. 8A shows an example icon switching from one art object shown in the left photograph to a different art object shown in the right photograph in a device according to certain embodiments disclosed herein. In this example, the two icons are of two different rendered images (e.g., like engravings) or art images. On the left is one image before the tilt, and the other image appears upon tilting the device. The same bright images against a diffuse background as well as dark icons against a diffuse background are seen as the observer tilts the device back and forth relative to his/her view.

Figure 8B:
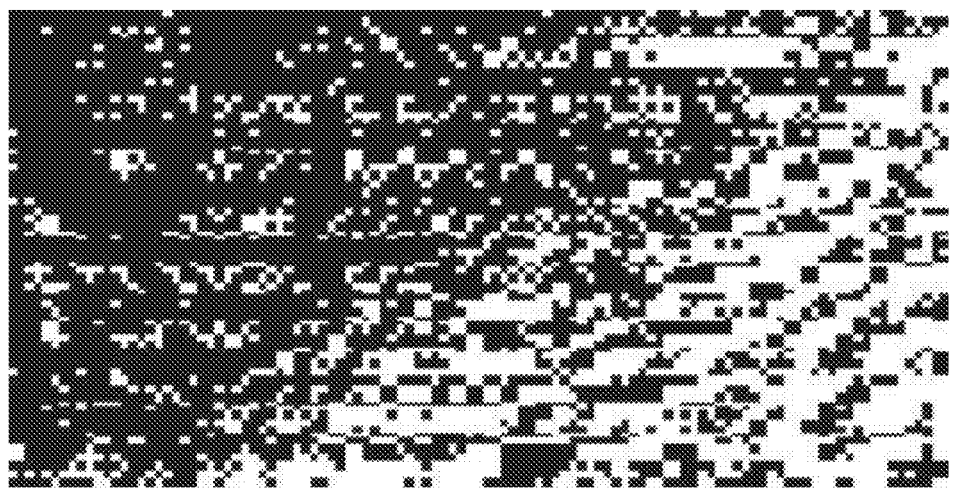
FIG. 8B shows an example half-tone pattern in accordance with certain embodiments described herein.
Figure 8C:
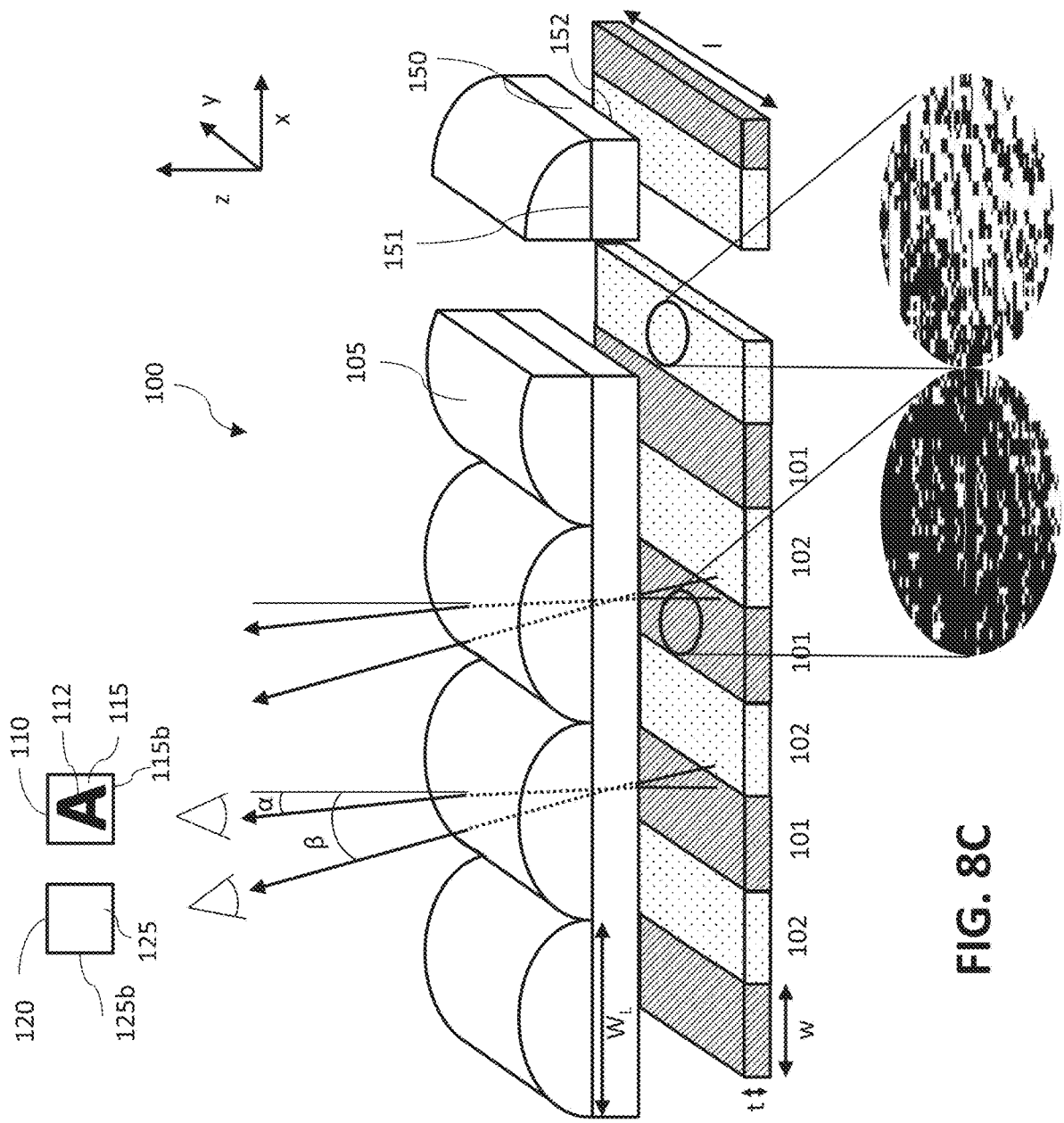
FIG. 8C schematically illustrates an example security device utilizing half-tone patterning in accordance with certain embodiments described herein.

This example embodiment was created utilizing half-tone patterning, e.g., as shown in FIG. 8B. In various embodiments, the amount of specular reflecting features can be varied by half-tone patterning and/or screening in the first segment and/or the second segment to control the brightness (or the darkness, e.g., greyness) of an image. For example, the brightness (or darkness, e.g. greyness) as perceived by a viewer of an area can be modulated by the ratio of specular reflecting features to diffusing features. For example, the brightness (or darkness, e.g. greyness) as perceived by a viewer of an area within a segment can be modulated by the ratio of the area (e.g., area of the footprint) of specular reflecting features to the area (e.g., area of the footprint) of the diffusing features. The size, number, and/or distribution of the specular reflecting features relative to the size, number, and/or distribution of the diffuse reflecting features in an area within a segment can likewise be configured to provide the level of brightness, darkness, (e.g., greyness). As discussed above, pigment, inks, or other absorptive material can be used to provide color, in which case the relative areas, size, number, and/or distribution of the specular reflecting features relative to that of the diffuse reflecting features would control the perceived brightness or darkness of the hue or color. The shape of the specular reflecting features and diffusing features, for example, the area (e.g., area of the footprint) may be square, rectangular, hexagonal, circular, or a wide variety of other shapes. Similarly the specular reflecting features and diffusing features may be packed together in a wide variety of arrangements, e.g., in a square array, triangular array, hexagonally closed packed, or in other arrangements. In FIG. 8B, the black regions can represent regions of diffusing features (or the specular reflecting features), while the white regions can represent the specular reflecting features (or the diffusing features). An un-aided eye typically cannot discern the image as a halftone image if the half-tone features are less than around 75 microns. Accordingly, in various embodiments, a minimum half-tone feature in the half-tone patterning can be less than or equal to 75 microns (e.g., less than or equal to 65 microns, less than or equal to 50 microns, less than or equal to 30 microns, less than or equal to 10 microns, etc.) and/or be in a range from 0.05 micron to 75 microns (e.g., 0.05 micron to 65 microns, 0.05 micron to 50 microns, 0.05 micron to 30 microns, 0.05 micron to 10 microns, 1 micron to 75 microns, 1 micron to 50 microns, etc.), in any range within this range, any values within these ranges, or in any ranges formed by such values. FIG. 8C schematically illustrates an example device utilizing half-tone patterning in accordance with certain embodiments described herein. The example device can be configured to present images such as those in FIG. 8A.

As described herein, the half-tone patterning shown in FIG. 8B can be used to render the two icons shown in FIG. 8A. The half-tone patterning was prepared by embossing the features (e.g., specular reflecting features 132, 332, 342 and diffusely reflective features 135, 335, 345) into a coating on substrate 150, UV curing the embossed coating, and metallizing the features. As also described herein, various embodiments using half-tone patterning can include transmissive structures (e.g., transparent features and/or diffusely transmissive features) instead of or in combination with reflective structures (e.g., specular reflecting features and/or diffusely reflective features). As described herein, transmissive structures can be prepared by removing regions of metallization by selective demetallization or laser ablation.

Figures 1, 9A:
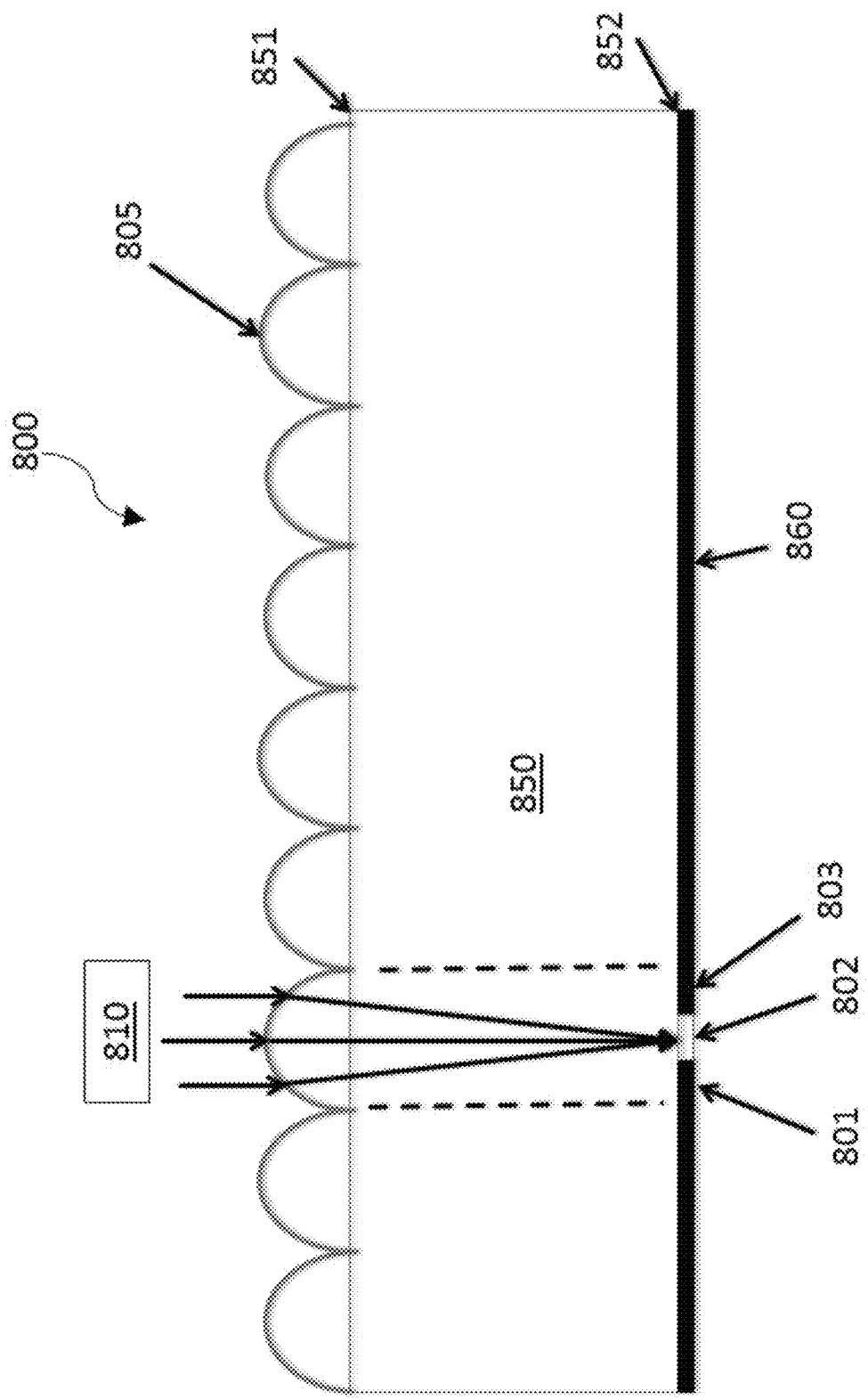
Figures 2, 9A:
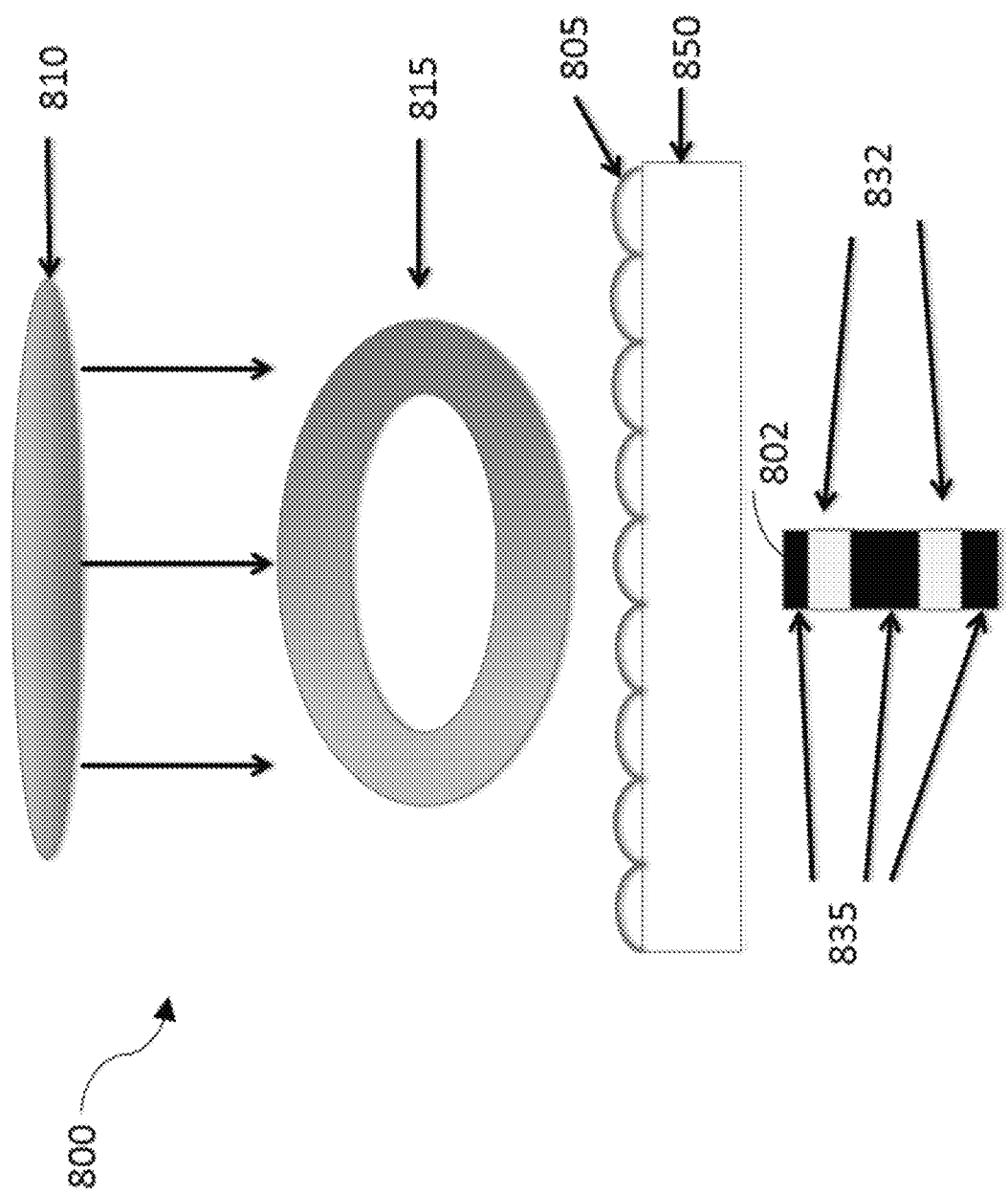
Figures 3, 9A:
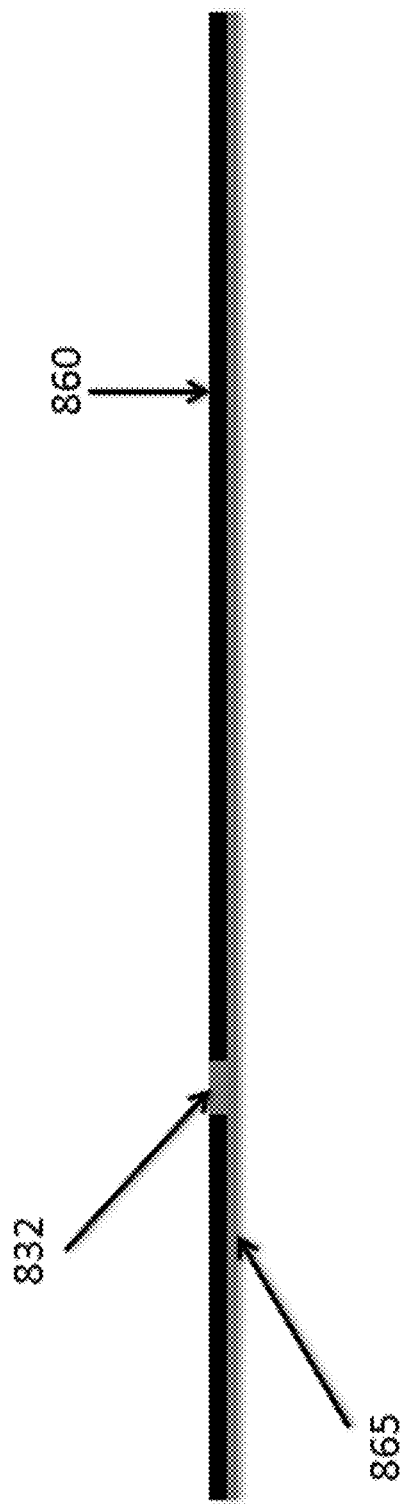

In certain embodiments, laser ablation can also be used to create one or more segments 101, 102, 301, 302 that define one or more images (e.g., one or more icons and backgrounds). FIGS. 9A-1 and 9A-2 schematically illustrate an example embodiment created using laser ablation. In FIG. 9A-1, the device 800 includes an array 805 of lenses disposed on a first side 851 of a substrate or carrier 850. An absorbing layer 860 such as an absorbing thin film (e.g., an absorbing material or a metal including any metal described herein) can be disposed on the second side 852 of the substrate 150. In various embodiments, the layer 860 can be formed into the segments such as a plurality of first 801, second 802, and third segments 803 in this example (shown only under one of the lenses for simplicity), that define one or more icons and backgrounds. In some embodiments, a laser 810 can be used to irradiate light on the absorbing layer 860 to remove portions of the absorbing layer 860 based on properties of the laser (e.g., intensity, wavelength, etc.) and/or the absorbing layer 860 (e.g., absorptive properties such as absorption wavelength, etc.). In FIG. 9A-1, the laser 810 uses the array 805 of lenses to focus light on the layer 860 to remove material in segment 802. One benefit of this technique includes registration of the array 805 of lenses with the segments 801, 802, 803. In some embodiments, the laser 810 may raster back and forth across the array 805 of lenses to create the plurality of segments under each of the lenses. In some embodiments, the layer 860 may be laser ablated prior to coupling with the array 805 of lenses and/or substrate 850.

As illustrated in FIG. 9A-2, in some embodiments, a mask 815 may be used to cover portions of the absorbing layer 860 when creating the segments. In FIG. 9A-2, segment 802 is shown with ablated areas 832 and unablated areas 835. In this example, the ablated areas 832 may define the icon, and the unablated areas 835 may define the background of an image. In various embodiments, use of a laser 810 can produce relatively sharp borders between the icon and background.

With continued reference to FIG. 9A-2, the ablated areas 832 can be transparent regions configured to transmit light from the side of the absorbing layer 860 opposite the array 805 of lenses. The unablated areas 835 can be non-transparent regions configured to absorb and/or reflect light (e.g., based at least in part on the properties of the unablated material).

In some embodiments, the unablated areas 835 can be configured to absorb visible light, and the background can appear dark (e.g., black). For example, the layer 860 may be an absorbing material such as a colored layer. In some embodiments, the unablated areas 835 can be configured to reflect light, and the background can appear shiny (e.g., when viewing in the specular direction) or dark (e.g., black when viewed off the specular direction). For example, the layer 860 may be a metal.

FIG. 9A-3 schematically illustrates an example of a second layer 865 coupled to an ablated area 832 of an example device. The second layer 865 can be disposed on the side of the ablatable layer 860 opposite the array 805 of lenses shown in FIG. 9A-1. The second layer 865 can be the underlying product (e.g., a banknote) or can be coupled to the underlying product. In some embodiments, the second layer 865 may include a window (not shown) adjacent the ablated areas 832 such that the icon can be viewed in transmission against the black or shiny appearance of the adjacent background. The window can include a transparent or transmissive layer (e.g., a transmissive coating) for protection and/or to reduce chances of duplication. In some embodiments, the second layer 865 can provide a relatively high contrasting color (e.g., a colored layer such as a colored coating) or white appearance (e.g., a white layer such as a flat white coating or a diffuse white coating) in the ablated areas 832 to define the icon against the black or shiny appearance of the adjacent background. In some embodiments, the second layer 865 can include a contrasting metal. For example, a copper coating for the second layer 865 can provide an icon that is copper in color against an adjacent background that is aluminum in color. As another example, a copper coating for the second layer 865 can provide an icon that is copper in color against an adjacent dark background from an absorbing coating (e.g., a single layer of metal such as titanium or multiple layers of material such as titanium and silicon). Other examples of materials for the second layer 865 include but are not limited to an optically variable coating (e.g., a transparent optically variable coating such as a dichroic coating), a non-transmissive reflective Fabry-Perot coating (e.g., absorber/dielectric/reflector metal), a dye (e.g., a transparent dye, a fluorescent dye, etc.), a pigment, etc. Although various embodiments described herein can include an absorbing layer 860 (e.g., an absorbing or reflective material) that can appear shiny (e.g., when viewing in the specular direction) or dark (e.g., when viewed off the specular direction) for the remaining unablated areas, other materials can be used. For example, the layer 860 can be provided with a material that appears white (e.g., a diffusing material such as provided by a kinoform diffuser) or colored. In some such embodiments, the ablated areas 832 can be provided with a layer that contrasts with the remaining unablated layer 860.

Although the ablated areas 832 are described as defining the icon and the unablated areas 835 are described as defining the background, in some embodiments, the unablated areas 835 can define the icon and the ablated areas 832 can define the background.

In some embodiments, instead of ablating an absorbing layer 860 to form segments 801, 802, 803 on the backplane of the substrate 850, laser ablation can be used to create a printing plate (e.g., a nano-printing plate). For example, the printing plate can use inks (e.g., pigments or nano-inks such as nano-sized carbon in a polymer layer) to print one or more images on other backplanes of an array 805 of lenses and/or substrates 850.

FIG. 9A-4 schematically illustrates an example device showing possible angles of observation. The example device 800 can include a first 801 plurality of segments, a second 802 plurality of segments, and a third 803 plurality of segments. The first 801 plurality of segments can define a first icon and background. The second 802 plurality of segments can define a second icon and background. The third 803 plurality of segments can define a third icon and background. The icons can be similar to each other or different from each other (e.g., same object, but in different positions, orientations, renderings, etc.). Any number of segments and/or icons can be provided. Some of the segments may define no icon. The device 800 can include any feature of any of the examples described herein and can operate similar to any of the examples provided herein (e.g., FIGS. 1A-8C). For example, at a first angle of observation (e.g., angle 1), the icon and background defined by the third 803 plurality of segments can be viewable. At the second angle of observation (e.g., angle 2), the icon and background defined by the second 802 plurality of segments can be viewable. The icon and background defined by the first 801 plurality of segments can be viewable at a third angle of observation (e.g., angle 3 not shown).

FIG. 9B schematically illustrates certain images and effects that can be presented for viewing by a security device in accordance with certain embodiments described herein. As disclosed herein, shape and/or size of the first background and second background can be the same or different from each other. FIG. 9B shows the first background 915 having a shape 915b different than the shape 925b of the second background 925. This concept can be extended for any number of levels of icons within icons. For example the shaped background 915, 925 can be considered in this case another shaped icon, albeit with the same or different surface texture. FIG. 9B shows an icon 912 within an icon 915 that switches to a different icon 922 within an icon 925.

As described herein, various embodiments can switch between an achromatic image appearing and disappearing or between a first achromatic image to a second different achromatic image. The achromatic image(s) can include features (e.g., specular reflecting and/or diffusing) that provide no diffractive or interference color. As also described herein, in some embodiments, the image(s) can include color via a tint, ink, dye, or pigment in one or more of the portions comprising specular reflective features, portions comprising diffusing features, lenses in the lens array, and/or substrate.

Figures 10A, 10B:
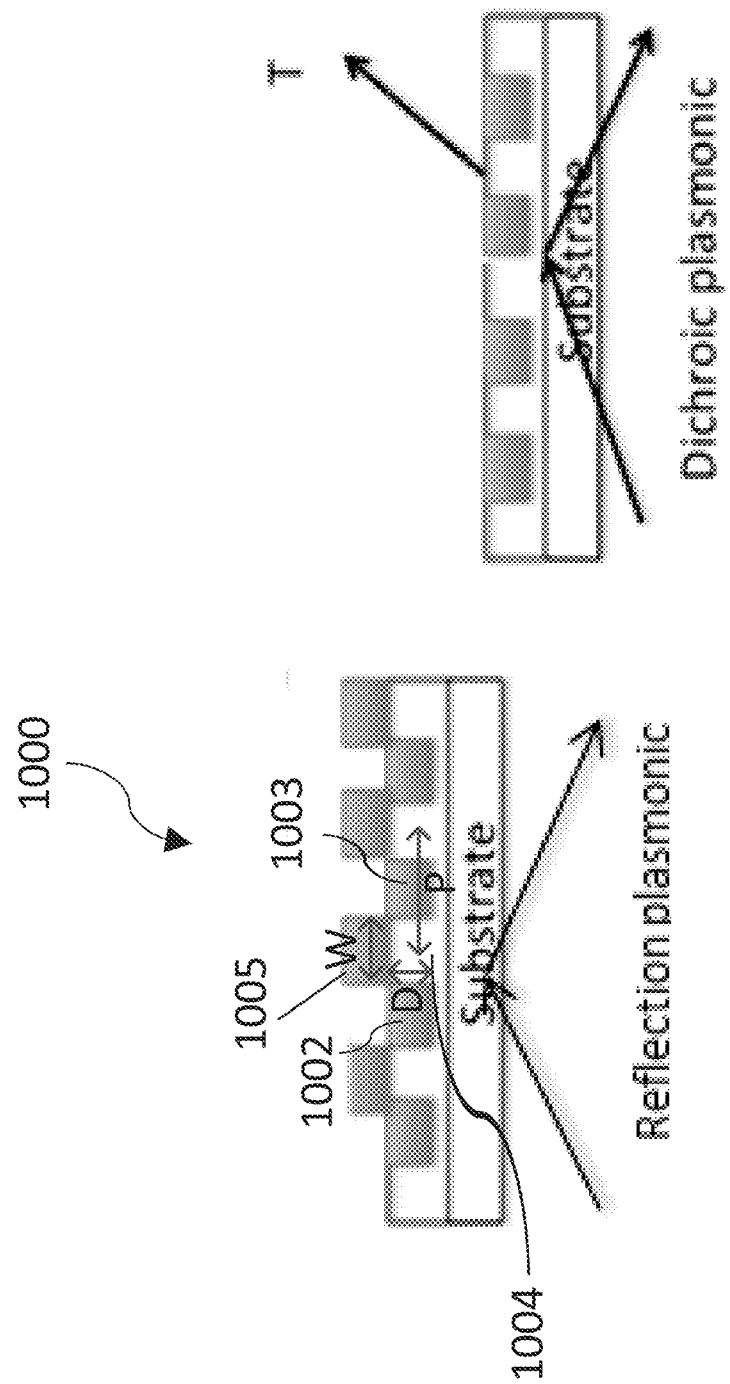
FIGS. 10A and 10B schematically illustrate example color generating structures including a plasmonic structure.

In some embodiments, color can be provided in an image (e.g., in an icon or background) by one or more color generating structures, such as microstructure and/or nanostructure configured to provide color. For example, FIG. 10A schematically illustrates an example color generating structure including a plasmonic structure 1000. The plasmonic structure 1000 can include a plurality of microfeatures and/or nanofeatures. For simplicity, the plasmonic structure 1000 will be described as having nanofeatures. In various embodiments, the plasmonic structure 1000 can include microfeatures and/or a combination of microfeatures and nanofeatures.

With reference to FIG. 10A, the plasmonic structure 1000 can include a first metal nanofeature 1002, a second metal nanofeature 1003, and a dielectric nanofeature 1004 therebetween. The first metal nanofeature 1002 and the second metal nanofeature 1003 can be made of any reflective metal, such as silver, aluminum, gold, copper, tin, combinations thereof, etc. In various embodiments, the first metal nanofeature 1002 and the second metal nanofeature 1003 can be made of the same reflective metal. The dielectric nanofeature 1004 can be made of a dielectric material. In some embodiments, the dielectric material can be a UV curable resin. Other materials are possible. As shown in FIG. 10A, the dielectric nanofeature 1004 can have a depth D, a width W, and a periodicity (e.g., pitch) P with other dielectric nanofeatures 1004. The first metal nanofeature 1002 and/or the second metal nanofeature 1003 can also have a depth, a width, and a periodicity.

Without being bound by theory, in various embodiments, light having a certain wavelength can be funneled into one or more of the first metal nanofeature 1002, the second metal nanofeature 1003, and/or the dielectric nanofeature 1004 via plasmonic resonance. For example, in some embodiments, the wavelength that is funneled can be based at least in part on one or more of the dielectric nanofeature's 1004 depth D, width W, and/or periodicity P with other dielectric nanofeatures 1004. For example, the D can be in the range of 50 nm to 300 nm, 50 nm to 275 nm, 50 nm to 250 nm, 50 nm to 200 nm, 75 nm to 300 nm, 75 nm to 250 nm, 75 nm to 200 nm, 100 nm to 300 nm, 100 nm to 250 nm, 100 nm to 200 nm, in any ranges formed by any of these ranges, in any ranges within these ranges, any values within these ranges, or in any ranges formed by such values. As another example, the P can be in the range of 50 nm to 400 nm, 50 nm to 375 nm, 50 nm to 350 nm, 50 nm to 300 nm, 75 nm to 400 nm, 75 nm to 350 nm, 100 nm to 300 nm, in any ranges formed by any of these ranges, in any ranges within these ranges, any values within these ranges, or in any ranges formed by such values. As another example, the W can be in the range of 10 nm to 200 nm, 10 nm to 175 nm, 10 nm to 150 nm, 10 nm to 100 nm, 20 nm to 200 nm, 20 nm to 150 nm, 20 nm to 100 nm, 30 nm to 200 nm, 30 nm to 150 nm, 30 nm to 100 nm, 40 nm to 200 nm, 40 nm to 150 nm, 40 nm to 100 nm, in any ranges formed by any of these ranges, in any ranges within these ranges, any values within these ranges, or in any ranges formed by such values. In certain embodiments, the D, W, and/or P can be selected to produce the desired color or colors. In some embodiments, the wavelength that is funneled can be based at least in part on one or more of the first 1002 or second 1003 metal nanofeature's depth, width, and/or periodicity. In some examples, the plasmonic structure 1000 can include a patterned structure such that the patterning can produce the desired color or colors. In various embodiments, the produced color can be independent of viewing angle.

In some embodiments, the plasmonic structure 1000 can operate as a reflective plasmonic structure. Without subscribing to any scientific theory, incident light can be reflected in some embodiments as filtered light, e.g., after absorption of the resonance wavelength. In some embodiments, the plasmonic structure 1000 can include a reflective nanofeature 1005 (or microfeature), for example, disposed over the dielectric nanofeature 1004. The reflective nanofeature 1005 can include a reflective metal as described for the first metal nanofeature 1002 and/or the second metal nanofeature 1003. In some such examples, the plasmonic structure 1000 can be configured to reflect the filtered light.

In some embodiments, the first metal nanofeature 1002, the second metal nanofeature 1003, and the reflective nanofeature 1005 can be provided by a unitary structure. In some such examples, the unitary structure can be provided by a coating, e.g., a coating over and between a plurality of dielectric nanofeatures 1004. In some instances, the coating can be a conformal coating. As another example, the unitary structure can be provided by a monolithic block of metallic material that is formed into the first metal nanofeature 1002, the second metal nanofeature 1003, and the reflective nanofeature 1005. In some other embodiments, the first metal nanofeature 1002, the second metal nanofeature 1003, and the reflective nanofeature 1005 can be provided by separate pieces.

In some embodiments as shown in FIG. 10B, the plasmonic structure 1000 can operate as a transmissive plasmonic structure. Without subscribing to any scientific theory, incident light can be reflected and/or transmitted, e.g., after absorption of the resonance wavelength. In some embodiments, the plasmonic structure 1000 may not include the reflective nanofeature 1005 over the dielectric nanofeature 1004. In some such examples, the plasmonic structure 1000 can be configured to transmit some of the filtered light. In some of these examples, the plasmonic structure 1000 can filter light in two directions. Some such embodiments can function as a dichroic plasmonic structure where the reflected light and the transmitted light may produce two different colors.

Figure 11:
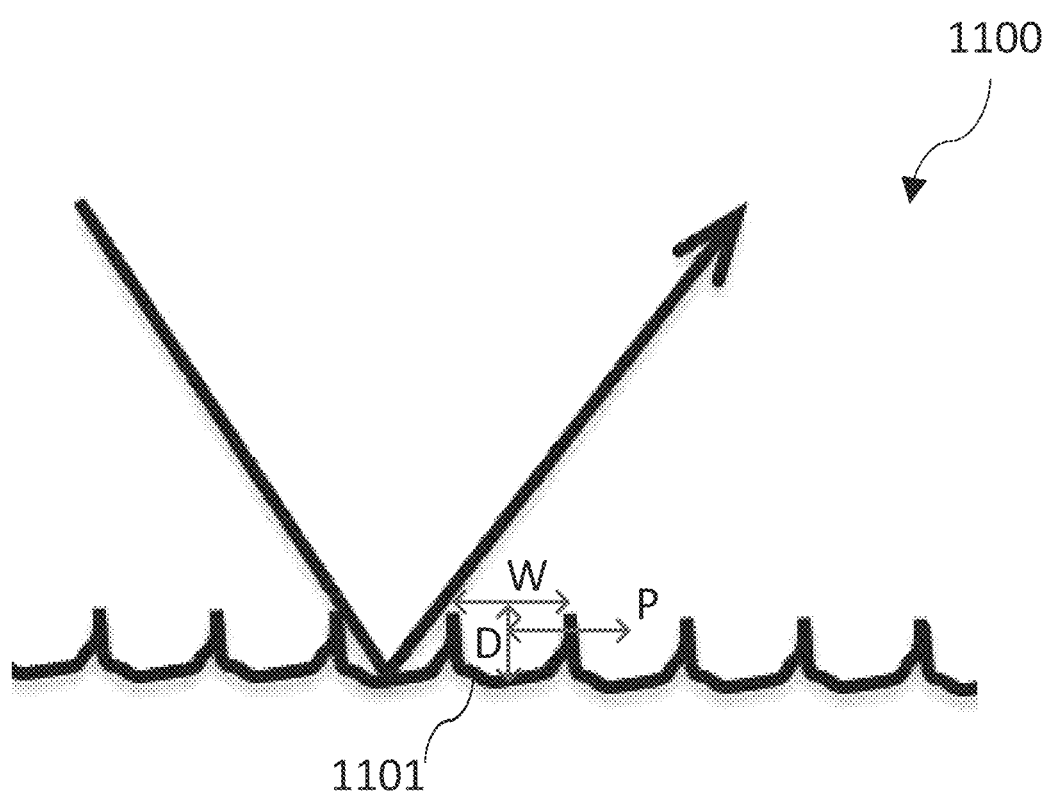
FIG. 11 schematically illustrates an example color generating structure including a reverse opal structure.

FIG. 11 schematically illustrates an example color generating structure (e.g., a microstructure and/or a nanostructure configured to provide color) including an opal structure. In some embodiments, the opal structure can include a reverse (or inverse) opal structure 1100 as shown in FIG. 11. For simplicity, the reverse opal structure 1100 will be described. However, in some embodiments, the opal structure can include a positive opal structure and/or a combination of a reverse and positive opal structure. With reference to FIG. 11, the reverse opal structure 1100 can include one or more microsurface or nanosurface relief portions 1101. For simplicity, the reverse opal structure 1100 will be described as having microsurface relief. In various embodiments, the opal structure 1100 can include nanosurface relief and/or a combination of microsurface and nanosurface relief. The microsurface relief portion 1101 can have a depth D, a width W, and a center-to-center distance and/or periodicity (e.g., pitch) P with other microsurface relief portions 1101. In some embodiments, the microsurface relief portion 1101 can be a hemisphere (or close to a hemisphere) such that 2D is substantially equal to W. However, in some embodiments, the portion of the microsurface relief might not be a hemisphere such that 2D is greater than or less than W. For example, the micro surface relief portions 1101 may be hemi-ellipsoidal or some other shape. Some embodiments can include a plurality of microsurface relief portions 1101, e.g., microsurface relief portions 1101 arranged in a 2D array. Additionally, although FIG. 11 shows a plurality of microsurface relief portions 1101 appearing to be without spacing in between the microsurface relief portions 1101, various embodiments can have spacing in between the microsurface relief portions 1101 such that P is greater than W.

In some embodiments, the reverse opal structure 1100 can be made of a dielectric material. For example, the reverse opal structure 1100 can be made of a UV curable resin. In various embodiments, the reverse opal structure 1100 can comprise a patterned microsurface relief.

Without being bound by theory, in some embodiments, the periodicity P can create a photonic bandgap, where transmission of incident light having a wavelength corresponding to the photonic bandgap is forbidden. In various embodiments, the reverse opal structure 1100 can operate as a reflective opal structure. For example, the reverse opal structure 1100 can include an opaque reflective coating on the surface of the microsurface relief portion 1101. Some example coatings can include any opaque reflective metal such as aluminum, silver, gold, copper, tin, combinations thereof, etc. Other examples are possible. In some such embodiments, the reverse opal structure 1100 can be configured to reflect the filtered light.

In some embodiments, the reverse opal structure 1100 can operate as a transmissive opal structure. For example, the reverse opal structure 1100 can include a transparent coating on the surface of the microsurface relief portion 1101. Example coatings can include a dielectric material having a relatively high index of refraction, e.g., greater than or equal to 1.8, greater than or equal to 1.9, greater than or equal to 2.0, greater than or equal to 1.8 and less than 2.5, greater than or equal to 1.8 and less than 2.75, greater than or equal to 1.8 and less than 3.0, etc. Some such examples can include zinc sulfide, titanium dioxide, indium tin oxide, combinations thereof, etc. Other examples are possible. In some such embodiments, the reverse opal structure 1100 can be configured to reflect and/or transmit the filtered light. In various embodiments, the reverse opal structure 1100 can include both reflective and transparent coatings and/or partially reflective/partially transmissive coatings. In some instances, the reverse opal structure 1100 can include a patterned metal coated with dielectric material.

Without being bound by theory, in some embodiments, the color of the filtered light can also be created by diffraction and/or Bragg diffraction and can also be based at least in part on one or more of the microsurface relief portion's depth D, width W, and/or periodicity P. For example, the D can be in the range of 0.3 microns to 0.7 microns, 0.3 microns to 0.65 microns, 0.35 microns to 0.7 microns, 0.35 microns to 0.65 microns, 0.03 microns to 0.6 microns, 0.35 microns to 0.6 microns, 0.4 microns to 0.6 microns, in any ranges formed by any of these ranges, in any ranges within these ranges, any values within these ranges, or in any ranges formed by such values. As another example, the W can be in the range of 0.5 microns to 2 microns, 0.5 microns to 1.5 microns, 0.5 microns to 1 microns, in any ranges formed by any of these ranges, in any ranges within these ranges, any values within these ranges, or in any ranges formed by such values. As another example, the P can be in the range of 0.1 microns to 0.6 microns, 0.2 microns to 0.5 microns, 0.25 microns to 0.45 microns, in any ranges formed by any of these ranges, in any ranges within these ranges, any values within these ranges, or in any ranges formed by such values. In certain embodiments, the D, W, and/or P can be selected to produce the desired color or colors. In some examples, the opal structure 1100 can include a patterned structure such that the patterning can produce the desired color or colors. In various embodiments, the produced color can be dependent on the viewing angle.

The opal structure (reverse, positive, or combination thereof) can include a plurality of aligned and/or repeating microsurface and/or nanosurface relief portions 1101. In some instances, for an additional security feature, the opal structure can include a misalignment and/or an irregularity to provide a forensic signature (e.g., an identifying mark). For example, the microsurface and/or nanosurface relief portions 1101 can be misaligned. As another example, the plurality of relief portions can include a differently sized or shaped relief portion 1101, a missing relief portion 1101, and/or other defect. In some embodiments, the misalignment and/or irregularity in the opal structure itself may not be viewable with the unaided eye, but can be viewable with an additional aid such as a white light interferometer, an atomic force microscope, a scanning electron microscope, etc. As another example, the misalignment and/or irregularity can be incorporated into a micro-image (e.g., an alphanumeric character, symbol, an art image, graphic, or an object) such that a misalignment and/or irregularity is presented in the micro-image (e.g., a crooked line, a speck of blue in orange text, etc.). In some such embodiments, the misalignment and/or irregularity in the micro-image may not be viewable with the unaided eye, but can be viewable with an additional aid such as a magnifying glass or microscope, etc. In some embodiments, the misalignment and/or irregularity in the micro-image may be viewable with the unaided/naked eye.

Various embodiments can include one or more color generating structures (e.g., microstructure and/or nanostructure configured to provide one or more colors such as a plasmonic structure, a reverse opal, a positive opal, and/or combinations thereof) under an array of lenses as described herein. For example, some embodiments including one or more color generating structures can be disposed under an array of 1D lenses as described herein. As another example, some embodiments including one or more color generating structures can be disposed under an array of 2D lenses as described herein. For example, any of the examples described herein (e.g., FIGS. 1A to 9B) can include one or more color generating structures to provide one or more colors. Also, any of the examples described herein (e.g., FIGS. 1A to 9B) can substitute one or more features (e.g., specular reflecting, transparent, diffusely reflective, and/or diffusely transmissive features) with one or more color generating structures. One or more color generating structures can be added such that color is above eye resolution (e.g., at least 100 microns or more) and viewable with the naked eye. Some such embodiments can also provide a security feature of an identifying mark (e.g., a colored dot, a colored mark, color in at least a portion of a graphic, color in at least a portion of text, etc.). Alternatively, as an additional security feature, one or more color generating structures can be added such that the color is below eye resolution (e.g., less than 100 microns) and not viewable with the naked eye, but viewable with the aid of, e.g., a magnifying glass or microscope.

As an example, with reference to FIGS. 1A and 1B, one or more color generating structures (e.g., 1000 or 1100 shown in FIGS. 10A, 10B, and 11) can be incorporated into a first segment 101*a*, 101*b*, 101*c*, and/or 101*d* to provide a color for the view 110 of the icon 112 (e.g., to at least a portion of the icon 112 and/or background 115). Additionally or alternatively, one or more color generating structures can be incorporated into a second segment 102*a*, 102*b*, 102*c*, and/or 102*d* to provide color to the view 120 without the icon 112. One or more color generating structures can be incorporated into the specular reflecting features 132 and/or diffusing features 135 of the first segments 101 and/or into the diffusing features 145 of the second segments 102. In some embodiments, one or more color generating structures can be substituted for the specular reflecting features 132 and/or the diffusing features 135 in the first segments 101 and/or for the diffusing features 145 of the second segments 102.

As another example, with reference to FIGS. 3A and 3B, one or more color generating structures can be incorporated into a first segment 301*a*, 301*b*, 301*c*, and/or 301*d* to provide a color for the first image 310 (e.g., to at least a portion of the icon 312 and/or background 315). Additionally or alternatively, one or more color generating structures can be incorporated into a second segment 302*a*, 302*b*, 302*c*, and/or 302*d* to provide color to the second image 320 (e.g., to at least a portion of the icon 322 and/or background 325). One or more color generating structures can be incorporated into the specular reflecting features 332 and/or diffusing features 335 of the first segments 301 and/or into the specular reflecting features 342 and/or diffusing features 345 of the second segments 302. In some embodiments, one or more color generating structures can be substituted for the specular reflecting features 332 and/or the diffusing features 335 in the first segments 301 and/or for the specular reflecting features 342 and/or diffusing features 345 of the second segments 302.

As another example, with reference to FIG. 5C, one or more color generating structures can be incorporated into or substituted for the first surface texture 551, the second surface texture 552, and/or the third surface texture 553 to provide a color to at least a portion of the icon and/or background of the security device 550.

As another example, with reference to FIG. 8A, one or more color generating structures can be incorporated into one or more engraving like images. One or more color generating structures can be incorporated into a region disposed under the array of lenses. For example, when incorporated into a region disposed under the array of lenses, color can be incorporated into at least a part of one of the switching icons or backgrounds. With reference to FIGS. 8B and 8C, one or more color generating structures can be incorporated into or substituted for some or all of the half-tone features (e.g., specular reflecting and/or diffuse features). In some embodiments, one or more color generating structures can be incorporated into a region other than those disposed under the lenses. For example, when incorporated into a region other than those disposed under the lenses, color can be incorporated outside of the switching icons or backgrounds.

In various embodiments, achromatic images (e.g., black, white, greys, etc.) can be provided by specular reflecting and diffusing features. In some embodiments, one or more color generating structures can be configured to provide different colors in the image(s) viewed by the viewer. For example, the color generating structures can provide the primary colors and/or secondary colors (e.g., red, green, blue or cyan, yellow, and magenta). In some embodiments, the different colors may combine to produce a different color or a single color as perceived by the naked eye. For example, the primary colors may in some instances combine to form secondary colors. The primary colors may in some instances also combine to form an achromatic appearance. For example, red, green, and blue or cyan, yellow, and magenta may combine to form an achromatic white appearance. By incorporation of color generating structures with specular reflecting and diffusing features, a sharp full color image and/or a natural tone image can be presented. Some embodiments can be configured to provide the true color of an object. For example, some embodiments can be configured to provide a rendition of an object's natural color, e.g., through an icon or image. In some instances, the icon or image can include a range of hues, such as more than 5 hues, more than 10 hues, more than 15 hues, more than 20 hues, or any ranges formed by such values, etc.

Figure 12:
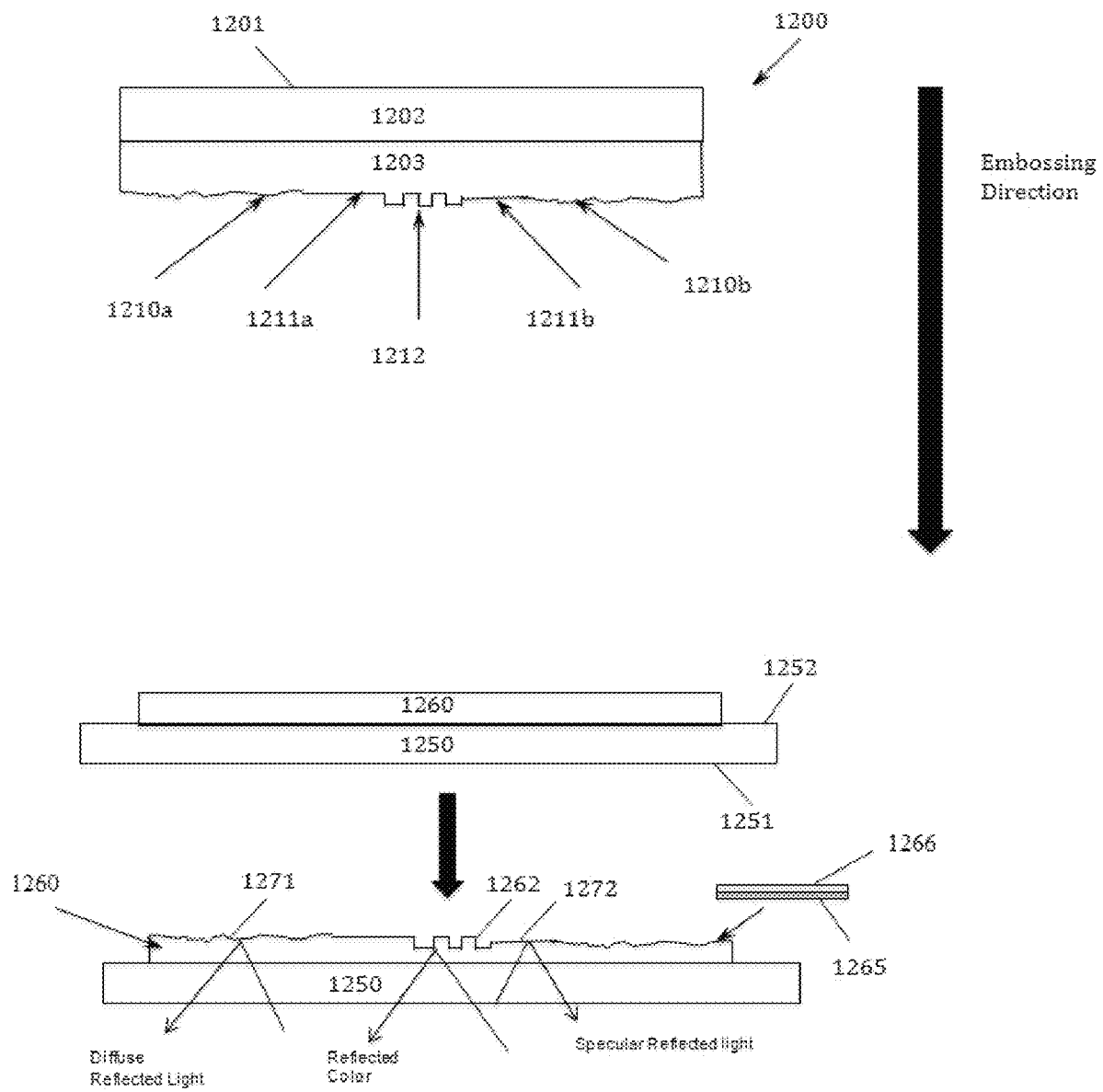
FIG. 12 schematically illustrates an example method of forming various color generating structures described herein.

FIG. 12 schematically illustrates an example method of forming various color generating structures described herein. The method 1200 can be similar to and/or compatible with the embossing method used to form various features (e.g., diffusing and/or specular reflecting features) as described herein. For example, the method 1200 can include forming an embossing tool 1201 such as one comprising a metal 1202 such as steel or aluminum. A master shim 1203 can be formed using an electron beam, lithographic technique, or etching. Daughter shims can be created from the master shim 1203. In some embodiments, the master shim 1203 can be formed in nickel, which can be attached to the metal 1202. Since the method 1200 can be similar to and/or compatible with the embossing method used to form various features (e.g., diffusing and/or specular reflecting features) described herein, FIG. 12 illustrates various features (e.g., diffusing features 1210a, 1210b and/or specular reflecting features 1211a, 1211b) and color generating structures 1212 (e.g., a plasmonic structure, a positive opal structure, and/or a reverse opal structure) that can be formed into the master shim 1203. Advantageously, one or more color generating structures can be formed simultaneously with one or more other color generating structures and/or one or more other features (e.g., diffusing and/or specular reflecting features) described herein. In some embodiments, one or more color generating structures can be formed sequentially (e.g., before or after) with one or more other color generating structures and/or one or more other features. Some embodiments may form only one of the color generating structures, while other embodiments may form more than one or all of the shown features and/or color generating structures.

As shown in FIG. 12, a substrate or carrier 1250 can be provided. The substrate 1250 can be embossed or can provide support for a layer of material 1260 which can be embossed by the embossing tool 1201 to form one or more of the actual color generating structures 1262. In some instances, heat embossing can be used to emboss a heat embossable polymer (e.g., polyvinyl chloride) substrate 1250 or a heat embossable polymer 1260 disposed on the substrate 1250. In some embodiments, the substrate 1250 or a layer of material 1260 can comprise a UV curable resin. In some such embodiments, UV light can be applied during the embossing operation to cure the resin. In some embodiments, the thickness of the UV cured resin 1260 disposed on a substrate can be in a range from 1 to 15 microns, 1 to 12.5 microns, 1 to 10 microns, 2 to 15 microns, 2 to 12.5 microns, 2 to 10 microns, 1 to 7 microns, 2 to 7 microns, 2 to 5 microns, in any ranges within these ranges, in any ranges formed by any of these ranges, any values within any of these ranges, in any ranges formed by such values, etc.

The substrate 1250 can be similar to the substrate described herein (e.g., substrate 150 in FIG. 1A). For example, the substrate 1250 can include a polymer substrate such as polyethylene terephthalate (PET) or oriented polypropylene (OPP), etc. The substrate 1250 can have a thickness that can be in the range from 10 microns to 300 microns, from 10 microns, to 250 microns, from 10 microns to 200 microns, from 10 microns to 150 microns, from 10 microns to 100 microns, from 10 microns to 20 microns, in any ranges formed by any of these ranges, in any ranges within these ranges, any values within these ranges (e.g., 12.5 microns, 25 microns, 37.5 microns, 40 microns, 45 microns, 50 microns, 80 microns, 100 microns, etc.), or in any ranges formed by such values.

Similar to FIG. 1A, the array of lenses (not shown), such as the 1D lens array in FIG. 1C-1 or the 2D lens array in FIG. 1C-2, can be disposed on a first side 1251 of a substrate 1250. The array of lenses can be disposed on a first side 1251 of the substrate 1250 before one or more color generating structures 1262 are formed in the layer of material 1260. For example, the lenses can be disposed on a first side 1251 of the substrate 1250 before forming the color generating structure 1262. In some embodiments, the array of lenses can be disposed on a first side 1251 of the substrate 1250 after one or more color generating structures 1262 are formed in the layer of material 1260. In FIG. 12, the layer of material 1260 is disposed on a second side 1252 of the substrate 1250 opposite the first side 1251. In some such embodiments, the array of lenses can be disposed on the first side 1251 or the second side 1252 of the substrate after one or more of the actual color generating structures are formed.

After the layer of material 1260 is embossed, for a reflective reverse opal, the material 1260 can be coated with a coating 1265 comprising a reflective metal (e.g., coated with an opaque reflective metal such as aluminum, silver, gold, tin, etc.), while for a transmissive reverse opal, the material 1260 can be coated with a coating 1265 comprising a transparent (or at least partially transmissive) dielectric material having a relative high index of refraction as described herein (e.g., zinc sulfide, titanium dioxide, indium tin oxide, etc.). For a reflective plasmonic structure, the material 1260 can be coated with a coating 1265 comprising a reflective metal (e.g., coated with an opaque reflective metal such as silver, gold, aluminum, copper, tin, etc.). In various embodiments, coating the embossed layer can comprise vacuum or evaporation coating. In some instances, since metal can be susceptible to corrosion, the coating 1265 comprising a reflective metal can be provided with a protective coating 1266 (e.g., a layer of dielectric material or other metal such as aluminum). In a transmissive plasmonic structure, any deposited reflective layer between the metal layers can be removed. In some such embodiments, some of the deposited metal may be lift-off or ion scrubbed at an angle. As shown in FIG. 12, the color generating structure 1262 (e.g., to reflect colored light) can be incorporated with one or more diffusing features 1271 (e.g., to reflect diffuse light) and/or one or more specular reflecting features 1272 (e.g., to reflect specular light)

Figure 13A:
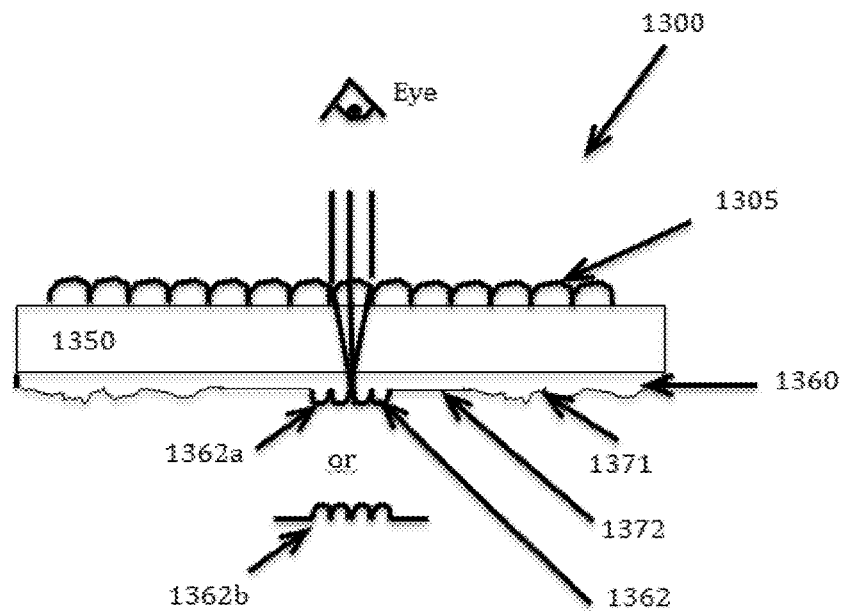
FIGS. 13A and 13B schematically illustrate example devices in accordance with certain embodiments described herein.

FIG. 13A schematically illustrates an example device in accordance with certain embodiments described herein. The device 1300 can include an array 1305 of lenses as described herein. For example, the array of lenses can include a UV cured resin in some embodiments. The array 1305 of lenses can be a 1D lens array or a 2D array of lenses as described herein. As described herein, each lens can have a diameter (or $W_L$ along the x-axis for a lenticular lens array) from 5 microns to 200 microns (such as from 10 microns to 150 microns, from 15 microns to 100 microns, etc.). The dimensions can depend on the application of use. For example, for a security device on currency, each lens can have a diameter from 5 microns to 20 microns (e.g., 5 microns, 10 microns, 15 microns, etc.).

Figure 13B:
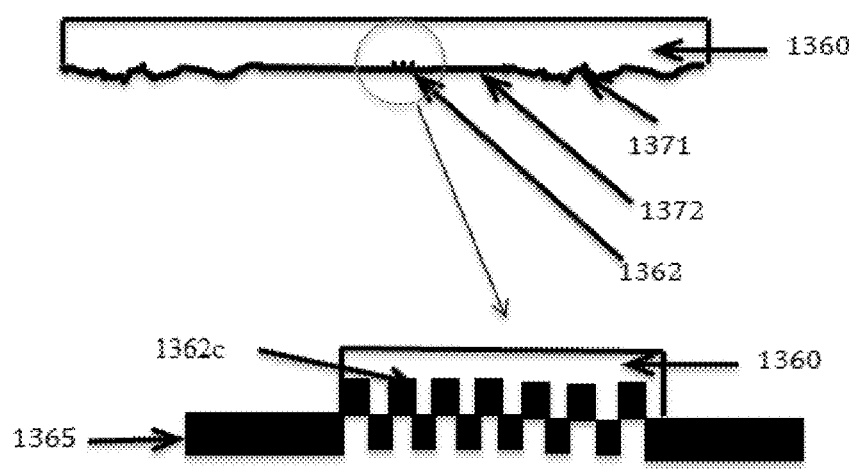

As also described herein, the lenses can be disposed on a first side 1351 of a substrate 1350. In some embodiments, the thickness of the substrate 1350 can be based at least on part on the lens diameter in the array of lenses. For example, in some instances, a lens having a diameter of 15 microns can be disposed on a substrate having a thickness of 15 micron (e.g., so the image plane can be in focus). Likewise, a lens having a diameter of 80 microns can be disposed on a substrate having a thickness of 80 microns. One or more color generating structures 1362 (such as a reverse opal structure 1362a, a positive opal structure 1362b, or a combination thereof) can be disposed on a second side 1352 of the substrate 1350. For example, the one or more color generating structures 1362 can be formed in the UV curable resin 1360. In various embodiments, one or more color generating structures 1362 can include a reverse opal structure 1362a or a positive opal surface 1362b. As described herein, some embodiments of the opal structure 1362 can include a coating (e.g., reflective, transparent, or partially reflective/partially transmissive). As also described herein, various embodiments can include one or more color generating structures 1362 incorporated with one or more diffusing features 1371 and/or one or more specular reflecting features 1372. As shown in FIG. 13B, one or more color generating structures 1362 can include a plasmonic structure 1362c. As described herein, the plasmonic structure 1362c can be surface coated with an opaque reflective material 1365 such as silver, followed by a protective coating of a dielectric material (e.g., silicon dioxide) or aluminum. FIGS. 13A and 13B are not drawn to scale. For example, in many embodiments, the size of the opal structure 1362*a* or 1362*b* and/or of the plasmonic structure 1362*c* can be much smaller than the size of the lenses 1305. Although various examples herein incorporating color generating structures are described with respect to reflective features (e.g., specular reflecting and/or diffusely reflective features), one or more of the reflective structures can be substituted or combined with one or more transmissive features (e.g., transparent and/or diffusely transmissive features).

In various embodiments, after the device is formed, various embodiments can be incorporated into a banknote as described herein. The security device can be configured to provide authenticity verification on an item of security (e.g., currency, a credit card, a debit card, a passport, a driver's license, an identification card, a document, a tamper evident container or packaging, or a bottle of pharmaceuticals). The security device can be a security thread, a hot stamp feature, an embedded feature, a windowed feature, or a laminated feature.

In some embodiments, one or more colors produced by a corresponding lens in the array of lenses can be resolved by an unaided eye. However, for added security, in some embodiments, at least one color can be added at a covert level. For example, one or more color generating structures can be added such that the color is below eye resolution (e.g., less than 100 microns) and not viewable without aid of a magnifying glass or a microscope. As another example, one or more color generating structures can be added such that the colored symbol (e.g., text, number, graphic, etc.) is not resolvable without an additional aid.

Figure 14A:
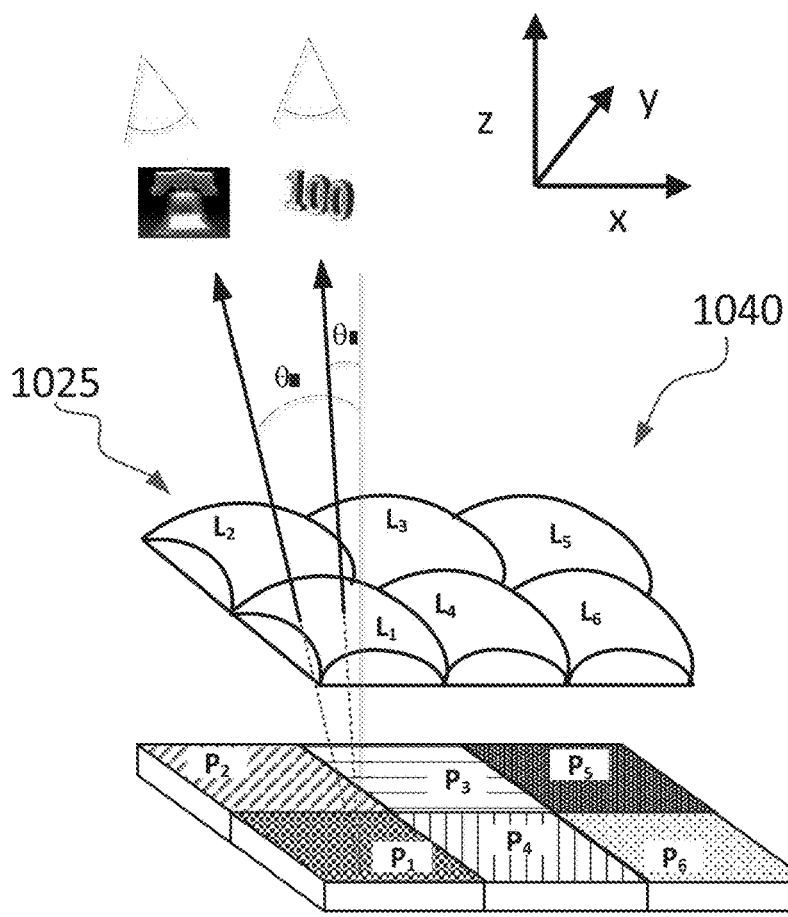
FIG. 14A schematically illustrates an isometric view of an example security device including a 2D lens array disposed over a plurality of portions having optical features as described herein. The device can be configured to present different distinct images when viewed from different directions.

As described herein, a 2D lens array as shown in FIG. 1C-2 can be incorporated in various embodiments described herein to present images/icons with or without color. FIG. 14A schematically illustrates an isometric view of an example security device 1040 including a 2D lens array 1025 comprising lens elements $L_1$, $L_2$, $L_3$, $L_4$, $L_5$ and $L_6$ disposed over a plurality of portions $P_1$, $P_2$, $P_3$, $P_4$, $P_5$ and $P_6$ having optical features as described herein. The device 1040 can be configured to present different distinct images/icons (e.g., a liberty bell and a number 100) when viewed from different directions. For example, as discussed above, at a first viewing angle, the device 1040 can present an icon for viewing and at a second viewing angle the device 1040 does not present the icon for viewing. Although FIG. 14A illustrates an example device 1040 configured to present an optical effect of switching between different icons/images at different viewing angles (e.g., a bell and the number 100), some embodiments, may be configured to present an optical effect of a non-switching plurality of icons/images (e.g., a 2D array of icons/images such as a 2D array of bells, a 2D array of the number 100, or a 2D array of different icons). Some embodiments may be configured to present an optical effect of icons/images (e.g., a 2D array of icons/images) that may appear and disappear at different viewing angles. As another example, some embodiments may be configured to present an optical effect of icons/images (e.g., a 2D array of icons/images) that may appear to transition between reflecting and diffusing.

With continued reference to FIG. 14A, in various embodiments discussed herein, the features included in each of the plurality of portions $P_1$, $P_2$, $P_3$, $P_4$, $P_5$ and $P_6$ can be configured to produce halftone images. As discussed herein, in some embodiments, each of the plurality of portions $P_1$, $P_2$, $P_3$, $P_4$, $P_5$ and $P_6$ can comprise a plurality of features that are configured to produce a plurality of distinct images/icons. For example, each of the plurality of portions $P_1$, $P_2$, $P_3$, $P_4$, $P_5$ and $P_6$ can comprise a first set of features that are configured to produce a first image/icon and a second set of features that are configured to produce a second image/icon distinct from the first image/icon. As another example, the plurality of portions $P_1$, $P_2$, $P_3$, $P_4$, $P_5$ and $P_6$ can comprise specular reflecting (or transparent) features and diffusing (e.g., diffusely reflective or diffusely transmissive) features. The specular reflecting features can define one of the icon or the background. The diffusing features can define the background when the specular reflecting features define the icon. The diffusing features can define the icon when the specular reflecting features define the background. As described herein, other combinations of specular reflecting, transparent, diffusely reflective, and/or diffusely transmissive features are possible. In some embodiments, each of the plurality of portions $P_1$, $P_2$, $P_3$, $P_4$, $P_5$ and $P_6$ is configured to produce a replica of the distinct images/icons individually. In such embodiments, the 2D lens array can be configured to produce distinct image/icons based on the distinct images/icons produced by each of the plurality of portions $P_1$, $P_2$, $P_3$, $P_4$, $P_5$ and $P_6$ individually. For example, each lens element of the 2D lens array can be configured to bring into focus different aspects of the distinct image/icons produced by the respective portion over which that lens element is disposed. In this manner a magnified version of the distinct images/icons can be produced using the lens array. In various embodiments, any of or any combination of the size and shape of the portions $P_1$, $P_2$, $P_3$, $P_4$, $P_5$ and $P_6$ and/or the location of the icons in the portions can be the same. In some embodiments, for example, the plurality of portions $P_1$, $P_2$, $P_3$, $P_4$, $P_5$ and $P_6$ can be replicas of each other.

In FIG. 14A, the plurality of portions $P_1$, $P_2$, $P_3$, $P_4$, $P_5$ and $P_6$ are depicted as having approximately the same size. However, in various embodiments, the portions $P_1$, $P_2$, $P_3$, $P_4$, $P_5$ and $P_6$ need not have the same size and/or shape. The portions $P_1$, $P_2$, $P_3$, $P_4$, $P_5$ and $P_6$ need not be ordered or regularly arranged identically sized rows and columns. Irrespective of whether the size and the shape of each of the plurality of portions $P_1$, $P_2$, $P_3$, $P_4$, $P_5$ and $P_6$ are the same, the different portions $P_1$, $P_2$, $P_3$, $P_4$, $P_5$ and $P_6$ can be configured to produce the same set of images/icons.

The size of each lens element of the 2D lens array 1025 can be matched to the size of the portion over which it is disposed such that each of the plurality of portions has a corresponding lens element disposed over it. In such embodiments, there is a one-to-one correspondence between the number of lens elements of the 2D lens array 1025 and the number of the portions. The curvature of each lens element of the 2D lens array can be configured to produce different optical effects and/or provide different amounts of magnification. Although, in FIG. 14A, the size of the individual lens elements of the 2D lens array is depicted as having approximately the same size, in other embodiments, the size of the individual lens elements of the 2D lens array can vary. In FIG. 14A, the individual lens elements of the 2D lens array are depicted as spherical lens elements that are in contact with the neighboring lens elements such that the distance between the centers of neighboring lens elements (also referred to as for example pitch) is equal to the diameter of the spherical lens element. However, in other embodiments, each lens element of the 2D lens array can be spaced apart from a neighboring lens element by a gap such that the distance between the centers of neighboring lens elements is greater than the diameter of the lens element. In various embodiments, the 2D lens array can be a regular array in which the distance between the centers of neighboring lens elements is constant across the array. However in other embodiments, the distance between the centers of neighboring lens elements can vary across the lens array.

Figure 14B:
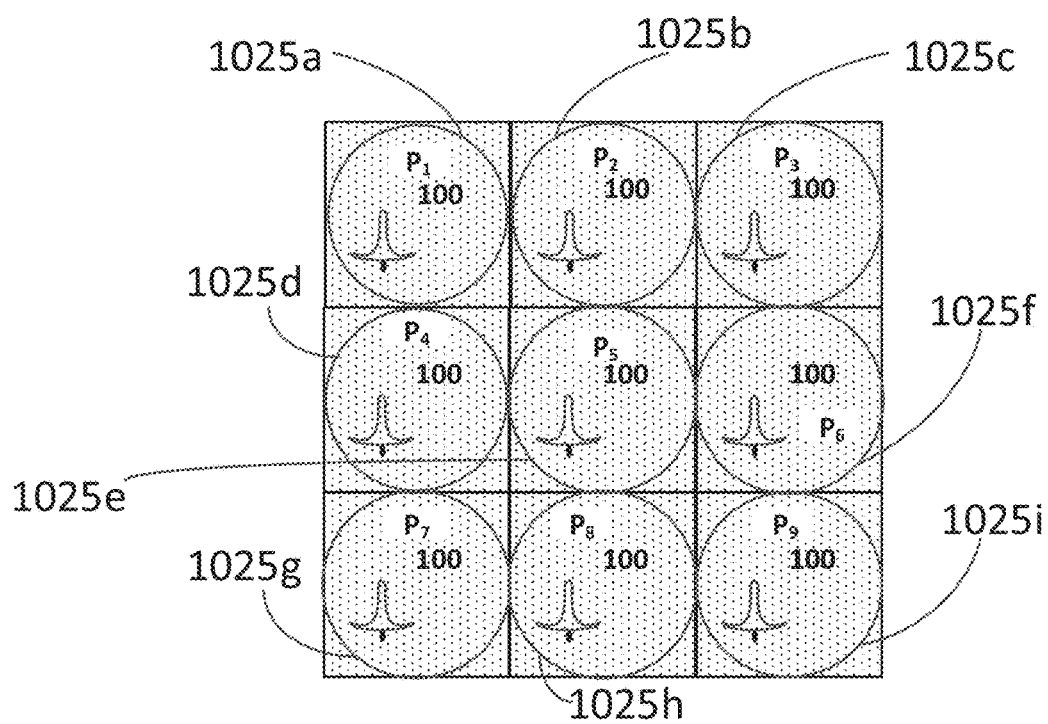
FIGS. 14B, 14C, 14D, 14E, 14F, 14G, and 14H show top views of example security devices including a 2D lens array disposed over a plurality of portions having optical features as described herein.

The lens elements of the 2D lens array 1025 can be aligned with respect to the plurality of portions $P_1$, $P_2$, $P_3$, $P_4$, $P_5$ and $P_6$ such that each lens element of the 2D lens array is registered with a respective portion. For example, the center of each lens element of the 2D lens array 1025 can coincide with the center of a respective portion over which it is disposed. FIG. 14B illustrates a top view of an example security device including a 2D lens array 1025 having lens elements 1025a, 1025b, 1025c, 1025d, 1025e, 1025f, 1025g, 1025h and 1025i that are registered with a portion $P_1$, $P_2$, $P_3$, $P_4$, $P_5$, $P_6$, $P_7$, $P_8$, and $P_9$ respectively such that the center of each lens element 1025a, 1025b, 1025c, 1025d, 1025e, 1025f, 1025g, 1025h and 1025i coincides with the center of the respective portion $P_1$, $P_2$, $P_3$, $P_4$, $P_5$, $P_6$, $P_7$, $P_8$, and $P_9$. In the device illustrated in FIG. 14B, each portion $P_1$, $P_2$, $P_3$, $P_4$, $P_5$, $P_6$, $P_7$, $P_8$, and $P_9$ has optical features that are configured to produce two distinct images/icons (e.g., a bell and the number 100). Other examples may include a non-switching 2D array of images/icons (e.g., a 2D array of bells, a 2D array of the number 100, or a 2D array of different icons).

In FIG. 14B, the arrangement of features that are configured to produce two distinct images/icons (e.g., a bell and the number 100) is the same in each of the plurality of portions $P_1$, $P_2$, $P_3$, $P_4$, $P_5$, $P_6$, $P_7$, $P_8$, and $P_9$ such that similar regions of the lens elements 1025a, 1025b, 1025c, 1025d, 1025e, 1025f, 1025g, 1025h and 1025i are disposed over similar regions of the two distinct images/icons and/or the icons in the plurality of portions $P_1$, $P_2$, $P_3$, $P_4$, $P_5$, $P_6$, $P_7$, $P_8$, and $P_9$ are disposed under similar regions of the lens.

Figure 14C:
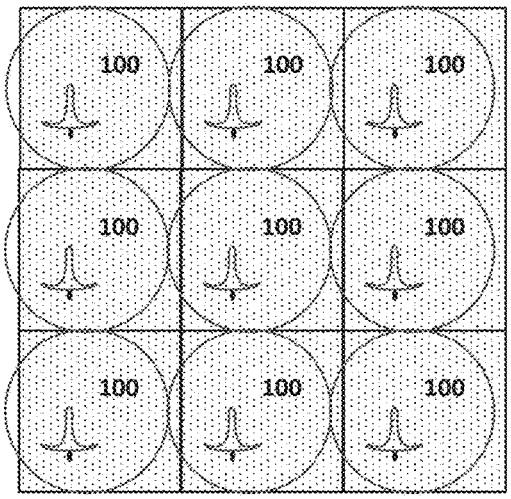

However, in various embodiments, lens elements need not be registered with respect to the plurality of portions. For example, as shown in FIG. 14C, the centers of the lens elements can be laterally shifted with respect to the centers of the corresponding portions. In such embodiments, the icons may appear to move when the device is tilted such that it is viewed from different directions. Although, the centers of the lens elements in FIG. 14C are depicted as being shifted laterally along the horizontal direction, in other embodiments, the centers of the lens elements can be shifted laterally along the vertical direction.

Figure 14D:
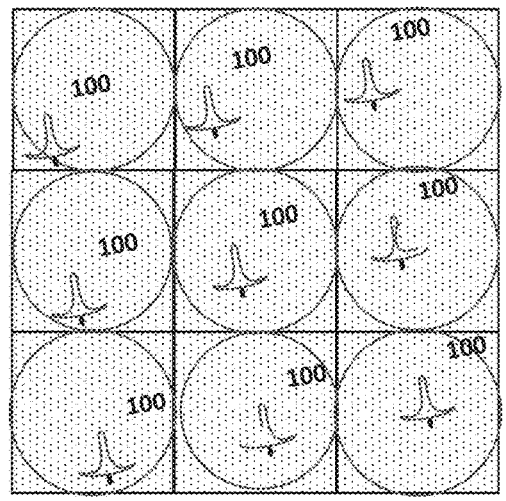
Figure 14E:
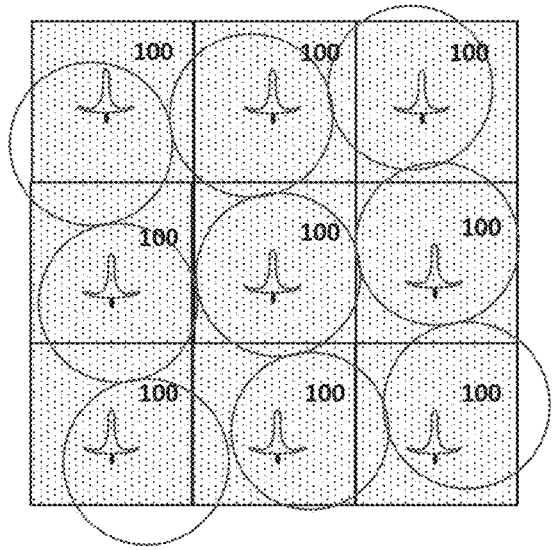
Figure 14F:
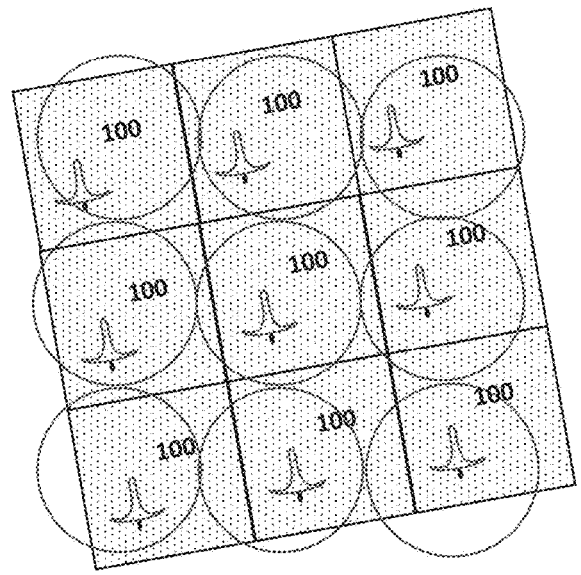

In FIG. 14D, the features in each of the plurality of portions $P_1$, $P_2$, $P_3$, $P_4$, $P_5$, $P_6$, $P_7$, $P_8$, and $P_9$ that are configured to produce two distinct images/icons (e.g., a bell and the number 100) are arranged such that the two distinct images/icons are produced in different spatial regions in each of the plurality of portions $P_1$, $P_2$, $P_3$, $P_4$, $P_5$, $P_6$, $P_7$, $P_8$, and $P_9$. Thus, although the individual lens elements of the 2D lens array are registered with a corresponding portion, the icons of the different portions $P_1$, $P_2$, $P_3$, $P_4$, $P_5$, $P_6$, $P_7$, $P_8$, and $P_9$ are not in the same position with respect to the center of the lens. Without any loss of generality, the plurality of portions $P_1$, $P_2$, $P_3$, $P_4$, $P_5$, $P_6$, $P_7$, $P_8$, and $P_9$ can be considered to form a 2D array of images that extends along horizontal and vertical directions. As discussed herein, the array of images can be a regular array having a period (referred to herein as an image period) corresponding to the distance between consecutive images. The 2D array of lenses can also extend along horizontal and vertical directions. In various embodiments, the lens period of the 2D lens array corresponding to the distance between consecutive lens elements can be equal to the image period (e.g., as shown in FIG. 14B), greater than the image period or lesser than the image period. When the lens period is greater than the image period, the image/icon can appear beyond the image plane. When the lens period is lesser than the image period, the image/icon can appear in front of the image plane. In various embodiments, the horizontal and vertical directions of the lens array can be aligned with the horizontal and vertical directions of the image array (as depicted in FIG. 14B) such that each lens element of the 2D lens array is registered (or aligned) with each element of the image array. However, in some other embodiments, the horizontal and vertical directions along which the lens array extends can be rotated with respect to the horizontal and vertical directions along which the image array extends such that the lens array is rotated with respect to the image array as depicted in FIG. 14E. For example, the lens array can be rotated by an amount less than or equal to 15 degrees with respect to the image array. By rotating the lens array with respect to the image array, the image/icon can be configured to move in a perpendicular direction relative to the tilt direction with respect to the observer as the viewing angle is changed. In such embodiments, the lens period can be considered to be rotated with respect to the image period. A similar effect can be obtained by rotating the horizontal and vertical directions along which the image array extends with respect to the horizontal and vertical directions along which the lens array extends as shown in FIG. 14F.

The 2D lens array disposed over a 2D image array can produce many different optical effects. For example, the different images/icons can appear to move laterally as the optical device is tilted. As another example, each of the plurality of portions can be configured to produce a first version of an image/icon having a first size and a second version of the image/icon having a second size. As the optical device is tilted, the image/icon can appear to change size without changing their shape. The different images/icons can appear to form puzzle pieces that intersect and/or move away from each other as the optical device is tilted. The different images/icons can appear to change optical density as the optical device is tilted. In some embodiments, each of the plurality of portions can be configured to produce a first version of an image/icon that is reflective (such that it appears bright) and a second version of the image/icon that is diffusive. As the optical device is tilted, the image/icon can appear to change from a reflective state to a diffusive state or vice-versa while maintaining the same shape. In some embodiments, each of the plurality of portions can be configured to produce a first version of an image/icon having a first orientation and a second version of the image/icon having a second orientation. The orientation of the image/icon can appear to change as the device is tilted. The different images/icons may appear to come closer together or move away from each other as the optical device is tilted. The different images/icons may appear to move in opposite directions laterally as the optical device is tilted. The different images/icons may appear to change from one symbol to another, from one number to another, from one geometric figure to another, from one logo to another, or from one pictorial representation to another as the optical device is tilted.

Figure 14G:
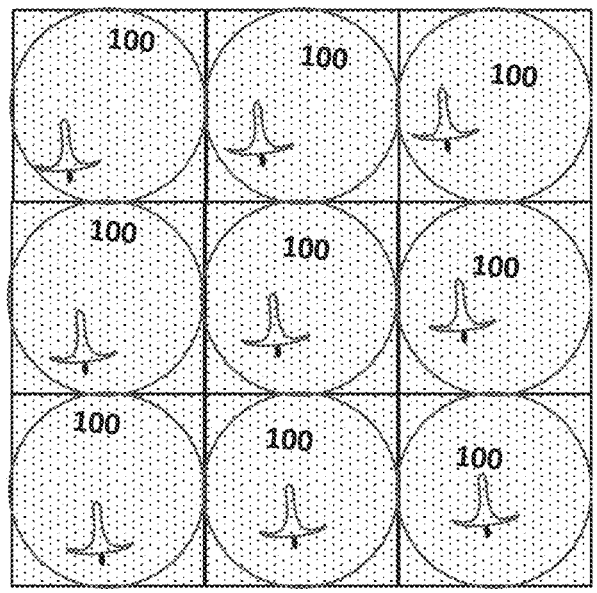

FIG. 14G illustrates a top view of security device comprising a lens array disposed over an image array. The image array includes portions comprising optical features that are configured to produce distinct icons (e.g., a bell and a text 100). The features of the image array that produce the first icon (e.g., a bell) are rotated along a first direction (e.g., counter clock-wise) with respect to the centers of the lenses of the lens array and the features of the image array that produce the second icon (e.g., text 100) are rotated along a second opposite direction (e.g., clock-wise) with respect to the centers of the lenses of the lens array. When the device is tilted then the first icon (e.g., a bell) and the second icon (e.g., text 100) can appear to move in different directions.

Figure 14H:
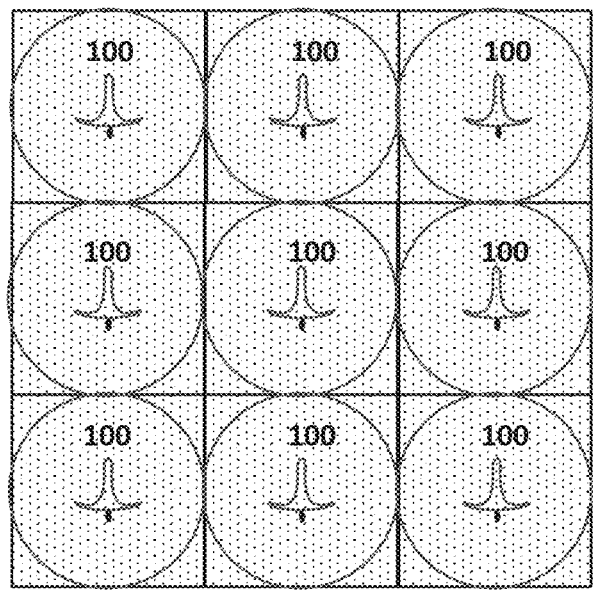

FIG. 14H illustrates a top view of security device comprising a lens array disposed over an image array. The image array includes portions comprising optical features that are configured to produce distinct icons (e.g., a bell and a text 100). The features of the image array that produce the first icon (e.g., a bell) are disposed such that they coincide with respect to the centers of the lenses of the lens array. Accordingly, the pitch of the first icons in the image (or the distance between adjacent first icons) is substantially equal to the pitch of the lens array. The pitch of the second icons in the image array can be different from the pitch of the lens array. For example, the pitch of the second icons can be from about 0.25% to about 1%, from about 0.25% to about 10%, from about 0.25% to about 15%, from about 0.25% to about 20%, or between about 1%-20% greater than or lesser than the pitch of the lens array. When the device is tilted then the second icon (e.g., text 100) can appear to move away from or closer to the first icon. Many such optical effects can be created by varying the registration of the image array and/or icons of the image array with respect to the centers of the lenses in the lens array. For example, in some embodiments, some of the images/icons produced by the features of the plurality of portions can appear to be at the surface of the device while some other images/icons produced by the features of the plurality of portions can appear to float above or below the surface of the device.

Figure 15:
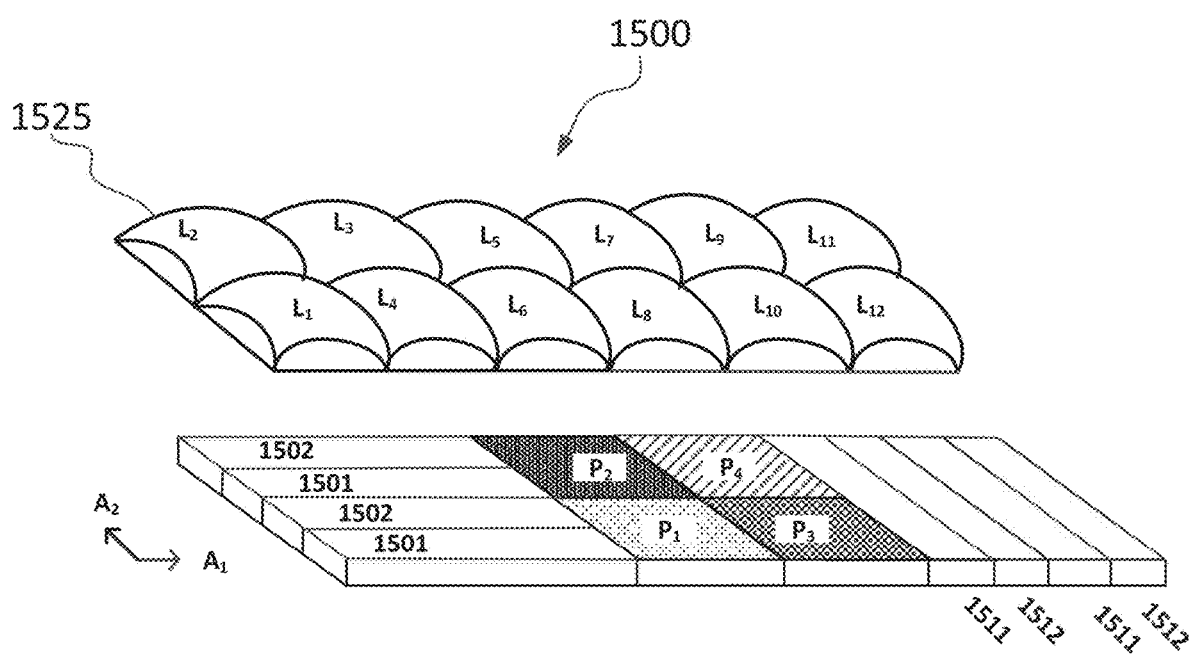
FIG. 15 schematically illustrates an example device incorporating multiple embodiments of features described herein.

As described herein, certain embodiments of features described herein can be combined together in any combination. Certain embodiments incorporating more than one feature described herein can advantageously provide a security device that is more difficult to counterfeit. Although various embodiments are described herein in the context of security devices, various embodiments can also be used in non-security applications (e.g., for aesthetics such as on packaging). FIG. 15 schematically illustrates an example optical device incorporating multiple embodiments of features described herein.

In FIG. 15, the example optical device 1500 includes at least one array 1525 of lenses. A plurality of first 1501 and second 1502 segments can be disposed under the array 1525 of lenses (e.g., under lenses or lens elements $L_1$, $L_2$, $L_3$, $L_4$). The plurality of first 1501 and second 1502 segments can have a length extending along a first axis $A_1$. As illustrated in FIG. 15, the first 1501 and second 1502 segments can form a 1D segment array (e.g., an array of segments periodic in one dimension) such that individual ones of the first 1501 and second 1502 segments can be disposed under a plurality of corresponding lenses. For example, one set of the first 1501 and second 1502 segments can be disposed under lenses $L_1$, $L_4$, and another set of the first 1501 and second 1502 segments can be disposed under lenses $L_2$, $L_3$.

As described herein, in various embodiments, the first 1501 and second 1502 segments can correspond to portions of an image or icon/background (e.g., as described with respect to FIGS. 1A-1B and 3A-3B). For example, the first 1501 and second 1502 segments can include a combination of specular reflecting, transparent, diffusely reflective, and/or diffusely transmissive features as described herein. Halftoning and/or color generating structures can also be incorporated (e.g., as described with respect to FIGS. 8A-8C and 10A-13B). Upon tilting the first 1501 and second 1502 segments about the first axis $A_1$ at a first viewing angle, the array 1525 of lenses can be configured to present an icon for viewing. Upon tilting the first 1501 and second 1502 segments about the first axis $A_1$ at a second viewing angle, the array 1525 of lenses can be configured to not present the icon for viewing. As described with reference to FIGS. 1A-1B, some embodiments can be configured such that the viewer can see the icon appear and disappear upon tilting. As described with reference to FIGS. 3A-3B, some embodiments can be configured such that the viewer can see the icon switch to another icon upon tilting. In some embodiments, the icon can appear in the plane of the surface of the device (e.g., as opposed to above, in front of, below, or behind the surface of the device).

With continued reference to FIG. 15, some embodiments can include one or more additional sets of features as described herein. For example, the example optical device 1500 can include another plurality of first 1511 and second 1512 segments disposed under the array 1525 of lenses (e.g., under lenses $L_9$, $L_{10}$, $L_{11}$, $L_{12}$). The plurality of the first 1511 and second 1512 segments can have a length extending along a second axis $A_2$. As illustrated, the first 1511 and second 1512 segments can form a 1D segment array such that individual ones of the first 1511 and second 1512 segments can be disposed under a plurality of corresponding lenses. For example, one set of the first 1511 and second 1512 segments can be disposed under lenses $L_9$, $L_{10}$, and another set of the first 1511 and second 1512 segments can be disposed under lenses $L_{11}$, $L_{12}$.

With continued reference to FIG. 15, the second set of segments (e.g., the plurality of first 1511 and second 1512 segments) can be laterally displaced from the first set of segments (e.g., plurality of first 1501 and second 1502 segments). As illustrated in FIG. 15, the second set of segments can be spaced apart from the first set of segments. In some embodiments, the second set can be adjacent to the first set.

The second set of segments (e.g., the first 1511 and second 1512 segments) can have similar features as the first set of segments (e.g., the first 1501 and second 1502 segments). Upon tilting first 1511 and second 1512 segments about the second axis $A_2$ at a third viewing angle, the array 1525 of lenses can be configured to present a second icon for viewing (can be an icon that is similar or different in shape, size, color, texture, etc. than the icon from the first 1501 and second 1502 segments). When tilting the first 1511 and second 1512 segments about the second axis $A_2$ at a fourth viewing angle, the array 1525 of lenses can be configured to not present the second icon for viewing (e.g., either disappearing or switching to another icon).

In this example, the first $A_1$ and second $A_2$ axes are orthogonal to each other. For example, when looking from a top view of the lens array 1525 and the segments disposed thereunder, the first axis $A_1$ can be the horizontal axis and the second axis $A_2$ can be the vertical axis (or vice versa). Incorporating two such examples in an optical device 1500 can produce two different optical effects. For example, in some embodiments upon tilting about the horizontal axis, icons can appear to flip vertically, and upon tilting about the vertical axis, icons can appear to flip horizontally.

As an example, the optical device (e.g., an optical array thin film device) can include a first and second image. In some embodiments, the second image can be adjacent to the first image. For example, the second image can be physically adjacent to the first image. Upon tilting the device away or toward an observer, the first image can flip to a third image, and upon tilting the device from side to side, the second image can flip to a fourth image. The first, second, third, and fourth images can include an icon and a background. The first, second, third, and fourth images can have similar or different icons. In some examples, the icons/images can be all different from one another. In some embodiments, the third or fourth image may be a blank image such that when the first or second image flips, the image has the optical effect of the icon/image appearing and disappearing (e.g., FIGS. 1A-1B). In some embodiments, two icons/images can match at a particular angle of tilt. For example, the first image can match the third or fourth image at a tilting angle, or the second image can match the third or fourth image at a tilting angle. As described herein, any of the icons can appear bright against a darker diffuse background at an angle of specular observation. As also described herein, any of the icons can appear dark against a brighter diffuse background at an angle of off-specular observation. The device can include any of the features described herein (e.g., one or more of specular reflecting, diffusely reflecting, transmissive, or diffusely transmissive features configured to define the first, second, third, or fourth images).

In addition, certain embodiments can include (or instead of having a second plurality of first 1511 and second 1512 segments) a plurality of additional segments $P_1$, $P_2$, $P_3$, $P_4$ (e.g., as described with respect to FIGS. 14A-14H) disposed under the array 1525 of lenses (e.g., under $L_5$, $L_6$, $L_7$, $L_8$). In some embodiments, the segments $P_1$, $P_2$, $P_3$, $P_4$ can form a 2D image array of a plurality of icons/backgrounds or images. The plurality of additional segments $P_1$, $P_2$, $P_3$, $P_4$ can be disposed with respect to a corresponding lens $L_5$, $L_6$, $L_7$, $L_8$ of the array 1525 of lenses. The array 1525 of lenses can present the plurality of icons (e.g., a 2D image array of icons in some cases) for viewing. For example, the lenses can be configured to produce a magnified version of the icons/backgrounds or images.

As illustrated in FIG. 15, the portions $P_1$, $P_2$, $P_3$, $P_4$ can be laterally displaced from the first set of segments (e.g., plurality of first 1501 and second 1502 segments) and/or the second set of segments (e.g., plurality of first 1511 and second 1512 segments). As described herein, some embodiments can produce optical effects such that the icons can appear above, in front of, below, or behind the surface of the device (e.g., as opposed to in the plane of the surface of the device). For example, in some embodiments, the plurality of icons can appear above or in front of the surface of the device. In some such embodiments, the icons can appear to move to the right of the device when an observer moves to the left of the device. Alternatively, in some embodiments, the plurality of icons can appear below or behind the surface of the device. In some such embodiments, the icons can appear to move to the left of the device when an observer moves to the left of the device.

As described herein, in some embodiments, the distance (or pitch) between adjacent lenses $L_5$, $L_6$, $L_7$, $L_8$ of the array 1525 of lenses can be equal to, less than, or greater than (e.g., from about 0.25% to about 1%, from about 0.25% to about 10%, from about 0.25% to about 15%, or from about 0.25% to about 20% less than or greater than) a distance between the corresponding segments $P_1$, $P_2$, $P_3$, $P_4$ disposed under the array 1525 of lenses (or the pitch of the 2D image array formed by features on the segments $P_1$, $P_2$, $P_3$, $P_4$). In some instances, when the pitch of the lenses is greater than the pitch of the 2D image array, the icons can appear below or behind the surface of the device (e.g., the icons can appear to float below or behind the surface of the device). In some instances, when the pitch of the lenses is less than the pitch of the 2D image array, the icons can appear above or in front of the surface of the device (e.g., the icons can appear to float above or in front of the surface of the device).

In some embodiments (not shown), two such sets of portions $P_1$, $P_2$, $P_3$, $P_4$ can be provided (alone or in combination with other segments shown in FIG. 15). In some embodiments, the first and second set of portions can produce different optical effects. For instance, the first set of portions may produce an icon (or a 2D array of icons/images) that is different (e.g., in size, shape, color, texture, etc.) from the icon (or a 2D array of icons/images) produced by the second set of portions. As another example, the first set of portions may produce an icon (or a 2D array of icons/images) that appears to float below the surface of the device, and the second set of portions may produce an icon (or a 2D array of icons/images) that appears to float above the surface of the device. In some embodiments, the first and second sets of portions may produce the same or similar optical effect, but may be spaced apart from each other by a region (e.g., including any of the features producing optical effects as described herein) that produces a different optical effect from the first or second sets of portions. In some embodiments, the first and second sets of portions may be spaced apart by a region that produces no optical effect.

In various embodiments, the at least one array of lenses can be provided by separate array lenses (e.g., separate 1D arrays and/or separate 2D arrays of lenses). In some embodiments, the array of lenses can be provided by a single 2D array 1525 of lenses (e.g., as shown in FIG. 15). For example, in some embodiments, the different regions producing different optical effects can be manufactured so as to be together under the same 2D array of lenses. Compared to incorporating different sets of lenses (and/or features disposed under the lenses) separately, certain embodiments, such as those having a common 2D array of lenses disposed thereover, can be easier to manufacture and can provide better registration and/or alignment of the different sets of lenses and/or features.

Additional features described herein may be included (e.g., in between or surrounding) and/or substituted for any of the example features shown in FIG. 15. As described herein, certain embodiments of features described herein can be combined together in any combination (e.g., any of the features described with reference to FIGS. 1A-14H). For example, with reference to FIG. 5A, some embodiments can include a transparent portion 503 to allow information (e.g., printed information, graphics, photograph, etc.) on an underlying product or packaging to be viewable. The transparent portion 503 can include a transparent layer of high refractive index material (e.g., index of refraction of about 1.8 to about 2.5, of about 1.8 to about 2.75, or of about 1.8 to about 3.0, such as zinc sulfide, titanium dioxide, tantalum pentoxide, zirconium dioxide, or a combination thereof). Reflective features, such as decorative features, may be formed by the index mismatched material such as high refractive index material (or reflective interference coating(s)) that provide some level of reflectivity in addition to some level of optical transmission. Other examples are possible.

Example Optical Effects

With reference to FIG. 1A-1B or 3A-3B, various implementations described herein can provide an optical device 100, 300 having an array 105, 305 of lenses (e.g., one or more 1D array of lenses, 2D array of lenses, and/or combination thereof) and a plurality of segments 101, 102, 301, 302 disposed under the array 105, 305 of lenses. The plurality of segments 101, 102, 301, 302 can correspond to a plurality of images 110, 120, 310, 320. In some implementations, the images 110, 120, 310, 320 can include at least one icon 112, 312, 322 and at least one background 115, 125, 315, 325. The segments 101, 102, 301, 302 (one or more segments) can include any of the features described herein. For example, the segments can include smooth features 132, 332, 342 (e.g., specular reflecting and/or transparent features) and/or diffusing features 135, 145, 335, 345 (e.g., diffusely reflective and/or diffusely transmissive features). The smooth features 132, 332, 342 can define one of the at least one icon 112, 312, 322 and the at least one background 115, 125, 315, 325. The diffusing features 135, 145, 335, 345 can define the at least one background 115, 125, 315, 325 when the smooth features 132, 332, 342 define the at least one icon 112, 312, 322. Alternatively, the diffusing features 135, 145, 335, 345 can define the at least one icon 112, 312, 322 when the smooth features 132, 332, 342 define the at least one background 115, 125, 315, 325. The features 132, 332, 342, 135, 145, 335, 345 can be viewed in reflection and/or transmission.

The segments 101, 102, 301, 302 can include at least two sets 101/102, 301/302 of segments corresponding to at least two images 110/120, 310/320. For simplicity, FIGS. 1A-1B and 3A-3B illustrate only two sets 101/102, 301/302 of segments corresponding to at least a first image 110, 310 and second image 120, 320. As the optical device 100, 300 is tilted, the array 105, 305 of lenses can present the first image 110, 310 at a first viewing angle α, and the second image 120, 320 at a second viewing angle β different from the first viewing angle α. As described herein, various optical effects such as an icon appearing and disappearing (e.g., FIGS. 1A-1B) or an icon switching to another icon (e.g., FIGS. 3A-3B) can be achieved.

Figure 16:
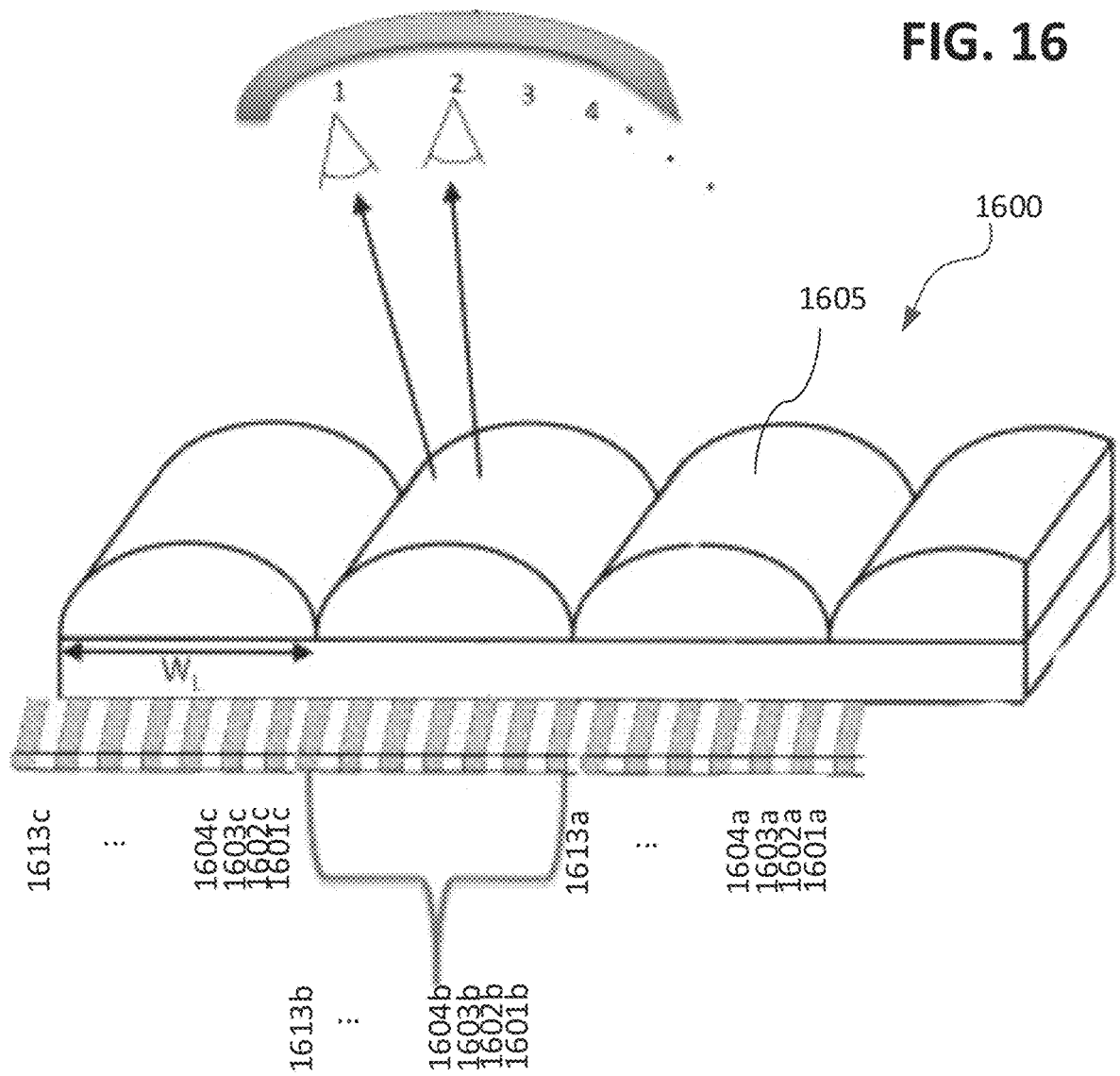
FIG. 16 schematically illustrates an example of optical device in accordance with certain embodiments described herein.

As also described herein, the number of segments and images are not particularly limited. The segments can include additional sets of segments corresponding to additional images. For example, the optical device can include 3, 4, 5, 10, 15, 20, 25, 30, 35, 40, 45, 50, 60, 70, 80, 90, 100, or more (or any range formed by such values, e.g., 10-30, 15-30, 20-30, 10-40, 15-40, 20-40, 10-50, 15-50, 20-50, 10-60, 15-60, 20-60, 10-70, 15-70, 20-70, 10-80, 15-80, 20-80, 10-90, 15-90, 20-90, 10-100, 15-100, 20-100, etc.) sets of segments and/or images. FIG. 16 schematically illustrates an example of such an optical device 1600. In FIG. 16, there are thirteen sets 1601, 1602, 1603, 1604, . . . 1613 of segments corresponding to thirteen images as an example. A set 1601 of segments can include non-adjacent segments 1601a, 1601b, 1601c. As the optical device 1600 is tilted through different viewing angles, the array of lenses 1605 can present the images sequentially. For example, the array of lenses 1605 can present a first image formed by a first set 1601 of segments 1601a, 1601b, 1601c, followed by a second image formed by a second set 1602 of segments 1602a, 1602b, 1602c, followed by a third image formed by a third set 1603 of segments 1603a, 1603b, 1603c, followed by a fourth image formed by a fourth set 1604 of segments 1604a, 1604b, 1604c, etc. As shown, segments from the various sets are included under a single lens of the array of lenses. As illustrated in FIG. 16, for example, segments 1601a, 1602a, 1603a, 1604a, etc. from the various sets, e.g., the first set 1601, the second set 1602, the third set 1603, the fourth set 1604, etc. are included under a first lens of the array of lenses. Similarly, segments 1601b, 1602b, 1603b, 1604b, etc. from the various sets, e.g., the first set 1601, the second set 1602, the third set 1603, the fourth set 1604, etc. are included under a second lens of the array of lenses. And, segments 1601c, 1602c, 1603c, 1604c, etc. from the various sets, e.g., the first set 1601, the second set 1602, the third set 1603, the fourth set 1604, etc. are included under a third lens of the array of lenses.

To incorporate additional segments 1601, 1602, 1603, 1604, . . . 1613, the size of the lenses (e.g., thickness t and/or width $W_L$) may be increased and/or the width of segments may be reduced. As an example, some segments can have a width less than or equal to 50 microns, less than or equal to 40 microns, less than or equal to 30 microns, less than or equal to 20 microns, less than or equal to 10 microns, and/or in a range from 0.5 micron to 50 microns, in any range within this range (e.g., 0.5 micron to 40 microns, 0.5 micron to 30 microns, 0.5 micron to 20 microns, 0.5 micron to 10 microns, 1 micron to 40 microns, 1 micron to 30 microns, 1 micron to 20 microns, 1 micron to 10 microns, etc.), any values within these ranges, or in any ranges formed by such values. In some instances, the thickness and/or width of a lens can be greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, greater than or equal to 90 microns, greater than or equal to 100 microns, and/or in a range from 10 microns to 100 microns, in any range within this range (e.g., 10 microns to 20 microns, 10 microns to 30 microns, 10 microns to 40 microns, 10 microns to 50 microns, 10 microns to 60 microns, 10 microns to 70 microns, 10 microns to 80 microns, 10 microns to 90 microns, 10 microns to 100 microns, etc.), any values within these ranges, or in any ranges formed by such values.

In certain implementations, the optical device can include a 1D array of lenses configured to present a 3D image. In various implementations, the optical device can include a 2D array of lenses configured to present a 3D image. In some implementations, the images can include similar icons and backgrounds with gradual differences such that the still images (e.g., frames) when presented and viewed in sequence can provide an optical effect of motion or change (e.g., a moving picture). In some designs, the images when presented and viewed in sequence can provide an optical effect of a smooth, continuous animation (e.g., without flicker). For instance, the presented images can provide perceptions of one or more icons from a different orientation, perspective, location and/or one or more icons that may appear to move, rotate, change form, color, brightness, etc. Some images can include shadows.

In some implementations, the images can include different icons and/or backgrounds, or similar icons and/or backgrounds with abrupt differences such that the images when presented can provide an optical effect of rapidly switching icons. In some implementations, the images can include a combination of images with gradual and abrupt differences, e.g., to provide optical effects of both gradually changing icons and rapidly changing icons. In some implementations, the gradual and abrupt differences between images can be quantified, for example, by correlation (e.g., angle sequential correlation). For example, a sequence of images A, B, C, D, E, may have identical images A and B which would have a correlation coefficient of 1. In some instances, a relatively high correlation (e.g., correlation coefficient of 0.5, 0.55, 0.6, 0.65, 0.7, 0.75, 0.8, 0.85, 0.9, 0.95, 0.96, 0.97, 0.98, 0.99, 1 or any ranges formed by such values such as 0.5 to 0.9, 0.5 to 0.95, 0.5 to 1, 0.6 to 0.9, 0.6 to 0.95, 0.6 to 1, 0.65 to 0.9, 0.65 to 0.95, 0.65 to 1, 0.7 to 0.9, 0.7 to 0.95, 0.7 to 1, 0.75 to 0.9, 0.75 to 0.95, 0.75 to 1, 0.8 to 0.9, 0.8 to 0.95, 0.8 to 1, 0.85 to 0.9, 0.85 to 0.95, 0.85 to 1, 0.9 to 0.95, 0.9 to 1, 0.95 to 1, 0.97 to 1, etc.) and/or a relatively low correlation differential (e.g., difference between correlation coefficients of 0, 0.01, 0.02, 0.03, 0.04, 0.05, 0.1, 0.15, 0.2, 0.25, 0.3, 0.35, 0.4, 0.45, 0.49 or any ranges formed by such values such as 0 to 0.1, 0.05 to 0.1, 0 to 0.15, 0.05 to 0.15, 0 to 0.2, 0.05 to 0.2, 0.1 to 0.2, 0 to 0.25, 0.05 to 0.25, 0.1 to 0.25, 0 to 0.3, 0.05 to 0.3, 0.1 to 0.3, 0 to 0.35, 0.05 to 0.35, 0.1 to 0.35, 0 to 0.4, 0.05 to 0.4, 0.1 to 0.4, 0 to 0.45, 0.05 to 0.45, 0.1 to 0.45, 0 to 0.49, 0.05 to 0.49, 0.1 to 0.49, etc.) between two images viewable in sequence upon tilt provided by two sets of segments can indicate a gradual change, and a relatively low correlation (e.g., correlation coefficient of 0, 0.01, 0.02, 0.03, 0.04, 0.05, 0.1, 0.15, 0.2, 0.25, 0.3, 0.35, 0.4, 0.45, 0.49, or any ranges formed by such values such as 0 to 0.1, 0.05 to 0.1, 0 to 0.15, 0.05 to 0.15, 0 to 0.2, 0.05 to 0.2, 0.1 to 0.2, 0 to 0.25, 0.05 to 0.25, 0.1 to 0.25, 0 to 0.3, 0.05 to 0.3, 0.1 to 0.3, 0 to 0.35, 0.05 to 0.35, 0.1 to 0.35, 0 to 0.4, 0.05 to 0.4, 0.1 to 0.4, 0 to 0.45, 0.05 to 0.45, 0.1 to 0.45, 0 to 0.49, 0.05 to 0.49, 0.1 to 0.49, etc.) and/or a relatively high correlation differential (e.g., difference between correlation coefficients of 0.5, 0.55, 0.6, 0.65, 0.7, 0.75, 0.8, 0.85, 0.9, 0.95, 0.96, 0.97, 0.98, 0.99, 1 or any ranges formed by such values such as 0.5 to 0.9, 0.5 to 0.95, 0.5 to 1, 0.6 to 0.9, 0.6 to 0.95, 0.6 to 1, 0.65 to 0.9, 0.65 to 0.95, 0.65 to 1, 0.7 to 0.9, 0.7 to 0.95, 0.7 to 1, 0.75 to 0.9, 0.75 to 0.95, 0.75 to 1, 0.8 to 0.9, 0.8 to 0.95, 0.8 to 1, 0.85 to 0.9, 0.85 to 0.95, 0.85 to 1, 0.9 to 0.95, 0.9 to 1, 0.95 to 1, 0.97 to 1, etc.) between two images viewable in sequence upon tilt provided by two sets of segments can provide an abrupt change. Since an image is provided by a set of segments, the correlation and/or correlation differential between two segments can also indicate a gradual or abrupt change in portions of two images. For example, in some implementations, a relatively high correlation (e.g., correlation coefficient of 0.5, 0.55, 0.6, 0.65, 0.7, 0.75, 0.8, 0.85, 0.9, 0.95, 0.96, 0.97, 0.98, 0.99, 1 or any ranges formed by such values) and/or relatively low correlation differential (e.g., correlation differential of 0, 0.01, 0.02, 0.03, 0.04, 0.05, 0.1, 0.15, 0.2, 0.25, 0.3, 0.35, 0.4, 0.45, 0.49 or any ranges formed by such values) between two sets of segments can provide a gradual change. In some instances, the naked eye may not discern the difference between the images. In some designs, a majority of adjacent segments and/or images (e.g., at least 50%, at least 60%, at least 70%, at least 80%, at least 90%, at least 95%, at least 96%, at least 97%, at least 98%, at least 99%, 100%, or any ranges formed by such values) can have a relatively high correlation therebetween (e.g., correlation coefficient of 0.5, 0.55, 0.6, 0.65, 0.7, 0.75, 0.8, 0.85, 0.9, 0.95, 0.96, 0.97, 0.98, 0.99, 1 or any ranges formed by such values) and/or relatively low correlation differential (e.g., correlation differential of 0, 0.01, 0.02, 0.03, 0.04, 0.05, 0.1, 0.15, 0.2, 0.25, 0.3, 0.35, 0.4, 0.45, 0.49 or any ranges formed by such values). As another example, in some implementations, a relatively low correlation (e.g., correlation coefficient of 0, 0.01, 0.02, 0.03, 0.04, 0.05, 0.1, 0.15, 0.2, 0.25, 0.3, 0.35, 0.4, 0.45, 0.49, or any ranges formed by such values) and/or relatively high correlation differential (e.g., correlation differential 0.5, 0.55, 0.6, 0.65, 0.7, 0.75, 0.8, 0.85, 0.9, 0.95, 0.96, 0.97, 0.98, 0.99, 1 or any ranges formed by such values) between two sets of segments can provide an abrupt change.

Figures 17A, 17B, 17C:
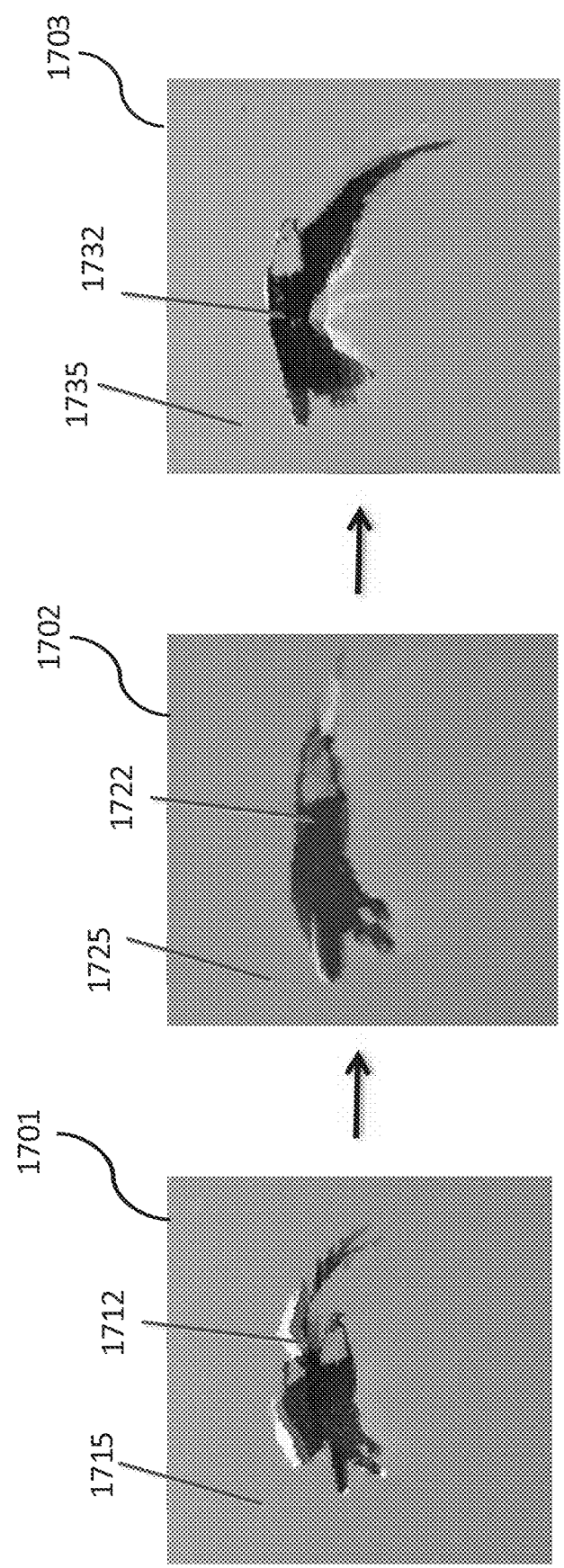
FIGS. 17A, 17B, and 17C show example images that can be presented for viewing by an optical device described herein.

FIGS. 17A-17C show example images that can be presented for viewing by an optical device described herein. The images 1701, 1702, 1703 include an icon 1712, 1722, 1732 against a background 1715, 1725, 1735. The images 1701, 1702, 1703 show the icon 1712, 1722, 1732 of an eagle in various stages of flight. When the images (e.g., along with other images with gradual differences) are presented sequentially for viewing, the eagle can appear to be in motion (e.g., flying).

In various examples, the images represent a sampling of the motion of an object or the movement of the orientation of the object or the lighting of the object. In some implementations, the number of unique images is sufficiently high to create smooth movement or transition between images when the angular motion between viewer and the optical device is sufficiently rapid. For example, if there are 13 images, and each image extends across a 5 degree field of view, and if the motion causes the viewer to move between images at a rate of 24 images/sec, and has an angular change of 65 degrees, the movement can appear as smooth as an animation or cinematic video in some implementations. As another example, for 22 sets of segments (e.g., corresponding to 22 images), each segment can be separated by 0.5 degree with an overall of 10 degrees of tilt to see fluid motion for all 22 set of segments. In some designs, the segments can be separated by 0.1 degree, 0.2 degree, 0.3 degree, 0.4 degree, 0.5 degree, 1 degree, 1.5 degrees, 2 degrees, 2.5 degrees, 3 degrees, 3.5 degrees, 4 degrees, 4.5 degrees, 5 degrees of tilt, etc. or any ranges formed by such values. Likewise, if the number of images is too small, the presented images may not provide the appearance of smooth motion with a large dynamic motion range. In various implementations, however the transition from one image to the next is seamless, without flicker, without interruption, or without abrupt transition as perceived by an aided human eye. Movement (including possibly e.g., rotation or change in perspective) and/or change from one shape, form, or presentation (e.g., brightness, contrast, shade, color, etc.) to another is similarly seamless, without flicker, without interruption, or without abrupt transition as perceived by an aided human eye and may appear as a movie, video, or animation. In some implementations, one or more changes may be abrupt. In certain implementations, periods of smooth or seamless transition can be included together with one or more abrupt transitions.

With reference to FIG. 16, after tilting the optical device 1600 such that all the images (e.g., 13 images in this example) are viewed, the device 1600 can again present another cycle of the images (e.g., another series of the 13 images) upon further tilting. In some implementations, the sets of segments can provide images that appear to form a continuous loop (e.g., no or substantially no abrupt change between cycles). For example, the last set of segments under a lens can have a relatively high correlation and/or relatively low correlation differential with an adjacent first set of segments under an adjacent lens such that the image provided by the last set of segments can be substantially similar to the image provided by the first set of segments. For example, with reference to FIGS. 17A-17C, the images when viewed in cycles can provide the optical effect of an eagle extending its wings up and down, up and down, etc. Other examples of moving life forms (e.g., humans, animals, and insects) are possible.

FIGS. 18A-18E show another example set of images that can be presented for viewing by an optical device described herein. The images 1801, 1802, 1803, 1804, 1805 include an icon 1812, 1822, 1832, 1842, 1852 against a background 1815, 1825, 1835, 1845, 1855. The images 1801, 1802, 1803, 1804, 1805 show an icon 1812, 1822, 1832, 1842, 1852 of a dollar sign from various orientations/perspectives. When viewed sequentially upon tilting the device, the dollar sign can appear to rotate. Additional icons can also be presented. For example, the images 1801, 1802, 1803, 1804, 1805 also show an icon 1813, 1823, 1833, 1843, 1853 of the shadow corresponding to the rotating dollar sign from a fixed light source. The shadow can move in a manner consistent with the movement of the object, here, the rotating dollar sign, illuminated by a fixed light source. Other examples of rotating objects and the corresponding shadows from a fixed light source are possible. Other examples may provide the optical effect of a fixed object and a moving/changing shadow from a moving light source. The shadow changes shape and size, for example, in a manner consistent with the movement of the light source with respect to the object and the resultant shadow produced from such changing position of the illumination. Such effects are "natural" and consistent with the changes in shape and size of real shadow produced by the illumination of real object with real light sources. Accordingly, such effects are intuitive. Other examples may provide an unnatural optical effect. For example, changes in perspective or movement of objects and/or shadows can be non-intuitive and/or unnatural. As an example, the expected shadow of the object (e.g., rotating dollar sign) may be in combination or replaced with an unexpected shadow (e.g., in combination or replaced with the shadow of the graphic "100" or the shadow of the scales of justice tipping). Another example can include an object having a natural optical effect and another object with an unnatural optical effect. One way of accomplishing such an effect is to decouple the movement or change of certain object with that of others by having the movements or changes be inconsistent, counter, independent, counter-intuitive, or otherwise uncoupled. For example, the presented images may include an icon (e.g., in the foreground) with one type of movement or optical effect (e.g., a rotating scale), and another icon (e.g., behind the other icon) with another type of movement or optical effect (e.g., a scale with dishes moving up and down) produced with tilt that would not be consistent or would be counter to each other, or would be counter-intuitive, independent or otherwise uncoupled or not connected. In some examples, the icon can include a corresponding shadow from a fixed light source. Alternatively or additionally, the icon can include a shadow that does not correspond to the fixed light source. In some examples, the icon can include a corresponding shadow from a moving light source. Alternatively or additionally, the icon can include a shadow that does not correspond to the moving light source. In some examples, the icon can include a shadow that does not correspond to a fixed light source or a moving light source. Any combination of these scenarios are also possible as more than one shadow from the same or from different icons can be included in the images. For example, the image can include a shadow corresponding to a fixed light source and a shadow that does not correspond to the fixed light source (formed by the same or a different object). Similarly, in some examples the image can include a shadow corresponding to a moving light source and a shadow that does not correspond to the moving light source (formed by the same or a different object). In some instances, at least one icon can include an object with a shadow and an object without a shadow. Other examples are possible.

FIGS. 19A-19E show another example set of images that can be presented for viewing by an optical device. The images 1901, 1902, 1903, 1904, 1905 include an icon 1912, 1922, 1932, 1942, 1952 against a background 1915, 1925, 1935, 1945, 1955. The images 1901, 1902, 1903, 1904, 1905 show an icon 1912, 1922, 1932, 1942, 1952 of an assembling star. Each succeeding image includes the image from the preceding image and additional content. With tilt, a portion of the icon persists and one or more additional portions of the icon or additional icons are added.

Figures 20A, 20B:
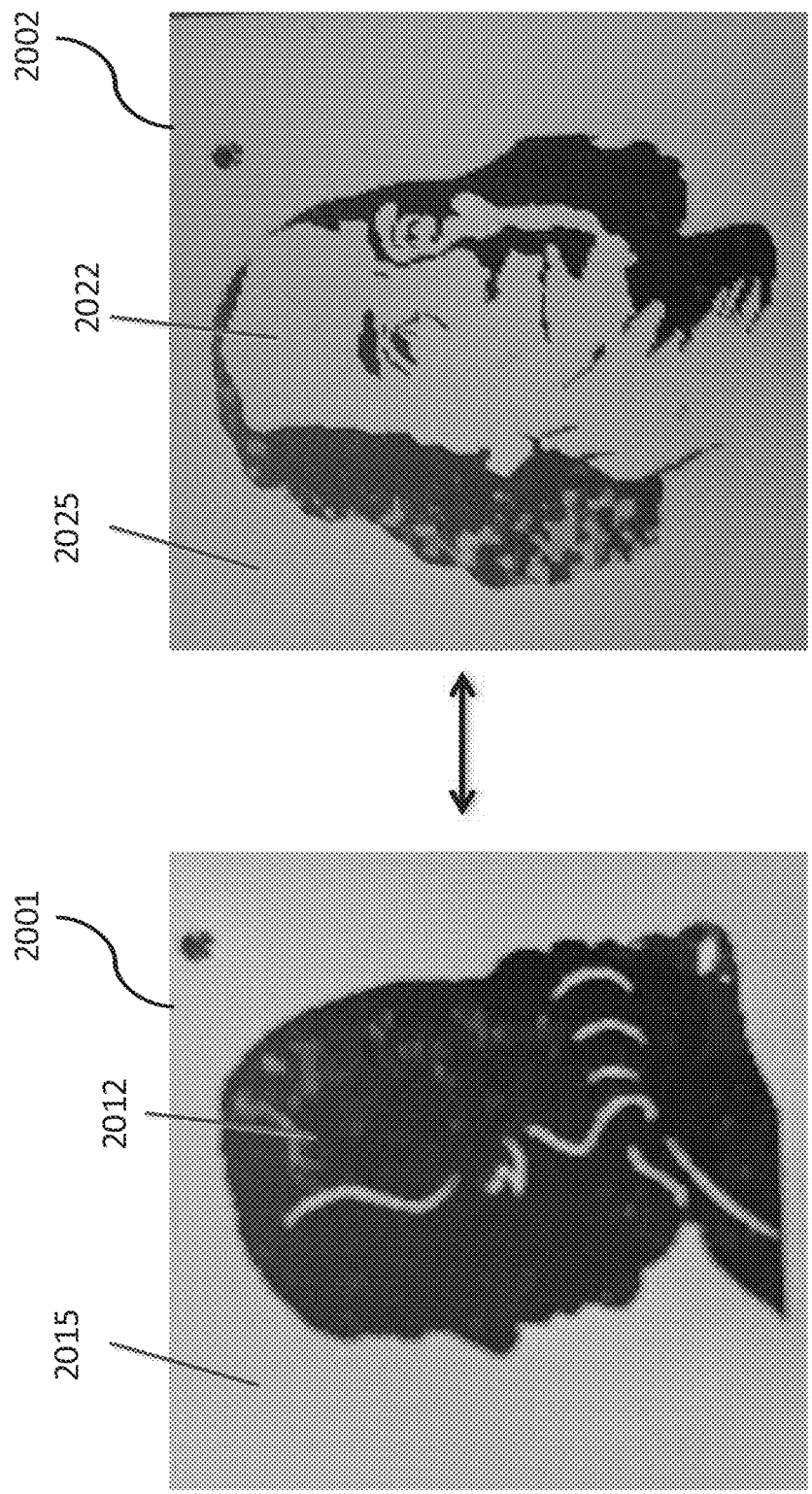
FIGS. 20A and 20B show another example set of images that can be presented for viewing.

FIGS. 20A-20B show another example set of images that can be presented for viewing. In this example, only the first image 2001 and last image 2002 are shown. The first image 2001 includes a first icon 2012 of a silhouette against a first background 2015. The second image 2002 includes a second icon 2022 of a face (e.g., full front view) against a second background 2025. The images in between the first and last image 2001, 2002 can gradually change form (e.g., morph) from the first icon 2012 (e.g., silhouette) into the second icon 2022 (e.g., full face). In some examples, the correlation between these successive segments can be high (e.g., correlation coefficient of 0.5, 0.55, 0.6, 0.65, 0.7, 0.75, 0.8, 0.85, 0.9, 0.95, 0.96, 0.97, 0.98, 0.99, 1 or any ranges formed by such values) and/or the correlation differential between these successive segments can be low (e.g., correlation differential of 0, 0.01, 0.02, 0.03, 0.04, 0.05, 0.1, 0.15, 0.2, 0.25, 0.3, 0.35, 0.4, 0.45, 0.49 or any ranges formed by such values). Other examples of icons changing form are possible.

Although some implementations may provide the appearance of a gradual change (e.g., moving, rotating, changing form) and/or a continuous loop (e.g., motion as described with respect to FIGS. 17A-17C), some devices may provide an abrupt change between any of the set of segments. For example, there may be a low correlation (e.g., correlation coefficient of 0, 0.01, 0.02, 0.03, 0.04, 0.05, 0.1, 0.15, 0.2, 0.25, 0.3, 0.35, 0.4, 0.45, 0.49, or any ranges formed by such values) and/or high correlation differential (e.g., correlation differential of 0.5, 0.55, 0.6, 0.65, 0.7, 0.75, 0.8, 0.85, 0.9, 0.95, 0.96, 0.97, 0.98, 0.99, 1 or any ranges formed by such values) between the last set of segments and the first set of segments such that the next cycle of images can provide the perception of a rapid flip to another icon (e.g., a correlation coefficient of 0.31 in FIGS. 20A-20B of a full face switching to a silhouette). As an example, if there are 11 frames of images changing from FIG. 20A to FIG. 20B, then using frame 1 as the reference, the correlation coefficient between frames goes from 1 (between frames 1 and itself) to 0.308 (between frames 1 and 11). Likewise, the correlation between frame 11 and 1 goes from 0.308 to 1. Also, in some implementations, there may be a low correlation and/or high correlation differential between the consecutive segments underneath a single lens.

Various implementations can provide one or more images that are achromatic and/or provide a grey scale effect. In some examples, the achromatic images can change in brightness. In some implementations, the device can include a tint, dye, ink, pigment, opal structure, and/or plasmonic structure to provide one or more images with color. The images can be monochromatic. In some instances, the monochromatic images can change in brightness with tilt.

Various embodiments of the present invention have been described herein. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. An optical device comprising:
an array of lenses; and
a plurality of segments disposed under the array of lenses, the plurality of segments corresponding to a plurality of images, the images comprising at least one icon and at least one background,
wherein the plurality of segments comprises smooth features and diffusing features, the smooth features defining one of the at least one icon and the at least one background, the diffusing features defining the at least one background when the smooth features define the at least one icon, and the diffusing features defining the at least one icon when the smooth features define the at least one background, and wherein the plurality of segments comprises ten sets of segments corresponding to ten images of the plurality of images such that as the device is tilted, the array of lenses presents the ten images sequentially as the device is tilted through 10 different viewing angles.

2. The optical device of claim 1, wherein the plurality of segments comprises 15 sets of segments corresponding to 15 images of the plurality of images such that the array of lenses presents the 15 images sequentially as the device is tilted through 15 different viewing angles.

3. The optical device of claim 2, wherein the plurality of segments comprises 20 sets of segments corresponding to 20 images of the plurality of images such that the array of lenses presents the 20 images sequentially as the device is tilted through 20 different viewing angles.

4. The optical device of claim 3, wherein the plurality of segments comprises 25 sets of segments corresponding to 25 images of the plurality of images such that the array of lenses presents the 25 images sequentially as the device is tilted through 25 different viewing angles.

5. The optical device of claim 1, wherein each set of the ten sets of segments comprises non-adjacent segments.

6. The optical device of claim 1, wherein the presented images provide images of the at least one icon from a different perspective.

7. The optical device of claim 1, wherein the presented images provide images of the at least one icon in a different location.

8. The optical device of claim 1, wherein the at least one icon appears to move as the device is tilted.

9. The optical device of claim 1, wherein the at least one icon appears to rotate as the device is tilted.

10. The optical device of claim 1, wherein the at least one icon appears to change form as the device is tilted.

11. The optical device of claim 1, wherein at least one of the at least one icon and the at least one background appear to change in brightness as the device is tilted.

12. The optical device of claim 1, wherein the plurality of segments comprises a tint, dye, ink, or pigment such that the images comprise color.

13. The optical device of claim 1, wherein the images are monochromatic.

14. The optical device of claim 1, wherein the images are achromatic.

15. The optical device of claim 1, wherein the device comprises a kinoform diffuser providing the diffusing features.

16. The optical device of claim 1, wherein the smooth features comprise specular reflecting features, and the diffusing features comprise diffusely reflective features.

17. The optical device of claim 1, wherein the smooth features comprise specular reflecting features, and the diffusing features comprise diffusely transmissive features.

18. The optical device of claim 1, wherein the smooth features comprise transparent features, and the diffusing features comprise diffusely reflective features.

19. The optical device of claim 1, wherein the smooth features comprise transparent features, and the diffusing features comprise diffusely transmissive features.

20. The optical device of claim 1, wherein the smooth features comprise specular reflecting features and transparent features, and the diffusing features comprise diffusely reflective features and diffusely transmissive features.

21. The optical device of claim 1, wherein the array of lenses comprises at least one 1D lens array.

22. The optical device of claim 1, wherein the array of lenses comprises at least one 2D array of lenses.

23. The optical device of claim 1, wherein the array of lenses comprises a first lens array having a first longitudinal axis and a second lens array having a second longitudinal axis, wherein the first and second arrays are arranged such that the first longitudinal axis of the first array is angled from 5 to 90 degrees with respect to the second longitudinal axis of the second array.

24. The optical device of claim 1, wherein the device is configured to provide authenticity verification on an item for security.

25. The optical device of claim 24, wherein the item is a credit card, a debit card, a banknote, currency, a passport, a driver's license, an identification card, a document, a ticket, a tamper evident container or packaging, or a bottle of pharmaceuticals.

26. The optical device of claim 1, wherein the device is a security thread, a hot stamp feature, an embedded feature, a windowed feature, or a laminated feature.

27. The optical device of claim 1, wherein adjacent segments have a correlation such that the at least one icon in the corresponding images appears to flip to another icon.

28. The optical device of claim 1, wherein the at least one icon appears to rotate with a corresponding shadow from a fixed light source.

29. The optical device of claim 1, wherein the at least one icon appears to remain fixed with a shadow that changes corresponding to a moving light source.

30. The optical device of claim 1, wherein for a plurality of preceding and succeeding images, each succeeding image includes an element in the preceding image.

31. The optical device of claim 1, wherein the presented images provide a smooth, continuous animation.

* * * * *